US010677602B2

(12) United States Patent
Rakah et al.

(10) Patent No.: US 10,677,602 B2
(45) Date of Patent: Jun. 9, 2020

(54) DETECTING THE NUMBER OF VEHICLE PASSENGERS

(71) Applicant: VIA TRANSPORTATION, INC., New York, NY (US)

(72) Inventors: Yaron Rakah, Givatayim (IL); Oren Shoval, Jerusalem (IL); Daniel Ramot, New York, NY (US); Shmulik Marcovitch, Kfar Saba (IL)

(73) Assignee: VIA TRANSPORTATION, INC., New York, NY (US)

( * ) Notice: Subject to any disclaimer, the term of this patent is extended or adjusted under 35 U.S.C. 154(b) by 0 days.

(21) Appl. No.: 15/914,843

(22) Filed: Mar. 7, 2018

(65) Prior Publication Data
US 2018/0211124 A1 Jul. 26, 2018

Related U.S. Application Data

(63) Continuation of application No. PCT/US2018/015060, filed on Jan. 24, 2018.
(Continued)

(51) Int. Cl.
*G01C 21/34* (2006.01)
*G08G 1/00* (2006.01)
(Continued)

(52) U.S. Cl.
CPC ......... *G01C 21/3438* (2013.01); *B60N 2/002* (2013.01); *G01C 21/343* (2013.01);
(Continued)

(58) Field of Classification Search
CPC ............ G01C 21/3438; G01C 21/3492; G01C 21/3461; G01C 21/343; G01C 21/3691; G01C 21/3415; H04W 4/40; G06K 9/00838; G06K 9/00845; G06K 9/6201; G06K 9/621; G06K 9/62015; B60N 2/002;
(Continued)

(56) References Cited

U.S. PATENT DOCUMENTS

| 4,528,679 A | * | 7/1985 | Shahbaz | ............... | G06M 1/108 367/108 |
| 9,599,481 B2 | | 3/2017 | Lord et al. | | |

(Continued)

*Primary Examiner* — Muhammad Shafi
(74) *Attorney, Agent, or Firm* — Finnegan, Henderson, Farabow, Garrett & Dunner, L.L.P.

(57) ABSTRACT

An automated ridesharing dispatch system includes a communications interface configured to electronically receive ride requests from a plurality of users and a memory configured to store a capacity threshold for each of a plurality of ridesharing vehicles. The system also includes at least one processor configured to process the ride requests received from the communications interface and to assign to a single ridesharing vehicle the plurality of users for pick up at a plurality of differing pick-up locations and for delivery to a plurality of differing drop-off locations, determine a route for the ridesharing vehicle, receive from at least one sensor within the ridesharing vehicle, information indicative of a current number of passengers in the ridesharing vehicle, and determine whether to assign additional users to the ridesharing vehicle based on the received information from the sensor and the capacity threshold associated with the ridesharing vehicle.

18 Claims, 45 Drawing Sheets

Related U.S. Application Data

(60) Provisional application No. 62/450,239, filed on Jan. 25, 2017, provisional application No. 62/500,109, filed on May 2, 2017, provisional application No. 62/537,155, filed on Jul. 26, 2017.

(51) Int. Cl.

| | | |
|---|---|---|
| *G01C 21/36* | (2006.01) | |
| *G06Q 50/30* | (2012.01) | |
| *G06Q 10/04* | (2012.01) | |
| *G08G 1/123* | (2006.01) | |
| *G08G 1/01* | (2006.01) | |
| *G08G 1/0968* | (2006.01) | |
| *H04W 4/40* | (2018.01) | |
| *B60N 2/00* | (2006.01) | |
| *G06K 9/00* | (2006.01) | |
| *G06Q 10/02* | (2012.01) | |
| *G06Q 10/06* | (2012.01) | |
| *G08G 1/005* | (2006.01) | |
| *G08G 1/14* | (2006.01) | |
| *G08G 1/127* | (2006.01) | |

(52) U.S. Cl.
CPC ..... *G01C 21/3415* (2013.01); *G01C 21/3461* (2013.01); *G01C 21/3492* (2013.01); *G01C 21/3691* (2013.01); *G06K 9/00838* (2013.01); *G06Q 10/02* (2013.01); *G06Q 10/047* (2013.01); *G06Q 10/0631* (2013.01); *G06Q 50/30* (2013.01); *G08G 1/005* (2013.01); *G08G 1/0129* (2013.01); *G08G 1/096822* (2013.01); *G08G 1/096844* (2013.01); *G08G 1/123* (2013.01); *G08G 1/148* (2013.01); *G08G 1/20* (2013.01); *G08G 1/202* (2013.01); *H04W 4/40* (2018.02); *G08G 1/127* (2013.01)

(58) Field of Classification Search
CPC .. G08G 1/202; G08G 1/127; G08G 1/096844; G08G 1/005; G08G 1/148; G06Q 50/30; G06Q 10/0631; G06Q 10/02
USPC .......................................................... 701/517
See application file for complete search history.

(56) References Cited

U.S. PATENT DOCUMENTS

| | | | | |
|---|---|---|---|---|
| 2004/0215382 | A1* | 10/2004 | Breed | B60C 11/24 701/45 |
| 2006/0208169 | A1* | 9/2006 | Breed | B60N 2/002 250/221 |
| 2011/0195699 | A1* | 8/2011 | Tadayon | H04B 5/0062 455/418 |
| 2012/0041675 | A1* | 2/2012 | Juliver | G06Q 10/08 701/465 |
| 2014/0052481 | A1* | 2/2014 | Monteil | G06Q 10/02 705/5 |
| 2015/0324718 | A1* | 11/2015 | Lord | G06Q 50/30 705/7.13 |
| 2016/0361970 | A1* | 12/2016 | Pebbles | B60H 1/00742 |
| 2018/0080263 | A1* | 3/2018 | Rose | E05B 81/18 |

\* cited by examiner

DETECTING THE NUMBER OF VEHICLE PASSENGERS

CROSS REFERENCES TO RELATED APPLICATIONS

This application is a continuation of PCT International Application No. PCT/US2018/015060, filed Jan. 24, 2018, which claims the benefit of priority of U.S. Provisional Patent Application No. 62/450,239, filed Jan. 25, 2017; U.S. Provisional Patent Application No. 62/500,109, filed May 2, 2017; and U.S. Provisional Patent Application No. 62/537,155, filed Jul. 26, 2017. All of the foregoing applications are incorporated herein by reference in their entirety.

BACKGROUND

I. Technical Field

The present disclosure generally relates to the field of vehicle ridesharing and systems and methods for ridesharing management.

II. Background Information

Recent years have witnessed increasing interest and development in the field of vehicle sharing, where one or more riders may share the same vehicle for a portion of their rides. Ridesharing may save ride costs, increase vehicle utilization, and reduce air pollution. A rider may use a ridesharing service through a ridesharing service application accessed by the rider's mobile device.

SUMMARY

Embodiments consistent with the present disclosure provide systems and methods for vehicle ridesharing and for managing a fleet of ridesharing vehicles. For example, consistent with the disclosed embodiments, the fleet of ridesharing vehicles may include more than 10 ridesharing vehicles, more than 100 ridesharing vehicles, or more than 1000 ridesharing vehicles that pick-up multiple users and drop them off at locations proximate but other than their desired destinations.

In one embodiment, a system for managing a fleet of ridesharing vehicles may comprise a communications interface configured to receive requests for shared rides from a plurality of users; memory configured to store indications of passenger-capacity for specific ridesharing vehicles in the fleet; and at least one processor configured to receive information from the communications interface, access the memory. The at least one processor may be further configured to assign, to ridesharing vehicles already transporting users, additional users for simultaneous transportation in the ridesharing vehicles; track a current utilized capacity of each specific ridesharing vehicle; and implement a threshold block that prevents assignment of additional users to a ridesharing vehicle when the ridesharing vehicle's current utilized capacity is above a threshold being less than the ridesharing vehicle's passenger-capacity.

In another embodiment, a computer-implemented method for managing a fleet of ridesharing vehicles may comprise assigning, to ridesharing vehicles already transporting users, additional users for simultaneous transportation in the ridesharing vehicles; tracking a current utilized capacity of each specific ridesharing vehicle; and implementing a threshold block that prevents assignment of additional users to a ridesharing vehicle when the ridesharing vehicle's current utilized capacity is above a threshold being less than the ridesharing vehicle's passenger-capacity.

In one embodiment, an automated ridesharing dispatch system may comprise a communications interface configured to receive ride requests from a first plurality of communication devices associated with a plurality of users and receive location information from a second plurality of communication devices associated with a plurality of ridesharing vehicles. Each ride request may include a starting point and a desired destination corresponding to each of the plurality of users. The system may further comprise at least one processor configured to assign a first ridesharing vehicle to pick-up a first group of the plurality of users and determine pick-up locations for the first group of users. For at least some of the first group of users, the determined pick-up locations may differ from the starting points. The at least one processor may be further configured to send data to the at least some of the first group of users to guide each user to a respective pick-up location different from a corresponding starting point of each said user; use information received from a first communications device of a first user to predict when the first user will arrive the assigned first pick-up location; prior to the first user arriving at a first pick-up location, cancel the assignment of the first ridesharing vehicle to the first user while maintaining the assignment of the first ridesharing vehicle to others of the first group of users; predict when a second ridesharing vehicle may pass the first pick-up location; compare the predicted passing time of the second ridesharing vehicle with the arrival time of the first user; and re-assign the first user to the second ridesharing vehicle when the predicted passing time is after the predicted arrival time.

In another embodiment, a computer-implemented method for automatically dispatching ridesharing vehicles may comprise receiving ride requests from a first plurality of communication devices associated with a plurality of users and receiving location information from a second plurality of communication devices associated with a plurality of ridesharing vehicles. Each ride request may include a starting point and a desired destination corresponding to each of the plurality of users. The method may further comprise assigning a first ridesharing vehicle to pick-up a first group of the plurality of users and determining pick-up locations for the first group of users. For at least some of the first group of users, the determined pick-up locations may differ from the starting points. The method may further comprise sending data to the at least some of the first group of users to guide each user to a respective pick-up location different from a corresponding starting point of each said user, using information received from a first communications device of a first user to predict when the first user will arrive the assigned first pick-up location; prior to the first user arriving at a first pick-up location, cancelling the assignment of the first ridesharing vehicle to the first user while maintaining the assignment of the first ridesharing vehicle to others of the first group of users; predicting when a second ridesharing vehicle may pass the first pick-up location; comparing the predicted passing time of the second ridesharing vehicle with the arrival time of the first user; and re-assigning the first user to the second ridesharing vehicle when the predicted passing time is after the predicted arrival time.

In one embodiment, an automated ridesharing dispatch system may comprise a communications interface configured to receive ride requests from a first plurality of communication devices associated with a plurality of users, wherein each ride request includes a starting point and a desired destination corresponding to each of the plurality of users; receive location information from a second plurality of communication devices associated with a plurality of ridesharing vehicles; and at least one processor. The at least one processor may be configured to: assign a first ridesharing vehicle to pick-up a group of the plurality of users; determine pick-up locations for the group of users, wherein for at least some of the group of the plurality of users, the determined pick-up locations differ from the starting points; send data to the group of the plurality of users indicating appointed pick-up times at the determined pick-up locations; use information received from at least one of the plurality of ridesharing vehicles to predict when the first ridesharing vehicle will arrive to a first pick-up location assigned to a first user; prior to a first pick-up time associated with the first user, estimate that the first ridesharing vehicle is going to be late to the first pick-up location by more than a time threshold; identify a second ridesharing vehicle to be assigned to pick-up the first user, cancel the assignment of the first ridesharing vehicle to the first user while maintaining the assignment of the first ridesharing vehicle to others of the group of the plurality of users; and assign the second ridesharing vehicle to pick up the first user.

In one embodiment, a system for managing a fleet of ridesharing vehicles may comprise a communications interface configured to receive requests for shared rides from a plurality of users and at least one processor. The at least one processor may be configured to identify a first ridesharing vehicle and a second ridesharing vehicle that are currently without passengers and receive, via the communications interface, a first request for a shared ride from a first user. The first request may include information related to a first pick-up location of the first user and a first desired destination of the first user. The at least one processor may be further configured to receive, via the communications interface, a second request for a shared ride from a second user. The second request may include information related to a second pick-up location of the second user and a second desired destination of the second user. The at least one processor may be further configured to assign the first user and the second user to the first ridesharing vehicle; generate a route to the first ridesharing vehicle for picking up and dropping off each of the first user and the second user; and receive, via the communications interface, a third request for a shared ride from a third user. The third request may include information related to a third pick-up location of the third user and a third desired destination of the third user. The at least one processor may be further configured to calculate a first expected arrival time of the first ridesharing vehicle at the third pick-up location and calculate a second expected arrival time of the second ridesharing vehicle at the third pick-up location. The second expected arrival time may be sooner than the first expected arrival time. The at least one processor may be further configured to, when both the first expected arrival time and the second expected arrival time are below a predetermined threshold, assign the third user to the first ridesharing vehicle; and generate an updated route for the first ridesharing vehicle to pick-up the third user.

In another embodiment, a method for managing a fleet of ridesharing vehicles may comprise receiving requests for shared rides from a plurality of users; identifying a first ridesharing vehicle and a second ridesharing vehicle that are currently without passengers; and receiving, via a communications interface, a first request for a shared ride from a first user. The first request may include information related to a first pick-up location of the first user and a first desired destination of the first user. The method may further comprise receiving, via the communications interface, a second request for a shared ride from a second user. The second request may include information related to a second pick-up location of the second user and a second desired destination of the second user. The method may further comprise assigning the first user and the second user to the first ridesharing vehicle; generating a route to the first ridesharing vehicle for picking up and dropping off each of the first user and the second user; and receiving, via the communications interface, a third request for a shared ride from a third user. The third request may include information related to a third pick-up location of the third user and a third desired destination of the third user. The method may further comprise calculating a first expected arrival time of the first ridesharing vehicle at the third pick-up location and calculating a second expected arrival time of the second ridesharing vehicle at the third pick-up location. The second expected arrival time may be sooner than the first expected arrival time. The method may further comprise, when both the first expected arrival time and the second expected arrival time are below a predetermined threshold, assigning the third user to the first ridesharing vehicle; and generating an updated route for the first ridesharing vehicle to pick-up the third user.

In one embodiment, an automated ridesharing dispatch system includes memory configured to store historical data associated with past demand for ridesharing vehicles in a geographical area, a communications interface, and at least one processor configured to access the memory. The at least one processor is configured to use the historical data to predict imminent demand of ridesharing requests including predicting general zones in the geographical area associated with imminent demand and select a holding zone for prepositioning empty ridesharing vehicles in order to expedite satisfaction of the predicted imminent demand. The at least one processor is also configured to send, via the communications interface, to a mobile communications device in a specific ridesharing vehicle, instructions directing the specific ridesharing vehicle to the holding zone.

In one embodiment, a non-transitory computer-readable storage medium stores instructions that, when executed by at least one processor, cause the at least one processor to perform a method for managing a fleet of ridesharing vehicles. The method includes storing historical data associated with past demand for ridesharing vehicles in a geographical area and using the historical data to predict imminent demand of ridesharing requests including predicting general zones in the geographical area associated with imminent demand. The method also includes selecting a holding zone for prepositioning empty ridesharing vehicles in order to expedite satisfaction of the predicted imminent demand and sending to a mobile communications device in a specific ridesharing vehicle, instructions directing the specific ridesharing vehicle to the holding zone.

In one embodiment, an automated ridesharing dispatch system includes a memory configured to store historical data associated with past demand for ridesharing vehicles in a geographical area, a communications interface configured to receive location information from a plurality of communication devices associated with a plurality of ridesharing vehicles, and at least one processor configured to access the memory. The at least one processor is configured to assign, to ridesharing vehicles already transporting users, additional users for simultaneous transportation in the ridesharing vehicles and to track assignments of each specific ridesharing vehicle to identify that a first ridesharing vehicle and a second ridesharing vehicle are about to be without passengers and without future assignments. The at least one processor is also configured to direct the first ridesharing vehicle to a first holding zone based on a current location of the first vehicle and a predicted imminent demand proximate the first holding zone and direct the second ridesharing vehicle to a second holding zone other than the first holding zone based on a current location of the second vehicle and a predicted imminent demand proximate to the second holding zone.

In one embodiment, an automated ridesharing dispatch system includes a communications interface configured to receive ride requests from a plurality of users headed to differing destinations, each ride request including a starting point and a desired destination. The communications interface is also configured to receive from a mobile communications device associated with a ridesharing vehicle, a current location of the ridesharing vehicle. At least one processor is configured to in response to the ride requests, send the ridesharing vehicle to pick up the plurality of users headed to differing destinations and determine, based on a known passenger capacity of the ridesharing vehicle, a capacity status of the ridesharing vehicle. If the capacity status of the ridesharing vehicle is below a capacity threshold, the processor directs the ridesharing vehicle along a first route resulting in a first set of arrival times for the plurality of users. If the capacity threshold is met, the processor directs the ridesharing vehicle along a second route resulting in a second set of arrival times for the plurality of users. The second set of arrival times is earlier than the first set of arrival times.

In one embodiment, a non-transitory computer-readable storage medium storing instructions that, when executed by at least one processor, cause the at least one processor to perform a method for managing a fleet of ridesharing vehicles. The method includes receiving ride requests from a plurality of users headed to differing destinations, each ride request including a starting point and a desired destination. The method also includes receiving from a mobile communications device associated with a ridesharing vehicle, a current location of the ridesharing vehicle and, in response to the ride requests, sending the ridesharing vehicle to pick up the plurality of users headed to differing destinations. The method further includes determining based on a known passenger capacity of the ridesharing vehicle, a capacity status of the ridesharing vehicle. If the capacity status of the ridesharing vehicle is below a capacity threshold, the ridesharing vehicle is directed along a first route resulting in a first set of arrival times for the plurality of users. If the capacity threshold is met, the ridesharing vehicle is directed along a second route resulting in a second set of arrival times for the plurality of users. The second set of arrival times are earlier than the first set of arrival times.

In one embodiment, an automated ridesharing dispatch system includes a communications interface configured to receive ride requests from a plurality of users headed to differing destinations, each ride request including a starting point and a desired destination, and to receive from a mobile communications device associated with a ridesharing vehicle, a current location of the ridesharing vehicle. At least one processor is configured to in response to the ride requests, send the ridesharing vehicle to pick up the plurality of users headed to differing destinations, to determine based on a known passenger capacity of the ridesharing vehicle, a capacity status of the ridesharing vehicle, and to direct the ridesharing vehicle along at least one of a first route and a second route based on a comparison of the capacity status of the ridesharing vehicle to a capacity threshold. The first route results in a first set of arrival times for the plurality of users, the second route results in a second set of arrival times for the plurality of users, and the second set of arrival times are earlier than the first set of arrival times.

In one embodiment, an automated ridesharing dispatch system is disclosed. The system may include a communications interface, a memory, a plurality of communication devices, a plurality of ridesharing vehicles, and at least one processor. The communications interface may be configured to receive ride requests from a plurality of users, wherein each ride request includes a starting point and a desired destination, and receive from a plurality of communication devices associated with a plurality of ridesharing vehicles, indications of current locations of the plurality of ridesharing vehicles. The memory may be configured to store a plurality of rules including a rule to select a fastest route for guiding a ridesharing vehicle, and a rule for reducing backtracking, even in instances where backtracking would result in shorter travel time. The at least one processor may be configured to assign the plurality of users to a common ridesharing vehicle and to use the stored plurality of rules to determine a route for the ridesharing vehicle other than the fastest route. The determined route is selected to account for the rule for reducing backtracking and includes a plurality of pick-up and drop-off locations associated with the starting points and desired destinations of the plurality of users. The at least one processor may also be configured in order to reduce backtracking, to direct the ridesharing vehicle along the determined route other than the fastest route.

In one embodiment, a method is disclosed for managing a fleet of ridesharing vehicles. The method may be performed by a system including a communications interface, a plurality of communication devices, a plurality of ridesharing vehicles, a memory, and at least one processor. The method may include receiving ride requests from a plurality of users, wherein each ride request includes a starting point and a desired destination; receiving from a plurality of communication devices associated with a plurality of ridesharing vehicles, indications of current locations of the plurality of ridesharing vehicles; accessing memory configured to store a plurality of rules including a rule to select a fastest route for guiding a ridesharing vehicle and a rule for reducing backtracking, even in instances where backtracking would result in shorter travel time; assigning the plurality of users to a common ridesharing vehicle; using the stored plurality of rules to determine a route for the ridesharing vehicle other than the fastest route, the determined route is selected to account for the rule for reducing backtracking and includes a plurality of pick-up and drop-off locations associated with the starting points and desired destinations of the plurality of users; and in order to reduce backtracking, directing the ridesharing vehicle along the determined route other than the fastest route.

In one embodiment, a system for directing a vehicle-for-hire and a prospective passenger to a remote pick-up location to avoid traffic congestion is disclosed. The system may include a communications interface, a plurality of communication devices, a plurality of vehicles-for-hire, and at least one processor. The communications interface may be configured to receive a ride request from a user, wherein the ride request includes a starting point and a desired destination, and receive from the plurality of communication devices associated with the plurality of vehicles-for-hire indications of current locations of the plurality of vehicles-for-hire. The at least one processor may be configured to receive real time traffic data, including information about at least one of street blockages and atypical congestion, identify an existence of an area of traffic obstruction in a vicinity of the user's starting point, select a vehicle-for-hire to pick up the user, and identify a pick-up location, remote from the user's starting point, peripheral to the area of traffic obstruction. The at least one processor may be configured to send to the user, via the communications interface, information about the pick-up location, and send to the selected vehicle-for-hire, via the communications interface, driving directions to the pick-up location, wherein the driving directions substantially avoid the area of traffic obstruction.

In one embodiment, a method is disclosed for directing a vehicle-for-hire and a prospective passenger to a remote pick-up location to avoid traffic congestion. The method may be performed by a communications interface, a plurality of communication devices, a plurality of vehicles-for-hire, and at least one processor. The method may include receiving a ride request from a user, wherein the ride request includes a starting point and a desired destination, receiving from the plurality of communication devices associated with the plurality of vehicles-for-hire indications of current locations of the plurality of vehicles-for-hire, receiving real time traffic data, including information about at least one of street blockages and atypical congestion, identifying an existence of an area of traffic obstruction in a vicinity of the user's starting point, selecting a vehicle-for-hire to pick up the user, identifying a pick-up location, remote from the user's starting point, and peripheral to the area of traffic obstruction, sending to the user, via the communications interface, information about the pick-up location, and sending to the selected vehicle-for-hire, via the communications interface, driving directions to the pick-up location, wherein the driving directions substantially avoid the area of traffic obstruction.

In one embodiment, a system is disclosed for directing a vehicle-for-hire and a prospective passenger to a remote pick-up location to avoid traffic congestion. The system may include a communications interface, a plurality of communication devices, a plurality of vehicles-for-hire, and at least one processor. The communications interface may be configured to receive from the plurality of communication devices associated with the plurality of vehicles-for-hire indications of current locations of the plurality of vehicles-for-hire. The at least one processor may be configured to receive real time traffic data, including information about at least one of street blockages and atypical congestion, identify an existence of an area of traffic obstruction in a vicinity of the user's starting point, select a vehicle-for-hire to pick up the user, identify a drop-off location, remote from the user's desired destination, peripheral to the area of traffic obstruction, send to the selected vehicle-for-hire, via the communications interface, driving directions to the drop-off location, wherein the driving directions substantially avoid the area of traffic obstruction, and send to the user, via the communications interface, walking directions from the drop-off location to the desired destination.

In one embodiment, an automated ridesharing dispatch system is disclosed. The system may include a communications interface configured to electronically receive ride requests from a plurality of users, a memory configured to store a capacity threshold for each of a plurality of ridesharing vehicles, at least one sensor, and at least one processor. The processor may be configured to process the ride requests received from the communications interface and to assign to a single ridesharing vehicle the plurality of users for pick up at a plurality of differing pick-up locations and for delivery to a plurality of differing drop-off locations. The processor may be configured to determine a route for the ridesharing vehicle, receive from at least one sensor within the ridesharing vehicle, information indicative of a current number of passengers in the ridesharing vehicle, and determine whether to assign additional users to the ridesharing vehicle based on the received information from the sensor and the capacity threshold associated with the ridesharing vehicle.

In one embodiment, a method is disclosed for automatically dispatching ridesharing vehicles. The method may be performed by a communications interface configured to electronically receive ride requests from a plurality of users, a memory configured to store a capacity threshold for each of a plurality of ridesharing vehicles, at least one sensor, and at least one processor. The method may include storing a capacity threshold for each of a plurality of ridesharing vehicles, receiving ride requests from a plurality of users, assigning to a particular ridesharing vehicle the plurality of users for pick up at a plurality of differing pick-up locations and for delivery to a plurality of differing drop-off locations, determining a route for the ridesharing vehicle, receiving at a location remote from the particular vehicle, and based on sensor data transmitted from the particular vehicle, information indicative of a current number of passengers in the particular vehicle, comparing the sensor data from the particular vehicle with the capacity threshold of the particular vehicle, determining, based on comparing, whether a number of actual users within the particular vehicle exceeds a number of users assigned to the particular vehicle, and reassigning to another vehicle a subsequent user already assigned to the particular vehicle if, from the sensor data, actual users detected exceeds the number of assigned users.

In one embodiment, an autonomous ridesharing vehicle is disclosed. The vehicle may include a plurality of seats for accommodating a number of passengers no greater than a capacity threshold, a communications interface configured to wirelessly communicate with a remote server, at least one sensor configured to detect a current number of passengers in the ridesharing vehicle, and at least one processor. The at least one processor may be configured to receive from the remote server a route including a plurality of pick-up locations for picking up users, a number of the users expected to enter the ridesharing vehicle at each pick-up location, and a plurality of drop-off locations for delivering the users, determine a discrepancy between an actual number of passengers entering the ridesharing vehicle at a specific pick-up location and the number of users expected to enter the ridesharing vehicle at the specific pick-up location, and inform the remote server of the discrepancy, thereby causing a change in the route of the ridesharing vehicle.

Consistent with other disclosed embodiments, non-transitory computer-readable storage media may store program instructions, which are executed by at least one processing device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute part of this disclosure, illustrate various example embodiments. In the drawings.

DETAILED DESCRIPTION

Figure 1:
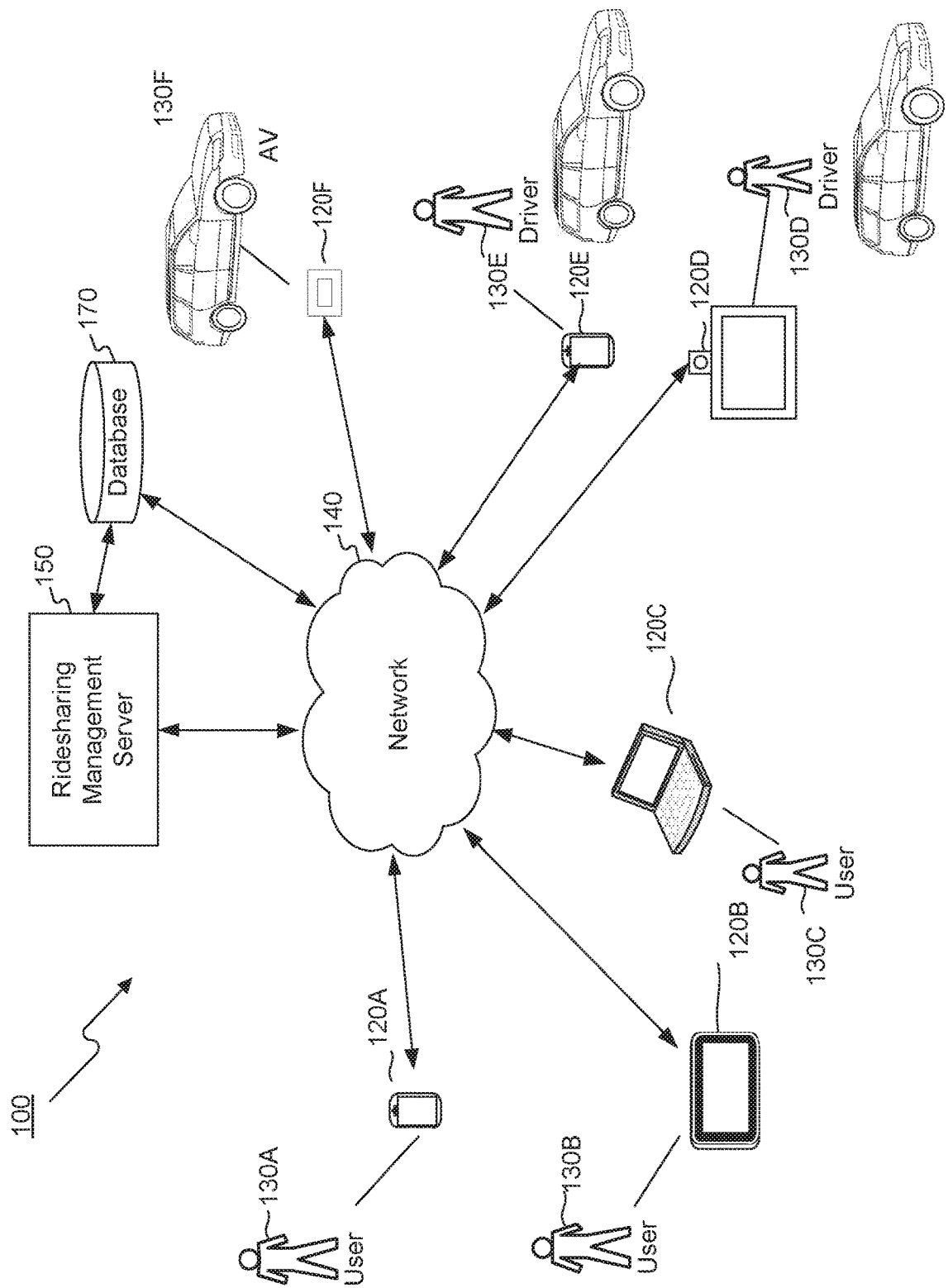
FIG. 1 is a diagram illustrating an example ridesharing management system, in accordance with some embodiments of the present disclosure.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Disclosed embodiments of the present disclosure provide methods and systems for vehicle ridesharing and vehicle ridesharing management. The term "vehicle" or "ridesharing vehicle" as used herein refers to any kind of vehicle (e.g., car, van, SUV, truck, bus, etc.) suitable for human transportation, such as providing ride services. In some embodiments, a vehicle may be a taxi. In some embodiments, a vehicle may include an autonomous vehicle, wherein a control device integrated with the vehicle or a management system separate from the vehicle may send operational instructions and guide the vehicle to designated pick-up locations and drop-off locations. For the ease and conciseness of description, some embodiments disclosed herein may simply refer to a vehicle or a taxi as an example, which does not limit the scope of the disclosed embodiments.

Consistent with some embodiments of the present disclosure, a ridesharing management system may receive a first ride request from a first user. The first ride request may include a starting point and a desired destination. The ridesharing management system may calculate a first estimated pick-up time based on a current location of a vehicle that is in the surrounding areas. After sending a confirmation with the estimated pick-up time, the ridesharing management system may then guide the vehicle to a pick-up location for picking up the first rider. The pick-up location may be a different location from the starting point included in the first ride request. The system may also guide the first user to the pick-up location.

In some embodiments, the system may subsequently receive a second ride request from a second user, for example, while the first user is still in the vehicle. The second ride request may include a second starting point and a second desired destination. The system may calculate a second estimated pick-up time, provide a second confirmation to the second rider, and guide the second rider to a second pick-up location. In some embodiments, the second pick-up location may be a different location from the second starting point included in the second ride request.

In some embodiments, the system may calculate the fares for each user, based on the solo ride portion for a corresponding user, and the shared portion of the ride. For example, the system may offer a discount for the shared portion of the ride. In some embodiments, the system may also calculate the fare amount for a particular user based on various service-related parameters such as user input regarding whether to use toll roads, the walking distance between the starting point and the pick-up location, and the walking distance between the desired destination and the drop-off location.

The embodiments herein further include computer-implemented methods, tangible non-transitory computer-readable mediums, and systems. The computer-implemented methods can be executed, for example, by at least one processor that receives instructions from a non-transitory computer-readable storage medium. Similarly, systems and devices consistent with the present disclosure can include at least one processor and memory, and the memory can be a non-transitory computer-readable storage medium. As used herein, a "non-transitory computer-readable storage medium" refers to any type of physical memory on which information or data readable by at least one processor can be stored. Examples include random access memory (RAM), read-only memory (ROM), volatile memory, nonvolatile memory, hard drives. CD ROMs. DVDs, flash drives, disks, and any other known physical storage medium. Singular terms, such as "memory" and "computer-readable storage medium," can additionally refer to multiple structures, such a plurality of memories or computer-readable storage mediums. As referred to herein, a "memory" may comprise any type of computer-readable storage medium unless otherwise specified. A computer-readable storage medium may store instructions for execution by at least one processor, including instructions for causing the processor to perform steps or stages consistent with an embodiment herein. Additionally, one or more computer-readable storage mediums may be used in implementing a computer-implemented method. The term "computer-readable storage medium" should be understood to include tangible items and exclude carrier waves and transient signals.

FIG. 1 is a diagram illustrating an example ridesharing management system, in which various implementations as described herein may be practiced, according to some embodiments of the present disclosure. As shown in FIG. 1, ridesharing management system 100 includes one or more mobile communications devices 120A-120F (collectively referred to as mobile communications devices 120), a network 140, a ridesharing management server 150, and a database 170. The plurality of mobile communications devices 120A-120F may further include a plurality of user devices 120A-120C associated with users 130A-130C respectively, a plurality of driver devices 120D and 120E associated with drivers 130D and 130E, and a driving-control device 120F associated with an autonomous vehicle 130F. Consistent with some embodiments of the present disclosure, ridesharing management server 150 may communicate with driving-control device 120F to direct autonomous vehicle 130F to pick-up and drop-off users 130A-130C. In one example, autonomous vehicles capable of detecting objects on the road and navigate to designated locations may be utilized for providing ridesharing services.

The components and arrangements shown in FIG. 1 are not intended to limit the disclosed embodiments, as the system components used to implement the disclosed processes and features can vary. For example, ridesharing management system 100 may include multiple ridesharing management servers 150, and each ridesharing management server 150 may handle a certain category of ridesharing services, ridesharing services associated with a certain category of service vehicles, or ridesharing services in a specific geographical region, such that a plurality of ridesharing management servers 150 may collectively provide a dynamic and integrated ridesharing service system.

Network 140 may facilitate communications between user devices 120 and ridesharing management server 150, for example, receiving ride requests and other ride server related input from or sending confirmations to user devices, and sending ride service assignments to driver devices and driving-control devices. Network 140 may be any type of networks that provides communications, exchanges information, and/or facilitates the exchange of information between ridesharing management server 150 and user devices 120. For example, network 140 may be the Internet, a Local Area Network, a cellular network, a public switched telephone network ("PSTN"), or other suitable connection(s) that enables ridesharing management system 100 to send and receive information between the components of ridesharing management system 100. Network 140 may support a variety of messaging formats, and may further support a variety of services and applications for user devices 120. For example, network 140 may support navigation services for mobile communications devices 120, such as directing the users and service vehicles to pick-up or drop-off locations.

Ridesharing management server 150 may be a system associated with a communication service provider which provides a variety of data or services, such as voice, messaging, real-time audio/video, to users, such as users 130A-130E. Ridesharing management server 150 may be a computer-based system including computer system components, desktop computers, workstations, tablets, handheld mobile communications devices, memory devices, and/or internal network(s) connecting the components. Ridesharing management server 150 may be configured to receive information from mobile communications devices 120 over network 140, process the information, store the information, and/or transmit information to mobile communications devices 120 over network 140.

For example, in some embodiments, ridesharing management server 150 may be configured to: receive ride requests from user devices 120A-120C, send ride confirmation and ride fare information to user devices 120A-120C, and send ride service assignments (for example, including pick-up and drop-off location information) to driver devices 120D and 120E, and driving-control device 120F. Further, ridesharing management server 150 may further be configured to receive user input from user devices 120A-120C as to various ride service parameters, such as walking distance to a pick-up location, maximum delay of arrival/detour, and maximum number of subsequent pick-ups, etc. In some embodiments, ridesharing management server 150 may be further configured to: calculate ride fares based on a solo portion of a user's ride and a shared portion of the ride. Further, the ride fare calculation may further be based on various ride service parameters set by the user, such as the walking distance involved in the ride, and user selection regarding toll road usage, etc.

Database 170 may include one or more physical or virtual storages coupled with ridesharing management server 150. Database 170 may be configured to store user account information (including registered user accounts and driver accounts), corresponding user profiles such as contact information, profile photos, and associated mobile communications device information. With respect to users, user account information may further include ride history, service feedbacks, complaints, or comments. With respect to drivers, user account information may further include number of ride service assignments completed, ratings, and ride service history information. Database 170 may further be configured to store various ride requests received from user devices 120A-120C and corresponding starting point and desired destination information, user input regarding various service parameters, pick-up and drop-off locations, time of pick-up and drop-off, ride fares, and user feedbacks, etc.

Database 170 may further include traffic data, maps, and toll road information, which may be used for ridesharing service management. Traffic data may include historical traffic data and real-time traffic data regarding a certain geographical region, and may be used to, for example, calculate estimate pick-up and drop-off times, and determine an optimal route for a particular ride. Real-time traffic data may be received from a real-time traffic monitoring system, which may be integrated in or independent from ridesharing management system 100. Maps may include map information used for navigation purposes, for example, for calculating potential routes and guiding the users to a pick-off or drop-off location. Toll road information may include toll charges regarding certain roads, and any change or updates thereof. Toll road information may be used to calculate ride fares, for example, in cases where the user permits use of toll roads.

The data stored in database 170 may be transmitted to ridesharing management server 150 for accommodating ride requests. In some embodiments, database 170 may be stored in a cloud-based server (not shown) that is accessible by ridesharing management server 150 and/or mobile communications devices 120 through network 140. While database 170 is illustrated as an external device connected to ridesharing management server 150, database 170 may also reside within ridesharing management server 150 as an internal component of ridesharing management server 150.

As shown in FIG. 1, users 130A-130E may include a plurality of users 130A-130C, and a plurality of drivers 130D and 130E, who may communicate with one another, and with ridesharing management server 150 using various types of mobile communications devices 120. As an example, a mobile communications device 120 may include a display such as a television, tablet, computer monitor, video conferencing console, or laptop computer screen. A mobile communications device 120 may further include video/audio input devices such as a microphone, video camera, keyboard, web camera, or the like. For example, a mobile communications device 120 may include mobile devices such as a tablet or a smartphone having display and video/audio capture capabilities. A mobile communications device 120 may also include one or more software applications that facilitate the mobile communications devices to engage in communications, such as IM, VoIP, video conferences. For example, user devices 130A-130C may send requests to ridesharing management server 150, and receive confirmations therefrom. Drivers 130D and 130E may use their respective devices to receive ride service assignments and navigation information from ridesharing management server 150, and may contact the users with their respective devices 120D and 120E.

In some embodiments, a user may directly hail a vehicle by hand gesture or verbal communication, such as traditional street vehicle hailing. In such embodiments, once a driver accepts the request, the driver may then use his device to input the ride request information. Ridesharing management server 150 may receive such request information, and accordingly assign one or more additional ride service assignments to the same vehicle, for example, subsequent e-hail ride requests received from other mobile communications devices 120 through network 140.

In some embodiments, driver devices 120D and 120E, and driving-control device 120F may be embodied in a vehicle control panel, as a part of the vehicle control system associated with a particular vehicle. For example, a traditional taxi company may install a drive device in all taxi vehicles managed by the taxi company. In some embodiments, driver devices 120D and 120E, and driving-control device 120F, may be further coupled with a payment device, such as a card reader installed as a part of the vehicle control panel or as a separate device associated with the vehicle. A user may then use the payment device as an alternative payment mechanism. For example, a user who hails the taxi on the street may pay through the payment device, without using a user device providing ridesharing service.

Figure 2:
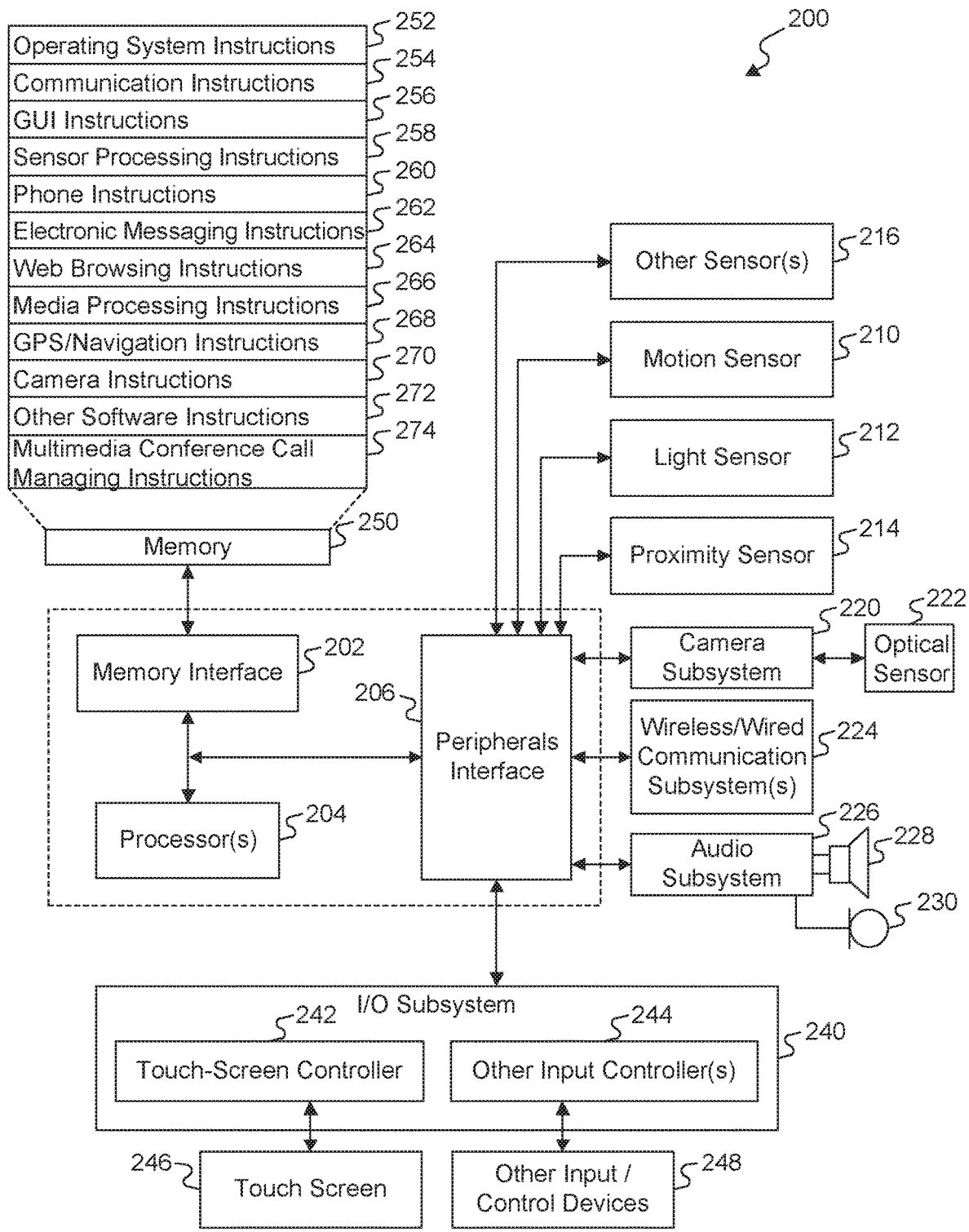
FIG. 2 is a diagram illustrating the components of an example mobile communications device associated with a ridesharing management system, in accordance with some embodiments of the present disclosure.

FIG. 2 is a diagram illustrating the components of an example mobile communications device 200 associated with a ridesharing management system, such as system 100 as shown in FIG. 1, in accordance with some embodiments of the present disclosure. Mobile communications device 200 may be used to implement computer programs, applications, methods, processes, or other software to perform embodiments described in the present disclosure, such as mobile communications devices 120A-120F. For example, user devices 120A-120C, driver devices 120D and 120E, and driving-control device 120F may respectively be installed with a user side ridesharing application, and a corresponding driver side ridesharing application.

Mobile communications device 200 includes a memory interface 202, one or more processors 204 such as data processors, image processors and/or central processing units, and a peripherals interface 206. Memory interface 202, one or more processors 204, and/or peripherals interface 206 can be separate components or can be integrated in one or more integrated circuits. The various components in mobile communications device 200 may be coupled by one or more communication buses or signal lines.

Sensors, devices, and subsystems can be coupled to peripherals interface 206 to facilitate multiple functionalities. For example, a motion sensor 210, a light sensor 212, and a proximity sensor 214 may be coupled to peripherals interface 206 to facilitate orientation, lighting, and proximity functions. Other sensors 216 may also be connected to peripherals interface 206, such as a positioning system (e.g., GPS receiver), a temperature sensor, a biometric sensor, or other sensing device, to facilitate related functionalities. A GPS receiver may be integrated with, or connected to, mobile communications device 200. For example, a GPS receiver may be included in mobile telephones, such as smartphone devices. GPS software may allow mobile telephones to use an internal or external GPS receiver (e.g., connecting via a serial port or Bluetooth). A camera subsystem 220 and an optical sensor 222. e.g., a charged coupled device ("CCD") or a complementary metal-oxide semiconductor ("CMOS") optical sensor, may be used to facilitate camera functions, such as recording photographs and video clips.

Communication functions may be facilitated through one or more wireless/wired communication subsystems 224, which includes a Ethernet port, radio frequency receivers and transmitters and/or optical (e.g., infrared) receivers and transmitters. The specific design and implementation of wireless/wired communication subsystem 224 may depend on the communication network(s) over which mobile communications device 200 is intended to operate. For example, in some embodiments, mobile communications device 200 may include wireless/wired communication subsystems 224 designed to operate over a GSM network, a GPRS network, an EDGE network, a Wi-Fi or WiMax network, and a Bluetooth® network.

An audio subsystem 226 may be coupled to a speaker 228 and a microphone 230 to facilitate voice-enabled functions, such as voice recognition, voice replication, digital recording, and telephony functions.

I/O subsystem 240 may include touch screen controller 242 and/or other input controller(s) 244. Touch screen controller 242 may be coupled to touch screen 246. Touch screen 246 and touch screen controller 242 may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 246. While touch screen 246 is shown in FIG. 2, 1/O subsystem 240 may include a display screen (e.g., CRT or LCD) in place of touch screen 246.

Other input controller(s) 244 may be coupled to other input/control devices 248, such as one or more buttons, rocker switches, thumb-wheel, infrared port, USB port, and/or a pointer device such as a stylus. Touch screen 246 may, for example, also be used to implement virtual or soft buttons and/or a keyboard.

Memory interface 202 may be coupled to memory 250. Memory 250 includes high-speed random access memory and/or non-volatile memory, such as one or more magnetic disk storage devices, one or more optical storage devices, and/or flash memory (e.g., NAND. NOR). Memory 250 may store an operating system 252, such as DRAWIN, RTXC, LINUX, iOS, UNIX, OS X, WINDOWS, or an embedded operating system such as VXWorkS. Operating system 252 may include instructions for handling basic system services and for performing hardware dependent tasks. In some implementations, operating system 252 can be a kernel (e.g., UNIX kernel).

Memory 250 may also store communication instructions 254 to facilitate communicating with one or more additional devices, one or more computers and/or one or more servers. Memory 250 can include graphical user interface instructions 256 to facilitate graphic user interface processing; sensor processing instructions 258 to facilitate sensor-related processing and functions; phone instructions 260 to facilitate phone-related processes and functions; electronic messaging instructions 262 to facilitate electronic-messaging related processes and functions; web browsing instructions 264 to facilitate web browsing-related processes and functions, media processing instructions 266 to facilitate media processing-related processes and functions; GPS/navigation instructions 268 to facilitate GPS and navigation-related processes and instructions; camera instructions 270 to facilitate camera-related processes and functions; and/or other software instructions 272 to facilitate other processes and functions.

In some embodiments, communication instructions 254 may include software applications to facilitate connection with ridesharing management server 150 that handles vehicle ridesharing requests. Graphical user interface instructions 256 may include a software program that facilitates a user associated with the mobile communications device to receive messages from ridesharing management server 150, provide user input, and so on. For example, a user may send ride requests and ride service parameters to ridesharing management server 150 and receive ridesharing proposals and confirmation messages. A driver may receive ride service assignments from ridesharing management server 150, and provide ride service status updates.

Each of the above identified instructions and applications may correspond to a set of instructions for performing one or more functions described above. These instructions need not be implemented as separate software programs, procedures, or modules. Memory 250 may include additional instructions or fewer instructions. Furthermore, various functions of mobile communications device 200 may be implemented in hardware and/or in software, including in one or more signal processing and/or application specific integrated circuits.

Figure 3:
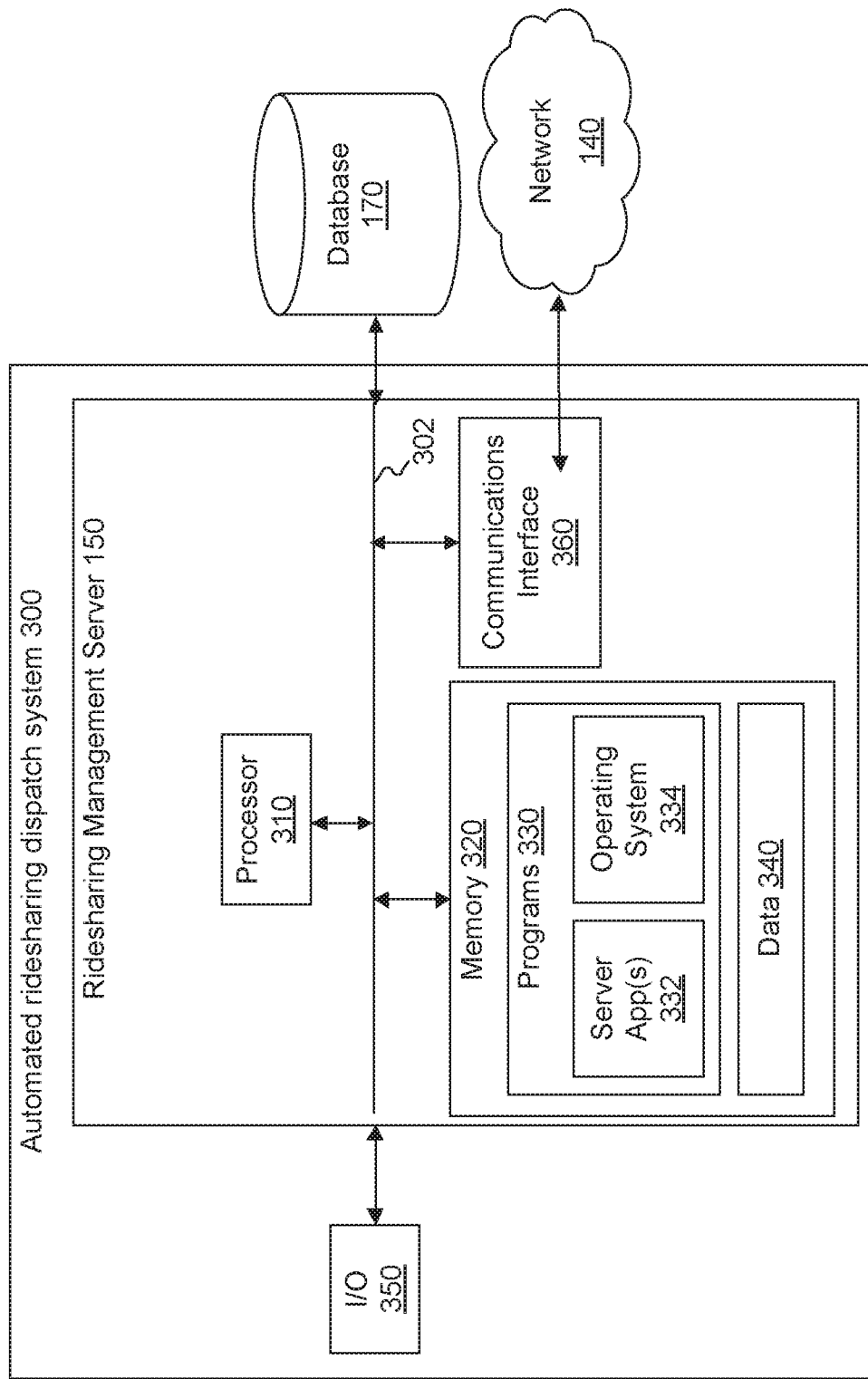
FIG. 3 is a diagram illustrating the components of an example ridesharing management server associated with a ridesharing management system, in accordance with some embodiments of the present disclosure.

FIG. 3 is a diagram illustrating the components of an example an automated ridesharing dispatch system 300 that includes ridesharing management server 150 associated with a ridesharing management system 100, in accordance with some embodiments of the present disclosure. Ridesharing management server 150 may include a bus 302 (or other communication mechanism), which interconnects subsystems and components for transferring information within ridesharing management server 150.

As shown in FIG. 3, automated ridesharing dispatch system 300 may include one or more processors 310, one or more memories 320 storing programs 330 including, for example, server app(s) 332, operating system 334, and data 340, and a communications interface 360 (e.g., a modem. Ethernet card, or any other interface configured to exchange data with a network, such as network 140 in FIG. 1). Automated ridesharing dispatch system 300 may communicate with an external database 170 (which, for some embodiments, may be included within ridesharing management server 150). Automated ridesharing dispatch system 300 may include a single server (e.g., ridesharing management server 150) or may be configured as a distributed computer system including multiple servers, server farms, clouds, or computers that interoperate to perform one or more of the processes and functionalities associated with the disclosed embodiments. The term "cloud server" refers to a computer platform that provides services via a network, such as the Internet. When ridesharing management server 150 is a cloud server it may use virtual machines that may not correspond to individual hardware. Specifically, computational and/or storage capabilities may be implemented by allocating appropriate portions of desirable computation/storage power from a scalable repository, such as a data center or a distributed computing environment.

Processor 310 may be one or more processing devices configured to perform functions of the disclosed methods, such as a microprocessor manufactured by Intel™ or manufactured by AMD™. Processor 310 may comprise a single core or multiple core processors executing parallel processes simultaneously. For example, processor 310 may be a single core processor configured with virtual processing technologies. In certain embodiments, processor 310 may use logical processors to simultaneously execute and control multiple processes. Processor 310 may implement virtual machine technologies, or other technologies to provide the ability to execute, control, run, manipulate, store, etc. multiple software processes, applications, programs, etc. In some embodiments, processor 310 may include a multiple-core processor arrangement (e.g., dual, quad core, etc.) configured to provide parallel processing functionalities to allow ridesharing management server 150 to execute multiple processes simultaneously. It is appreciated that other types of processor arrangements could be implemented that provide for the capabilities disclosed herein.

Memory 320 may be a volatile or non-volatile, magnetic, semiconductor, tape, optical, removable, non-removable, or other type of storage device or tangible or non-transitory computer-readable medium that stores one or more program (s) 330 such as server apps 332 and operating system 334, and data 340. Common forms of non-transitory media include, for example, a flash drive, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory. NVRAM, a cache, a register, any other memory chip or cartridge, and networked versions of the same.

Ridesharing management server 150 may include one or more storage devices configured to store information used by processor 310 (or other components) to perform certain functions related to the disclosed embodiments. For example, ridesharing management server 150 may include memory 320 that includes instructions to enable processor 310 to execute one or more applications, such as server apps 332, operating system 334, and any other type of application or software known to be available on computer systems. Alternatively or additionally, the instructions, application programs, etc., may be stored in an external database 170 (which can also be internal to ridesharing management server 150) or external storage communicatively coupled with ridesharing management server 150 (not shown), such as one or more database or memory accessible over network 140.

Database 170 or other external storage may be a volatile or non-volatile, magnetic, semiconductor, tape, optical, removable, non-removable, or other type of storage device or tangible or non-transitory computer-readable medium. Memory 320 and database 170 may include one or more memory devices that store data and instructions used to perform one or more features of the disclosed embodiments. Memory 320 and database 170 may also include any combination of one or more databases controlled by memory controller devices (e.g., server(s), etc.) or software, such as document management systems, Microsoft SQL databases, SharePoint databases, Oracle™ databases, Sybase™ databases, or other relational databases.

In some embodiments, ridesharing management server 150 may be communicatively connected to one or more remote memory devices (e.g., remote databases (not shown)) through network 140 or a different network. The remote memory devices can be configured to store information that ridesharing management server 150 can access and/or manage. By way of example, the remote memory devices may include document management systems, Microsoft SQL database. SharePoint databases, Oracle™ databases, Sybase™ databases, or other relational databases. Systems and methods consistent with disclosed embodiments, however, are not limited to separate databases or even to the use of a database.

Programs 330 may include one or more software modules causing processor 310 to perform one or more functions of the disclosed embodiments. Moreover, processor 310 may execute one or more programs located remotely from one or more components of the ridesharing management system 100. For example, ridesharing management server 150 may access one or more remote programs that, when executed, perform functions related to disclosed embodiments.

In the presently described embodiment, server app(s) 332 may cause processor 310 to perform one or more functions of the disclosed methods. For example, devices associated with users, drivers and autonomous vehicles may respectively be installed with user applications for vehicle ridesharing services, and driver applications for vehicle ridesharing services. Further, a mobile communications device may be installed with both the driver applications and the user applications, for uses in corresponding situations.

In some embodiments, other components of ridesharing management system 100 may be configured to perform one or more functions of the disclosed methods. For example, mobile communications devices 120 may be configured to calculate estimate pick-up and drop-off times based on a certain ride request, and may be configured to calculate estimate ride fares. As another example, mobile communications devices 120 may further be configured to provide navigation service, and location service, such as directing the user to a particular pick-up or drop-off location, and providing information about a current location of the respective user or vehicle to ridesharing management server 150.

In some embodiments, program(s) 330 may include operating system 334 performing operating system functions when executed by one or more processors such as processor 310. By way of example, operating system 334 may include Microsoft Windows™, Unix™, Linux™, Apple™ operating systems, Personal Digital Assistant (PDA) type operating systems, such as Apple iOS. Google Android. Blackberry OS, Microsoft CE™, or other types of operating systems. Accordingly, the disclosed embodiments may operate and function with computer systems running any type of operating system 334. Ridesharing management server 150 may also include software that, when executed by a processor, provides communications with network 140 through communications interface 360 and/or a direct connection to one or more mobile communications devices 120. Specifically, communications interface 360 may be configured to receive ride requests (e.g., from user devices 120A-120C) headed to differing destinations, and receive indications of the current locations of the ridesharing vehicles (e.g., from driver devices 120D and 120E or driving-control device 120F). In one example, communications interface 360 may be configured to continuously or periodically receive current vehicle location data for the plurality of ridesharing vehicles that are part of ridesharing management system 100. The current vehicle location data may include global positioning system (GPS) data generated by at least one GPS component of a mobile communications device 120 associated with each ridesharing vehicle.

In some embodiments, data 340 may include, for example, profiles of users, such as user profiles or driver profiles. Data 340 may further include ride requests from a plurality of users, user ride history and driver service record, and communications between a driver and a user regarding a particular ride request. In some embodiments, data 340 may further include traffic data, toll road information, and navigation information, which may be used for handling and accommodating ride requests.

Automated ridesharing dispatch system 300 may also include one or more I/O devices 350 having one or more interfaces for receiving signals or input from devices and providing signals or output to one or more devices that allow data to be received and/or transmitted by automated ridesharing dispatch system 300. For example, automated ridesharing dispatch system 300 may include interface components for interfacing with one or more input devices, such as one or more keyboards, mouse devices, and the like, that enable automated ridesharing dispatch system 300 to receive input from an operator or administrator (not shown).

Figure 4A:
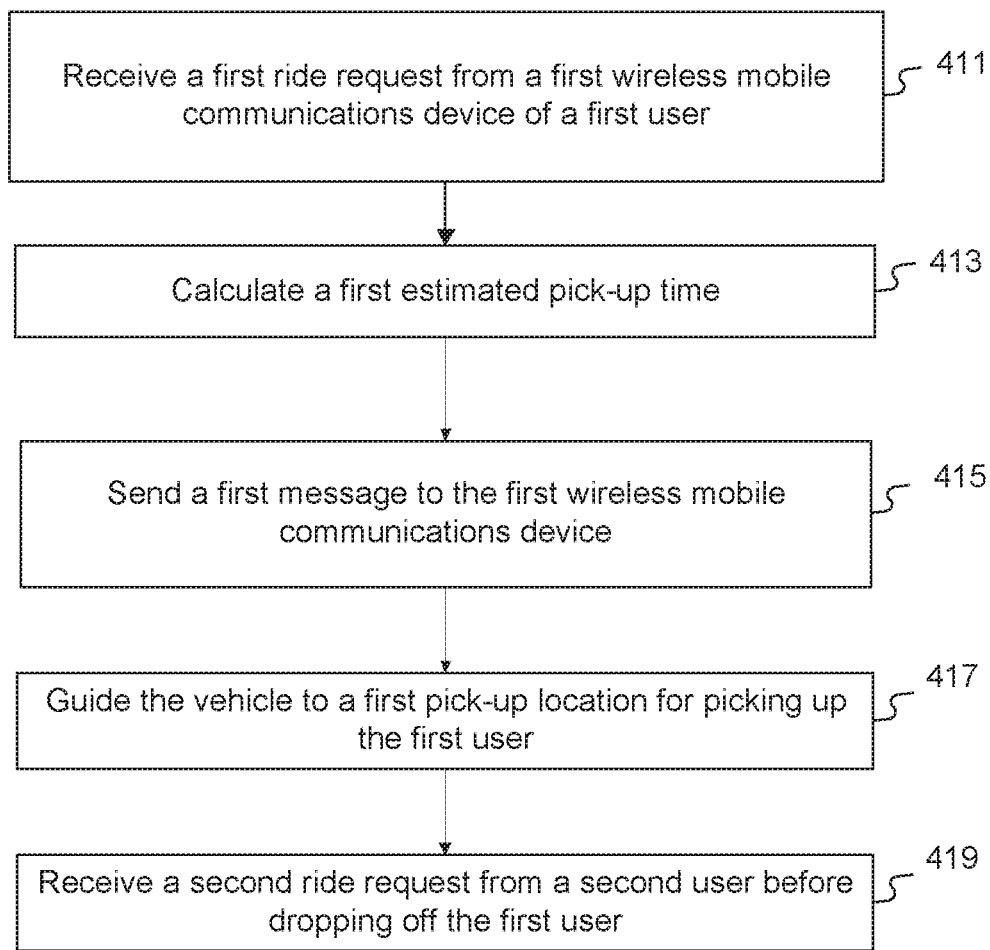
FIGS. 4A and 4B are flowcharts of example processes for vehicle ridesharing management, in accordance with some embodiments of the present disclosure.
Figure 4B:
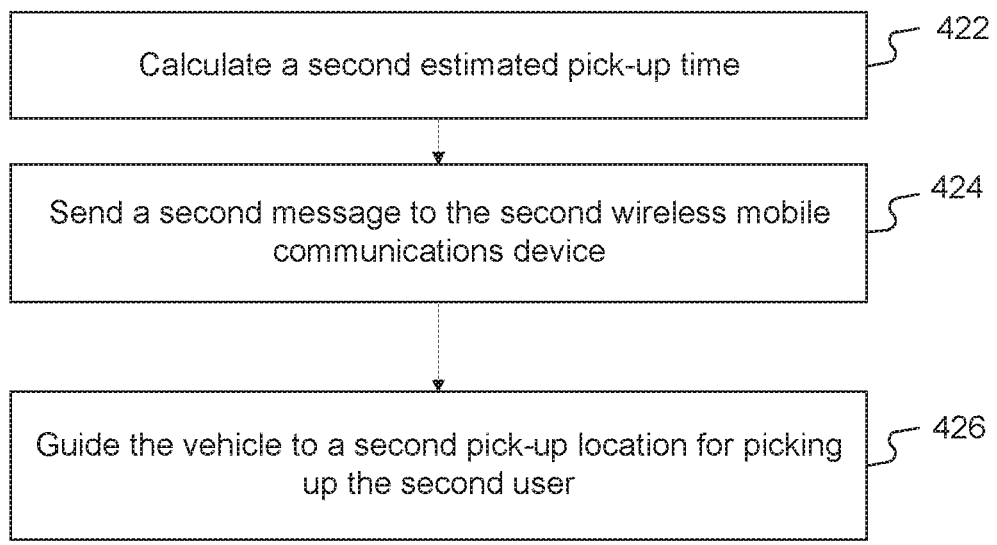

FIGS. 4A and 4B are flowcharts of example processes 410 and 420 for vehicle ridesharing management, in accordance with some embodiments of the present disclosure. In one embodiment, all of the steps of process 400 may be performed by a ridesharing management server, such as ridesharing management server 150 described above with reference to FIGS. 1 and 3. Alternatively, at least some of the steps of process 400 may be performed by a mobile communications device, such as the mobile communications devices 120 described above with reference to FIGS. 1 and 2. In the following description, reference is made to certain components of FIGS. 1-3 for purposes of illustration. It will be appreciated, however, that other implementations are possible and that other components may be utilized to implement example methods disclosed herein.

At step 411, ridesharing management server 150 may receive a first ride request from a first wireless communication of a first user, for example, a request from user 130A sent through user device 120A. The first ride request may include a first starting point and a first desired destination. A ride request may refer to a request from a user needing transportation service from a certain location to another. A starting point may refer to a current location of the user, as input by the user through an input device of an associated user device, or as determined by a location service application installed on the user device. In some embodiments, the starting point may be a location different from the current location of the user, for example, a location where the user will subsequently arrive at (e.g., entrance of a building). A desired destination may refer to a location where the user requests to be taken to.

In some embodiments, the actual pick-up location and the actual drop-off location may be different from the starting point and the desired destination. For example, the pick-up location may be of a certain distance from the starting point, where the user may be directed to for pick-up. By encouraging the user to walk to a pick-up location nearby, consistent with some embodiments, the vehicle may more easily and quickly locate the user without excessive detour, or causing excessive delay for users who are in the vehicle. Similarly, by encouraging the user to walk from a drop-off location different from but within a certain distance from the desired destination, the vehicle may be able to accommodate subsequent pick-ups, or arrive at the subsequent pick-up locations more quickly. The vehicle ridesharing service management system may provide incentives or rewards for the user who are willing to walk a certain distance. For example, the ridesharing management system may offer certain discounts based on the number and distances of the walks involved in a particular ride. Alternatively, the ridesharing management system may offer ride credits corresponding to the number and distance of the walks undertaken by the user during his rides. The user may use the credits for subsequent ride payment, or redeem the credit for money, free rides, or other rewards. Further, advantages of such embodiments may include more efficient vehicle use and management, more user flexibility, and less air pollution associated with vehicle use.

In some embodiments, prior to or after the user sends a ride request to ridesharing management server 150, the user may further input ride service parameters through, for example, a settings component provided on a user interface. Ride service parameters refer to user preference parameters regarding a vehicle ridesharing service, for example, a maximum walking distance from the starting point to a pick-up location, a maximum walking distance from a drop-off location to a desired destination, a total maximum walking distance involved in a ride, a maximum number of subsequent pick-ups, maximum delay of arrival/detour incurred by subsequent pick-ups during a ride, and a selection whether to permit toll road usage during the ride, etc.

Ride service parameters may be transmitted to ridesharing management server 150 for processing the request and assignment of an available vehicle based on the ride service parameters. For example, a ride request may be associated with a maximum walking distance of 300 meters from a starting point to a pick-up location. When assigning an available vehicle to pick-up the user, ridesharing management server 150 may include in the assignment an assigned pick-up location within 300 meters or less of the starting point. Similarly, a ride request may be associated with a maximum walking distance of 0.5 mile from a drop-off location to a desired destination. When assigning an available vehicle to pick-up the user, ridesharing management server 150 may include in the assignment an assigned drop-off location within 0.5 mile or less from the desired destination.

For requests associated with a maximum total walking distance of one mile during the ride, when assigning an available vehicle to pick-up the user, ridesharing management server 150 may include in the assignment an assigned pick-up location and an assigned drop-off location, a total of a distance from the starting point to the assigned pick-up location and a distance from the assigned drop-off location to a desired destination may be equal to or less than one mile.

In the above examples, the values regarding the walking distances are only exemplary. Other embodiments consistent with the present disclosure may use different options of the distances and may provide a list of options. The distances may further be measured in different units, for example, miles, meters, kilometers, blocks, and feet, etc., which are not limited by the disclosed embodiments herein. In some embodiments, the distance may further be represented by an average walking time from a certain location to another, based on average walking speed, for example, ten minutes, five minutes, etc.

With respect to parameters regarding subsequent pick-ups, such as a maximum number of subsequent pick-ups, and maximum delay of arrival incurred by subsequent pick-ups, ridesharing management server 150 may assign subsequent pick-ups accordingly, without exceeding the parameters set by the user. For example, a ride request may be associated with a maximum number of two subsequent pick-ups during the ride. Ridesharing management server 150 may monitor the service status of the vehicle assigned to pick-up the user, and refrain from assigning a third subsequent pick-up before the vehicle arrives at the a drop-off location for dropping off the user. As another example, for a ride request associated with a maximum delay of arrival of ten minutes, when assigning subsequent ride requests, ridesharing management server 150 may calculate an estimated delay that may occur to the user if the same vehicle was to undertake the subsequent ride request. If the estimated delay that may occur to the user is more than ten minutes, ridesharing management server 150 may assign the subsequent ride request to other available vehicles.

In some embodiments, the user may also input selection of toll road usage through the associated user device, to allow or disallow use of toll roads. Ridesharing management server 150 may then take the user's selection into account when assigning an available vehicle for accommodating the ride request, determining travel route, and calculating ride fare for the user. For example, ridesharing management server 150 may adjust the ride fare amount for a corresponding user based on the toll roads selection input and toll charges involved. For another example, if a first user does not permit toll road usage, before any subsequent pick-ups during the ride, ridesharing management server 150 may send a route to an assigned vehicle that does not include toll roads. For another example, if a subsequent user sharing the ride permits usage of toll road, ridesharing management server 150 may not charge the first user for any overlap portion of the ride where toll roads are used, change the route to include toll roads after the first user is dropped off, or assign the second user to a ridesharing vehicle with users that permit toll road usage.

In some embodiments, the ride request information may also be input from the driver device, for example, driver device 120D, or from a device associated with the vehicle. In the case of street hailing, where the user hails a vehicle on the street without using a vehicle ridesharing service application on a mobile communications device, the driver, for example, driver 130D, may input information such as the starting point/pick-up information and destination information through driver device 120D, which may then be transmitted to ridesharing management server 150.

At step 413, ridesharing management server 150 may calculate an estimated pick-up time, for example, based on a current location of an assigned vehicle and the first starting point included in the first ride request. An estimated pick-up time may refer to a time period before an assigned vehicle arrives at a pick-up location for picking up the user.

The assigned vehicle may refer to the vehicle that is assigned to undertake the first ride request, for example, a taxi in a taxi fleet, one of a plurality of vehicles managed by a transportation service system, or a plurality of vehicles owned by a plurality of owners and used to provide ridesharing services. The pick-up location may be the same as the starting point, or an assigned pick-up location associated with the starting point.

The estimated pick-up time may be determined based on a distance between a current location of the assigned vehicle and the pick-up location, and an estimate speed of traveling along the route between the two locations. The current location of the assigned vehicle may be determined by a location service application installed on a driver device, a driving-control device, or by a location determination component in the ridesharing management system 100, which may be a part of or separate from ridesharing management server 150. In some embodiments, the estimated pick-up time may further be determined based on historical or real-time traffic data, and a route currently followed by the vehicle.

In some embodiments, process 410 may further include locating one or a plurality of potential available vehicles, and selecting an assigned vehicle therefrom. For example, potential available vehicles may include vacant vehicles in the surrounding areas of the first starting point, and vehicles heading to a location close to the first starting point for assigned pick-ups or drop-offs. Ridesharing management server 150 may filter potential available vehicles by ride service parameters set by the users who are inside the vehicle, for example, removing occupied vehicles where the a user inside the vehicle does not permit subsequent pick-ups, or occupied vehicles where the user requires a minimal delay. In some embodiments, ridesharing management server 150 may filter potential assignment vehicles by choosing a vehicle that would involve minimal walking of the user, or walking without the need of crossing the street. In some embodiments, ridesharing management server 150 may further filter potential assignment vehicles by choosing a vehicle that would involve minimal detour for the vehicle to arrive at the pick-up location. In some embodiments, the assigned vehicle may be selected by applying multiple filter criteria, or by applying multiple filter criteria in a certain order.

In some embodiments, the pick-up location may be an assigned pick-up location different from the first starting point, for example, half a block or further away from the first starting point. Ridesharing management server 150 may assign a pick-up location based on ride service parameters set by the first user, as described above at step 411. Ridesharing management server 150 may further assign a pick-up location which is along a main street where an assigned vehicle can easily locate, or a location which would not require an assign vehicle to take a U-turn. In cases where there are one or more other users in the vehicle, ridesharing management server 150 may assign a pick-up location close to the vehicle's next assigned drop-off, or on the side of a street where the vehicle will soon go through. In some embodiments, ridesharing management server 150 may adjust selection of the pick-up location based on filtering results of potential assignment vehicles, or vice versa. The two selection processes may complement each other to reach one or more optimal combinations.

In some embodiments, where there are multiple potential assignment vehicles, each with a corresponding potential pick-up location, an estimated pick-up time may be respectively calculated corresponding to each of the potential assignment vehicles. Ridesharing management server 150 may then choose the vehicle with the shortest estimated pick-up time to be the assigned vehicle.

At step 415, ridesharing management server 150 may send a first message to a user device associated with the first user, which is, in this example, user device 120A. The first message may be configured to cause an indication of the calculated first estimated pick-up time to appear on a display of user device 120A. The message may appear in different formats, for example, a text message including the estimated pick-up time, an audio message, or an image, the specific implementation of which are not limited by the disclosed embodiments herein.

In one embodiment, the message includes a confirmation that the ridesharing request is accepted. If ridesharing management server 150 assigns a pick-up location different from the starting point, the message may further cause the display of an indication of the assigned pick-up location. Ridesharing management server 150 may further provide a navigation option which may be displayed on a user interface. A selection of the navigation option may then provide walking directions the user to the assigned pick-up location for pick-up. The message may further cause a display of an indication of an estimated walking distance from the starting point to the assigned pick-up location. In addition, the message may include an estimated walking distance from the assigned drop-off location to the desired destination. The assigned drop-off location may be a location close to the desired destination, within the maximum walking distance parameters set by the first user. For example, the drop-off location may be at a location half a block away or further from the desired destination, and may be along a main street where the vehicle may easily locate and access. For another example, the drop-off location may be determined based on a route towards the next pick-up location, such that the vehicle may easily drop-off the first user on its way to the next pick-up location, thereby avoiding an extra detour.

In another embodiment, the message may include one or more proposals associated with different vehicles. Each proposal may include information about the proposed pick-up location. The information about the proposed pick-up location may include the distance from the user to the proposed pick-up location. Each proposal may include a price of the ride associated with the type of the ride, and an estimation of a pick-up time. The estimate may be presented as a range. In one example, each proposal may include different pick-up locations, different prices, and/or different estimations of a pick-up time. According to this embodiment, step 415 may also include receiving a proposal selection reflective of a selected pick-up vehicle and sending an addition message that includes information about the selected vehicle, and the driver associated with the vehicle. For example, the vehicle information may include the license plate number, brand, color, and/or model of the vehicle. The driver information may include a name, nickname, profile photo, ratings, number of previous rides, and/or contact information of the driver. The message may further include a contact option allowing the user to contact the driver, for example, a "contact the driver" button, which the user may select to initiate a communication session with the driver.

At step 417, ridesharing management server 150 may guide the assigned vehicle to the first pick-up location for picking up the first user. For example, ridesharing management server 150 may transmit direction information to the driver device associated with the assigned vehicle, for example, driver device 120D or driving-control device 120F. In some embodiments, a navigation component of the driver device, or the driving-control device may perform the step of guiding the vehicle to the first pick-up location. Correspondingly, ridesharing management server 150, or a navigation component of the user device 120A, may guide the user to the first pick-up location, in cases where the pick-up location is an assigned pick-location different from the first starting point. For example, for autonomous vehicles used for ridesharing services, such as autonomous vehicle 130F as shown in FIG. 1, the vehicle itself may be capable of using a variety of techniques to detect its surroundings, identify feasible paths, and navigate without direct human input.

In some embodiments, once the vehicle is assigned to pick-up the user, ridesharing management server 150 may assign a communication channel for the driver associated with the assigned vehicle to communicate with the user, for example, a masked phone number. In some embodiments, a user interface of a driver device, such as driver device 120D, may include an option to send notification messages to the user, for example, a pre-defined message button of "I'm here." Once the vehicle arrives at the pick-up location, the driver may click the message button to send the message to the user. This way, the driver may not need to dial out or type a message in order to notify the user of the vehicle's arrival, reducing driver distraction and associated safety hazards.

At step 419, ridesharing management server 150 may receive a second ride request from a second user. In some embodiments, the second user request may be a street hailing request received directly by the vehicle while the first user is still inside, namely, before dropping off the first user. The vehicle may then undertake the second ride request, if the first user permits subsequent pick-ups. In some embodiments, the driver of the vehicle may input the second ride request information through a driver device, for example, driver device 120D associated with driver 130D. The input may inform ridesharing management server 150 that the vehicle has undertaken a second ride request, or may further include the pick-up location and destination information of the second user. Ridesharing management server 150 may then accordingly determine whether to assign additional pick-ups to the same vehicle, and may further send direction information guiding the vehicle to the second user's destination.

In some embodiments, the second ride request may be received by ridesharing management server 150 from a second wireless mobile communications device, for example, user device 120B associated with user 130B as shown in FIG. 1. The second ride request may further include a second starting point, and a second desired destination. Ridesharing management server 150 may then assign a corresponding ride service to an available vehicle, which may be the vehicle that has picked up the first user, before dropping off the first user. In processing the second ride request, the example process 420 as shown in FIG. 4B may be performed.

At step 422, ridesharing management server 150 may calculate a second estimated pick-up time, for example, based on a second current location of the vehicle and the second starting point. The second estimated pick-up time may refer to an estimated time period before the vehicle arrives at a second pick-up location for picking up the second user. The second pick-up location may be an assigned pick-up location different from, but associated with, the second starting point. Assignment of the second pick-up location may include similar steps as described above with reference to FIG. 4A, details of which are not repeated herein.

At step 424, ridesharing management server 150 may send a second message to the second wireless mobile communication device, which is user device 120B in this example. The second message may be configured to cause an indication of the calculated second estimated pick-up time to appear on a display of the second wireless mobile communication device. As described above with reference to FIG. 4A, the message may appear in different formats, and may further cause a display of multiple proposals with multiple options for the second pick-up location, walking distance, walking directions from the second starting point to the second pick-up location, etc., the details of which are not repeated herein.

In some embodiments, ridesharing management server 150 may set the second pick-up location at substantially the same location as the first pick-up location, for example, half a block away, or 100 meters away from the first pick-up location. This way, the vehicle may pick-up both users at about the same time at substantially the same location, further improving service efficiency. In some embodiments, ridesharing management server 150 may set the second pick-up location at a substantially the same location as the first drop-off location, wherein the vehicle may drop-off the first user, and pick-up the second user at about the same time, without extra travelling. Further, in some embodiments, the second drop-off location may be set at substantially the same location as the first drop-off location, such that the vehicle may drop-off multiple users at the same time.

In some embodiments, ridesharing management server 150 may set the first pick-up location to substantially differ from the first starting point, and the second pick-up location to substantially differ from the second starting point, for example, to ensure both pick-up locations are along the same side of the same street where the vehicle may go through. Ridesharing management server 150 may then send respective directions to the first user device and the second user device, to guide the users to the respective pick-up locations.

In some embodiments, ridesharing management server 150 may set the first pick-up location at substantially the same as the first starting point, and set the second pick-up location to substantially differ from the second starting point. For example, the selection of the pick-up locations may be made such that the first pick-up location and the second pick-up location are close to one another, both pick-up locations are along the same street, or the second pick-up location is close to the first drop-off location. Ridesharing management server 150 may then send respective directions to the first user device and the second user device, to guide the users to the respective pick-up locations.

At step 426, ridesharing management server 150 may guide the vehicle to a second pick-up location for picking up the second user. As described above with reference to FIG. 4A, this step may also be performed by a navigation component of the driver's device (e.g., driver device 120D or driving-control device 120F associated with autonomous vehicle 130F).

In some embodiments, ridesharing management server 150 may change the first drop-off location after receiving the second ride request, and the change may be made without pre-approval of the first user. The first drop-off location refers to a location for dropping off the first user. As described above with reference to FIG. 4A, the first drop-off location may be the same as the first desired destination, or at a location different from the first desired destination.

For example, the second pick-up location may be set at a location close to the first desired destination, included in the first ride request. When assigning the second ride request to the vehicle, ridesharing management server 150 may change the first drop-off location to a location closer to or at the first desired destination, thus reducing the walking distance for the first user to arrive at his desired destination. For another example, the first drop-off location may be changed to a location where the first user does not need to cross the street to arrive at his desired destination, without causing or increasing detour for the vehicle to arrive at the second pick-up location.

In some embodiments, ridesharing management system 100 may subsequently receive a plurality of subsequent ride requests. These additional ride requests may either be received by ridesharing management server 150 and assigned to the vehicles, or received by the vehicles in the form of street hailing. Steps described above with reference to FIGS. 4A and 4B may similarly be used to process the third ride request.

For example, ridesharing management server 150 may receive a third ride request from a third user device, for example, user device 120C associated with user 130C, as shown in FIG. 1. Ridesharing management server 150 may process the request and assign the request to the vehicle while at least one of a first user and a second user is still in the vehicle. The third ride request may further include a third starting point and a third desired destination. Ridesharing management server 150 may calculate a third estimated pick-up time, and send a confirmation to a user's device (e.g., user device 120C). Ridesharing management server 150 may transmit direction and route information to the driver's device associated with the vehicle (e.g., driver device 120D as shown in FIG. 1), to guide the vehicle to pick-up and drop-off user 130C.

As described above with reference to FIGS. 4A and 4B, processing of subsequent ride requests may take into account of the ride service parameters set by the users whose requests have previously been received and assigned. For example, if both the first user and the second user are still in the vehicle, and one of them has set a maximum delay of arrival, ridesharing management server 150 may not assign the third request to the same vehicle if such assignment would cause a delay longer than the set value. For example, if the first user has set a maximum delay of arrival of 10 minutes, ridesharing management server 150 may calculate an estimated time period it takes for the vehicle to pick-up (and/or drop-off) the third user before dropping off the first user. If the estimated time would cause a total delay of arrival for the first user to exceed 10 minutes, ridesharing management server 150 may therefore assign the third ride request to another vehicle. For another example, if the second user has set a maximum number of one co-rider and the second user will be dropped off earlier than the first user, ridesharing management server 150 may not assign to the same vehicle, as such assignment may cause violation of the parameter (maximum number of one co-rider) set by the second user.

Figure 5:
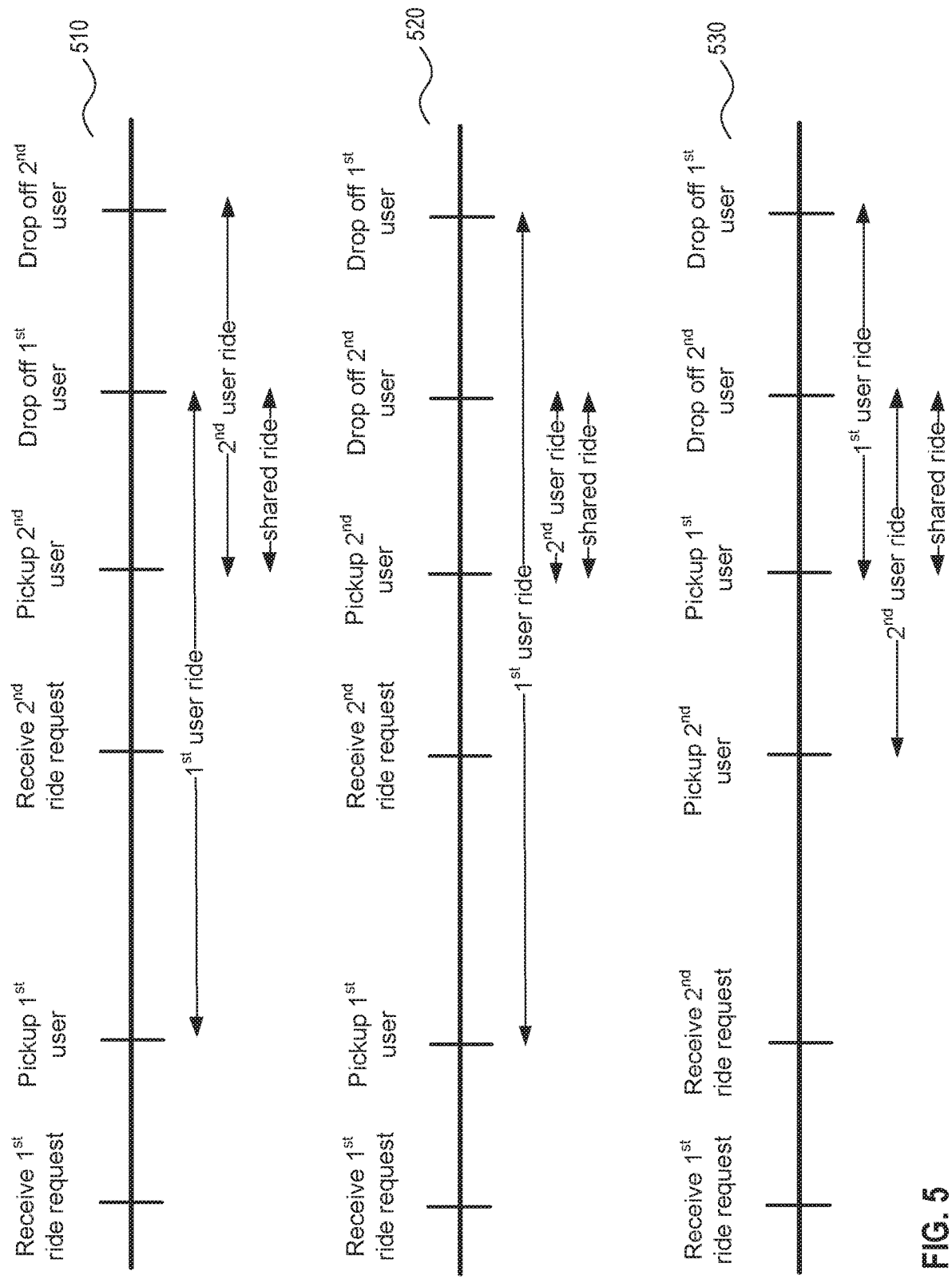
FIG. 5 is a diagram of example timelines showing ridesharing arrangements, in accordance with some embodiments of the present disclosure.

FIG. 5 is a diagram of three example timelines showing ridesharing arrangements, in accordance with some embodiments of the present disclosure. As shown in example timelines 510, 520, and 530, for a particular assigned vehicle undertaking a first ride request from a first user and a second ride request from a second user, the order of pick-ups and drop-offs for the second user may vary. For example, ridesharing management server 150 may receive a plurality of ride requests, design an optimal path and pick-up/drop-off order for a particular assigned vehicle undertaking multiple requests, and assign additional pick-ups as the vehicle completes a part of or all of the ride requests. For example, as shown in example timeline 510, a vehicle may receive a second ride request after picking up the first user, and drop-off the first user before dropping off the second user. A corresponding shared ride portion may be the portion of ride between the pick-up of the second user and drop-off of the first user. As shown in example timeline 520, the vehicle may receive a second ride request after picking up the first user, and drop-off the second user before dropping off the first user. A corresponding shared ride portion may be the portion of ride between the pick-up of the second user and drop-off the second user. As another example, as shown in example timeline 530, the vehicle may receive the first ride request and the second ride request before any pick-up. The vehicle may then pick-up the second user before picking up the first user, and drop-off the second user before dropping off the first user. A corresponding shared ride portion may be the portion of ride between pick-up of the first user and drop-off of the second user. Depending on the order of pick-ups and drop-offs, the ridesharing management server may then determine a corresponding shared ride portion, and calculate ride fare for each user based on, for example, the shared portion, solo portion of each user, and/or other factors such as the ride service parameters set by each user.

Under-Utilization of Vehicle Capacity

Embodiments of the present disclosure may allow for the implementation of capacity blocks on rideshare vehicles. For example, the capacity blocks may ensure that the full capacity of the rideshare vehicles is not used in regular operation. This may enhance the experience of users who might otherwise feel cramped in vehicles at or near capacity. Indeed, some embodiments may implement the threshold block across a fleet of ridesharing vehicles (e.g., by applying a threshold block to each vehicle in the fleet, whether the same threshold or different thresholds and/or by applying an aggregate threshold block to one or more parts of the fleet).

In addition, the capacity block may be adjusted based on tracking of passengers' physical conditions capable of impacting capacity of a ridesharing vehicle, tracking of passengers' luggage capable of impacting capacity of a ridesharing vehicle, or the like. Additionally of alternatively, the capacity block may be overridden in particular circumstances (e.g., inclement weather, special events, etc.). Such dynamic reassessment of the capacity block may increase the efficiency of a fleet of rideshare vehicles on the whole.

Figure 6:
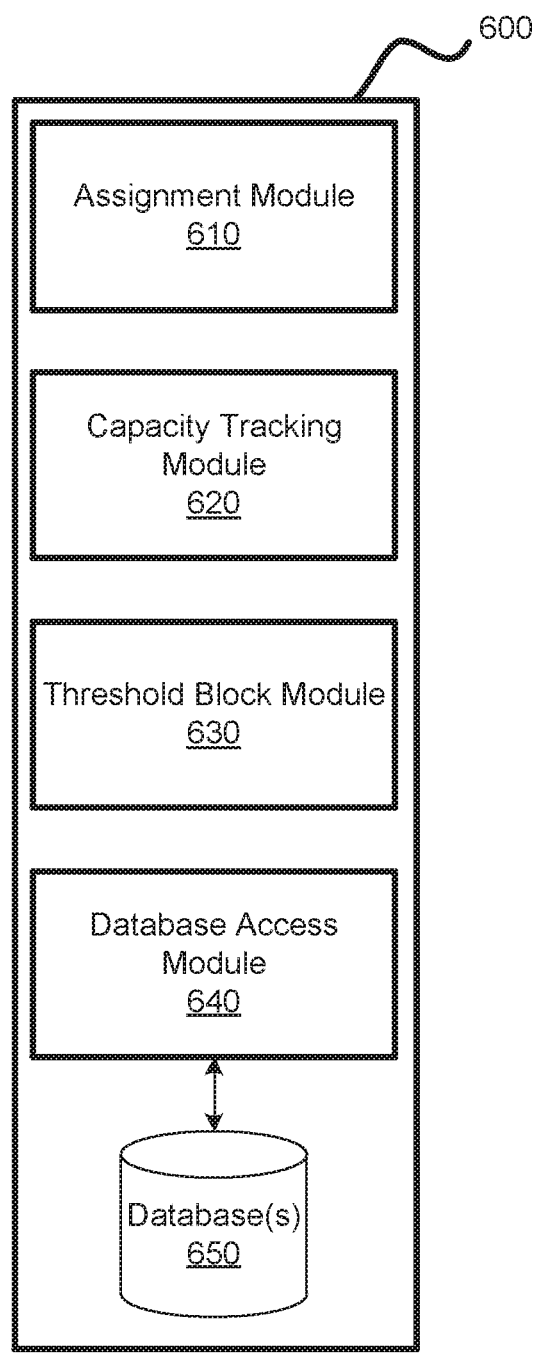
FIG. 6 is a diagram of an example memory module for under-utilizing vehicle capacity, in accordance with some embodiments of the present disclosure.

FIG. 6 depicts an example of a memory module 600 for under-utilizing vehicle capacity. Although depicted as a single memory in FIG. 6, memory 600 may comprise one or more non-volatile (e.g., hard disk drive, flash memory, etc.) and/or volatile (e.g., RAM or the like) memories. In some embodiments, memory 600 may be included in ridesharing management server 150. For example, memory 600 may comprise, at least in part, a portion of memory 320.

As depicted in FIG. 6, memory 600 may include assignment module 610. Assignment module 610 may receive requests for shared rides from a plurality of users. For example, assignment module 610 may receive the requests using a communications interface. The communications interface may comprise, for example, one or more network interface controllers (NICs). These one or more NICs may communicate over one or more computer networks, such as the Internet, a local area network (LAN), or the like.

Assignment module 610 may further assign the users to rideshare vehicles in a fleet. For example, assignment module 610 may assign a first user to a first rideshare vehicle. In addition, assignment module 610 may assign a second user to the first rideshare vehicle. For example, assignment module 610 may combine the first user and the second user based on the closeness of a pick-up location of the first user to a pick-up location and/or a destination of the second user, the closeness of a destination of the first user to the pick-up location and/or the destination of the second user, overlap between a first predicted route from the pick-up location of the first user to the destination of the first user and a second predicted route from the pick-up location of the second user to the destination of the second user, or the like. The predicted routes may be calculated using one or more maps, optionally in combination with traffic information. The one or more maps may be retrieved from one or more memories and/or using the communications interface. Similarly, the traffic information may be retrieved from one or more memories and/or using the communications interface.

As further depicted in FIG. 6, memory 600 may include capacity tracking module 620. Capacity tracking module 620 may track a current utilized capacity in the rideshare fleet. For example, capacity tracking module 620 may track the current utilized capacity of each specific ridesharing vehicle in the fleet. For example, capacity tracking module 620 may track capacity using assignments from assignment module 610. Additionally or alternatively, capacity tracking module 620 may track capacity when users are picked up by rideshare vehicles, e.g., using signals received from one or more devices (such as mobile communications device 200) associated with drivers of the rideshare vehicles and/or signals received from one or more devices (such as mobile communications device 200) associated with the users.

In some embodiments, capacity tracking module 620 may account for other factors that impact capacity. For example, capacity tracking module 620 may track passengers' physical condition capable of impacting capacity of a ridesharing vehicle (e.g., based on signals from the one or more devices associated with the users and/or from the one or more devices associated with the drivers indicating whether a passenger has a wheelchair, crutches, or the like). In another example, capacity tracking module 620 may track passengers' luggage capable of impacting capacity of a ridesharing vehicle (e.g., based on signals from the one or more devices associated with the users and/or from the one or more devices associated with the drivers indicating amount and/or size of luggage, or the like).

As depicted in FIG. 6, memory 600 may include a threshold block module 630. Threshold block module 630 may implement a threshold block when a ridesharing vehicle's current utilized capacity is above a threshold. For example, threshold block module 630 may receive the current utilized capacity from capacity tracking module 620. In some embodiments, the threshold may be less than the ridesharing vehicle's passenger-capacity. For example, the threshold may be at least 10%, at least 15%, at least 20%, at least 25%, or the like of the specific vehicle's capacity. In a similar example, the threshold may be one seat less than the specific vehicle's capacity, two seats less, three seats less, or the like. The threshold block may be implemented, for example, by sending a block signal to assignment module 610 to prevent assignment of additional users to the ridesharing vehicle.

In some embodiments, threshold block module 630 may determine a value for the threshold. For example, threshold block module 630 may access stored information about the ridesharing vehicle to determine the value. The stored information may be in memory 600 and/or in one or more additional memories. Additionally or alternatively, the stored information may be received over the communications interface. In certain aspects, the stored information may include a model of the vehicle, a make of the vehicle, a year of the vehicle, one or more passengers' reviews of the vehicle, or the like.

In some embodiments, threshold block module 630 may override the threshold. For example, threshold block module 630 may override the threshold block in response to a received indication of an inclement weather condition, such as rain, snow, hail, or the like. In such an example, the indication may be received from one or more memories and/or using the communications interface. In another example, threshold block module 630 may override the threshold block override in response to a received indication of a special event condition, such as a sporting event, a festival, a marathon, or the like. In such an example, the indication may be received from one or more memories and/or using the communications interface. In yet another example, threshold block module 630 may override the threshold block when an estimated time in which the ridesharing vehicle's utilized capacity is above the threshold is less than a predefined period of time, such as 1 minute, 3 minutes, 5 minutes, 10 minutes, or the like. The predefined period of time may be fixed or may be dynamic (e.g., determined based on stored information about the ridesharing vehicle). In a fourth example, threshold block module 630 may override the threshold block in response to a received indication of an unscheduled-user condition (e.g., an indication that three passengers entered to the van when only one passenger scheduled the ride). In such an example, the indication may be received from one or more devices (such as mobile communications device 200) associated with the drivers and/or signals received from one or more devices (such as mobile communications device 200) associated with the users.

Memory 600 may further include a database access module 640, and may also include database(s) 650. Database access module 640 may include software instructions executable to interact with database(s) 650, to store and/or retrieve information (e.g., information about the ridesharing vehicle as described above, weather information, traffic information, one or more maps, or the like).

Figure 7:
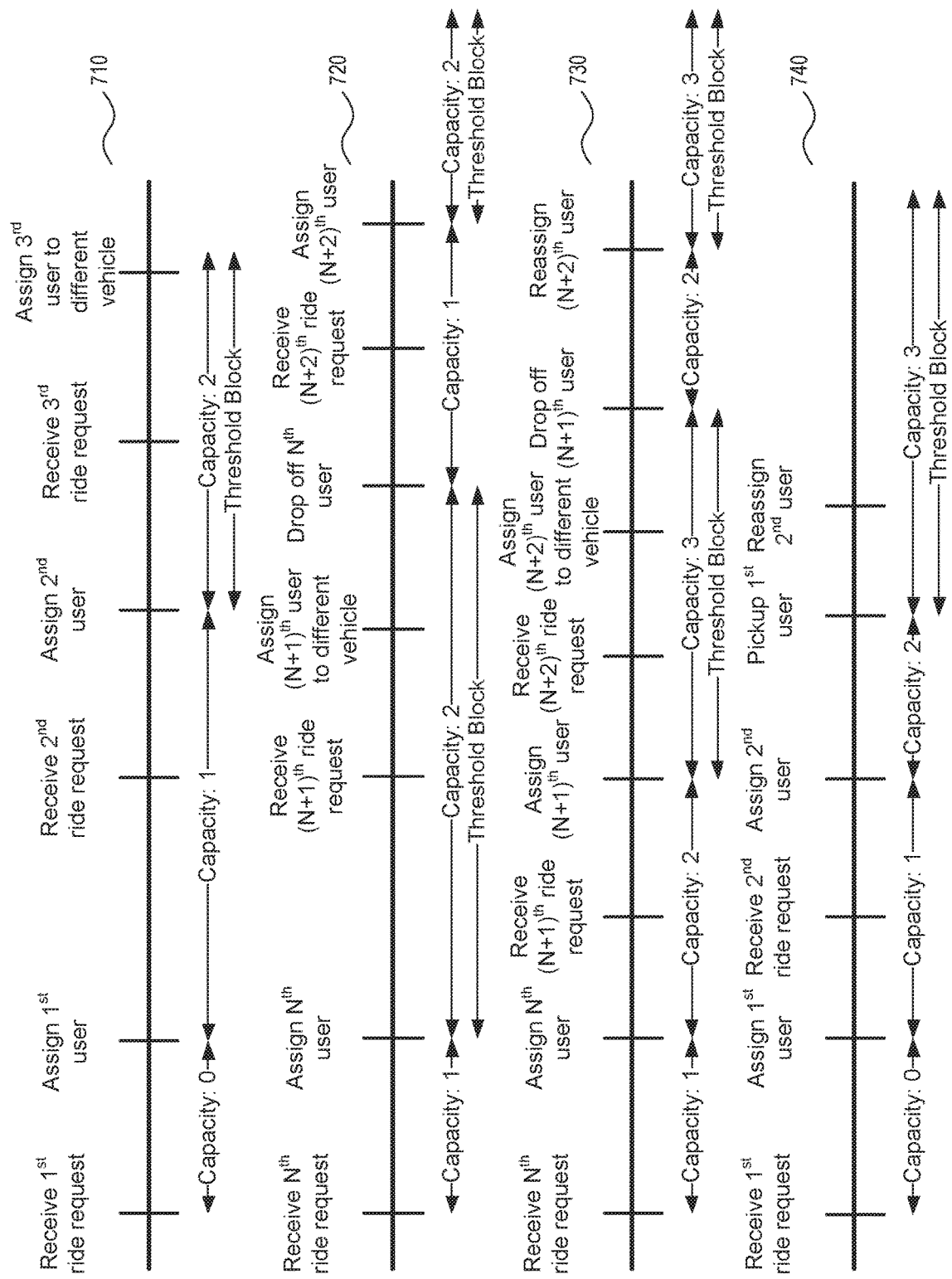
FIG. 7 is a diagram of example timelines showing the use of threshold blocks in a rideshare fleet, in accordance with some embodiments of the present disclosure.

FIG. 7 is a diagram of example timelines showing the use of threshold blocks in a rideshare fleet, in accordance with some embodiments of the present disclosure. As shown in example timeline 710, for a particular rideshare vehicle, ridesharing management server 150 may receive a first request and a second request and assign both to the particular rideshare vehicle. In example timeline 710, ridesharing management server 150 may implement a threshold block when the capacity of the particular rideshare vehicle reaches 2. Accordingly, in example timeline 710, a third request is assigned to another rideshare vehicle on account of the threshold block. Although depicted as tracking the capacity upon assignment of the requests, ridesharing management server 150 may additionally or alternatively track the capacity upon pick-up of the users.

As shown in example timeline 720, for a particular rideshare vehicle, ridesharing management server 150 may receive an Nth request when the particular rideshare vehicle is at capacity 1 and assign the Nth request to the particular rideshare vehicle. In example timeline 720, ridesharing management server 150 may implement a threshold block after assigning the Nth request (i.e., when the capacity of the particular rideshare vehicle reaches 2). Accordingly, in example timeline 720, the (N+1)th request is assigned to another rideshare vehicle on account of the threshold block. When the Nth user is dropped off, the capacity may return to 1 and, accordingly, the (N+2)th request is assigned to the particular rideshare vehicle. Similar to timeline 710, although depicted as tracking the capacity upon assignment of the requests in timeline 720, ridesharing management server 150 may additionally or alternatively track the capacity upon pick-up of the users.

As shown in example timeline 730, for a particular rideshare vehicle, ridesharing management server 150 may receive an Nth request when the particular rideshare vehicle is at capacity 1 and assign the Nth request to the particular rideshare vehicle. In addition, ridesharing management server 150 may receive an (N+1)th request when the particular rideshare vehicle is at capacity 2 and assign the (N+1)th request to the particular rideshare vehicle. In example timeline 730, ridesharing management server 150 may implement a threshold block after assigning the (N+1)th request (i.e., when the capacity of the particular rideshare vehicle reaches 3). Accordingly, in example timeline 730, the (N+2)th request is assigned to another rideshare vehicle on account of the threshold block. When the (N+1)th user is dropped off, the capacity may return to 2 and, accordingly, the (N+2)th request may be re-assigned to the particular rideshare vehicle. Similar to timelines 710 and 720, although depicted as tracking the capacity upon assignment of the requests in timeline 730, ridesharing management server 150 may additionally or alternatively track the capacity upon pick-up of the users.

As shown in example timeline 740, for a particular rideshare vehicle, ridesharing management server 150 may receive a first request and a second request and assign both to the particular rideshare vehicle. In example timeline 710, the first user may have an additional rider, one or more pieces of luggage, and/or a physical condition that uses 3 seats of capacity rather than 1. Accordingly, because ridesharing management server 150 may implement a threshold block when the capacity of the particular rideshare vehicle reaches 3, the third user is re-assigned to another rideshare vehicle on account of the threshold block activated upon pick-up of the first user.

Although the examples of FIG. 7 use a threshold block of 2, various thresholds may be used, as explained above with regards to threshold block module 630. For example, the threshold may be at least 10%, at least 15%, at least 20%, at least 25%, or the like of the specific vehicle's capacity. In a similar example, the threshold may be one seat less than the specific vehicle's capacity, two seats less, three seats less, or the like.

Figure 8:
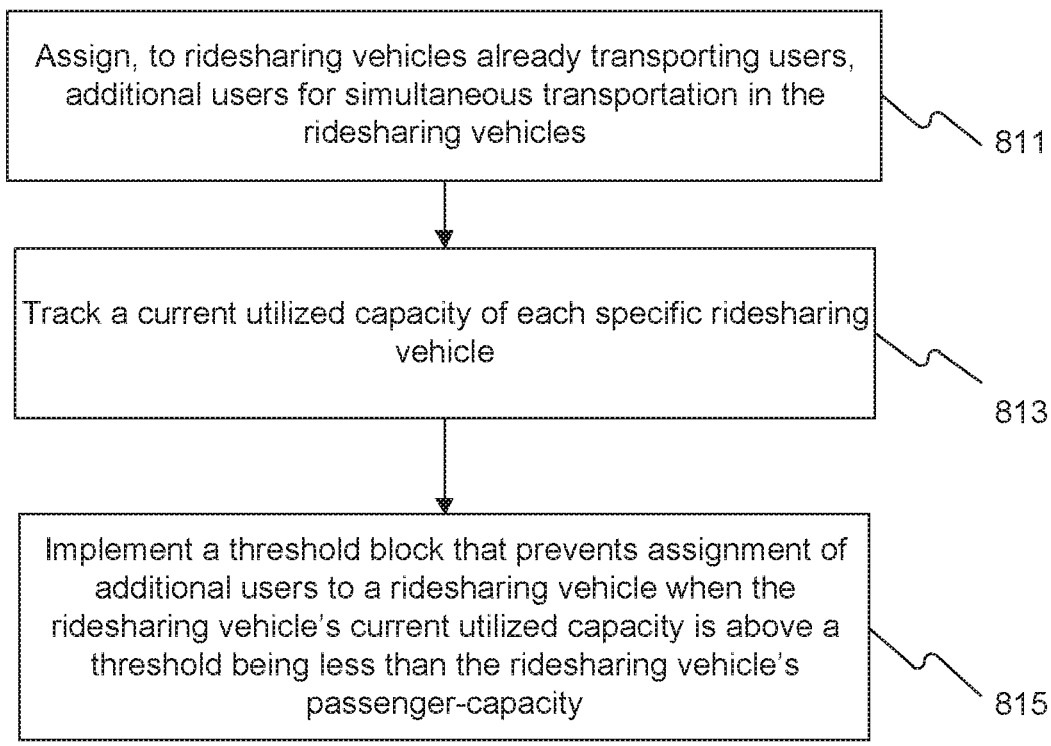
FIG. 8 is a diagram of a flowchart of an example process for managing a fleet of ridesharing vehicles, in accordance with some embodiments of the present disclosure.

FIG. 8 depicts example method 800 for managing a fleet of ridesharing vehicles. Method 800 may, for example, be implemented by ridesharing management server 150 of FIG. 3.

At step 811, server 150 may assign, to ridesharing vehicles already transporting users, additional users for simultaneous transportation in the ridesharing vehicles. For example, as explained above with regards to assignment module 610, server 150 may make assignments based on the closeness of pick-up locations of the users and the additional users, the closeness of destinations of the users and the additional users, the closeness of pick-up locations of the users to destinations of the additional users (or vice versa), overlap between predicted routes from the pick-up locations of the users to the destinations of the additional users and predicted routes from the pick-up locations of the users to the destinations of the additional users, or the like.

At step 813, server 150 may track a current utilized capacity of each specific ridesharing vehicle. For example, as explained above with respect to capacity tracking module 620, server 150 may track the current utilized capacity using the assignments. Additionally or alternatively, server 150 may track the current utilized capacity when the users and/or the additional users are picked up by rideshare vehicles, e.g., using signals received from one or more devices (such as mobile communications device 200) associated with a driver of the specific ridesharing vehicle and/or signals received from one or more devices (such as mobile communications device 200) associated with the users and/or the additional users.

At step 815, server 150 may implement a threshold block that prevents assignment of additional users to a ridesharing vehicle when the ridesharing vehicle's current utilized capacity is above a threshold being less than the ridesharing vehicle's passenger-capacity. For example, server 150 may implement the threshold block to prevent at least 10% (or at least 15%, at least 20%, at least 25%, or the like) of the specific vehicle's capacity from being utilized. For example, if the specific vehicle is an eight-seat van, at least one seat or at least two seats may remain empty.

In some embodiments, server 150 may implement the threshold block across a fleet of ridesharing vehicles. For example, server 150 may apply a threshold block to each rideshare vehicle in the fleet. Additionally or alternatively, server 150 may implement one or more threshold blocks to one or more groups of vehicles.

In some embodiments, server 150 may store information about the ridesharing vehicle. For example, server 150 may store static information such as a year of the vehicle (e.g., 1999, 2005, 2017, etc.), a make of the vehicle (e.g., GM, Honda, Hyundai, Lincoln, etc.) model of the vehicle (e.g., Camry, Malibu, etc.).

Additionally or alternatively, server 150 may store dynamic information such as one or more reviews of the vehicle by passengers. For example, server 150 may receive reviews (such as a rating, like 4 out of 5 or "Good," optionally coupled with comments from the user) from one or more devices (such as mobile communications device 200) associated with the users and/or the additional users. In such an example, server 150 may couple with received reviews with a capacity associated with the reviews. For example, if a review is received from a user that rode in the vehicle when the capacity of the vehicle was at 3, server 150 may associate the review with a capacity of 3. In an example where a user rode in a vehicle during different capacities (e.g., began the ride at a capacity of 2 and ended the ride at a capacity of 3), server 150 may associate with the review with an average of the different capacities, a minimum of the different capacities, a maximum of the different capacities, or the like.

Based on the stored information, server 150 may determine a value for the threshold based on information stored in the memory, the value being specific to each ridesharing vehicle. For example, server 150 may determine a passenger-capacity of the specific ridesharing vehicle based on the particular year, make, and/or model of the specific ridesharing vehicle. Server 150 may then determine a value for the threshold such that the determined value for a specific ridesharing vehicle is one seat less than the passenger-capacity of the specific ridesharing vehicle, the determined value for a specific ridesharing vehicle is two seats less than the passenger-capacity of the specific ridesharing vehicle, the determined value for a specific ridesharing vehicle is three seats less than the passenger-capacity of the specific ridesharing vehicle, or the like. In a similar example, when a specific ridesharing vehicle has more than ten seats, the determined value for the specific ridesharing vehicle may be less than ten seats.

Additionally or alternatively, server 150 may determine a value for the threshold based on the reviews. For example, server 150 may determine the value based on the majority of reviews being above a score threshold when the associated capacities are below the threshold and the majority of reviews being below the score threshold when the associated capacities are above the threshold. In another example, server 150 may determine the value based on detected sentiment of comments included with the reviews. In such an example, server 150 may determine the value for the threshold based on a value of the associated capacities at which the detected sentiments changes from positive to negative or based on a value of the associated capacities at which a negativity of the detected sentiments exceeds a negativity threshold.

Method 800 may further include additional steps. For example, method 800 may include overriding the threshold block in response to a received indication of an inclement weather condition. For example, server 150 may receive an indication of rain, snow, hail, or other inclement weather conditions and override the threshold block in response. Such an indication may be retrieved from one or more memories and/or received using the communications interface (e.g., from a weather server and/or weather update service using the Internet).

In another example, method 800 may include overriding the threshold block override in response to a received indication of a special event condition. For example, server 150 may receive an indication of a sporting event, a holiday, a festival, or other special event and override the threshold block in response. Such an indication may be retrieved from one or more memories and/or received using the communications interface (e.g., from a global calendar, a local calendar of events, a sports calendar, a holiday database, or the like using the Internet).

In yet another example, method 800 may include overriding the threshold block when an estimated time in which the ridesharing vehicle's utilized capacity is above the threshold is less than a predefined period of time. For example, server 150 may estimate the time based on an overlap between the routes of the users and the routes of the additional users. The predefined period of time may be, for example, 3 minutes, 5 minutes, 10 minutes, or the like.

In a fourth example, method 800 may include overriding the threshold block in response to a received indication of an unscheduled-user condition. For example, server 150 may receive an indication that more passengers entered the vehicle than initially indicated when the ride was scheduled (e.g., 3 passengers enter when only 1 passenger requested a ride). Such an indication may be received from one or more devices (such as mobile communications device 200) associated with the users.

Method 800 may further include cancelling the assignment of a first rideshare vehicle and re-assigning a second rideshare vehicle in order to enable the first rideshare vehicle to pick-up a passenger not originally assigned to the first rideshare vehicle. For example, if more passengers enter the first vehicle than initially indicated when the ride was scheduled (e.g., 2 passengers enter when only 1 passenger requested a ride), server 150 may cancel another assignment to the first vehicle and re-assign that request to a second vehicle. In some embodiments, the cancellation and rescheduling may be performed any time that more passengers enter than originally indicated. In other embodiments, the cancellation and rescheduling may only be performed when the extra passengers would cause the threshold block to be exceeded. For example, if 2 passengers enter the first vehicle when only 1 passenger requested a ride, and the other assignment to the first vehicle is for 2 passengers, server 150 may only cancel and re-assign the other assignment if the threshold block for the first vehicle is less than 4. In another example, if 3 passengers enter the first vehicle when only 2 passengers requested a ride, and the other assignment to the first vehicle is for 1 passenger, server 150 may only cancel and re-assign the other assignment if the threshold block for the first vehicle is less than 4. The re-assignment may be communicated to one or more devices (such as mobile communications device 200) associated with the additional users.

Server 150 may also account for factors other than passenger count that may affect capacity. For example, server 150 may track passengers' luggage capable of impacting capacity of the ridesharing vehicle. In such an example, server 150 may receive an indication that a user has one or more suitcases, a bicycle, a music instrument, or the like. Based on this indication, server 150 may increase the tracked utilized capacity of the vehicle to account for the luggage or otherwise assign fewer passengers to the vehicle. Such an indication may be received from one or more devices (such as mobile communications device 200) associated with the user. Additionally or alternatively, such an indication may be received from one or more devices (such as mobile communications device 200) associated with a driver of the vehicle (e.g., if the user failed to indicate s/he had any luggage when submitting a ride request). In such an embodiment, server 150 may cancel one or more additional assignments to the vehicle and re-assign a second rideshare vehicle in order to enable the vehicle to pick-up the luggage.

Additionally or alternatively, server 150 may track a passenger's physical condition capable of impacting capacity of the ridesharing vehicle. For example, server 150 may track if the user has a wheelchair, a baby, crutches, injury, or the like, or is obese or has any other physical condition that requires additional space. In such an example, server 150 may receive an indication of the physical condition. Based on this indication, server 150 may increase the tracked utilized capacity of the vehicle to account for the physical condition or otherwise assign fewer passengers to the vehicle. Such an indication may be retrieved from one or more memories (e.g., a user database storing information associated with user accounts including indications of physical conditions) and/or received from one or more devices (such as mobile communications device 200) associated with the user. Additionally or alternatively, such an indication may be received from one or more devices (such as mobile communications device 200) associated with a driver of the vehicle (e.g., if the user failed to indicate s/he had a physical condition when registering for a user account and/or submitting a ride request). In such an embodiment, server 150 may cancel one or more additional assignments to the vehicle and re-assign a second rideshare vehicle in order to enable the vehicle to accommodate the physical condition.

Dynamic Re-Assignment of Vehicles

Embodiments of the present disclosure may allow for the dynamic re-assignment of rideshare vehicles. For example, passenger assignments may be changed between a time of initial assignment and a time of picking up the passenger. This may enhance the experience of users when a vehicle to which they are initially assigned is delayed, for example, on account of traffic, weather, wrong turns, or the like. In addition, the dynamic re-assignment may be used to allow the fleet of rideshare vehicles to handle urgent requests. For example, users having a medical emergency, family emergency, running late for a flight, or the like, may be prioritized to increase aggregate satisfaction across all users.

Figure 9:
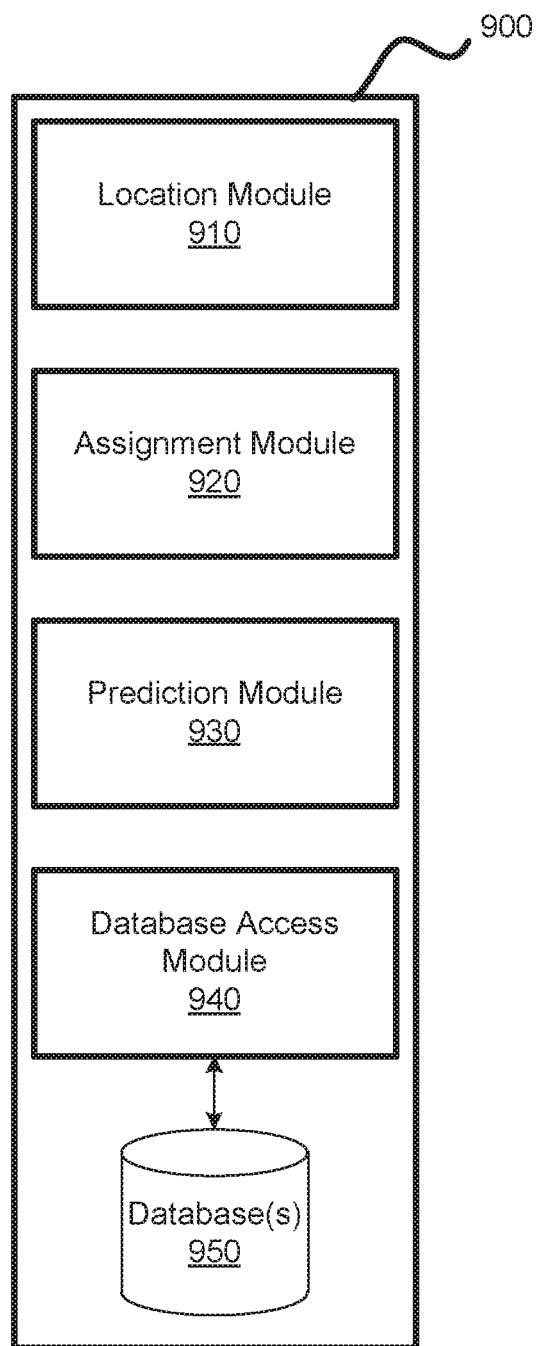
FIG. 9 is a diagram of an example memory module for dynamic re-assignment of ridesharing vehicles, in accordance with some embodiments of the present disclosure.

FIG. 9 depicts an example of a memory module 900 for dynamic re-assignment of rideshare vehicles. Although depicted as a single memory in FIG. 9, memory 900 may comprise one or more non-volatile (e.g., hard disk drive, flash memory, etc.) and/or volatile (e.g., RAM or the like) memories. In some embodiments, memory 900 may be included in ridesharing management server 150. For example, memory 900 may comprise, at least in part, a portion of memory 320.

As depicted in FIG. 9, memory 900 may include location module 910. Location module 910 may determine pick-up locations for users assigned to ridesharing vehicles. For example, location module 910 may receive location information (e.g., using GPS) from a first plurality of communication devices (such as mobile communications device 200) associated with a plurality of users. In such an example, the received location information may be included in ride requests as starting points.

Additionally, location module 910 may receive location information from a second plurality of communication devices (such as mobile communications device 200) associated with a plurality of ridesharing vehicles. In such an embodiment, location module 910 may continuously receive location information from the first and second pluralities of communication devices. As used herein, "continuously" does not necessarily mean without interruption but may refer to the receipt of information in a discretized manner having spacings (and/or interruptions) each below a threshold of time, such as 50 ms, 100 ms, 500 msec, 1 sec, 5 sec, 10 sec, 30 sec. or the like.

Location module 910 may determine pick-up locations for a first group of users assigned to a first ridesharing vehicle. For example, location module 910 may determine the pickup locations based on one or more optimization models run on one or more predicted routes between starting points and destinations of the users. The one or more optimization models may include a shortest distance optimization, a shortest travel time optimization (e.g., accounting for speed limits, traffic, wrong turns, etc.), a combination of distance and travel time optimization, a fuel efficiency optimization (e.g., based on known fuel ratings of the ridesharing vehicle), an electric battery charge optimization, or the like. For example, any solution to the P v. NP problem later derived may also be incorporated into the optimization models. For at least some of the first group of users, the determined pick-up locations may differ from the starting points.

Additionally or alternatively, location module 910 may determine drop-off locations for a first group of users assigned to a first ridesharing vehicle. For example, location module 910 may determine the drop-off locations based on one or more optimization models run on one or more predicted routes between starting points and destinations of the users. The one or more optimization models may include a shortest distance optimization, a shortest travel time optimization (e.g., accounting for speed limits, traffic, wrong turns, etc.), a fuel efficiency optimization (e.g., based on known fuel ratings of the ridesharing vehicle), or the like. For example, any solution to the P v. NP problem later derived may also be incorporated into the optimization models. For at least some of the first group of users, the determined drop-off locations may differ from the destinations.

The pick-up locations and/or drop-off locations may be changed depending on cancellations and re-assignments performed by assignment module 920. For example, location module 910 may change at least one drop-off location of at least one second user in a second ridesharing vehicle after assignment of the second ridesharing vehicle to a first user. In a similar example, location module 910 may change a pick-up location of the first user after cancellation of an assignment of a first ridesharing vehicle to the first user and/or after re-assignment of the second ridesharing vehicle to the first user.

In some embodiments, location module 910 may also send data to at least some of the first group of users to guide each user to a respective pick-up location different from a corresponding starting point of each said user. For example, location module 910 may send GPS coordinates of the pick-up locations, physical addresses of the pick-up locations, or the like to devices of the first plurality of communication devices (such as mobile communications device 200) associated with the at least some of the first group of users. Each device may use received coordinates, a received address, or the like to route (e.g., via walking) the associated user from a current location of the device to the pick-up location. In another example, location module 910 may determine routes (e.g., via walking) from current locations received from the devices to the pick-up locations and send the route to the devices. Accordingly, location module 910 may send to the at least some of the first group of users walking directions to the respective pick-up locations.

Additionally or alternatively, location module 910 may send to the at least some of the first group of users at least one of a location and an address of the respective pick-up locations. For example, location module 910 may send GPS coordinates of the respective pick-up locations, physical addresses of the pick-up locations, or the like to devices of the first plurality of communication devices (such as mobile communications device 200) associated with the at least some of the first group of users. Guiding the at least some of the first group of users (e.g., using routes and/or walking directions as described above) may be performed by the devices.

As further depicted in FIG. 9, memory 900 may include assignment module 920. Assignment module 920 may receive ride requests from a first plurality of communication devices (such as mobile communications device 200) associated with a plurality of users. For example, assignment module 920 may receive the requests using a communications interface. The communications interface may comprise, for example, one or more network interface controllers (NICs). These one or more NICs may communicate over one or more computer networks, such as the Internet, a local area network (LAN), or the like.

Assignment module 920 may further assign the rideshare vehicles in a fleet to pick-up a plurality of users. For example, assignment module 920 may assign a first ridesharing vehicle to pick-up a first group of the plurality of users. For example, assignment module 920 may combine users to form the first group based on the closeness of the pick-up location of one user in the first group to a pick-up location and/or a destination of another user in the first group, the closeness of a destination of the user in the first group to the pick-up location and/or the destination of the other user in the first group, overlap between a first predicted route from the pick-up location of the user to the destination of the user and a second predicted route from the pick-up location of the other user to the destination of the other user, or the like. The predicted routes may be calculated using one or more maps, optionally in combination with traffic information. The one or more maps may be retrieved from one or more memories and/or using the communications interface. Similarly, the traffic information may be retrieved from one or more memories and/or using the communications interface.

In some embodiments, assignment module 920 may cooperate with location module 910 to perform dynamic re-assignment. For example, prior to a first user arriving at a first pick-up location, assignment module 920 may cancel the assignment of a first ridesharing vehicle to the first user while maintaining the assignment of the first ridesharing vehicle to others of the first group of users. Additionally or alternatively, assignment module 920 may cooperate with prediction module 930 to perform dynamic re-assignment. For example, assignment module 920 may re-assign the first user to a second ridesharing vehicle, e.g., when a predicted passing time when a second ridesharing vehicle may pass the first pick-up location is after a predicted arrival time when the first user will arrive at the first pick-up location. In some embodiments, the second ridesharing vehicle may be carrying at least one second user while being assigned to the first user. For example, assignment module 920 may assign to the second ridesharing vehicle (e.g., a van) already transporting at least four second users for simultaneous transportation with the first user. In another example, assignment module 920 may assign to the second ridesharing vehicle (e.g., a taxi) already transporting one or two second users for simultaneous transportation with the first user.

The re-assignment may be performed similar to the initial assignment. For example, assignment module 920 may assign the first user to the second ridesharing vehicle based on a current location of the second ridesharing vehicle and a desired destination of the at least one second user. Additionally or alternatively, assignment module 920 may assign the first user to the second ridesharing vehicle based on an overlap between a current route of the second ridesharing vehicle and a predicted route from the first pick-up location to the destination of the first user, or the like.

Additional dynamic re-assignments may be performed by assignment module 920. For example, assignment module 920 may cancel the assignment of the first rideshare vehicle when an estimated arrival time of the first ridesharing vehicle is before an estimated arrival time of the first user. In certain aspects, assignment module 920 may cancel the assignment of the first rideshare vehicle when the estimated arrival time of the first ridesharing vehicle is more than a predetermined period of time (e.g., 0.5 minutes, 1 minute, 2 minutes, 3 minutes, 5 minutes, or the like) before the estimated arrival time of the first user. In another example, assignment module 920 may cancel the assignment of the first rideshare vehicle when a delay in an arrival of the first ridesharing vehicle at the first pick-up location is predicted. In certain aspects, assignment module 920 may cancel the assignment when the predicted delay is more than a predetermined period of time (e.g., 5 minutes, 10 minutes, 15 minutes, or the like) as compared to an original estimated arrival time of the first ridesharing vehicle at the first pick-up location, and the second ridesharing vehicle that may be reassigned with the first user is predicted to pass first pick-up location earlier than first ridesharing vehicle.

As explained above with respect to FIG. 6, assignment module 920 may cancel the assignment of the first rideshare vehicle and re-assign the second rideshare vehicle to enable the first rideshare vehicle to pick-up a passenger not originally assigned to the first rideshare vehicle (e.g., 4 passengers enter when only 2 passengers requested a ride). For example, if the first rideshare vehicle has more passengers board than were initially requested prior to picking up the first user, the second rideshare vehicle may be re-assigned to the first user. In certain aspects, the second rideshare vehicle may be re-assigned only if the total passengers in the first rideshare vehicle exceed a threshold (e.g., 2 passengers, 4 passengers, a threshold block as described above, etc.).

In general, assignment module 920 may re-assign the second rideshare vehicle in order to minimize a total waiting time of the plurality of users. For example, assignment module 920 may determine that re-assigning the second rideshare vehicle to one or more users initially assigned to the first rideshare vehicle (such as the first user) results in a lower total waiting time (i.e., a total waiting time for each user assigned to the first rideshare vehicle and each user assigned to the second rideshare vehicle) and then perform the re-assignment. The predicted total waiting time may depend on routes between starting locations of the users and pick-up locations of the users as well as predicted arrival times for the first rideshare vehicle and/or the second rideshare vehicle at the pick-up locations.

Additionally or alternatively, assignment module 920 may re-assign the second rideshare vehicle in order to minimize a total travel time of the plurality of users. For example, assignment module 920 may determine that re-assigning the second rideshare vehicle to one or more users initially assigned to the first rideshare vehicle (such as the first user) results in a lower total travel time (i.e., a total travel time for each user assigned to the first rideshare vehicle and each user assigned to the second rideshare vehicle) and then perform the re-assignment. The predicted total travel time may depend on routes between pick-up locations of the users and drop-off locations of the users as well as predicted arrival times for the first rideshare vehicle and/or the second rideshare vehicle at the drop-off locations and may change in real time due to wrong turns and/or changes in traffic conditions.

Any time the assignment of the first ridesharing vehicle to the first user is cancelled, the route of the first ridesharing vehicle may be automatically updated. For example, the first ridesharing vehicle may be re-routed to bypass the pick-up location of the first user and therefore reach another pick-up location or drop-off location at an earlier time and/or after traversing a shorter distance. Assignment module 920 may further guide the first ridesharing vehicle to the other pick-up location or drop-off location. For example, assignment module 920 may send the updated route to one or more devices of the second plurality of communication devices (such as mobile communications device 200) associated with the first ridesharing vehicle.

Similarly, any time the first user is re-assigned to the second ridesharing vehicle, the route of the second ridesharing vehicle may be automatically updated. For example, the second ridesharing vehicle may be re-routed to pass the pick-up location of the first user, optionally before another pick-up location or drop-off location of the at least one second user. Assignment module 920 may guide the second ridesharing vehicle to the first pick-up location. For example, assignment module 920 may send a route (or updated route) to one or more devices of the second plurality of communication devices (such as mobile communications device 200) associated with the second ridesharing vehicle.

As further depicted in FIG. 9, memory 900 may include prediction module 930. Prediction module 930 may use the location information from the first and second pluralities of communication devices to estimate arrival times at respective pick-up locations. For example, prediction module 930 may use information received from a first communications device (e.g., derived from a GPS of the first communications device) of a first user to predict when the first user will arrive at the assigned first pick-up location. Additionally or alternatively, information used for predicting when the first user will arrive at the assigned first pick-up location may be derived from the ride request (e.g., which may include a current location of the first user). In another example, prediction module 930 may use information received from a second communications device (e.g., derived from a GPS of the second communications device) of the first ridesharing vehicle to predict when the first ridesharing vehicle will arrive at the assigned first pick-up location.

Similarly, prediction module 930 may use information received from a second communications device (e.g., derived from a GPS of the second communications device) of a second ridesharing vehicle to predict when a second ridesharing vehicle may pass the first pick-up location. Prediction module 930 may then compare the predicted passing time of the second ridesharing vehicle with the arrival time of the first user.

Prediction module 930 may make additional or alternative comparisons. For example, prediction module 930 may compare a predicted passing time of the first ridesharing vehicle with the arrival time of the first user and/or any other user. In another example, prediction module 930 may compare a predicted passing time of a third ridesharing vehicle with the arrival time of the first user and/or any other user.

In embodiments where location module 910 continuously receives location information from the first and second pluralities of communication devices, prediction module 930 may use the continuously received location information to estimate arrival times at respective pick-up locations, similar to the examples explained above. In such embodiments, prediction module 930 may additionally or alternatively use the continuously received location information to predict a delay in an arrival of the first ridesharing vehicle at the first pick-up location. For example, prediction module 930 may use weather, traffic information, and/or information about emergency (e.g., fire, police, medical, etc.) activity (e.g., received using the communications interface and/or retrieved from one or more memories) to predict the delay. Additionally or alternatively, prediction module 930 may compare the continuously received location information with a predicted route to determine if any wrong turns, unexpected slow downs, wrong turns, or the like, cause the first ridesharing vehicle to be at a different portion of the route than expected. Additionally or alternatively, prediction module 930 may receive information from one or more second communication devices regarding a malfunctioning of an associated ridesharing vehicle and predict a delay therefrom. Any of the above examples may similarly be used to predict a delay in arrival of one or more users and/or one or more additional ridesharing vehicles.

Memory 900 may further include a database access module 940, and may also include database(s) 950. Database access module 940 may include software instructions executable to interact with database(s) 950, to store and/or retrieve information (e.g., information used to perform any of the predictions described above, weather information, traffic information, one or more maps, or the like).

Figure 10A:
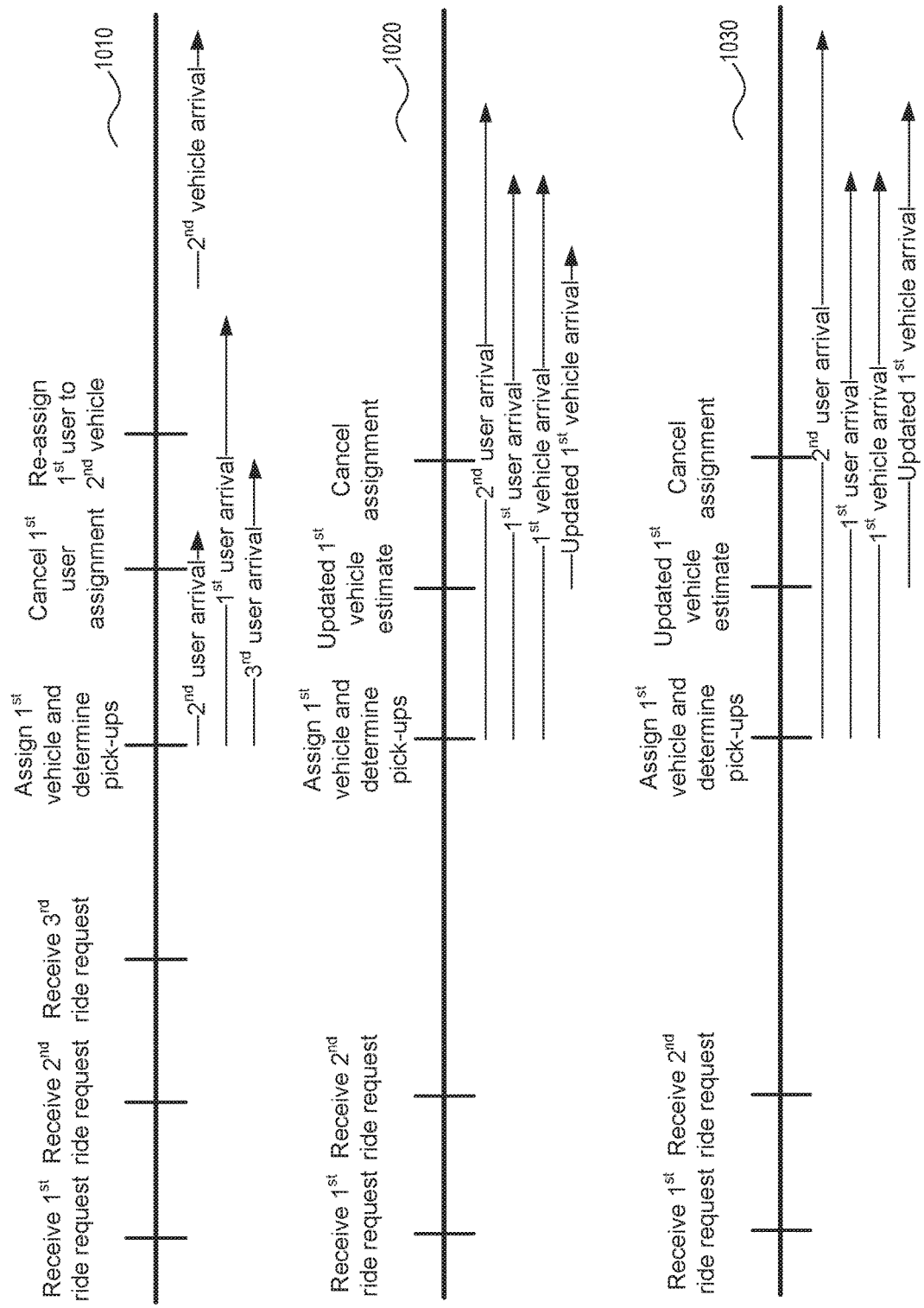
FIG. 10A is a diagram of example timelines showing the use of dynamic re-assignment in a rideshare fleet, in accordance with some embodiments of the present disclosure.

FIG. 10A is a diagram of example timelines showing the use of dynamic re-assignment in a rideshare fleet, in accordance with some embodiments of the present disclosure. As shown in example timeline 1010, ridesharing management server 150 may receive a first request from a first user, a second request from a second user, and a third request from a third user. Ridesharing management server 150 may assign the first request, the second request, and the third request to a first ridesharing vehicle. Accordingly, the first user, the second user, and the third user may form a first group of users.

After assignment, ridesharing management server 150 may determine a first pick-up location for the first user, a second pick-up location for the second user, and a third pick-up location for the third user. For at least one of the users, the corresponding pick-up location may be different from a starting point included in the corresponding request. Additionally or alternatively, ridesharing management server 150 may determine a first drop-off location for the first user, a second drop-off location for the second user, and a third drop-off location for the third user. For at least one of the users, the corresponding drop-off location may be different from a desired destination included in the corresponding request.

In example timeline 1010, ridesharing management server 150 may predict an arrival time for the first user at the first pick-up location, an arrival time for the second user at the second pick-up location, and an arrival time for the third user at the third pick-up location. For example, ridesharing management server 150 may use information received from a first communications device of the first user to predict the arrival time for the first user, may use information received from a first communications device of the second user to predict the arrival time for the second user, and/or may use information received from a first communications device of the third user to predict the arrival time for the third user.

As further shown in example timeline 1010, prior to the first user arriving at the first pick-up location, ridesharing management server 150 may cancel the assignment of the first ridesharing vehicle to the first user while maintaining the assignment of the first ridesharing vehicle to others of the first group of users. Further, ridesharing management server 150 may predict when a second ridesharing vehicle may pass the first pick-up location. For example, ridesharing management server 150 may use information received from a second communications device associated with the second ridesharing vehicle. In example timeline 1010, because the predicted passing time of the second ridesharing vehicle is after the predicted arrival time of the first user, ridesharing server 150 may re-assign the first user to the second ridesharing vehicle.

As shown in example timeline 1020, ridesharing management server 150 may receive a first request from a first user and a second request from a second user. Ridesharing management server 150 may assign the first request and the second request to a first ridesharing vehicle. Accordingly, the first user and the second user may form a first group of users.

After assignment, ridesharing management server 150 may determine a first pick-up location for the first user and a second pick-up location for the second user. For at least one of the users, the corresponding pick-up location may be different from a starting point included in the corresponding request. Additionally or alternatively, ridesharing management server 150 may determine a first drop-off location for the first user and a second drop-off location for the second user. For at least one of the users, the corresponding drop-off location may be different from a desired destination included in the corresponding request.

In example timeline 1020, ridesharing management server 150 may predict an arrival time for the first user at the first pick-up location, an arrival time for the second user at the second pick-up location, and an arrival time of the first ridesharing vehicle at the first pick-up location and/or the second pick-up location. For example, ridesharing management server 150 may use information received from a first communications device of the first user to predict the arrival time for the first user, may use information received from a first communications device of the second user to predict the arrival time for the second user, and/or may use information received from a second communications device associated with the first ridesharing vehicle.

Ridesharing management server 150 may continuously receive location information to estimate arrival times at respective pick-up locations. Accordingly, in example timeline 1020, ridesharing management server 150 may calculate an updated arrival time of the first ridesharing vehicle at the first pick-up location and/or the second pick-up location. Although not depicted in FIG. 10A, ridesharing server 150 may additionally or alternatively calculate an updated arrival time for the first user at the first pick-up location and/or an updated arrival time for the second user at the second pick-up location.

As further shown in example timeline 1020, ridesharing management server 150 may cancel the assignment of the first rideshare vehicle when the estimated arrival time of the first ridesharing vehicle is before the estimate arrival time of the first user. Accordingly, ridesharing management server 150 cancels the assignment when the updated arrival time of the first ridesharing vehicle at the first pick-up location and/or the second pick-up location is before the arrival time for the first user at the first pick-up location. In some embodiments, ridesharing management server 150 may cancel the assignment of the first rideshare vehicle when the estimated arrival time of the first ridesharing vehicle is more than a predetermined period of time (e.g., 0.5 minutes, 1 minute, 2 minutes, 3 minutes, 5 minutes, etc.) before the estimated arrival time of the first user.

Although not depicted in FIG. 10A, ridesharing management server 150 may further predict when a second ridesharing vehicle may pass the first pick-up location, compare the predicted passing time of the second ridesharing vehicle with the arrival time of the first user, and re-assign the first user to the second ridesharing vehicle when the predicted passing time is after the predicted arrival time.

As shown in example timeline 1030, ridesharing management server 150 may receive a first request from a first user and a second request from a second user. Ridesharing management server 150 may assign the first request and the second request to a first ridesharing vehicle. Accordingly, the first user and the second user may form a first group of users.

After assignment, ridesharing management server 150 may determine a first pick-up location for the first user and a second pick-up location for the second user. For at least one of the users, the corresponding pick-up location may be different from a starting point included in the corresponding request. Additionally or alternatively, ridesharing management server 150 may determine a first drop-off location for the first user and a second drop-off location for the second user. For at least one of the users, the corresponding drop-off location may be different from a desired destination included in the corresponding request.

In example timeline 1030, ridesharing management server 150 may predict an arrival time for the first user at the first pick-up location, an arrival time for the second user at the second pick-up location, and an arrival time of the first ridesharing vehicle at the first pick-up location and/or the second pick-up location. For example, ridesharing management server 150 may use information received from a first communications device of the first user to predict the arrival time for the first user, may use information received from a first communications device of the second user to predict the arrival time for the second user, and/or may use information received from a second communications device associated with the first ridesharing vehicle.

Ridesharing management server 150 may continuously receive location information to estimate arrival times at respective pick-up locations. Accordingly, in example timeline 1030, ridesharing management server 150 may calculate an updated arrival time of the first ridesharing vehicle at the first pick-up location and/or the second pick-up location. Although not depicted in FIG. 10A, ridesharing server 150 may additionally or alternatively calculate an updated arrival time for the first user at the first pick-up location and/or an updated arrival time for the second user at the second pick-up location. In the example of timeline 1030, ridesharing management server 150 has predicted a delay in an arrival of the first ridesharing vehicle at the first pick-up location and/or the second pick-up location. For example, the delay may be due to traffic, weather, vehicle malfunction, police activity, wrong turns, or the like.

As further shown in example timeline 1030, ridesharing management server 150 may cancel the assignment of the first rideshare vehicle because the delay is predicted. Accordingly, ridesharing management server 150 cancels the assignment when the updated arrival time of the first ridesharing vehicle is after the original estimated arrival time of the first ridesharing vehicle. In some embodiments, ridesharing management server 150 may cancel the assignment of the first rideshare vehicle when the estimated arrival time of the first ridesharing vehicle is more than a predetermined period of time (e.g., 5 minutes, 10 minutes, 15 minutes, etc.) later than the original estimated arrival time of the first ridesharing vehicle.

Although not depicted in FIG. 10A, ridesharing management server 150 may further predict when a second ride-sharing vehicle may pass the first pick-up location, compare the predicted passing time of the second ridesharing vehicle with the arrival time of the first user, and re-assign the first user to the second ridesharing vehicle when the predicted passing time is before the predicted arrival time. In addition, in some embodiments, ridesharing manager server may cancel the assignment of the first user to the first ridesharing vehicles only if reassignment to the second ridesharing vehicle succeeds.

Figure 10B:
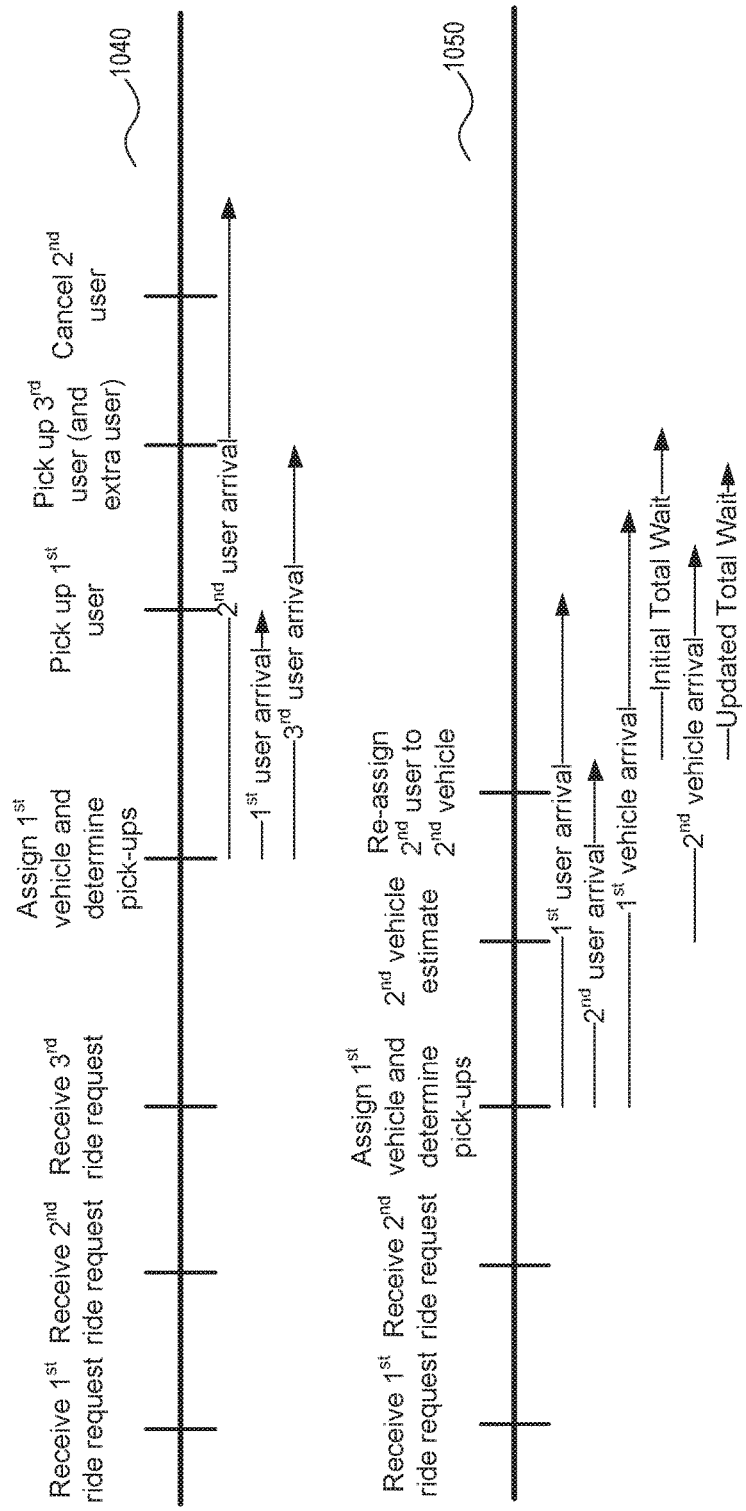
FIG. 10B is a diagram of additional example timelines showing the use of dynamic re-assignment in a rideshare fleet, in accordance with some embodiments of the present disclosure.

FIG. 10B is a diagram of additional example timelines showing the use of dynamic re-assignment in a rideshare fleet, in accordance with some embodiments of the present disclosure. As shown in example timeline 1040, ridesharing management server 150 may receive a first request from a first user, a second request from a second user, and a third request from a third user. Ridesharing management server 150 may assign the first request, the second request, and the third request to a first ridesharing vehicle. Accordingly, the first user, the second user, and the third user may form a first group of users.

After assignment, ridesharing management server 150 may determine a first pick-up location for the first user, a second pick-up location for the second user, and a third pick-up location for the third user. For at least one of the users, the corresponding pick-up location may be different from a starting point included in the corresponding request. Additionally or alternatively, ridesharing management server 150 may determine a first drop-off location for the first user, a second drop-off location for the second user, and a third drop-off location for the third user. For at least one of the users, the corresponding drop-off location may be different from a desired destination included in the corresponding request.

In example timeline 1040, ridesharing management server 150 may predict an arrival time for the first user at the first pick-up location, an arrival time for the second user at the second pick-up location, and an arrival time for the third user at the third pick-up location. For example, ridesharing management server 150 may use information received from a first communications device of the first user to predict the arrival time for the first user, may use information received from a first communications device of the second user to predict the arrival time for the second user, and/or may use information received from a first communications device of the third user to predict the arrival time for the third user.

As further shown in example timeline 1040, the first ridesharing vehicle may pick-up the first user (e.g., from the first pick-up location). Thereafter, the first ridesharing vehicle may pick-up the third user (e.g., from the third pick-up location). In the example of timeline 1040, although the third user has only requested a ride for a single passenger, two passengers actually board the first ridesharing vehicle. In one example, a second communications device associated with the first ridesharing vehicle may send a signal to ridesharing management server 150 regarding the passenger not originally assigned to the first rideshare vehicle. In response, ridesharing management server 150 cancels the assignment of the first rideshare vehicle in order to enable the first rideshare vehicle to pick-up a passenger not originally assigned to the first rideshare vehicle. Although not depicted in FIG. 10B, ridesharing management server 150 may further re-assign a second ridesharing vehicle to the second user. For example, ridesharing management server 150 may predict when the second ridesharing vehicle may pass the second pick-up location and re-assign the second ridesharing vehicle when the predicted passing time is after the predicted arrival time of the second user or after the planned pickup time of the second user.

As shown in example timeline 1050, ridesharing management server 150 may receive a first request from a first user and a second request from a second user. Ridesharing management server 150 may assign the first request and the second request to a first ridesharing vehicle. Accordingly, the first user and the second user may form a first group of users.

After assignment, ridesharing management server 150 may determine a first pick-up location for the first user and a second pick-up location for the second user. For at least one of the users, the corresponding pick-up location may be different from a starting point included in the corresponding request. Additionally or alternatively, ridesharing management server 150 may determine a first drop-off location for the first user and a second drop-off location for the second user. For at least one of the users, the corresponding drop-off location may be different from a desired destination included in the corresponding request.

In example timeline 1050, ridesharing management server 150 may predict an arrival time for the first user at the first pick-up location, an arrival time for the second user at the second pick-up location, and an arrival time of the first ridesharing vehicle at the first pick-up location and/or the second pick-up location. For example, ridesharing management server 150 may use information received from a first communications device of the first user to predict the arrival time for the first user, may use information received from a first communications device of the second user to predict the arrival time for the second user, and/or may use information received from a second communications device associated with the first ridesharing vehicle.

Ridesharing management server 150 may further determine a total waiting time of the plurality of users. For example, each difference between the predicted arrival time of a user and the predicted arrival time of the first ridesharing vehicle may be summed. In embodiments where the predicted arrival time of the first ridesharing vehicle is before a predicted arrival time of one or more of the users, ridesharing management server 150 may either subtract the difference between the arrival times from the total waiting time or may ignore the one or more of the users in determining the total waiting time.

As further shown in example timeline 1050, ridesharing management server 150 may cancel the assignment of the first rideshare vehicle to the second user and re-assign the second rideshare vehicle in order to minimize a total waiting time of the plurality of users. For example, ridesharing management server 150 may predict an arrival time of the second ridesharing vehicle at the second pick-up location and, therefrom, predict an updated total waiting time if the second ridesharing vehicle were to be re-assigned to the second user. If the updated total waiting time is less than the initial total waiting time, ridesharing management server 150 may cancel the assignment of the first rideshare vehicle to the second user and re-assign the second rideshare vehicle.

Additionally or alternatively, the second user may also be re-assigned to a new pick-up location during re-assignment. In such an embodiment, ridesharing management server 150 may predict an arrival time of the second ridesharing vehicle at the updated pick-up location and predict an arrival time of the second user at the updated pick-up location. Based on the arrival times at the updated pick-up location, ridesharing management server 150 may predict an updated total waiting time if the second ridesharing vehicle were to be re-assigned to the second user. If the updated total waiting time is less than the initial total waiting time, ridesharing management server 150 may cancel the assignment of the first rideshare vehicle to the second user, re-assign the second rideshare vehicle, and send the updated pick-up location to the second user.

Although not depicted in FIG. 10B, ridesharing management server 150 may decline to re-assign the second ridesharing vehicle even if the updated total waiting time is less than the initial total waiting time. For example, one or more thresholds (e.g., 10 minutes, 15 minutes, or the like) may be applied to a predicted waiting time for an individual user. In this example, ridesharing management server 150 may decline to re-assign the second ridesharing vehicle if the re-assignment would result in a predicted waiting time for a user exceeding the threshold. Accordingly, inconveniences to individual users may be capped in order to encourage such users to become repeat riders and enjoy the advantages of fleet-wide optimization on one or more future trips.

Any of the examples of FIGS. 10A and 10B may be combined. For example, the minimization of total wait time in example timeline 1050 may be applied to any of the example timelines 1010, 1020, 1030, and/or 1040. In another example, the enablement of a rideshare vehicle to pick-up a passenger not originally assigned to the rideshare vehicle in example timeline 1040 may be applied to any of the example timelines 1010, 1020, 1030, and/or 1050.

Figure 11A:
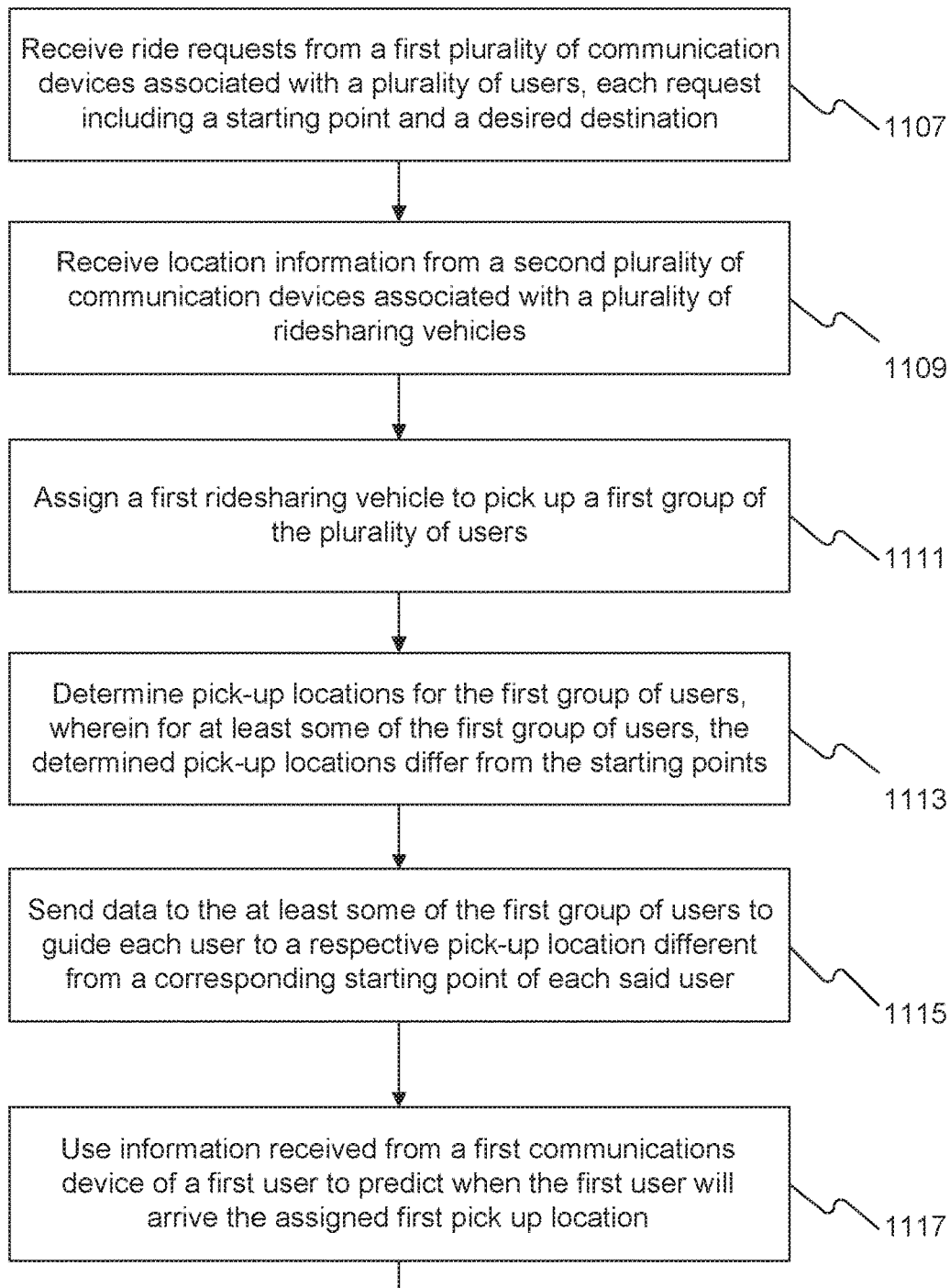
FIG. 11A is a diagram of the first part of another example process for managing a fleet of ridesharing vehicles, in accordance with some embodiments of the present disclosure.
Figure 11B:
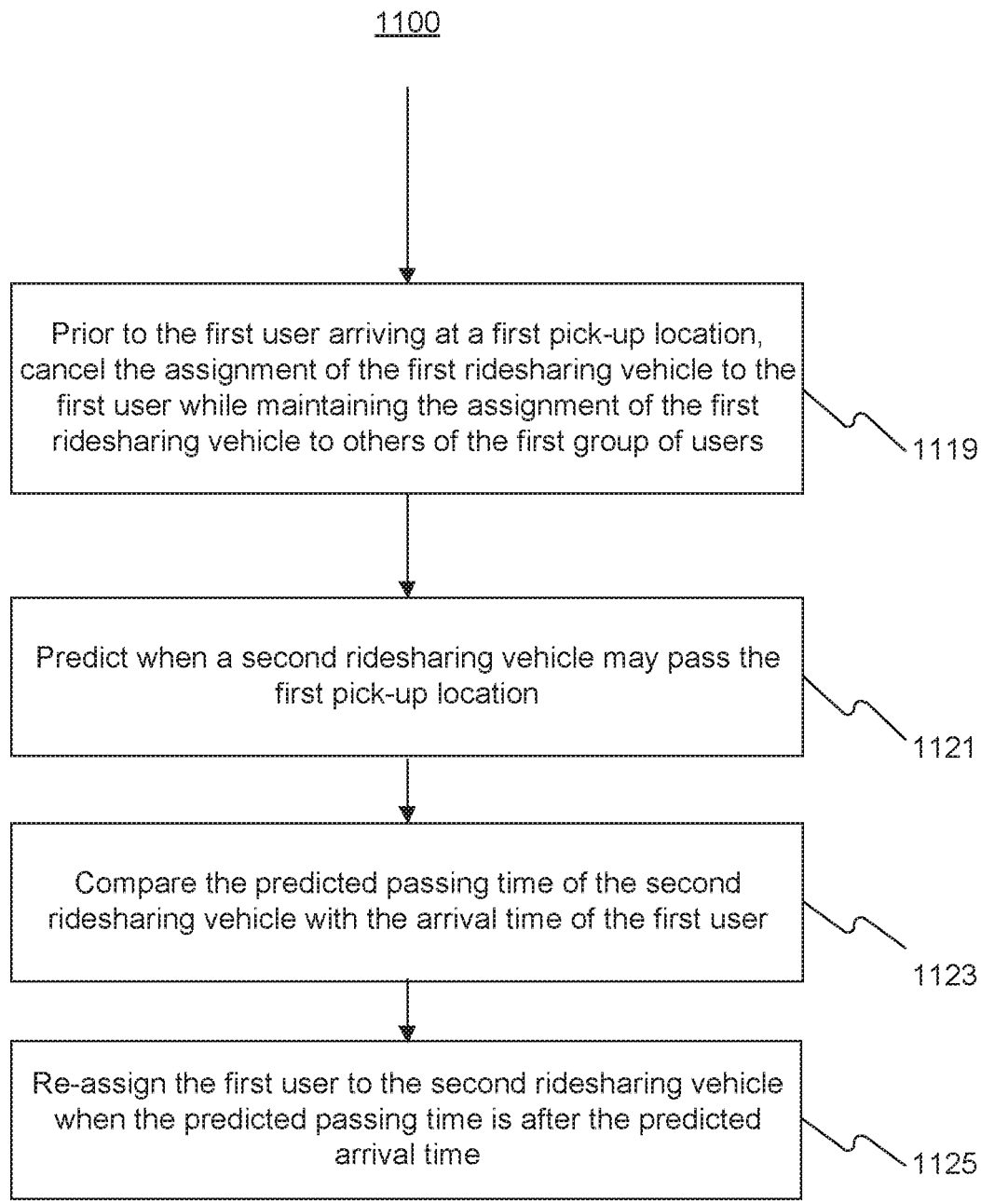
FIG. 11B is a diagram of the second part of the example process of FIG. 11A.

FIGS. 11A and 11B depict example method 1100 for managing a fleet of ridesharing vehicles. Method 1100 may, for example, be implemented by ridesharing management server 150 of FIG. 3.

At step 1107, server 150 may receive ride requests from a first plurality of communication devices associated with a plurality of users. For example, server 150 may receive the ride requests using one or more communications interfaces (such as communications interface 360). In some embodiments, each ride request includes a starting point and a desired destination corresponding to each of the plurality of users. The starting point may be included as GPS coordinates, a physical address, or the like. Similarly, the desired destination may be included as GPS coordinates, a physical address, or the like.

At step 1109, server 150 may receive location information from a second plurality of communication devices associated with a plurality of ridesharing vehicles. For example, server 150 may receive the ride requests using one or more communications interfaces (such as communications interface 360). In some embodiments, the location information may include information derived from one or more GPS devices of the second communications devices.

At step 1111, server 150 may assign a first ridesharing vehicle to pick-up a first group of the plurality of users. For example, the first group may include a first user, a second user, a third user, etc. Some users may be included in the same request (e.g., if a first user and a second user are included in a first request). As explained above with regards to assignment module 920, server 150 may assemble the first group of the plurality of users based on the closeness of starting points of the assembled users, the closeness of the desired destinations of the assembled users, the closeness of the starting points of some of the first group to desired destinations of others of the first group, overlap between predicted routes from the starting points to the desired destinations of some of first group and predicted routes from the starting points to the desired destinations of others of the first group, or the like.

At step 1113, server 150 may determine pick-up locations for the first group of users. For example, sever 150 may determine a pick-up location for each user in the first group of users at which the corresponding user will meet the first ridesharing vehicle. For at least some of the first group of users, the determined pick-up locations may differ from the starting points.

At step 1115, server 150 may send data to the at least some of the first group of users to guide each user to a respective pick-up location different from a corresponding starting point of each said user. For example, server 150 may send to at least some of the first group of users at least one of a location and an address of the respective pick-up locations. In this example, server 150 may send the location (e.g., GPS coordinates) and/or the address to a corresponding first communications device associated with the corresponding user. Additionally or alternatively, server 150 may send to at least some of the first group of users walking directions to the respective pick-up locations.

At step 1117, server 150 may use information received from a first communications device of a first user to predict when the first user will arrive the assigned first pick-up location. For example, the information used for predicting when the first user will arrive at the assigned first pick-up location may be derived from the ride request. Additionally or alternatively, the information used for predicting when the first user will arrive at the assigned first pick-up location is derived from a GPS of the first communications device.

At step 1119, prior to the first user arriving at a first pick-up location, server 150 may cancel the assignment of the first ridesharing vehicle to the first user while maintaining the assignment of the first ridesharing vehicle to others of the first group of users. For example, server 150 may send the cancellation to a second communications device associated with the first ridesharing vehicle and/or to the first communications device associated with the first user.

Additionally or alternatively, server 150 may cancel the assignment of the first rideshare vehicle when an estimated arrival time of the first ridesharing vehicle is before the estimate arrival time of the first user. For example, as explained above with respect to prediction module 930, server 150 may estimate an arrival time for the first ridesharing vehicle in addition to predicting the arrival time for the first user in step 1117. Optionally, as explained above with respect to assignment module 920, server 150 may cancel the assignment when an estimated arrival time of the first ridesharing vehicle is more than a predetermined period of time before the estimate arrival time of the first user.

Server 150 may optionally automatically update a route of the first ridesharing vehicle after cancelling the assignment of the first ridesharing vehicle to the first user. For example, as explained above with respect to location module 910, the updated route may omit a pick-up location and a drop-off location associated with the first user.

At step 1121, server 150 may predict when a second ridesharing vehicle may pass the first pick-up location. For example, as explained above with respect to prediction module 930, server 150 may estimate an arrival time for the second ridesharing vehicle in addition to predicting the arrival time for the first user in step 1117.

At step 1123, server 150 may compare the predicted passing time of the second ridesharing vehicle with the arrival time of the first user. For example, server 150 may perform an absolute comparison (e.g., a difference of 2 minutes, a difference of 5 minutes, etc.), a relative comparison (e.g., a difference of 10/%, a difference of 20%, etc.), or the like. In some embodiments, the second ridesharing vehicle may be carrying at least one second user (e.g., one second user, two second users, four second users, etc.) while being assigning to the first user.

At step 1125, server 150 may re-assign the first user to the second ridesharing vehicle when the predicted passing time is after the predicted arrival time. Optionally, server 150 may re-assign the first user only when the predicted passing time is within one or more thresholds after the predicted arrival time. For example, server 150 may re-assign the first user if the predicted passing time is less than 5 minutes, 10 minutes, etc. after the predicted arrival time and/or may re-assign the first user if the predicted passing time is more than 1 minute, 2 minutes, etc. after the predicted arrival time. In some embodiments, server 150 may guide the second ridesharing vehicle to the first pick-up location. For example, as explained above with respect to location module 910, server 150 may send a location (e.g., GPS coordinates) and/or an address of the first pick-up location to a second communications device associated with the second ridesharing vehicle and/or send driving directions to the first pick-up location to the second communications device.

Additionally or alternatively, server 150 may assign the first user to the second ridesharing vehicle based on a current location of the second ridesharing vehicle and a desired destination of the at least one second user. For example, as explained above with regards to assignment module 920, server 150 may assign the first user based on the closeness of starting points of the first user and the at least one second user, the closeness of the desired destinations of the first user and the at least one second user, the closeness of the starting point of the first user to desired destinations of the at least one second user (or vice versa), overlap between a predicted route from the starting point to the desired destination of the first user and predicted routes from the starting points to the desired destinations of the at least one second user, or the like.

Additionally or alternatively, server 150 may re-assign the second rideshare vehicle in order to minimize a total waiting time of the plurality of users. For example, as explained above with regards to prediction module 930, server 150 may calculate an initial total wait time and predict an updated total wait time and perform the (cancellation and) re-assignment if the updated total wait time is less than the initial total wait time. Optionally, as explained above with regards to prediction module 930, server 150 may perform the (cancellation and) re-assignment only if the difference between the updated total wait time and the initial total wait time is above a threshold (e.g., 2 minutes, 5 minutes, 10 minutes, etc.) and/or only if a predicted wait time of the re-assigned user remains below a threshold (such as 10 minutes, 15 minutes, or the like).

Server 150 may optionally automatically update a route of the second ridesharing vehicle after the re-assigning of the first user. For example, as explained above with respect to location module 910, the updated route may include a pick-up location and a drop-off location associated with the first user. Moreover, server 150 may optionally change at least one drop-off location of the at least one second user after assignment of the second ridesharing vehicle to the first user. Additionally or alternatively, server 150 may optionally change a pick-up location of the first user after assignment of the second ridesharing vehicle to the first user.

Method 1100 may further include additional steps. For example, as explained above with respect to location module 910, method 1100 may include continuously receiving location information from the first and second pluralities of communication devices to estimate arrival times at respective pick-up locations. In such embodiments, as explained above with respect to assignment module 920 and prediction module 930, server 150 may cancel the assignment of the first rideshare vehicle when the estimated arrival time of the first ridesharing vehicle is before the estimate arrival time of the first user. Additionally or alternatively, in such embodiments, as explained above with respect to assignment module 920 and prediction module 930, server 150 may predict a delay in an arrival of the first ridesharing vehicle at the first pick-up location and may cancel the assignment of the first rideshare vehicle when a delay is predicted. For example, server 150 may cancel the assignment of the first rideshare vehicle when the predicted delay in arrival of the first ridesharing vehicle at the first pick-up location is more than a predetermined period of time compared to an original estimated arrival time of the first ridesharing vehicle at the first pick-up location.

In another example, method 1100 may further include (as an additional step or in combination with or as an alternatively to step 1119) cancelling the assignment of the first rideshare vehicle and re-assigning the second rideshare vehicle in order to enable the first rideshare vehicle to pick-up a passenger not originally assigned to the first rideshare vehicle. For example, as explained above with respect to example timeline 1040, one or more additional passengers may board the first ridesharing vehicle than initially requested or anticipated, and server 150 may re-assign the first user to accommodate such additional passengers.

Figure 11C:
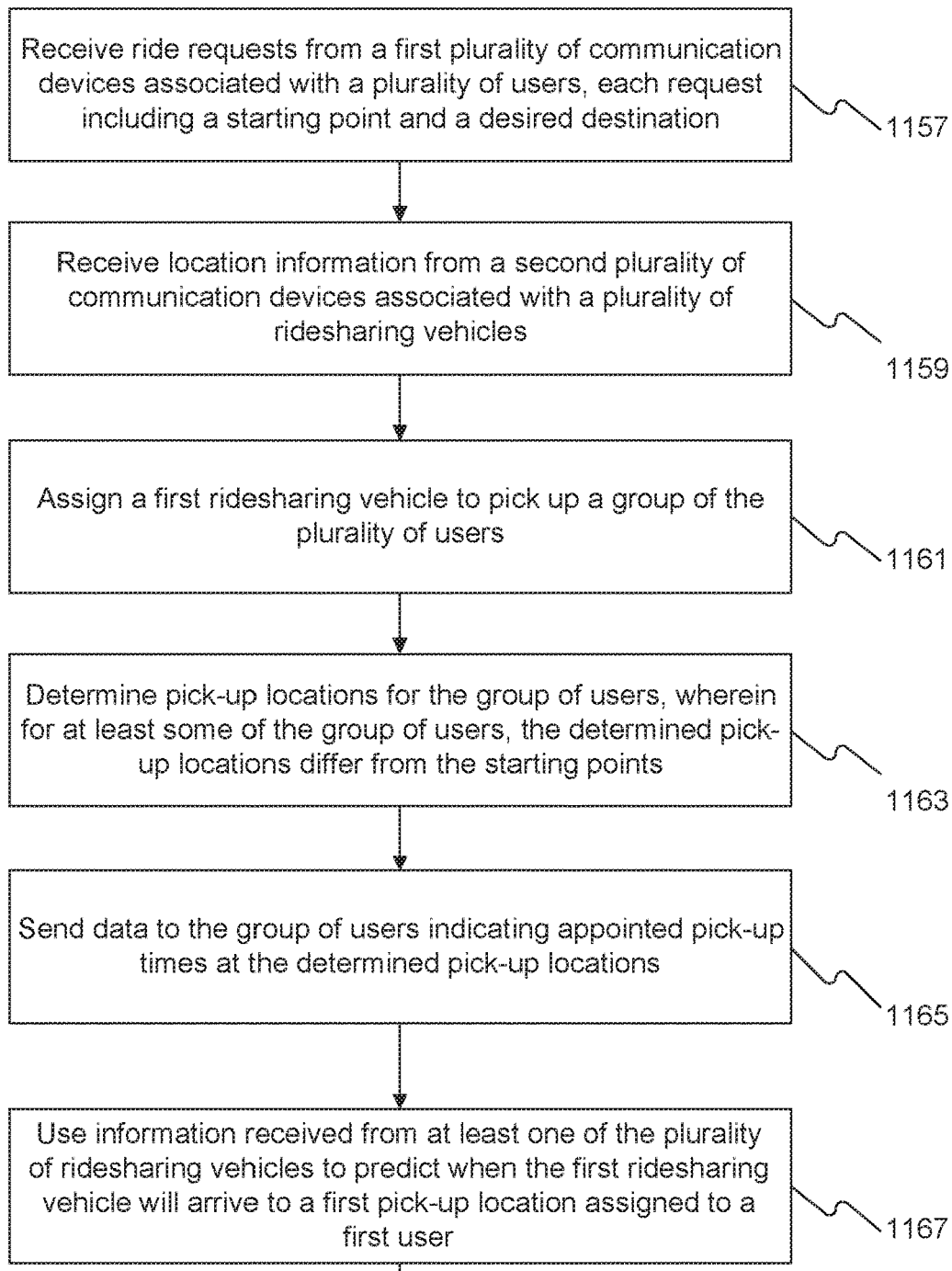
FIG. 11C is a diagram of the first part of yet another example process for managing a fleet of ridesharing vehicles, in accordance with some embodiments of the present disclosure.
Figure 11D:
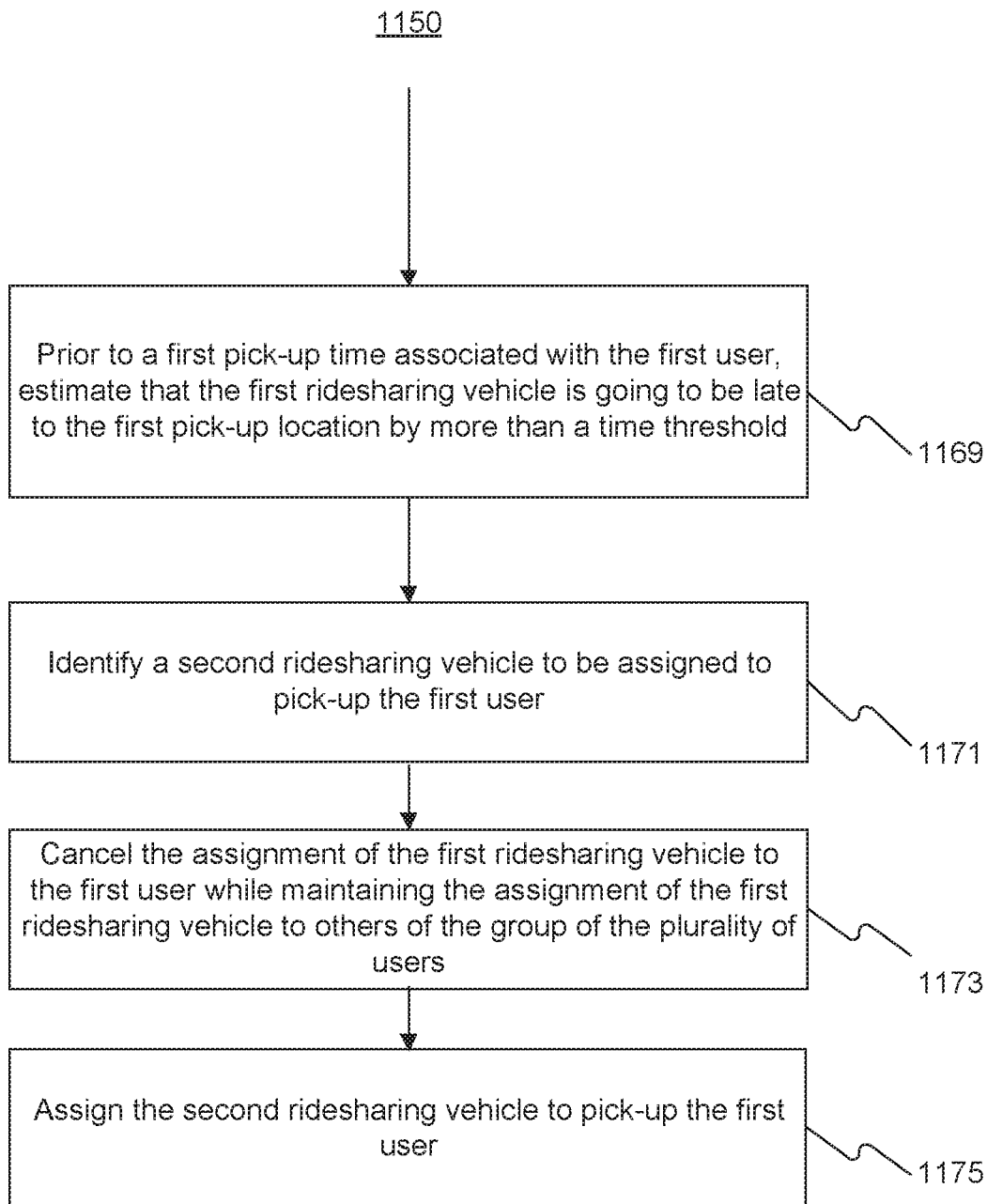
FIG. 11D is a diagram of the second part of the example process of FIG. 11C.

FIGS. 11C and 11D depict another example method 1150 for managing a fleet of ridesharing vehicles. Method 1100 may, for example, be implemented by ridesharing management server 150 of FIG. 3.

At step 1157, server 150 may receive ride requests from a first plurality of communication devices associated with a plurality of users, For example, server 150 may receive the ride requests using one or more communications interfaces (such as communications interface 360). In some embodiments, each ride request includes a starting point and a desired destination corresponding to each of the plurality of users. The starting point may be included as GPS coordinates, a physical address, or the like. Similarly, the desired destination may be included as GPS coordinates, a physical address, or the like.

At step 1159, server 150 may receive location information from a second plurality of communication devices associated with a plurality of ridesharing vehicles. For example, server 150 may receive the ride requests using one or more communications interfaces (such as communications interface 360). In some embodiments, the location information may include information derived from one or more GPS devices of the second communications devices.

At step 1161, server 150 may assign a first ridesharing vehicle to pick-up a group of the plurality of users. For example, the group may include a first user, a second user, a third user, etc. Some users may be included in the same request (e.g., if a first user and a second user are included in a first request). As explained above regarding assignment module 920, server 150 may assemble the group of the plurality of users based on the closeness of starting points of the assembled users, the closeness of the desired destinations of the assembled users, the closeness of the starting points of some of the group to desired destinations of others of the group, overlap between predicted routes from the starting points to the desired destinations of some of group and predicted routes from the starting points to the desired destinations of others of the group, or the like.

At step 1163, server 150 may determine pick-up locations for the group of users. For example, sever 150 may determine a pick-up location for each user in the group of users at which the corresponding user will meet the first ridesharing vehicle. In some embodiments, the determined pick-up locations may differ from the starting points.

At step 1165, server 150 may send data to the group of the plurality of users indicating appointed pick-up times at the determined pick-up locations. For example, server 150 may send to the group of users at least one of a location and an address of the respective pick-up locations. In this example, server 150 may send the location (e.g., GPS coordinates) and/or the address to a corresponding first communications device associated with the corresponding user. Additionally or alternatively, server 150 may send to the group of users walking directions to the respective pick-up locations. Moreover, as explained above with respect to prediction module 930, server 150 may estimate arrival times for the first ridesharing vehicle at the determined pick-up locations and/or arrival times for corresponding users at corresponding pick-up locations. Based on predicted arrival times, server 150 may appoint corresponding pick-up times to users. For example, the pick-up times may correspond to predicted arrival times of the first ridesharing vehicle, to predicted arrival times of the corresponding users, or any combination thereof (e.g., by selecting the maximum of two predicted arrival times). In some embodiments, the pick-up times may correspond to predicted arrival times with one or more buffers added. For example, server 150 may add an absolute buffer, such as one minute, two minutes, five minutes, or the like, and/or a relative buffer, such as 5%, 10%, 15%, or the like, to a predicted arrival time to determine a corresponding pick-up time.

At step 1167, server 150 may use information received from at least one of the plurality of ridesharing vehicles to predict when the first ridesharing vehicle will arrive to a first pick-up location assigned to a first user. For example, as explained above with respect to prediction module 930, server 150 may estimate an arrival time for the first ridesharing vehicle. In some embodiments, the information used to predict when the first ridesharing vehicle will arrive at the first pick-up location may include GPS data from the first ridesharing vehicle and/or real-time traffic updates from the plurality of ridesharing vehicles.

At step 1169, prior to a first pick-up time associated with the first user, server 150 may estimate that the first ridesharing vehicle is going to be late to the first pick-up location by more than a time threshold. For example, as explained above with respect to prediction module 930, server 150 may estimate an arrival time for the first user in addition to predicting the arrival time for the first ridesharing vehicle in step 1169. Accordingly, server 150 may estimate lateness based on a comparison of the estimated arrival time for the first ridesharing vehicle and the estimated arrival time for the first user. Additionally or alternatively, server 150 may estimate lateness based on a comparison of the estimated arrival time for the first ridesharing vehicle and the appointed pick-up time for the first user. In some embodiments, the time threshold may have a value between 2 minutes and 20 minutes (e.g., after the first pick-up time).

At step 1171, server 150 may identify a second ridesharing vehicle to be assigned to pick-up the first user. For example, server 150 may identify the second ridesharing vehicle based on which vehicles in the plurality of ridesharing vehicles have no current passengers and/or are near the first pick-up locations. Server 150 may use information from the second plurality of communication devices associated with the plurality of ridesharing vehicles to perform the identification.

At step 1173, server 150 may cancel the assignment of the first ridesharing vehicle to the first user while maintaining the assignment of the first ridesharing vehicle to others of the group of the plurality of users. Server 150 may optionally automatically update a route of the first ridesharing vehicle after cancelling the assignment of the first ridesharing vehicle to the first user. For example, as explained above with respect to location module 910, the updated route may omit a pick-up location and a drop-off location associated with the first user.

At step 1175, server 150 may assign the second ridesharing vehicle to pick up the first user. Optionally, server 150 may determine that the second ridesharing vehicle can pick up the first user before the first ridesharing vehicle. For example, as explained above with respect to prediction module 930, server 150 may predict a passing time for the first ridesharing vehicle and a passing time the second ridesharing vehicle at the first pick-up location and compare the predicted passing times to make the determination.

Method 1150 may include additional steps. For example, method 1150 may include determining that, by assigning the second ridesharing vehicle to pick up the first user, a first time delay of at least one passenger riding in the first ridesharing vehicle is lower than a second time delay of the at least one passenger when the first user is assigned to the first ridesharing vehicle. For example, as explained above with respect to prediction module 930, server 150 may predict the second time delay (e.g., a delay in arrival of the first ridesharing vehicle at a corresponding pick-up location, a delay in arrival of the first ridesharing vehicle at a corresponding drop-off location, and/or a delay in the length of drive between the corresponding pick-up location and the corresponding drop-off location) for at least one passenger (e.g., not the first user) riding in (and/or assigned to) the first ridesharing vehicle. The time delay may be caused, for example, by the lateness of the first ridesharing vehicle to the first pick-up location (and corresponding and/or cascading lateness to other pick-up locations). Moreover, as explained above with respect to prediction module 930, server 150 may predict the first time delay for the at least one passenger based on a hypothesis that the first user is assigned to the second ridesharing vehicle rather than the first ridesharing vehicle. Accordingly, server 150 may assign the first use to the second ridesharing vehicle only if the first time delay is predicted to be lower than the second time delay (i.e., that assignment of the first user to the second ridesharing vehicle will reduce a time delay for at least one passenger riding in and/or assigned to the first ridesharing vehicle). In some embodiments, server 150 may perform the assignment only if the first time delay is higher than the second time delay by a threshold, e.g., six minutes, twelve minutes, or the like.

Method 1150 may optionally be implemented in combination with method 1100. For example, server 150 may re-assign the first user to the second ridesharing vehicle when the predicted passing time is after the predicted arrival time and when the first ridesharing vehicle is going to be late to the first pick-up location by more than a time threshold. In other words, server 150 may combine methods 1100 and 1150 such that steps 1125 and 1175 are combined.

Sub-Optimization of Individual Routes

Embodiments of the present disclosure may allow for the sub-optimization of individual routes within a ridesharing fleet. For example, individual routes for one or more users may be sub-optimized in order to allow for greater optimization of the fleet (or at least a portion of the fleet) as a whole. This may enhance the overall experience of users while incurring insignificant costs to individual users. Users may particularly experience the effects of fleet-wide optimization if they are repeat customers.

In some embodiments, the sub-optimization may be limited by one or more constraints. For example, an individual sub-optimization may be rejected if it results in a user waiting more than 10 minutes, 15 minutes, or the like to be picked up by a ridesharing vehicle, even if such a sub-optimization would allow for greater optimization of the fleet as a whole. Such constraints balance the needs of individual users with the benefits of fleet-wide optimization.

Figure 12:
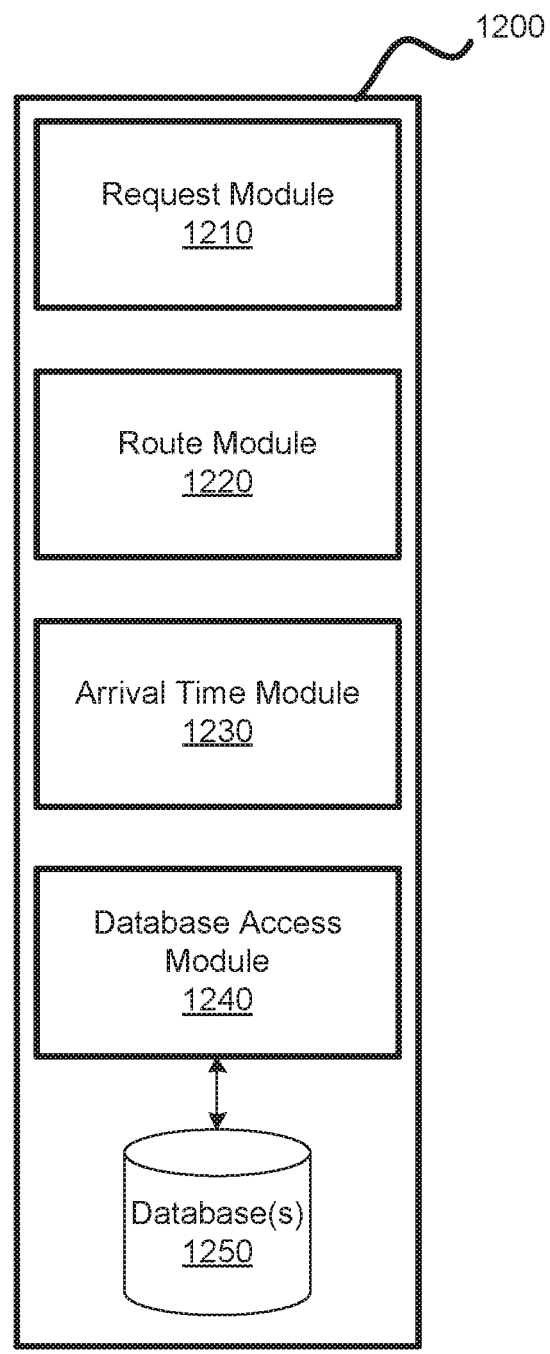
FIG. 12 is a diagram of an example memory module for sub-optimization of routes in a rideshare fleet, in accordance with some embodiments of the present disclosure.

FIG. 12 depicts an example of a memory module 1200 for sub-optimization of individual routes. Although depicted as a single memory in FIG. 12, memory 1200 may comprise one or more non-volatile (e.g., hard disk drive, flash memory, etc.) and/or volatile (e.g., RAM or the like) memories. In some embodiments, memory 1200 may be included in ridesharing management server 150. For example, memory 1200 may comprise, at least in part, a portion of memory 320.

As depicted in FIG. 12, memory 1200 may include request module 1210. Request module 1210 may receive a first request for a shared ride from a first user. For example, the first request may be received via a communications interface, such as communications interface 360. The communications interface may comprise, for example, one or more network interface controllers (NICs). These one or more NICs may communicate over one or more computer networks, such as the Internet, a local area network (LAN), or the like. In some embodiments, the first request may include information related to a first pick-up location of the first user and a first desired destination of the first user. The information related to the first pick-up location may include GPS coordinates, a physical address, or the like of the first pick-up location. Similarly, the information related to the first desired destination may include GPS coordinates, a physical address, or the like of the first desired destination. Additionally or alternatively, the information related to the first pick-up location may include a current location of the first user (e.g., derived from a GPS device of a first communications device associated with the first user) and/or a user-requested pick-up location. For example, the first user may request to be picked up at a certain location (e.g., certain GPS coordinates, a certain physical address, or the like). e.g., by inputting the certain location into the first communications device associated with the first user. Optionally, the information related to the first pick-up location may also include a requested time for pick-up, e.g., based on input to the first communications device associated with the first user.

Request module 1210 may further receive a second request for a shared ride from a second user. For example, the second request may be received via the communications interface, such as communications interface 360. In some embodiments, the second request may include information related to a second pick-up location of the second user and a second desired destination of the second user. The information related to the second pick-up location may include GPS coordinates, a physical address, or the like of the second pick-up location. Similarly, the information related to the second desired destination may include GPS coordinates, a physical address, or the like of the second desired destination. Additionally or alternatively, the information related to the second pick-up location may include a current location of the second user (e.g., derived from a GPS device of a first communications device associated with the second user) and/or a user-requested pick-up location. For example, the second user may request to be picked up at a certain location (e.g., certain GPS coordinates, a certain physical address, or the like), e.g., by inputting the certain location into the rust communications device associated with the first user. Optionally, the information related to the second pick-up location may also include a requested time for pick-up. e.g., based on input to the first communications device associated with the second user.

Request module 1210 may further receive a third request for a shared ride from a third user. For example, the third request may be received via the communications interface, such as communications interface 360. In some embodiments, the third request may include information related to a third pick-up location of the third user and a third desired destination of the third user. The information related to the third pick-up location may include GPS coordinates, a physical address, or the like of the third pick-up location. Similarly, the information related to the third desired destination may include GPS coordinates, a physical address, or the like of the third desired destination. Additionally or alternatively, the information related to the third pick-up location may include a current location of the third user (e.g., derived from a GPS device of a first communications device associated with the third user) and/or a user-requested pick-up location. For example, the third user may request to be picked up at a certain location (e.g., certain GPS coordinates, a certain physical address, or the like). e.g., by inputting the certain location into the first communications device associated with the third user. Optionally, the information related to the third pick-up location may also include a requested time for pick-up, e.g., based on input to the first communications device associated with the third user.

In some embodiments, request module 1210 may receive the requests for shared rides from a plurality of first mobile communications devices (such as mobile communications device 200) associated with the plurality of users. As explained above, such first mobile communications device may send requests to request module 1210 via the communications interface including information input into the mobile communications device by the associated user, information derived from a GPS device of the mobile communications device, or the like.

Additionally or alternatively, request module 1210 may receive from a plurality of second mobile communication devices associated with a plurality of ridesharing vehicles, information about a current location of each of the second mobile communications devices. For example, the current location may be derived from a location circuit within each of the second mobile devices. The plurality of second mobile communication devices may include a plurality of handheld devices (such as mobile communications device 200) associated with drivers of at least a part of the fleet of ridesharing vehicles and/or a plurality of transmitters (such as driving-control device 120F) embedded in autonomous vehicles that are a part of the fleet of ridesharing vehicles.

In some embodiments, request module 1210 (and/or route module 1220, described below) may continuously receive location information from the plurality of first mobile communications devices and/or the plurality of second mobile communication devices. As used herein, "continuously" does not necessarily mean without interruption but may refer to the receipt of information in a discretized manner having spacings (and/or interruptions) each below a threshold of time, such as 50 ms, 100 ms, 500 msec, 1 sec, 5 sec, 10 sec, 30 sec, or the like.

Request module 1210 may further identify a first ridesharing vehicle and a second ridesharing vehicle that are currently without passengers. For example, request module 1210 may identify the vehicles using signals received from associated second mobile communication devices. In such an example, the second mobile communication devices may send an indicator of how many passengers are in the associated vehicle based on input from a driver of the associated vehicle and/or based on output from an application (or other software module) on the second mobile communication device that tracks the number of passengers in the associated vehicle. Additionally or alternatively, request module 1210 may identify the vehicles based on centralized tracking of capacity at ridesharing server 150 (e.g., as explained above with respect to capacity tracking module 620).

In some embodiments, the third request may be received while both the first user and the second user are riding in the first ridesharing vehicle. In such an embodiment, request module 1210 may schedule picking up of the third user before dropping off the first user. Examples of this embodiment are depicted in FIGS. 13E and 13F. Alternatively, request module 1210 may schedule picking up the third user after dropping off the first user and before dropping off the second user. Examples of this embodiment are depicted in FIGS. 13C and 13D.

As further depicted in FIG. 12, memory 1200 may include route module 1220. Route module 1220 may assign a first user and a second user to a first ridesharing vehicle. For example, route module 1220 may assign the users to the first ridesharing vehicle when request module 1210 identifies the first ridesharing vehicle as currently without passengers.

Additional or alternative factors may be considered by route module 1220 when assignment the users to the first ridesharing vehicle. For example, route module 1220 may assign the first user and the second user to the first ridesharing vehicle based on the closeness of a starting point and/or the pick-up location of the first user to a starting point, the pick-up location, the desired destination, and/or a drop-off location of the second user, the closeness of the desired destination and/or a drop-off location of the first user to a starting point, the pick-up location, the desired destination, and/or a drop-off location of the second user, overlap between a first predicted route from the pick-up location of the first user to the desired destination of the first user and a second predicted route from the pick-up location of the second user to the desired destination of the second user, or the like. The predicted routes may be calculated using one or more maps, optionally in combination with traffic information. The one or more maps may be retrieved from one or more memories and/or using the communications interface. Similarly, the traffic information may be retrieved from one or more memories and/or using the communications interface.

Route module 1220 may also generate a route to the first ridesharing vehicle for picking up and dropping off each of the first user and the second user. For example, route module 1220 may generate the route based on one or more optimization models run on the pick-up locations of the first user and the second user as well as the desired destinations of the first user and the second user. One or more maps (e.g., retrieved from one or more memories and/or using the communications interface), optionally with traffic and/or weather information (e.g., retrieved from one or more memories and/or using the communications interface) may also be fed into the optimization model(s). The one or more optimization models may include a shortest distance optimization, a shortest travel time optimization (e.g., accounting for speed limits, traffic, etc.), a fuel efficiency optimization (e.g., based on known fuel ratings of the ridesharing vehicle), or the like. For example, any solution to the P v. NP problem later derived may also be incorporated into the optimization models.

In some embodiments, route module 1220 may determine the pick-up locations and/or drop-off locations for at least one of (or each of) the first, second, and third users. For example, route module 1220 may determine the pick-up location(s) and/or the drop-off location(s) based on one or more optimization models run on one or more predicted routes between starting points and destinations of the users. The one or more optimization models may include a shortest distance optimization, a shortest travel time optimization (e.g., accounting for speed limits, traffic, wrong turns, etc.), a fuel efficiency optimization (e.g., based on known fuel ratings of the ridesharing vehicle), or the like. For example, any solution to the P v. NP problem later derived may also be incorporated into the optimization models. For at least one of (or each of) the first, second, and third users, the determined drop-off locations may differ from the desired destinations. Similarly, for at least one of (or each of) the first, second, and third users, the determined pick-up locations may differ from current locations of the users.

One or more of the pick-up and/or drop-off locations may be sub-optimized. For example, route module 1220 may sub-optimize the drop-off location of the first user in order to minimize a total waiting time of the third user. An example of this embodiment is depicted in FIGS. 13C and 13F. The sub-optimized drop-off location may be determined initially or may be determined as an updated drop-off location. Additionally or alternatively, route module 1220 may sub-optimize the third pick-up location of the third user to minimize a total travel time of the first and second users. An example of this embodiment is depicted in FIGS. 13D and 13E. The sub-optimized pick-up location may be determined initially or may be determined as an updated pick-up location.

Any of the sub-optimizations described above may be subject to one or more thresholds. For example, route module 1220 may decline a sub-optimization if it would result in a walking time and/or distance for a user above a threshold (e.g., 10 minutes, 15 minutes, etc., 0.25 miles, 0.5 miles, 1 kilometer, or the like).

In embodiments where one or more determined pick-up locations differ from starting points, route module 1220 may cause notices of the determined pick-up locations to be sent to the mobile communications devices of each of the first, second, and third users. For example, route module 1220 may transmit data associated with the notices to the mobile communications devices of each of the first, second, and third users. For example, the data may include GPS coordinates of the pick-up locations, physical addresses of the pick-up locations, or the like. Each mobile communication device may use received coordinates, a received address, or the like to route (e.g., via walking) the associated user from a current location of the device to the pick-up location. In another example, the data may include walking directions to the determined pick-up locations.

Similarly, in embodiments where one or more determined drop-off locations differ from desired destinations, route module 1220 may cause notices of the determined drop-off locations to be sent to the mobile communications devices of each of the first, second, and third users. For example, route module 1220 may transmit data associated with the notices to the mobile communications devices of each of the first, second, and third users. For example, the data may include GPS coordinates of the drop-off locations, physical addresses of the drop-off locations, or the like. Each mobile communication device may use received coordinates, a received address, or the like to route (e.g., via walking) the associated user (e.g., after being dropped off) to the drop-off location. In another example, the data may include walking directions to the determined drop-off locations.

The pick-up locations and/or drop-off locations may be changed depending on cancellations and re-assignments performed by arrival time module 1230. For example, route module 1220 may change at least one pick-up location and/or drop-off location of at least one of (or each of) the first, second, and third users if a user's assignment is cancelled and/or if a user is re-assigned. Additionally or alternatively, route module 1220 may change at least one pick-up location and/or drop-off location of at least one of (or each of) the first, second, and third users if route module 1220 determines that such a change would further optimize the generated route for the ridesharing vehicle. Such optimization may be rejected if the new pick-up location and/or drop-off location would be too inconvenient for a corresponding user (e.g., by exceeding a threshold walking distance and/or time, or the like). Corresponding users may be notified of updates to drop-off locations and/or pick-up locations as described above.

In embodiments where the third user is assigned to the first ridesharing vehicle, route module 1220 may generate an updated route for the first ridesharing vehicle to pick-up the third user. The updated route may be calculated like the original route described above while account for a pick-up location and a drop-off location of the third user. Alternatively, route module 1220 may generate a route for the second ridesharing vehicle to send the second ride sharing vehicle toward an area with predicted imminent passenger demand. For example, the area with predicted demand is identified using a request history (e.g., stored in database 1250) and/or real-time information (e.g., using event information retrieved from one or more memories and/or using the communications interface). For example, route module 1220 may determine that requests are expected in an area near a stadium after a sporting event concludes.

As depicted in FIG. 12, memory 1200 may further include arrival time module 1230. Arrival time module 1230 may calculate a first expected arrival time of the first ridesharing vehicle at one or more pick-up locations (such as the third pick-up location). The expected arrival time may depend on a predicted route (e.g., calculated by route module 1220 as explained above) for the first ridesharing vehicle. Arrival time module 1230 may also account for weather, traffic information, and/or information about emergency (e.g., fire, police, medical, etc.) activity, wrong turns, or the like (e.g., received using the communications interface and/or retrieved from one or more memories).

Similarly, arrival time module 1230 may calculate a second expected arrival time of the second ridesharing vehicle at one or more pick-up locations (such as the third pick-up location). The second expected arrival time may be calculated similar to the first excepted arrival time, described above.

In embodiments where the second expected arrival time is sooner than the first expected arrival time and both the first expected arrival time and the second expected arrival time are below a predetermined threshold (e.g., 15 minutes, 10 minutes, or the like), arrival time module 1230 may assign the third user to the first ridesharing vehicle. Additionally or alternatively, arrival time module 1240 may assign the third user to the first ridesharing vehicle when an estimated delay for each of the first user and the second user is below another predetermined threshold (e.g., 30 minutes, 20 minutes, or the like). Accordingly, the assignment of the third user may be rejected if such an assignment is too inconvenient for the first user and/or the second user. Additionally or alternatively, arrival time module 1240 may assign the third user to the first ridesharing vehicle when the third desired destination of the third user is in a same neighborhood as the second desired destination of the second user and/or the first desired destination of the first user. For example, the third desired destination may be within a particular range (e.g., 10 miles, 20 kilometers, etc.) of the second desired destination and/or the first desired destination, within a zone defining the neighborhood of the second desired destination and/or the first desired destination (e.g., a square, a rectangle, a parallelogram, other regular shapes, irregular figures, or the like), etc.

Memory 1200 may further include a database access module 1240, and may also include database(s) 1250. Database access module 1240 may include software instructions executable to interact with database(s) 1250, to store and/or retrieve information (e.g., a request history as described above, weather information, traffic information, one or more maps, or the like).

Figure 13A:
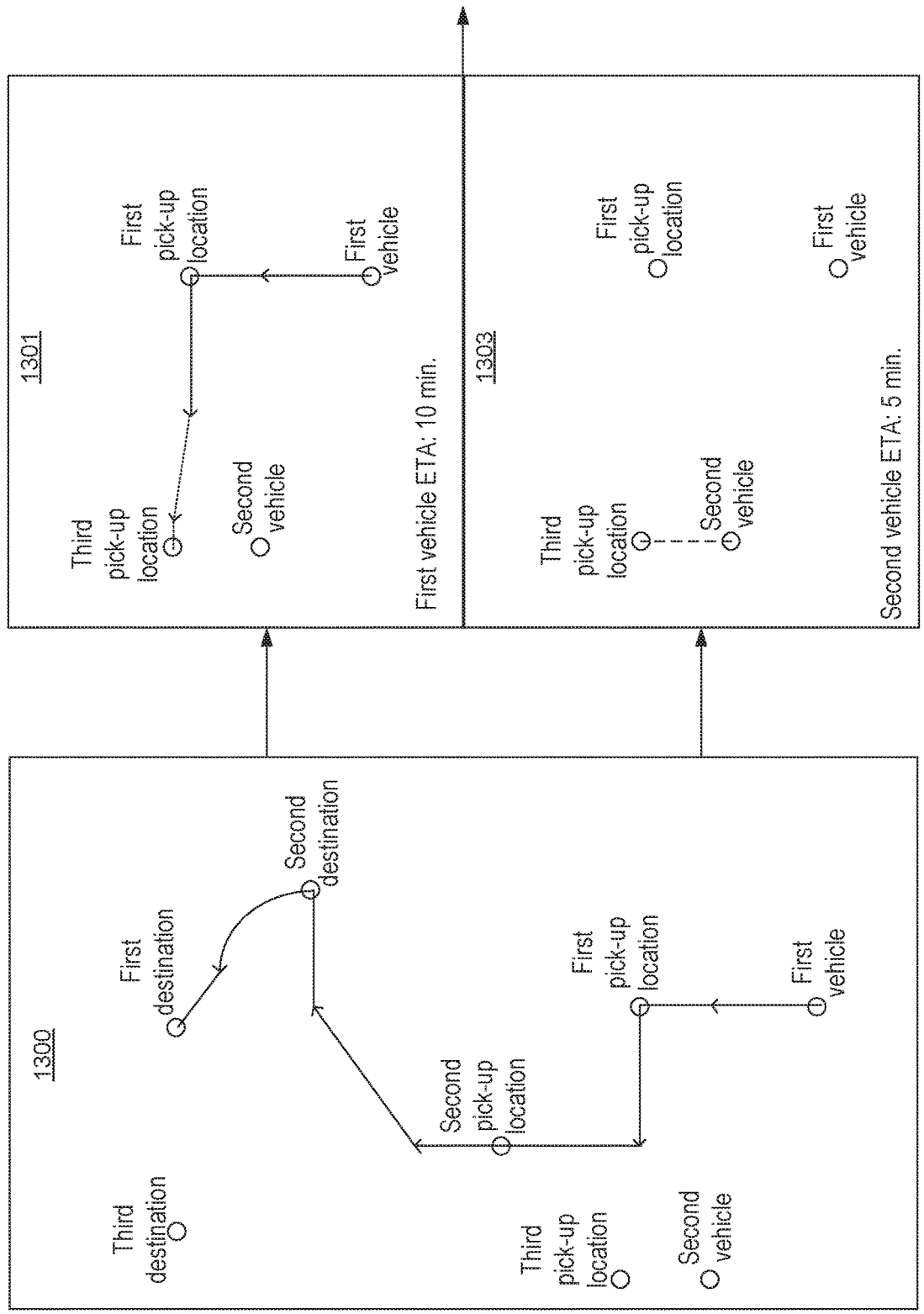
FIG. 13A is a diagram illustrating the first part of yet another example process for managing a fleet of ridesharing vehicles, in accordance with some embodiments of the present disclosure.
Figure 13B:
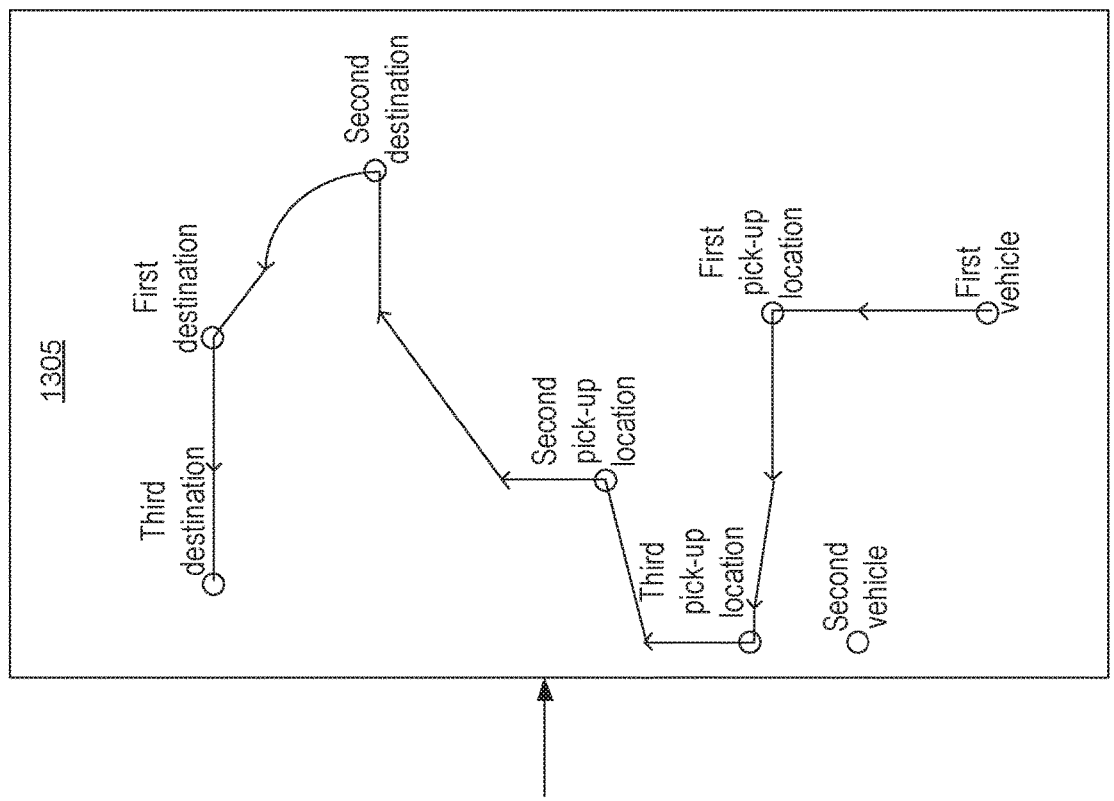
FIG. 13B is a diagram illustrating the second part of the example process of FIG. 13A.
Figure 13C:
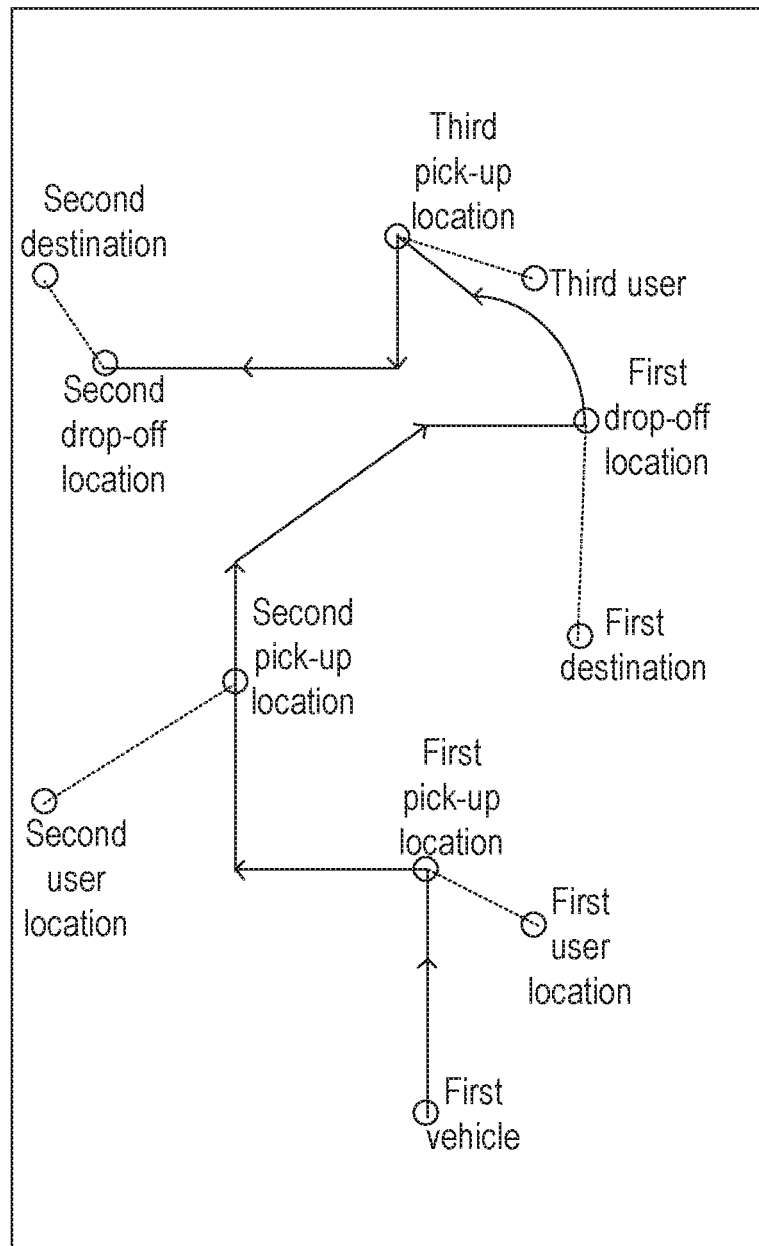
FIG. 13C is a diagram illustrating an example of scheduling picking up a third user after dropping off a first user and before dropping off a second user and of sub-optimizing a drop-off location of the first user to minimize a total waiting time of the third user, in accordance with some embodiments of the present disclosure.
Figure 13D:
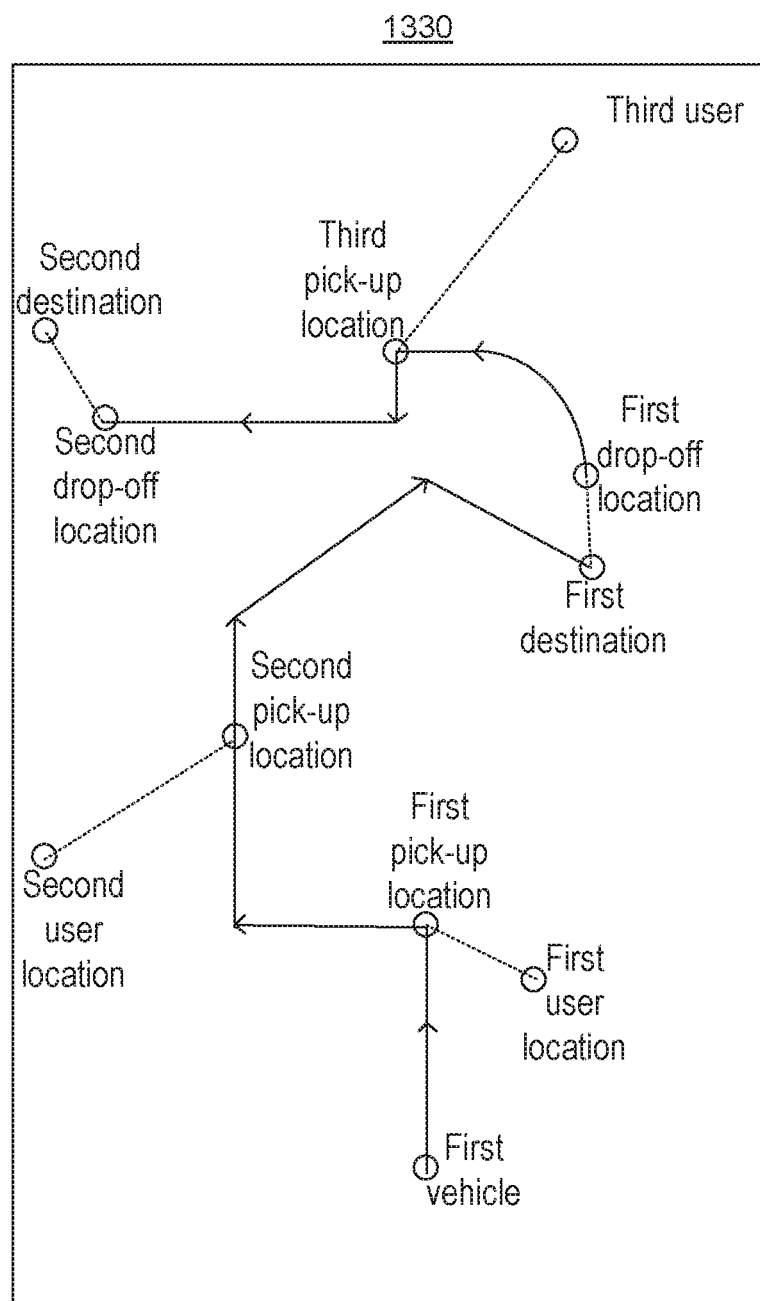
FIG. 13D is a diagram illustrating an example of scheduling picking up a third user after dropping off a first user and before dropping off a second user and of sub-optimizing a third pick-up location of the third user to minimize a total travel time of the first and second users, in accordance with some embodiments of the present disclosure.
Figure 13E:
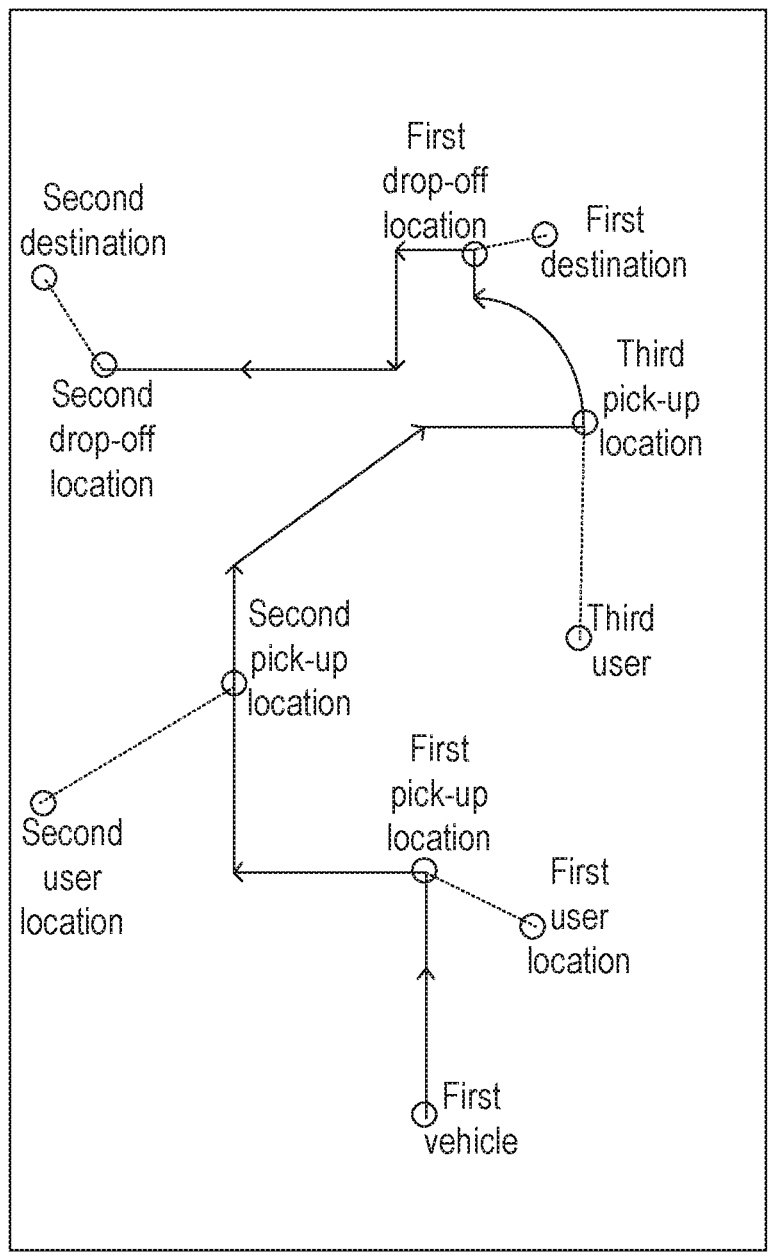
FIG. 13E is a diagram illustrating an example of scheduling picking up a third user before dropping off a first user and of sub-optimizing a third pick-up location of the third user to minimize a total travel time of the first and second users, in accordance with some embodiments of the present disclosure.
Figure 13F:
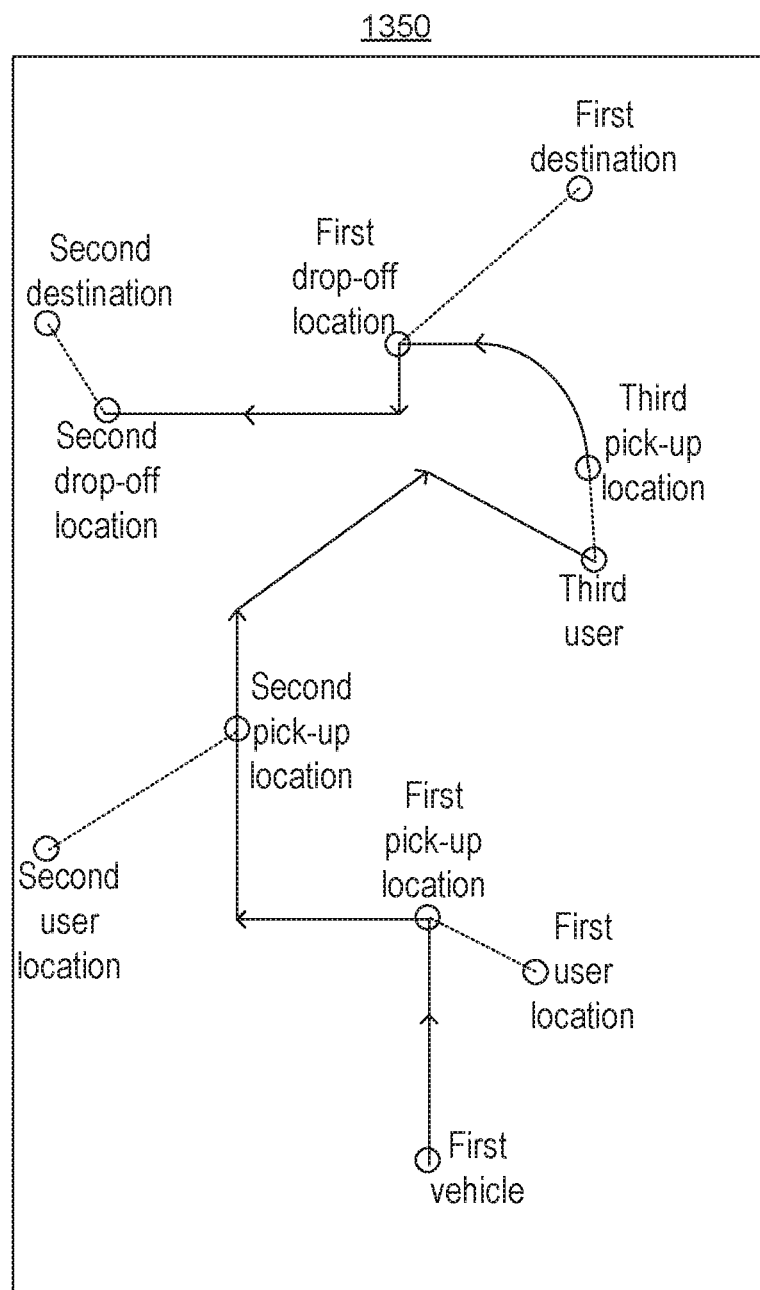
FIG. 13F is a diagram illustrating an example of scheduling picking up a third user before dropping off a first user and of sub-optimizing a drop-off location of the first user to minimize a total waiting time of the third user, in accordance with some embodiments of the present disclosure.

FIGS. 13A and 13B illustrate an example process for managing a fleet of ridesharing vehicles. At step 1300, a first user and a second user may be assigned to a first ridesharing vehicle. Accordingly, a route may be generated for the first ridesharing vehicle including a pick-up location of the first user, a pick-up location of the second user, a desired destination of the first user, and a desired destination of the second user. In addition, at step 1300, a third ride request from a third user having a third pick-up location may be received.

At step 1301, a first expected arrival time of the first ridesharing vehicle at the third pick-up location is determined (e.g., 10 min. in the example of FIG. 13A). Similarly, in step 1303, a second expected arrival time of the second ridesharing vehicle at the third pick-up location is determined (e.g., 5 min in the example of FIG. 13A). The arrival times may be calculated as explained above with respect to arrival time module 1230. In the example of FIG. 13A, the second expected arrival time is sooner than the first expected arrival time.

At step 1305, the third user is assigned to the first ridesharing vehicle and an updated route is generated for the first ridesharing vehicle to pick-up the third user. Although not depicted in FIG. 13B, the second ride sharing vehicle may be sent toward an area with predicted imminent passenger demand (e.g., as explained above with respect to route module 1220).

Although depicted without current locations of the first user, the second user, and the third user, the example of FIGS. 13A and 13B may be modified to use one or more pick-up locations that differ from current locations of users and/or one or more drop-off locations that differ from the desired destinations of the users.

FIG. 13C illustrates an example 1320 of scheduling picking up a third user after dropping off a first user and before dropping off a second user. Moreover, in the example of FIG. 13C, a drop-off location of the first user is sub-optimized to minimize a total waiting time of the third user.

FIG. 13D illustrates an example 1330 of scheduling picking up a third user after dropping off a first user and before dropping off a second user. Moreover, in the example of FIG. 13D, a third pick-up location of the third user is sub-optimized to minimize a total travel time of the first and second users.

FIG. 13E illustrates an example 1340 of scheduling picking up a third user before dropping off a first user. Moreover, in the example of FIG. 13E, a third pick-up location of the third user is sub-optimized to minimize a total travel time of the first and second users.

FIG. 13F illustrates an example 1350 of scheduling picking up a third user before dropping off a first user. Moreover, in the example of FIG. 13F, a drop-off location of the first user is sub-optimized to minimize a total waiting time of the third user.

Figure 14A:
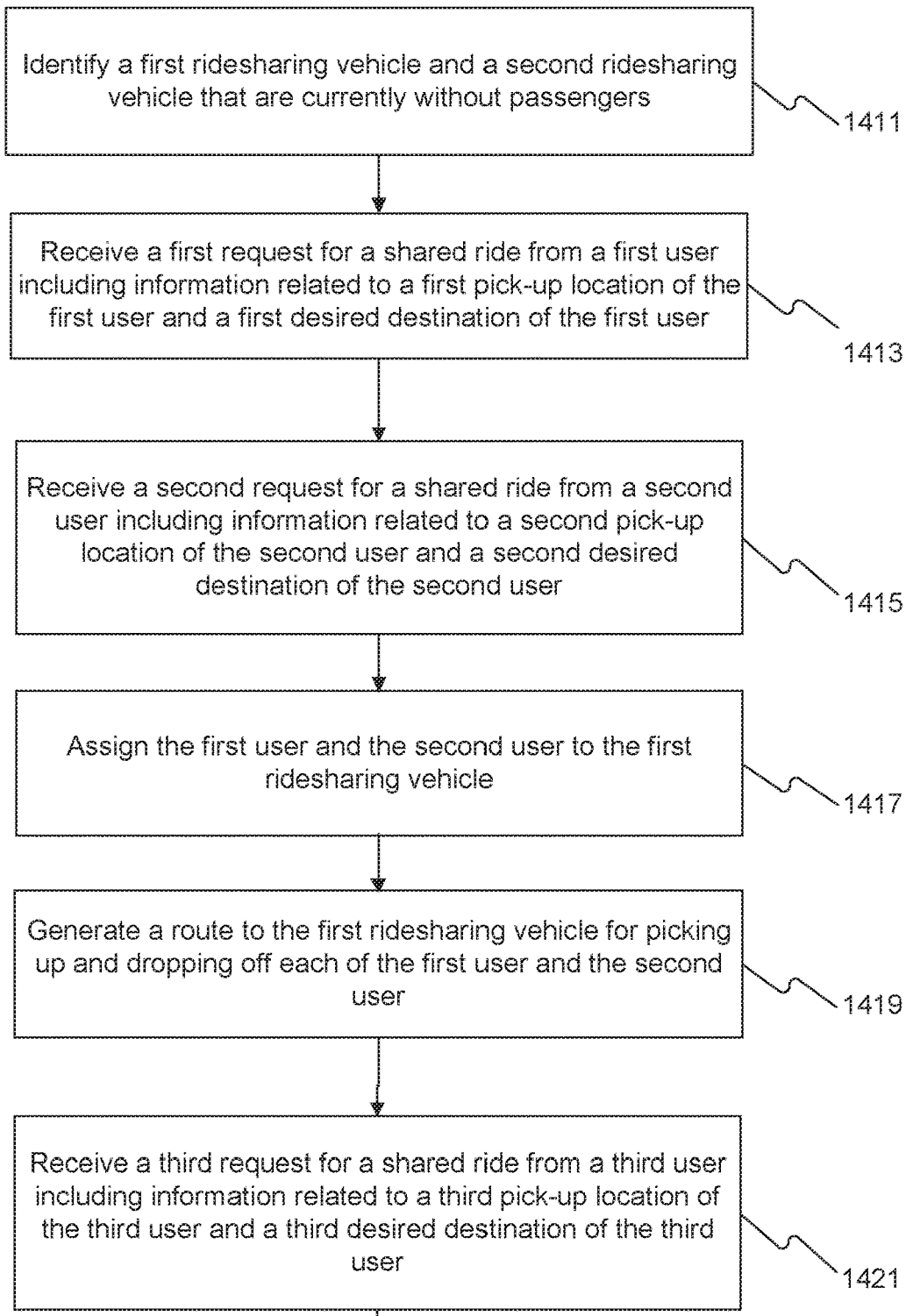
FIG. 14A is a diagram of the first part of yet another example process for managing a fleet of ridesharing vehicles, in accordance with some embodiments of the present disclosure.
Figure 14B:
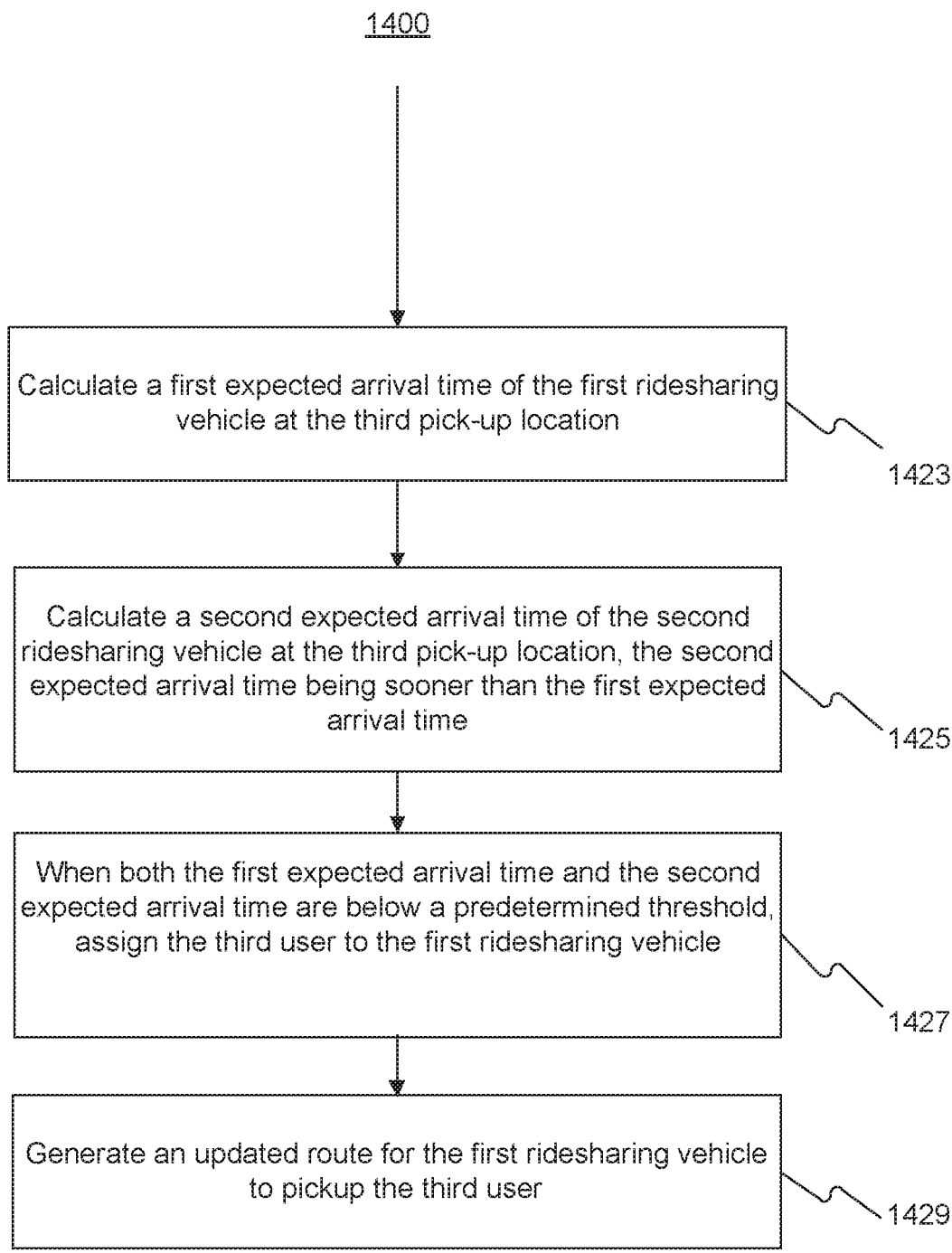
FIG. 14B is a diagram illustrating the second part of the example process of FIG. 14A.

FIGS. 14A and 14B depict example method 1400 for managing a fleet of ridesharing vehicles. Method 1400 may, for example, be implemented by ridesharing management server 150 of FIG. 3.

At step 1411, server 150 may identify a first ridesharing vehicle and a second ridesharing vehicle that are currently without passengers. For example, as explained above with respect to request module 1210, server 150 identify the vehicles using signals received from second mobile communication devices associated with the ridesharing vehicles. Additionally or alternatively, server 1210 may identify the vehicles based on centralized tracking of capacity at ridesharing server 150 (e.g., as explained above with respect to capacity tracking module 620).

Optionally, server 150 may receive, from a plurality of second mobile communication devices associated with a plurality of ridesharing vehicles (e.g., including the first ridesharing vehicle and the second ridesharing vehicle), information about a current location of each of the second mobile communications devices, derived from a location circuit (e.g., a GPS locator) within each of the second mobile devices. The plurality of second mobile communication devices may include a plurality of handheld devices associated with drivers of at least a part of the fleet of ridesharing vehicles and/or a plurality of transmitters embedded in autonomous vehicles (e.g., autonomous vehicle 130F) that are a part of the fleet of ridesharing vehicles.

At step 1413, server 150 may receive a first request for a shared ride from a first user. For example, server 150 may receive the first request using one or more communications interfaces (such as communications interface 360). In some embodiments, the first request may include information related to a first pick-up location of the first user and a first desired destination of the first user. For example, the information related to the first pick-up location may include a current location of the first user or a user-requested pick-up location.

At step 1415, server 150 may receive a second request for a shared ride from a second user. For example, server 150 may receive the second request using one or more communications interfaces (such as communications interface 360. In some embodiments, the second request may include information related to a second pick-up location of the second user and a second desired destination of the second user. For example, the information related to the second pick-up location may include a current location of the second user or a user-requested pick-up location.

Optionally, server 150 may receive the requests for shared rides from a plurality of first mobile communications devices associated with the plurality of users.

In some embodiments, server 150 may also determine pick-up locations and/or drop-off locations for each of the first and second users. As explained above with respect to route module 1220, the pick-up locations may differ from current locations of users and/or the drop-off locations may differ from the desired destinations of the users. In such embodiments, server 150 may cause notices of the determined pick-up locations to be sent to the mobile communications devices of each of the first and second users. For example, as described above with respect to route module 1220, server 150 may transmit data associated with the notices to the mobile communications devices of each of the first and second users, and the data may include walking directions to the determined pick-up locations.

At step 1417, server 150 may assign the first user and the second user to the first ridesharing vehicle. At step 1419, server 150 may generate a route to the first ridesharing vehicle for picking up and dropping off each of the first user and the second user. For example, as described above with respect to route module 1220, server 150 may generate the route based on one or more optimization models run on the pick-up locations of the first user and the second user as well as the desired destinations (and/or drop-off locations) of the first user and the second user.

At step 1421, server 150 may receive via the communications interface, a third request for a shared ride from a third user. For example, server 150 may receive the third request using one or more communications interfaces (such as communications interface 360). In some embodiments, the third request may include information related to a third pick-up location of the third user and a third desired destination of the third user. For example, the information related to the third pick-up location may include a current location of the third user or a user-requested pick-up location.

Optionally, as explained above with respect to steps 1413 and 1415, server 150 may receive the third request from a first mobile communications device associated with the third user.

In some embodiments, as explained above with respect to steps 1413 and 1415, server 150 may also determine a pick-up location and/or a drop-off location for the third user. As explained above with respect to route module 1220, the pick-up location may differ from current location of the third user and/or the drop-off location may differ from the desired destinations of the third users. In such embodiments, server 150 may cause a notice of the determined pick-up location to be sent to the mobile communications device of the third user. For example, as described above with respect to route module 1220, server 150 may transmit data associated with the notice to the mobile communications devices of the third user, and the data may include walking directions to the determined pick-up location.

In some embodiments, server 150 may receive the third request while both the first user and the second user are riding in the first ridesharing vehicle. In such embodiments, server 150 may schedule picking up of the third user before dropping off the first user or may schedule picking up the third user after dropping off the first user and before dropping off the second user.

At step 1423, server 150 may calculate a first expected arrival time of the first ridesharing vehicle at the third pick-up location. For example, as explained above with respect to arrival time module 1230 and depicted in the example of FIG. 13A, server 150 may determine the first expected arrival time based on a predicted route (e.g., calculated by route module 1220 as explained above) for the first ridesharing vehicle; weather, traffic information, and/or information about emergency (e.g., fire, police, medical, etc.) activity (e.g., received using the communications interface and/or retrieved from one or more memories), or the like.

At step 1425, server 150 may calculate a second expected arrival time of the second ridesharing vehicle at the third pick-up location. For example, as explained above with respect to arrival time module 1230 and depicted in the example of FIG. 13A, server 150 may determine the second expected arrival time based on a predicted route (e.g., calculated by route module 1220 as explained above) for the second ridesharing vehicle; weather, traffic information, and/or information about emergency (e.g., fire, police, medical, etc.) activity (e.g., received using the communications interface and/or retrieved from one or more memories); wrong turns; or the like. The second expected arrival time may be sooner than the first expected arrival time.

At step 1427, when both the first expected arrival time and the second expected arrival time are below a predetermined threshold, server 150 may assign the third user to the first ridesharing vehicle. For example, as explained above with respect to arrival time module 1230, the predetermined threshold may be less than twenty minutes.

Additionally or alternatively, server 150 may assign the third user to the first ridesharing vehicle when an estimated delay for each of the first user and the second user is below another predetermined threshold. For example, as explained above with respect to arrival time module 1230, the other predetermined threshold may be less than ten minutes.

Additionally or alternatively, server 150 may assign the third user to the first ridesharing vehicle when the third desired destination of the third user is in a same neighborhood as the second desired destination of the second user. For example, as explained above with respect to arrival time module 1230, the third desired destination may be within a particular range (e.g., 10 miles, 20 kilometers, etc.) of the second desired destination, within a zone defining the neighborhood of the second desired destination (e.g., a square, a rectangle, a parallelogram, other regular shapes, irregular figures, or the like), etc.

If any or all of the above conditions are not satisfied, server 150 may assign the third user to the second ridesharing vehicle. If the second ridesharing vehicle is assigned to the third user, server 150 may generate a route to the second ridesharing vehicle for picking up and dropping off the third user.

In any of the above embodiments, server 150 may sub-optimize the drop-off location of the first user in order to minimize a total waiting time of the third user (e.g., as depicted in FIGS. 13C and 13F) or may sub-optimize the third pick-up location of the third user to minimize a total travel time of the first and second users (e.g., as depicted in FIGS. 13D and 13E). As explained above with respect to arrival time module 1230

At step 1429, server 150 may generate an updated route for the first ridesharing vehicle to pick-up the third user. For example, as explained above with respect to route module 1220, server 150 may generate the route based on one or more optimization models run on the pick-up locations of the first, second, and third users as well as the desired destinations (and/or drop-off locations) of the first, second, and third users.

Method 1400 may further include additional steps. For example, method 1400 may include generating a route for the second ridesharing vehicle to send the second ride sharing vehicle toward an area with predicted imminent passenger demand. As explained above with respect to route module 1220, the area with predicted demand may be identified using a request history (e.g., stored in database 1250) and/or real-time information (e.g., using event information retrieved from one or more memories and/or using the communications interface). Server 150 may generate such a route if the third user is not assigned to the second ridesharing vehicle.

Prepositioning Empty Vehicles Based on Predicted Future Demand

In some embodiments, ridesharing management system 100 may collect a large volume of information over time related to the demand for ridesharing vehicles in geographical areas at particular times, places, etc. This historical data may be stored by ridesharing management system 100, for example, in database 170 for future use. However, some existing ridesharing management systems may encounter the technical problem of how to process the large amount of historical data that is collected and to use the historical data to provide an improved user experience for the riders and/or drivers in the ridesharing network. This problem may be particularly prevalent in systems for which the number and type of ridesharing vehicles present in a geographical area at a given point in time fluctuates based on human behavior, choices, traffic conditions, weather conditions, seasonality etc.

Some of the presently disclosed embodiments may address these technical problems by collecting and processing historical data to make predictions of future demand in general zones of a geographical area. Further, in some embodiments, the ridesharing management system 100 may use the predicted future demand for ridesharing vehicles to preposition vehicles with capacity to transport passengers in areas proximate to the expected passengers. Further, the historical data may be used to selectively position user-driven vehicles and autonomous vehicles within a geographical area to better meet an expect demand based on historical patterns. For example, in one embodiment, the user-driven vehicles may be positioned in a holding zone proximate a general zone with an expected high demand while the autonomous vehicles may be assigned a route (e.g., a circular route) through the general zone. Presently disclosed embodiments may offer one or more advantages over ridesharing systems driven solely by present demand. For example, some embodiments may direct one or more vehicles to maintain a presence proximate an area of expected high demand such that the high demand will be met even though present demand exists in another geographical area. These and other features of presently disclosed embodiments are discussed in more detail below.

Figure 15:
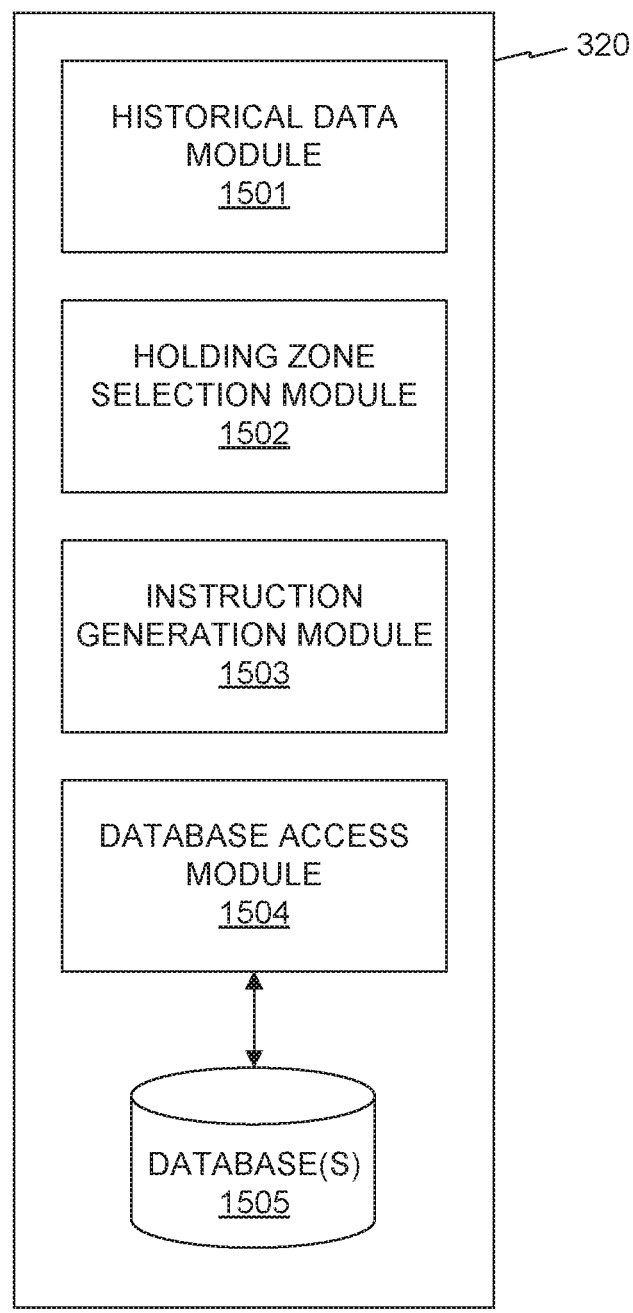
FIG. 15 illustrates an exemplary embodiment of a memory containing software modules, in accordance with some embodiments of the present disclosure.

FIG. 15 is a diagram illustrating an example of memory 320 storing a plurality of modules, consistent with the disclosed embodiments. The modules may be executable by at least one processor to perform various methods and processes disclosed herein. Further, it should be noted that memory 320 may store more or fewer modules than those shown in FIG. 15, depending on implementation-specific considerations.

As illustrated in FIG. 15, memory 320 may store software instructions to execute a historical data module 1501, a holding zone selection module 1502, an instruction generation module 1503, a database access module 1504, and may also include database(s) 1505. Historical data module 1501 may include software instructions for storing, receiving, and/or using historical data associated with past demand for ridesharing vehicles, e.g., in a geographical area. Holding zone selection module 1502 may include software instructions for selecting a holding zone for prepositioning one or more empty (i.e., without passengers) ridesharing vehicles in preparation for a predicted imminent demand for ridesharing services. Instruction generation module 1503 may include software instructions for generating control signals for directing one or more ridesharing vehicles to one or more holding zones despite other ridesharing demand in the geographical area. Database access module 1504 may include software instructions executable to interact with database(s) 1505, to store and/or retrieve information (e.g., historical data associated with past demand).

Historical data module 1501 may include software instructions for storing, receiving, and/or accessing historical data associated with past demand for ridesharing vehicles in a geographical area. The historical data may include any information associated with demand for ridesharing vehicles at a prior point in time. For example, the historical data may include any historical information that may be used to analyze, estimate, or determine past demand for ridesharing vehicles, such as data collected about pick-up locations, days, times, etc. of prior ride requests. The historical data may also include information collected about weather conditions associated with a prior ride request. For example, the historical data may indicate that fewer rides are requested on a sunny day than on a rainy day in the same month.

The historical data may also include raw data tracking previous ridesharing requests, such as a log created contemporaneously as past requests for a ride were initiated. The log may include, for example, an indication of the time and/or date of the request, the location of the user when the request was initiated, the time it look for the user to begin a trip in a ridesharing vehicle, etc. In other embodiments, however, the historical data may include analyzed and/or compiled data, such as a ride request frequency defined by a total number of ride requests received over a given period of time in a given area. For further example, the historical data may include data analyzed based on proximity to a given venue when a show or event ends, begins, or is occurring. For example, the historical data may include an average or median number of rides requested when a concert, play, etc. ends at a given venue on a weekend night.

The geographical area may include any physical region, depending on implementation-specific considerations. For example, in one embodiment, the geographical area may be a legally defined area, such as a city, a state, a county, a country, etc. However, in other embodiments, the geographical area may be defined by the ridesharing management system 100 to include, for example, a certain numbers of streets, square miles, landmarks, etc. Indeed, the geographical area may be any physical area with boundaries assigned based on any suitable criteria for the given implementation.

In some embodiments, historical data module 1501 may store the historical data associated with past demand for one or more ridesharing vehicles in a fleet of ridesharing vehicles in database 1505. The historical data may be stored contemporaneously with its collection (e.g., within 1-2 minutes of its collection), at specific time intervals (e.g., once a day, once a month, biweekly, etc.), when initiated by a user, or in any other suitable manner. The stored historical data may then be accessed by historical data module 1501. e.g., through database access module 1504, at a later point in time than the data was collected.

In one embodiment, the historical data may be used to predict imminent demand of ridesharing requests. As used herein, predicted imminent demand refers to demand that is predicted to occur within a predetermined time period from a given point in time. The predetermined time period may be within seconds (e.g., 10 seconds, 20 seconds, 30 seconds, etc.), within 1 minute, 5 minutes, 10 minutes, 15 minutes, 20 minutes, 25 minutes, 30 minutes, 35 minutes, 40 minutes, 45 minutes, 50 minutes, 55 minutes, or 1 hour from a given point in time. Further, in some embodiments, to predict imminent demand, the amount of demand may need to meet or exceed a predetermined threshold. For example, the demand may need to meet a predicted number of ride requests in a given period of time, such as greater than 10 requests over a 10 minute period of time, greater than 100 requests over 10 minutes, etc.

For example, in one embodiment, predicting imminent demand of ridesharing requests may include predicting general zones in a geographical area associated with the imminent demand. The general zones may be any physical region located within a geographical area, depending on implementation-specific considerations. For example, in one embodiment, the geographical area may be a city, and the general zone may be a portion of the city where imminent demand is predicted to occur within the next 15 minutes. In another embodiment, the general zone may be defined to be an area within a certain distance from a venue, such as a concert hall, movie theatre, school, workplace, mall, airport, etc. For example, the general zone may be defined to be a certain number of square miles surrounding the venue.

Holding zone selection module 1502 may include software instructions for selecting a holding zone for prepositioning one or more empty ridesharing vehicles in order to expedite satisfaction of the predicted imminent demand. As used herein, empty ridesharing vehicles may refer to vehicles that are not carrying a passenger who requested a ride, including vehicles driven by a user and/or an autonomous vehicles. Such vehicles may be prepositioned before a predicted imminent demand materializes (i.e., before the ride requests are made). In this way, the satisfaction of the users requesting rides when the demand materializes may be increased compared to systems that do not include prepositioned vehicles.

As used herein, a holding zone may be any physical area in the geographical area where one or more ridesharing vehicles may be located. For example, the holding zone may be a neighborhood (e.g., an area bounded by a set of streets), a specific location (e.g., a parking lot, parking garage, etc.), or a combination thereof. Further, the holding zone may include parking spots, predetermined holding patterns/routes, or any other areas for ridesharing vehicles to congregate. For example, in one embodiment, a holding zone may include parking spots for vehicles driven by users to wait for the predicted imminent demand to materialize. In some embodiments, a holding zone may include a continuous route for autonomous vehicles to follow while waiting for the imminent demand to materialize. Still further, one or more of the holding zones may include a location where one or more partially or fully electrically-powered vehicles may charge an energy storage device (e.g., a battery) while waiting for a user assignment.

In some embodiments, the holding zone for a particular ridesharing vehicle may be selected from a plurality of pre-identified holding zones stored in memory, e.g., database 1505. The pre-identified holding zones may be areas where the ridesharing management system 100 provider has pre-negotiated for the ridesharing vehicles to be located. For example, the ridesharing management system 100 provider may have agreements with owners of certain garages, parking lots, etc. Further, the holding zone for a specific ridesharing vehicle may be selected using real-time data (i.e., data collected within 10 seconds, 20 seconds, 30 seconds, 40 seconds, 50 seconds, a minute, 5 minutes, 10 minutes, 20 minutes, etc., of when the data is analyzed or used). For example, the holding zone for a given vehicle may be selected to be close to downtown office buildings during rush hour, a football stadium when a football game is expected to end, etc.

Indeed, when selecting a holding zone for a specific ridesharing vehicle, holding zone selection module 1502 may take into account one or more implementation-specific considerations. In one embodiment, the holding zone for a given vehicle may be selected using data about passenger-capacity of the vehicle (e.g., vans or high capacity vehicles may be sent to holding zones where a large number of passengers will likely need a ride together, such as near a concert venue). In other embodiments, a holding zone may be selected for a specific ridesharing vehicle using data about a shift of a driver of the vehicle. For example, a vehicle driven by a driver for a longer period of time (e.g., 4 hours) may be selected to go to the holding zone instead of a vehicle driven by a driver for a shorter period of time (e.g., 15 minutes).

Further, in some embodiments, holding zone selection module 1502 may be configured to identify a plurality of holding zones and direct a plurality of empty ridesharing vehicles to the plurality of holding zones. In some embodiments, the plurality of empty ridesharing vehicles may be selectively paired with the plurality of holding zones. For example, based on the predicted general zones in the geographical area, a single empty ridesharing vehicle may be directed to a first holding zone (e.g., near a location where demand is expected to be low, such as a small office building) and at least two empty ridesharing vehicles to a second holding zone (e.g., near a location where demand is expected to be comparably higher, such as a large office building).

Instruction generation module 1503 may include software instructions for generating and/or sending instructions to at least one ridesharing vehicle. For example, in some embodiments, instructions directing one or more ridesharing vehicles to one or more holding zones identified for the respective vehicle(s) may be sent to mobile communication device(s) in the respective vehicles. In some embodiments, the instructions may include an indication that the one or more ridesharing vehicles should maintain a presence in the one or more holding zones despite other ridesharing demand in the geographical area. That is, a ridesharing vehicle may be instructed to stay in a holding zone in anticipation of predicted imminent demand instead of picking up a passenger currently demanding a ride in the geographical area. In this way, predicted surges in demand may be accommodated and/or prioritized over contemporaneous and/or unexpected demand.

Database 1505 may be configured to store any type of information of use to modules 1501-1504, depending on implementation-specific considerations. For example, in embodiments in which historical data module 1501 is configured to store historical data associated with past demand for ridesharing vehicles, database 1505 may store the historical data. Further modules 1501-1504 may be implemented in software, hardware, firmware, a mix of any of those, or the like. For example, if the modules are implemented in software, they may be stored in memory 320. However, in some embodiments, any one or more of modules 1501-1504 and data associated with database 1505, may, for example, be stored in processor 310 and/or located on server ridesharing management server 150, which may include one or more processing devices. Processing devices of server 150 may be configured to execute the instructions of modules 1501-1504. In some embodiments, aspects of modules 1501-1504 may include software, hardware, or firmware instructions (or a combination thereof) executable by one or more processors, alone or in various combinations with each other. For example, modules 1501-1504 may be configured to interact with each other and/or other modules of server 150 to perform functions consistent with disclosed embodiments.

Figure 16:
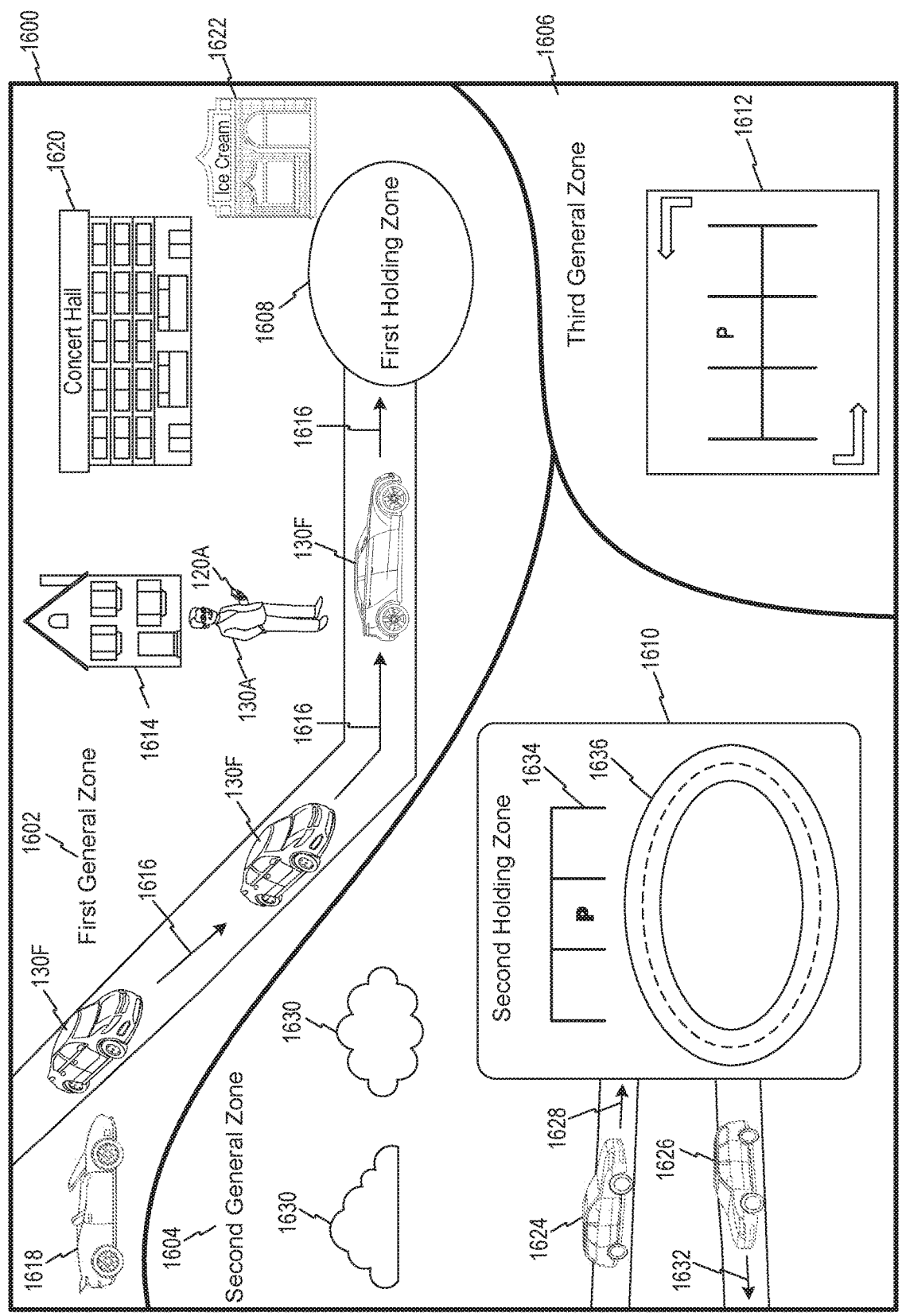
FIG. 16 shows an example environment and operation of the automated ridesharing system in the environment, in accordance with some embodiments of the present disclosure.

FIG. 16 illustrates an example environment including a geographical area 1600 in which ridesharing vehicles 130F, 1624, and 1626 are dispatched and under control of ridesharing management system 100. In the illustrated embodiment, processor 310 has determined that the geographical area 1600 includes a first general zone 1602, a second general zone 1604, and a third general zone 1606. In the illustrated embodiment, the first and second general zones 1602, 1604 have been predicted to be associated with imminent demand for rides. Therefore, the first general zone 1602 includes a first holding zone 1608 that enables prepositioning of one or more ridesharing vehicles in the first general zone 1602. Likewise, the second general zone 1604 includes a second holding zone 1610 that enables prepositioning of one or more ridesharing vehicles in the second general zone 1604. In the illustrated embodiment, the third general zone 1606 includes only a parking lot 1612. Therefore, the third general zone 1606 has been associated with a lack of imminent demand and, accordingly, has not been assigned a holding zone.

In some embodiments, the processor 310 may be configured to receive a rideshare request from a mobile communications device of a user in a vicinity of a specific ridesharing vehicle driving toward a selected holding zone, but assign the ride to another vehicle farther away from the user to pick up the user. For example, in the first general zone 1602, user 130A may request a ride via device 120A while standing outside user's house 1614. Vehicle 130F may be driving toward the first holding zone 1608, as indicated by arrows 1616, when the ride request of user 130A is received. However, vehicle 1618, which is farther from user 130A when the ride request is received, may be assigned to pick up user 130A while vehicle 130F may continue to the first holding zone 1608.

The foregoing feature may offer one or more advantages over systems that connect user 130A to vehicle 130F on the basis of closest proximity. For example, by directing vehicle 130F to the first holding zone 1608, the processor 310 may reduce or prevent the likelihood that a demand surge that occurs when a concert ends at concert hall 1620 is not met. In other words, user 130A may experience a delay in being picked up for a ride to expedite satisfaction of the users who may be in concert hall 1620 for a concert that is about to end.

In other embodiments, however, the processor 310 may receive a rideshare request from a mobile communications device of a user in a vicinity of a specific ridesharing vehicle driving toward a selected holding zone and send a message to the specific ridesharing vehicle to pick up the user when the desired destination of the user is in proximity to the selected holding zone. For example, in some embodiments, the processor 310 may direct vehicle 130F to pick up user 130A on its way to the first holding zone 1608 when the user's destination is ice cream shop 1622, which is proximate the first holding zone 1608.

In some embodiments, one or more vehicles in a holding zone may be directed to leave a holding zone to pick up a passenger. For example, the processor 310 may be configured to receive a rideshare request from mobile communications device 120A of user 130A in a vicinity of a selected holding zone 1608. The processor 310 may then to send a message to an empty rideshare vehicle 130F that has been positioned in the selected holding zone 1608 to pick-up user 130A. The instructions may include routing instructions to a pick-up location, such as house 1614, in a vicinity of the selected holding zone 1608.

In some embodiments, the processor 310 may assign passengers to one or more ridesharing vehicles, such as vehicle 1624 and vehicle 1626. In one embodiment, each of vehicles 1624 and 1626 may be already transporting one or more users and be assigned one or more additional users for simultaneous transportation. However, in another embodiment, each of vehicles 1624 and 1626 may be transporting a single user. Further, the processor 310 may track assignments of vehicle 1624 and vehicle 1626 to identify that vehicles 1624 and 1626 are about to be without passengers and without future assignments. Vehicle 1624 may be directed toward second holding zone 1610, as indicated by arrow 1628. The processor 310 may direct vehicle 1624 to second holding zone 1610 based on the current location of the vehicle (e.g., on a road headed toward second holding zone 1610) and a predicted imminent demand proximate second holding zone 1610. In the illustrated embodiment, imminent demand may be predicted because storm clouds 1630 indicate that it is likely to rain in second general zone 1604.

Vehicle 1626 may be directed to another holding zone (not illustrated in FIG. 16) in a direction 1632 away from second holding zone 1610. The processor 310 may direct vehicle 1626 to another holding zone other than second holding zone 1610 based on the current location of vehicle 1626 (e.g., on a road headed away from second holding zone 1610) and a predicted imminent demand proximate another holding zone. However, in other embodiments, vehicles 1624 and 1626 may be directed to separate holding zones based on a variety of implementation-specific considerations. For example, vehicle 1624 may be closer to second holding zone 1610 than to first holding zone 1608 such that vehicle 1624 may be assigned to meet the demand in second general zone 1604 instead of first general zone 1602. For further example, in some embodiments, one or more of the vehicles may be directed to another holding zone if second holding zone 1610 is at full capacity (i.e., it cannot accommodate any more vehicles).

In some embodiments, one or more of the holding zones may include a location where one or more ridesharing vehicles may park while waiting for a user assignment. For example, second holding zone 1610 includes parking spots 1634. In some embodiments, one or more of the holding zones may include a route along which a vehicle may be directed to drive while awaiting a pick-up assignment. For example, second holding zone 1610 includes circular route 1636. In one embodiment, manually-drivable vehicles may be directed to parking spots 1634 and autonomous vehicles may be directed to route 1636. In the illustrated embodiment, route 1636 is shown as a circular route proximate to parking spots 1634. However, in other embodiments, route 1636 may be a series of streets in a neighborhood, or any other suitable path one or more vehicles can follow while waiting for a passenger assignment.

Figure 17A:
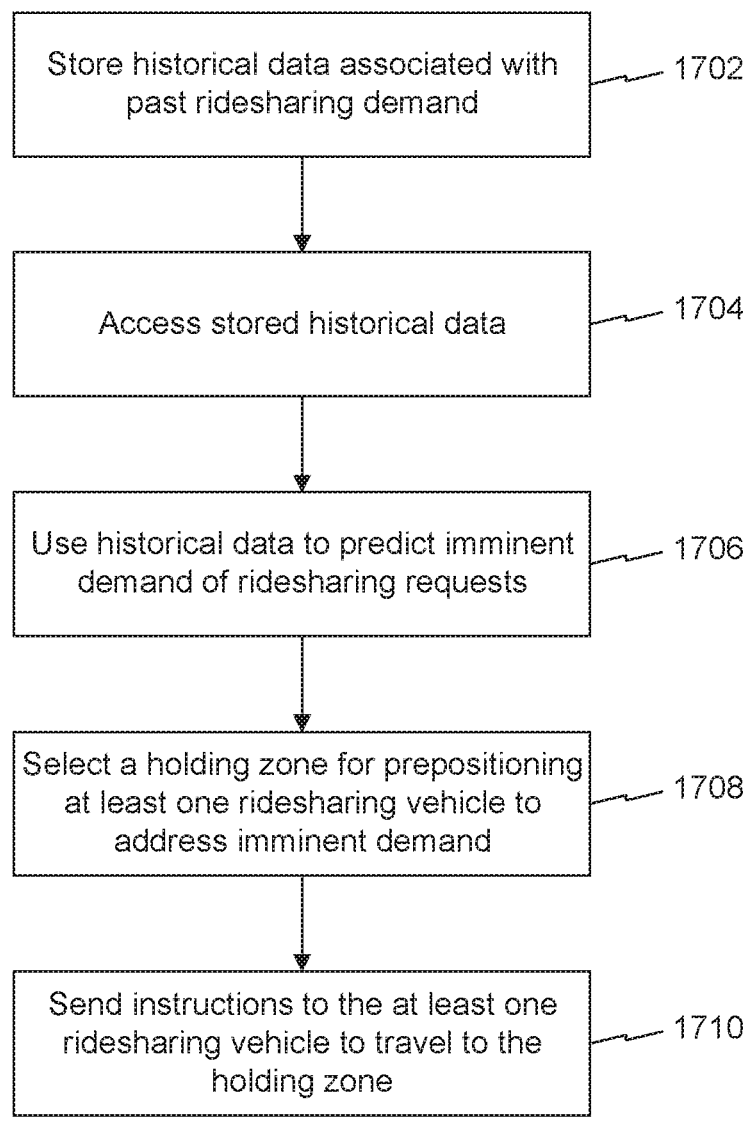
FIG. 17A is a flowchart illustrating an exemplary method for dispatching at least one ridesharing vehicle, in accordance with some embodiments of the present disclosure.

FIG. 17A illustrates a flowchart of an exemplary method 1700 for dispatching at least one ridesharing vehicle, in accordance with some embodiments of the present disclosure. The method 1700 may be carried out, for example, by processor 310. For exemplary purposes only, method 1700 for dispatching at least one ridesharing vehicle is described with respect to processing device 310 cooperating with memory 320 to execute modules 1501-1504. In accordance with method 1700, processor 310 may store historical data associated with past ridesharing demand at block 1702. For example, historical data module 1501 may store historical data in database 1505 as it is collected when ride requests are initiated for a ride. The stored historical data may then be accessed at a later point in time at block 1704. For example, historical data module 1501 may access the historical data via database access module 1504.

Historical data module 1501 may use the accessed historical data to predict imminent demand of ridesharing requests at block 1706. For example, the processor 310 may predict that first general zone 1602 and second general zone 1604 in geographical area 1600 will likely experience imminent demand for ridesharing requests. Holding zone selection module 1502 may select a holding zone for prepositioning at least one ridesharing vehicle to address the predicted imminent demand at block 1708. For example, the processor 310 may select second holding zone 1610 for vehicle 1624 based on predicted imminent demand in second general zone 1604. The imminent demand may be predicted, for example, based on the likelihood of rain given storm clouds 1630. The processor 310 may send instructions to at least one rideshare vehicle (e.g., vehicle 1624) to travel to the selected holding zone (e.g., second holding zone 1610) at block 1710.

Figure 17B:
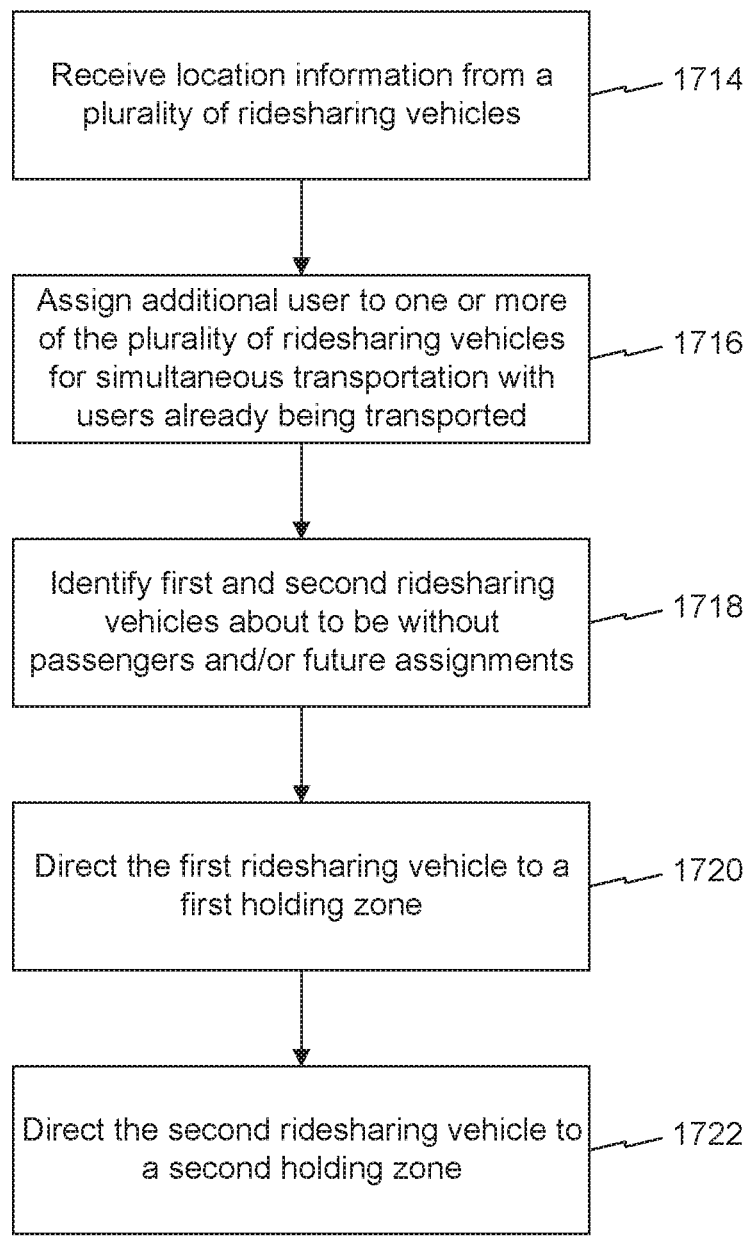
FIG. 17B is a flowchart illustrating an exemplary method for dispatching a plurality of ridesharing vehicles, in accordance with some embodiments of the present disclosure.

FIG. 17B illustrates a flowchart of an exemplary method 1712 for dispatching a plurality of ridesharing vehicles, in accordance with some embodiments of the present disclosure. The method 1712 may be carried out, for example, by processor 310. For exemplary purposes only, method 1712 for dispatching at least one ridesharing vehicle is described herein with respect to processing device 310 cooperating with memory 320 to execute modules 1501-1504. In accordance with method 1712, processor 310 may receive location information from a plurality of ridesharing vehicles at block 1714. For example, processor 310 may receive location information from vehicle 1624 and vehicle 1626. The location information may include any information that enables the processor 310 to determine vehicle location within geographical area 1600. For example, the location information may include global positioning system ("GPS") coordinates, current speed, current direction of travel, etc.

The processor 310 may assign additional users to one or more of the plurality of ridesharing vehicles for simultaneous transportation with users already being transported in the ridesharing vehicles at block 1716. For example, vehicle 1624 may be carrying user 130A when processor 310 assigns vehicle 1624 an additional user 130B to transport. In this way, user 130A and user 130B may be simultaneously transported by vehicle 1624 because at least a portion of the trip of user 130A overlaps with at least a portion of the trip of user 130B such that they are in vehicle 1624 at the same time for a portion of their respective trips.

The processor 310 may identify first and second ridesharing vehicles about to be without passengers and without future assignments at block 1718. For example, the processor 310 may determine that vehicle 1624 has stopped at the final destination of its passengers and has not accepted another trip request. Likewise, the processor 310 may determine that vehicle 1626 is 0.1 miles from the final destination of its passengers and has not accepted another trip request. Based on this information, the processor 310 may direct the first ridesharing vehicle to a first holding zone at block 1720 and the second ridesharing vehicle to a second holding zone at block 1722. In some embodiments, the first ridesharing vehicle and the second ridesharing vehicle may be directed to the holding zones to which each vehicle is closest. In other embodiments, the ridesharing vehicles may be directed based on a variety of implementation-specific considerations, such as holding zone capacity, holding zone occupancy rate, expected level of demand in a general zone or each zone, length of time the vehicle has been driven, etc.

Dynamic Route Planning

In some embodiments, ridesharing management system 100 may collect a large volume of information over time related to available routes for ridesharing vehicles in geographical areas at particular times, places, etc. This data may be stored by ridesharing management system 100, for example, in database 170 for future use. However, some existing ridesharing management systems may encounter the technical problem of how to process the large amount of stored data and large number of possible routes and to use the data to provide an improved user experience for the riders and/or drivers in the ridesharing network. This problem may be particularly prevalent in systems for which the number and type of ridesharing vehicles present in a geographical area at a given point in time fluctuates based on human behavior, choices, traffic conditions, weather conditions, etc.

Some of the presently disclosed embodiments may address these technical problems by collecting and processing past route data and/or current variables affecting possible vehicle routes to determine an optimal route for a particular ridesharing vehicle through a given geographical area. For example, presently disclosed embodiments may take into account a capacity of a given ridesharing vehicle and how much of that capacity is being utilized at a given point in time to determine a vehicle route. For instance, in one embodiment, the ridesharing management system 100 may route a particular ridesharing vehicle along a route that results in a later arrival time for one or more passengers, as compared to another available route, when the ridesharing vehicle is operating with a different, e.g., higher capacity. In this way, a greater number of users may be serviced more quickly compared to systems that route based only on expected arrival time and not other variables.

Figure 18:
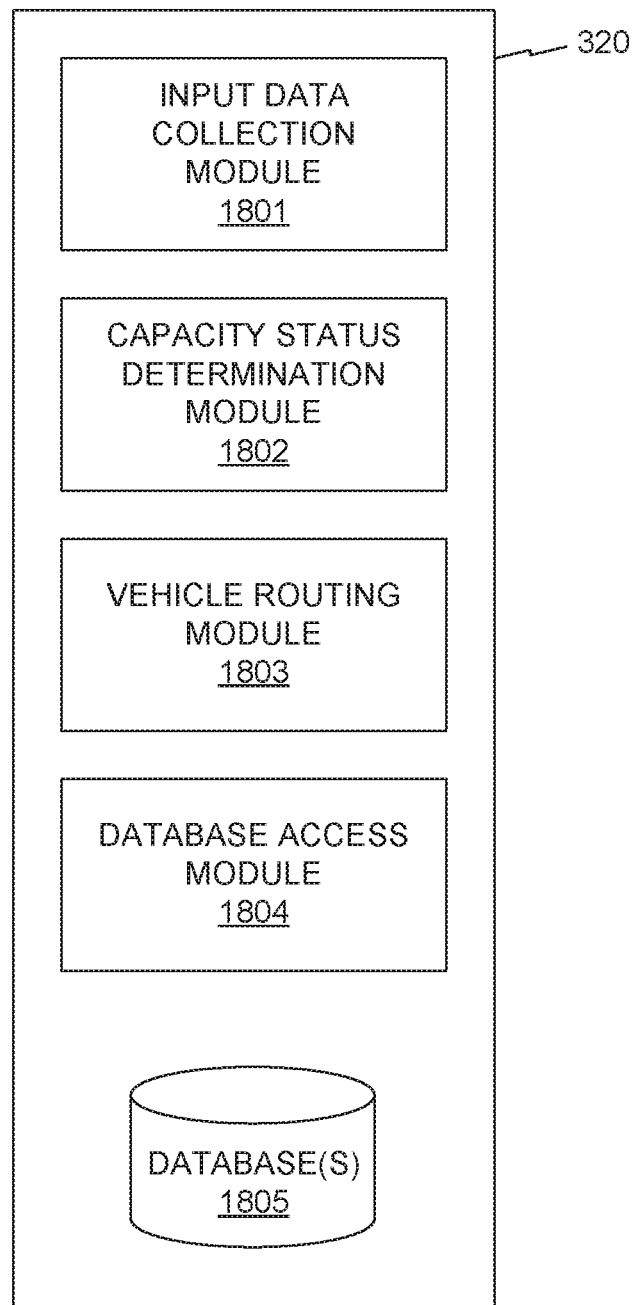
FIG. 18 illustrates an exemplary embodiment of a memory containing software modules, in accordance with some embodiments of the present disclosure.

FIG. 18 is a diagram illustrating an example of memory 320 storing a plurality of modules, consistent with the disclosed embodiments. The modules may be executable by at least one processor to perform various methods and processes disclosed herein. Further, it should be noted that memory 320 may store more or fewer modules than those shown in FIG. 18, depending on implementation-specific considerations.

As illustrated in FIG. 18, memory 320 may store software instructions to execute an input data collection module 1801, a capacity status determination module 1802, a vehicle routing module 1803, a database access module 1804, and may also include database(s) 1805. Input data collection module 1801 may include software instructions for receiving input data (e.g., user ride requests, current location of ridesharing vehicles, etc.) from one or more sources. Capacity status determination module 1802 may include software instructions for determining a capacity status for one or more ridesharing vehicles based on a known passenger capacity. Vehicle routing module 1803 may include software instructions for sending one or more ridesharing vehicles to pick up user(s) and directing the vehicles along a determined route. Database access module 1804 may include software instructions executable to interact with database(s) 1805, to store and/or retrieve information (e.g., geographical maps associated with a geographical area in which a ridesharing vehicle is operating).

Input data collection module 1801 may include software instructions for receiving input data related to ridesharing vehicle routing. The input data may be any data relevant to directing one or more ridesharing vehicles along a route. For example, the input data may include ride requests from a plurality of users headed to different destinations. The ride requests may include information such as a starting point, a desired destination, an identity of the user, a rating of the user, etc. Moreover, the input data may be a current location of one or more ridesharing vehicles. The current location of a ridesharing vehicle may be received, for example, from a mobile communications device (e.g., a smartphone, tablet, etc.) associated with (e.g., located in the passenger cabin) the ridesharing vehicle.

Capacity status determination module 1802 may include software instructions for determining a capacity status for one or more ridesharing vehicles. The capacity status of a vehicle at a given point in time may be any variable that captures the relative available capacity of the vehicle compared to a known capacity of the vehicle when empty. For example, the capacity status and/or known capacity may be measured with respect to a numerical value for each passenger. For example, if the known passenger capacity of a vehicle is 4 riders and 1 rider is in the vehicle, the capacity status of the vehicle is 3. Further, the capacity status and/or known capacity of the vehicle may include the vehicle's driver or may be computed without counting the vehicle's driver (e.g., in the case of an autonomous vehicle).

In some embodiments, the capacity status may be adjusted based on factors other than the number of passengers currently in the vehicle but that affect the available capacity of the vehicle. For example, if a passenger has a suitcase that is taking up the space in the vehicle, the capacity status availability may be reduced by 2 passengers instead of 1 passenger. As another example, if a passenger takes up more than one seat in the vehicle, the capacity status may be reduced accordingly. Additionally, the capacity status may be adjusted automatically based on, for example, metadata associated with a user's ride request, and/or manual inputs, such as the driver's observations when the passenger is picked up.

Capacity status determination module 1802 may also include software instructions for retrieving, receiving, and/or determining a capacity threshold for a given ridesharing vehicle. The capacity threshold may be any variable that captures the lack of further availability of a vehicle to accommodate transport of additional passengers and/or items. For example, the capacity threshold may be a percentage of the known passenger capacity of the given ridesharing vehicle. In one embodiment, the capacity threshold may be set at 75% of the known passenger capacity such that if 3 of the 4 available seats in a vehicle are full, the capacity threshold is met. In other embodiments, the capacity threshold may be determined based on a vehicle ride type selected and/or paid for by a given rider. For example, in one embodiment, a user may select a private ride such that the capacity threshold is set to one passenger.

In some embodiments, the capacity threshold may be set based on the passenger-capacity of a given ridesharing vehicle. For example, in some embodiments, the capacity threshold may be one person less than a passenger-capacity of a ridesharing vehicle. In other embodiments, the capacity threshold may be two persons less than a passenger-capacity of the ridesharing vehicle. In other embodiments, the capacity threshold may be three persons less than a passenger-capacity of the ridesharing vehicle. In another embodiment, the capacity threshold may be four persons less than a passenger-capacity of the ridesharing vehicle. Further, the capacity threshold may be any given number of passengers, such as two passengers, three passengers, four passengers, etc.

Further, in some embodiments, a particular vehicle type may have a known passenger capacity (e.g., a four door vehicle may accommodate 4 passengers other than the driver). However, certain sub-types of the vehicle type may nevertheless be assigned a capacity status or have a capacity threshold adjusted up or down for the particular vehicle type. For example, a small vehicle with reduced room inside may be assigned a lower known passenger capacity or may be found to meet a threshold capacity sooner than a larger vehicle. Likewise, a large vehicle with increased room inside may be assigned a higher known passenger capacity or may be found to reach a capacity threshold later than a smaller vehicle.

Capacity status determination module 1802 may also include software instructions for determining whether the capacity status of a ridesharing vehicle meets the capacity threshold. For example, the module 1802 may compare a normalized capacity status to a normalized capacity threshold to determine if the threshold is met. The capacity status and capacity threshold may be normalized to both be represented as a whole number, percentage, ratio, etc, to enable comparison. In some embodiments, if the capacity status of the vehicle is below the capacity threshold, the ridesharing vehicle may be directed to pick up one or more additional passengers. Further, if the capacity status of the vehicle meets or exceeds the capacity threshold, the ridesharing vehicle may be directed to a route that transports the existing passengers to their respective destinations as quickly as possible.

Vehicle routing module 1803 may include software instructions for routing a ridesharing vehicle to pick up and/or transport one or more users. For example, in response to the ride requests received by input data collection module 1801 from the plurality of users headed to differing destinations, vehicle routing module 1803 may send the ridesharing vehicle to pick up the plurality of users headed to the different destinations. That is, vehicle routing module 1803 may direct the ridesharing vehicle along one or more routes through the surrounding environment based on the current state of one or more variables. Further, the route to which the ridesharing vehicle is assigned may be dynamically adjusted during transportation of the plurality of users to redirect the ridesharing vehicle to optimize one or more performance variables.

For example, in one embodiment, vehicle routing module 1803 may direct and/or redirect the ridesharing vehicle along one or more routes based on the capacity status of the ridesharing vehicle and/or one or more additional variables. In one embodiment, the ridesharing vehicle may be directed along a first route resulting in a first set of arrival times for the plurality of users (e.g., if the capacity status of the ridesharing vehicle is below the capacity threshold). The ridesharing vehicle may also be directed along a second route resulting in a second set of arrival times for the plurality of users (e.g., if the capacity threshold is met). In some embodiments, the second set of arrival times may be earlier than the first set of arrival times. This may occur, for example, because the second route includes a toll road that is more direct than a non-toll road, a highway that is faster than side streets or streets with traffic signals, or any other factor affecting trip length. In one embodiment, each of the respective arrival times of each respective passenger may be earlier for the second route than the first route. However, in other embodiments, the second route may result in a set of arrival times that are generally earlier than the first route. That is, each respective arrival time of each passenger is not necessarily earlier on the second route than the first route, but at least one passenger may arrive earlier for the second route than the first route.

In one embodiment, the ridesharing vehicle may be directed or redirected to the second route when the capacity of the ridesharing vehicle is below the capacity threshold but imminent demand is predicted in an area near at least one drop-off location associated with at least one passenger. For example, only one passenger may be in a vehicle that can accommodate three passengers. However, the current passenger's destination may be a concert hall near a sports arena that is hosting a sporting event that is expected to end within a few minutes of the passenger's estimated arrival time at the concert hall. Accordingly, in order to better meet the expected demand proximate the sports arena, ridesharing management system 100 may direct the ridesharing vehicle to take the second, faster route.

In another embodiment, the ridesharing vehicle may be directed or redirected to the second route when the capacity status of the ridesharing vehicle is below the capacity threshold but another ridesharing vehicle is driving along a similar route to the first route. A "similar route" may be any route that partially or fully overlaps with the first route. For example, if the first route includes driving on portions streets A, B, C, and D, and another route includes driving on the same portions of streets A and B, the routes may be similar routes. The foregoing feature may enable greater efficiencies in the ridesharing system because the likelihood that multiple vehicles are traveling along the same or similar routes may be reduced, thus enabling duplicative routes to be reduced or eliminated.

Database 1805 may be configured to store any type of information of use to modules 1801-1804, depending on implementation-specific considerations. For example, in embodiments in which vehicle routing module 1803 is configured to access one or more prior-stored maps of geographical areas, database 1805 may store the geographical maps. Further, modules 1801-1804 may be implemented in software, hardware, firmware, a mix of any of those, or the like. For example, if the modules are implemented in software, they may be stored in memory 320. However, in some embodiments, any one or more of modules 1801-1804 and data associated with database 1805, may, for example, be stored in processor 310 and/or located on server ridesharing management server 150, which may include one or more processing devices. Processing devices of server 150 may be configured to execute the instructions of modules 1801-1804. In some embodiments, aspects of modules 1801-1804 may include software, hardware, or firmware instructions (or a combination thereof) executable by one or more processors, alone or in various combinations with each other. For example, modules 1801-1804 may be configured to interact with each other and/or other modules of server 150 to perform functions consistent with disclosed embodiments.

Figure 19:
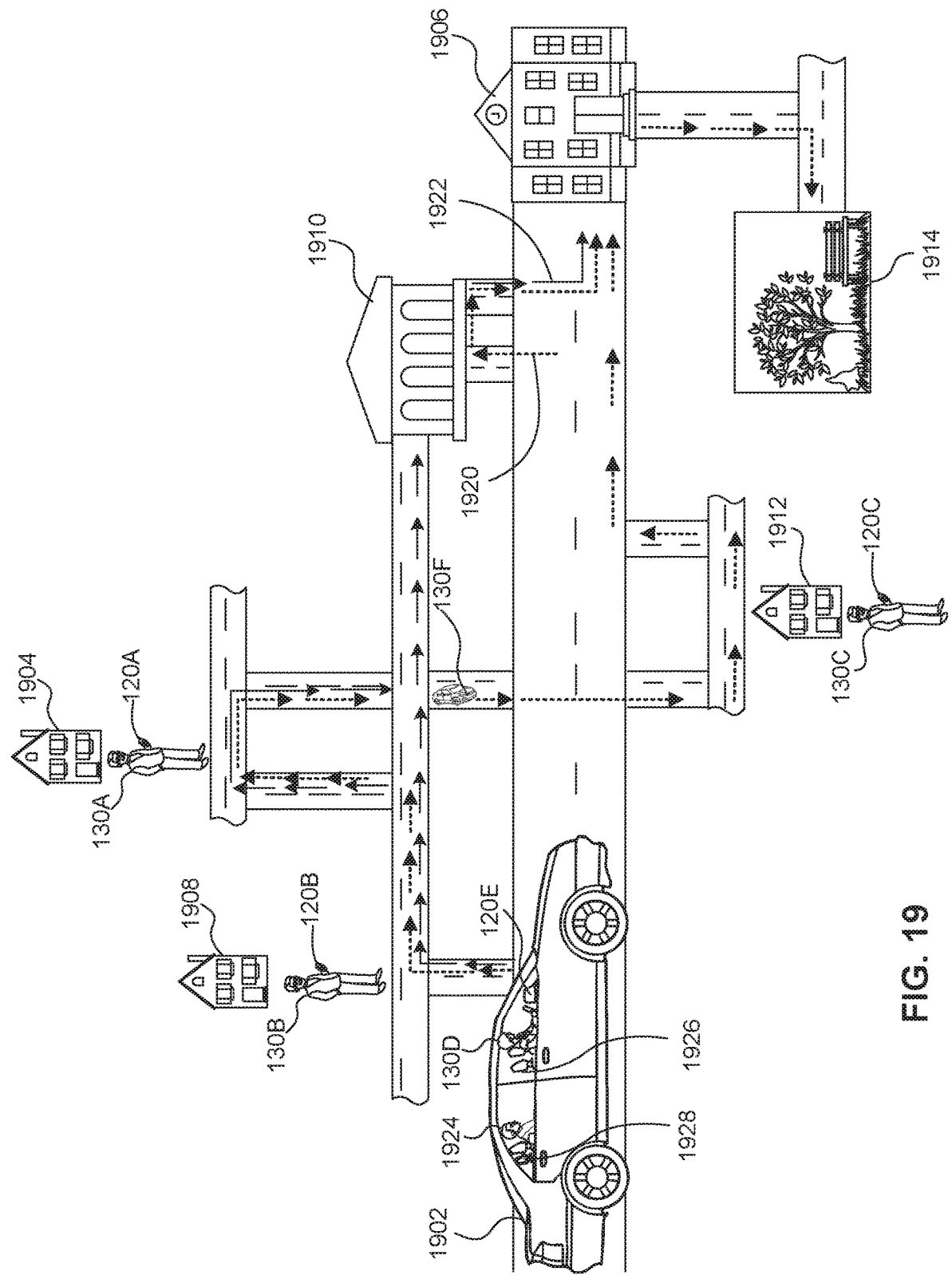
FIG. 19 shows an example environment and operation of the automated ridesharing system in the environment, in accordance with some embodiments of the present disclosure.

FIG. 19 illustrates a schematic of an example environment including a geographical area 1900 in which autonomous ridesharing vehicle 130F and user-driven vehicle 1902 (not shown to scale for illustrative purposes) are dispatched and under control of ridesharing management system 100. In the illustrated embodiment, processor 310 has received ride requests from the plurality of users 130A-C via communications devices 120A-C. In the illustrated example, user 130A has requested a ride from the starting point at house 1904 to desired destination at school 1906. Further, user 130B has requested a ride from the starting point at house 1908 to desired destination at library 1910. Similarly, user 130C has requested a ride from the starting point at house 1912 to desired destination at park 1914.

In the illustrated example, ridesharing management system 100 has determined a first route 1920 resulting in a first set of arrival times for users 130A-C. For example, first route 1920 may result in user 130A arriving at school 1906 at 9:00 am, user 130B arriving at library 1910 at 9:05 am, and user 130C arriving at park 1914 at 9:10 am. Similarly, ridesharing management system 100 has determined a second route 1922 resulting in a second set of arrival times for users 130A-B. For example, second route 1922 may result in user 130A arriving at school 1906 at 8:55 am, user 130B arriving at library 1910 at 9:00 am, and user 130C being picked up by another ridesharing vehicle. In this embodiment, the second set of arrival times may be earlier than the first set of arrival times because user 130A arrives at 8:55 am when route 1922 is taken but at 9:00 am when route 1920 is taken. Similarly, the second set of arrival times may be earlier than the first set of arrival times because user 130A arrives at 9:00 am when route 1922 is taken but at 9:05 am when route 1920 is taken.

In some embodiments, processor 310 may selectively direct vehicle 1902 along the first route 1920 and/or the second route 1922 based on the capacity status of the vehicle 1902. For example, vehicle 1902 in the illustrated embodiment includes driver 130D having mobile communications device 120E mounted in vehicle 1902. A passenger 1924 is being transported by vehicle 1902. However, seats 1926 and 1928, as well as a non-illustrated middle seat in the back, remained unoccupied. Therefore, vehicle 1902 may be determined to be below a capacity threshold for the vehicle, which may be set at 4 passengers. Therefore, vehicle 1902 may be determined to have availability to pick up 3 passengers to fill the remaining seats in vehicle 1902. Thus, in one embodiment, vehicle 1902 may be directed along the first route 1920 to pick up passengers 130A-C.

In another embodiment, however, vehicle 1902 may be directed along second route 1922. For example, passenger 1924 may have a large bag or suitcase taking up one seat in vehicle 1902 such that only two additional passengers can be transported simultaneously with passenger 1924 and his belongings. In such an embodiment, vehicle 1902 may be directed along second route 1922 to pick up passengers 130A and 130B, but not passenger 130C.

As another example, vehicle 1902 may be directed along second route 1922 when the capacity status of vehicle 1902 is below the capacity threshold but at least one of the users 130A-C booked an expedited ride (e.g., by paying a higher price for the ride). For example, user 130A may book an expedited ride to school 1906 such that vehicle 1902 is directed along second route 1922 to get user 130A to school 1906 more quickly than if first route 1920 was taken.

In another embodiment, vehicle 1902 may be selectively directed or redirected along the first route 1920 and the second route 1922 based on feedback received from one or more tracking systems. For example, in one embodiment, ridesharing management system 100 may receive real time traffic data (e.g., data from governmental traffic tracking cameras) updated every 30 seconds, every minute, every 5 minutes, ever 10 minutes, etc. as traffic changes. In one embodiment, vehicle 1902 may be directed along the first route 1920 when the capacity threshold is met but traffic congestion is identified along the second route 1922. In some embodiment, the traffic congestion may be atypical for the given day, time, and/or route.

In another embodiment, vehicle 1902 may be directed along the second route 1922 based on real time traffic data. For example, vehicle 1902 may be directed to the second route when the capacity status of vehicle 1902 is below the capacity threshold and traffic congestion is identified along first route 1920. In some embodiments, the traffic congestion along first route 1920 may be atypical for the given day, time, and/or route.

In some embodiments, ridesharing management system 100 may receive inputs from mobile communications devices associated with users 130A-C, vehicle 130F, and/or vehicle 1902 throughout the continuous operation of the ridesharing dispatch system. These inputs may be used to direct one or more of the ridesharing vehicles in the system to different routes, to pick up different passengers, etc. For example, in one embodiment, processor 310 is configured to continuously receive location information from the mobile communications device 120E associated with the ridesharing vehicle 1902 to estimate arrival time of vehicle 1902 at the pick up location 1904 of one of the plurality of users 130A and to reassign a different ridesharing vehicle (e.g., 130F) when the processor 310 predicts a delay in arrival of the ridesharing vehicle 1902 at the pick-up location 1904. For example, a delay may be expected because vehicle 1902 needs to stop for fuel, has encountered traffic, got into an accident, experienced mechanical malfunctions, got pulled over by the police, made a wrong turn, etc.

In another embodiment, the processor 310 is configured to continuously receive location information from mobile communications device 120A associated with one of the plurality of users 130A, to estimate arrival time at the pick-up location 1904 of the user 130A and to reassign a different ridesharing vehicle (e.g., 130F) when the processor 310 estimates that that user 130A will arrive after the ridesharing vehicle 1902. For example, if user 130A requests a ride while visiting a neighbor, mobile communications device 120A may reflect that user 130A is not at pickup location 1904. Processor 310 may further compute that it will take user 130A more time to reach house 1904 than vehicle 1902 given the current locations of user 130A and vehicle 1902. Therefore, processor 310 may send a different vehicle, such as autonomous vehicle 130F to pick up user 130A.

In another embodiment, the processor 310 is configured to continuously receive location information from a communications device (e.g. mobile communications device 120A) associated with the ridesharing vehicle 1902, to estimate arrival time at the pick-up location 1904 and to reassign a different ridesharing vehicle (e.g., 130F) when the processor estimates that the ridesharing vehicle 1902 will arrive at the pick-up location 1904 later than a time originally estimated.

In some embodiments, processor 310 may be configured to track one or more variables that impact the capacity status of the ridesharing vehicle(s) and change the capacity status and/or capacity threshold accordingly. For example, in one embodiment, processor 310 may track the luggage of one or more passengers that can have an effect on the capacity status of the ridesharing vehicle and change the capacity status and/or capacity threshold accordingly. Luggage of one or more passengers may be tracked in any suitable manner, such as user input, sensor input, etc. For example, in one embodiment, the passenger and/or driver may input that he/she has a suitcase, bicycle, musical instrument, or other space-consuming item to transport. For further example, in another embodiment, processor 310 is further configured to track a passenger's physical condition that can have an effect on the capacity status of the ridesharing vehicle and to change the capacity status and/or capacity threshold accordingly. For instance, the passenger, driver, and/or one or more sensors may indicate that the passenger has a wheel chair, a baby, or any other item that takes up space, or that the passenger is a large size that will take up more than one seat.

In some embodiments, vehicle 1902 may be directed or redirected along the first route 1920 when the capacity threshold is met but an additional user is assigned to the ridesharing vehicle 1902 with a pick-up location along the first route 1920. For example, in one embodiment, the capacity threshold for vehicle 1902 may be set to 3 adult passengers so no adult passengers are assigned to sit in the middle back seat. However, the capacity threshold may be overridden if a user (e.g., user 130A) has a pickup location (e.g., house 1904) along the first route 1920.

Figure 20:
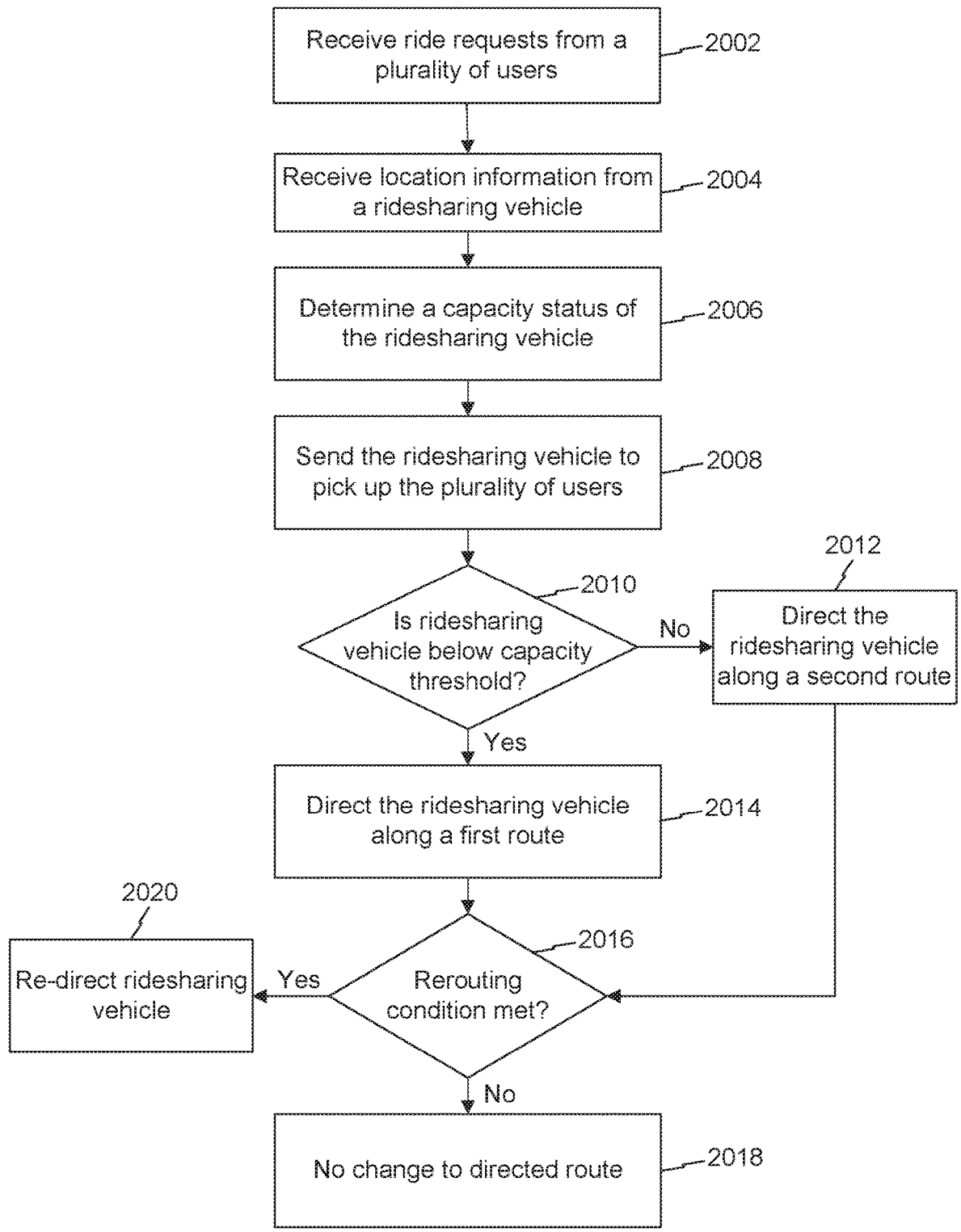
FIG. 20 is a flowchart illustrating an exemplary method for dispatching at least one ridesharing vehicle, in accordance with some embodiments of the present disclosure.

FIG. 20 illustrates a flow chart of an exemplary method 2000 for dispatching at least one ridesharing vehicle, in accordance with some embodiments of the present disclosure. For exemplary purposes only, method 2000 for dispatching at least one ridesharing vehicle is described with respect to processing device 310 cooperating with memory 320 to execute modules 1801-1804. In accordance with method 2000, processor 310 may receive ride requests from a plurality of users, as described in detail above, at block 2002. Further, processor 310 may receive location information from one or more communications devices associated with a ridesharing vehicle at block 2004. These inputs may be collected as discussed above with respect to input data collection module 1801.

Capacity status determination module 1802 may determine a capacity status of the ridesharing vehicle available to pick up the plurality of users at block 2006. For example, processor 310 may receive an input regarding the known passenger capacity of the ridesharing vehicle (e.g., the vehicle is an extended SUV that seats 6 passengers, a four-door car that seats 4 passengers, etc.). Processor 310 may then receive an input regarding the current number of passengers in the ridesharing vehicle. Based on these inputs, processor 310 may determine the capacity status of the vehicle. The capacity status may be expressed in terms of absolute numbers (e.g., vehicle can accommodate 2 passengers), a binary representation (e.g., availability or no availability), or any other suitable representation.

Vehicle routing module 1803 may send the ridesharing vehicle to pick up the plurality of users at block 2008. Processor 310 may then query whether the capacity status of the ridesharing vehicle is below the capacity threshold at block 2010. Based on the result of the query at block 2010, processor 310 may direct the ridesharing vehicle along a selected route. For example, in the illustrated embodiment, if the capacity status of the ridesharing vehicle is not below the capacity threshold, the ridesharing vehicle is directed along the second route 1922 at block 2012. However, if the capacity status of the ridesharing vehicle is below the capacity threshold, the ridesharing vehicle is directed along the first route 1920 at block 2014. In this way, the ridesharing vehicle may be directed to a route to pick up additional passengers when the capacity status indicates room in the vehicle for additional passengers or to an alternate route to drop off the existing passengers when the capacity status indicates lack of room for additional passengers.

Further, method 2000 includes a query as to whether a rerouting condition has been met at block 2016. The rerouting condition may be any factor that renders the current route of the ridesharing vehicle more or less desirable at a given point in time. For example, the rerouting condition may be a traffic report, identified construction, road hazard, weather alert, imminent expected demand in a nearby area, user request for an expedited ride, driver request to stop driving, etc. If the rerouting condition is met, the ridesharing vehicle may be redirected to an alternate route at block 2020. However, if the rerouting condition is not met, processor 310 may not make any change to the directed route at block 2018.

For instance, in one embodiment, vehicle 1902 may be directed along first route 1920 at block 2014. However, after the ride has begun, imminent demand may be predicted near library 1910 due to a reading group ending soon. Accordingly, vehicle 1902 may be redirected along an alternate route that includes library 1910 to meet the expected imminent demand.

Purposefully Selecting Longer Routes to Improve User Satisfaction

In the context of ridesharing, the quality of the passengers' user experience is typically not simply a function of the arrival time, simply because there are other available transportation alternatives that may be faster than ridesharing. Instead, a complicated combination of factors other than the fastest time of arrival may affect the satisfaction of a typical ridesharing passenger. In one example, as discussed above with reference to FIGS. 6-8, automated ridesharing dispatch system 300 may avoid using the full capacity of its vehicles in regular operation. This enhances the experience of users who might otherwise feel cramped in vehicles at or near capacity. In another example, as discussed in greater detail below, ridesharing management system 100 may avoid directing the ridesharing vehicle to a fastest route when the fastest route would violate a principle associated with expected user satisfaction. Specifically, certain navigation maneuvers (e.g., backtracking, U-turns, traversing certain roads) can negatively impact the user experience, even if resulting in a faster arrival time. Therefore, as described below, ridesharing management system 100 may determine a driving route longer than alternative driving routes, but nevertheless determine a route that is substantially devoid of navigation maneuvers that negatively impact the user experience.

Figure 21A:
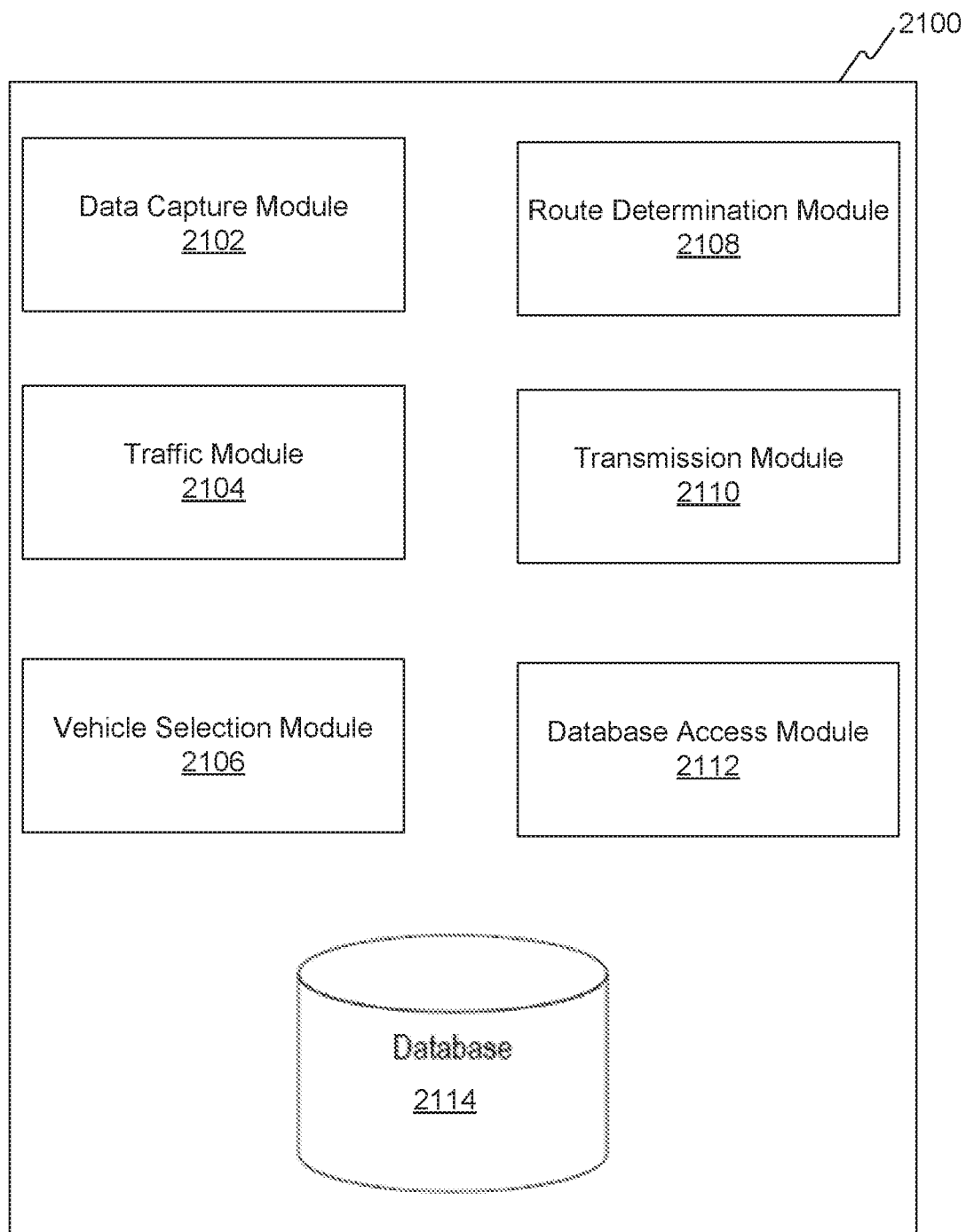
FIG. 21A illustrates an exemplary embodiment of a memory containing software modules consistent with the present disclosure.

FIG. 21A illustrates an exemplary embodiment of a memory 2100 containing software modules consistent with the present disclosure. In particular, as shown, memory 2100 may include a data capture module 2102, a traffic module 2104, a vehicle selection module 2106, a route determination module 2108, a transmission module 2110, a database access module 2112, and a database 2114. Modules 2102, 2104, 2106, 2108, 2110, and 2112 may contain software instructions for execution by at least one processing device, e.g., processor 310, included with automated ridesharing dispatch system 300. Data capture module 2102, traffic module 2104, vehicle selection module 2106, route determination module 2108, transmission module 2110, database access module 2112, and database 2114 may cooperate to perform multiple operations. For example, data capture module 2102 may receive ride requests from a plurality of users and receive indications of current locations of the plurality of ridesharing vehicles.

Traffic module 2104 may receive real time traffic data and enables estimation of the durations of alternatives driving routes. Vehicle selection module 2106 may select a ridesharing vehicle to pick up the plurality of users. Route determination module 2108 may determine a route for the selected ridesharing vehicle. Transmission module 2110 may use a communications interface for sending information to the plurality of users about the pick-up location, and for sending driving directions to the selected ridesharing vehicle based on the determined route. Database access module 2112 may interact with database 2114 which may store a plurality of rules for determining the driving route and any other information associated with the functions of modules 2102-2112. The plurality of rules may include a fastest route for guiding a ridesharing vehicle and a rule for reducing backtracking even in instances where backtracking would result in shorter travel time.

In some embodiments, memory 2100 may be included in, for example, memory 320. Alternatively or additionally, memory 2100 may be stored in an external database 170 (which may also be internal to ridesharing management server 150) or external storage communicatively coupled with ridesharing management server 150, such as one or more database or memory accessible over network 140. Further, in other embodiments, the components of memory 2100 may be distributed in more than one server.

In some embodiments, data capture module 2102 may receive ride requests from a plurality of users, and each ride request may include a starting point and a desired destination. A starting point may refer to a current location of the user, as input by each user through an input device of an associated user device, or as determined by a location service application installed on the user device. A desired destination may refer to a location where the user desires to be taken to, for example, an entrance of a shopping center. In some embodiments, data capture module 2102 may also receive from a plurality of communication devices associated with a plurality of ridesharing vehicles indications of current locations of the plurality of ridesharing vehicles. The current location of the plurality of ridesharing vehicles may be determined by a location service application installed on a driver device, a driving-control device, or by a location determination component in the ridesharing management system 100, which may be a part of or separate from ridesharing management server 150. For example, the indications of current locations of the plurality of ridesharing vehicles may include global positioning system (GPS) data generated by at least one GPS component associated with each ridesharing vehicle.

In some embodiments, traffic module 2104 may include instructions configured to receive historical and/or real time traffic data, including information about at least one of street blockages and atypical congestion. Traffic data may include real-time traffic data regarding a certain geographical region, and may be used to, for example, calculate estimate time of arrival for pick-up locations. The traffic data may also be used for determining the driving route for a particular ride. Real-time traffic data may be received from a real-time traffic monitoring system, which may be integrated in or independent from ridesharing management system 100. In one embodiment, traffic module 2104 may determine the real time traffic data from information received from the plurality of ridesharing vehicles. In some embodiments, traffic module 2104 may also identify an existence of an area of traffic obstruction in a vicinity of the driving route. Traffic obstructions may include scheduled event (e.g., a parade, an infrastructure repair, construction work, etc.) and an unscheduled event (e.g., a road closure, an accident, a public safety incident, or any related environmental condition, such as a fallen tree or powerline, etc.). In another embodiment, traffic module 2104 is configured to predict traffic conditions based on historic traffic data records.

In some embodiments, vehicle selection module 2106 may select a ridesharing vehicle to pick up the plurality of users. In other words, vehicle selection module 2106 may assign the plurality of users to a common ridesharing vehicle. For example, ride service parameters may be transmitted to ridesharing management server 150 for processing the ride request and selecting an available ridesharing vehicle based on one or more ride service parameters. The ride service parameters may include user preference parameters regarding a vehicle ridesharing service, for example, a maximum walking distance from a starting point to a pick-up location, a maximum walking distance from a drop-off location to a desired destination, a total maximum walking distance involved in a ride, a maximum number of subsequent pick-ups, maximum delay of arrival/detour incurred by subsequent pick-ups during a ride, and a selection whether to permit toll road usage during the ride, etc. Ridesharing management server 150 may further be configured to receive user input from user devices (e.g., user devices 120A-120C) as to various ride service parameters and may select a ridesharing vehicle to pick up the user, accordingly.

In some embodiments, route determination module 2108 may determine a route for the selected ridesharing vehicle. The determined route may include a plurality of pick-up and drop-off locations associated with the starting points and desired destinations of the plurality of users. Consistent with the present disclosure, determining the driving route may include selecting pick-up locations and drop-off locations for each of the plurality of users (commonly referred to as "virtual bus stops"), and determining the path between the virtual bus stops. The determined route may pass between all the determined pick-up points. When selecting a virtual bus stop, route determination module 2108 may confirm that the pick-up location is within a maximum walking distance (e.g., 300 meters or less) from the starting point, and that the drop-off location is within a maximum walking distance (e.g., 500 meters or less) to a desired destination. The virtual bus stops for the plurality of users and the driving route may be determined to minimize at least one of: a time duration of each user spends in the ridesharing vehicle, a time duration each user spends waiting in the pick-up location, a distance each user needs to walk from the starting point to the pick-up location, a distance each user needs to walk from the drop-off location to the desired destination, and the number of empty seats in the ridesharing vehicle.

Figure 21B:
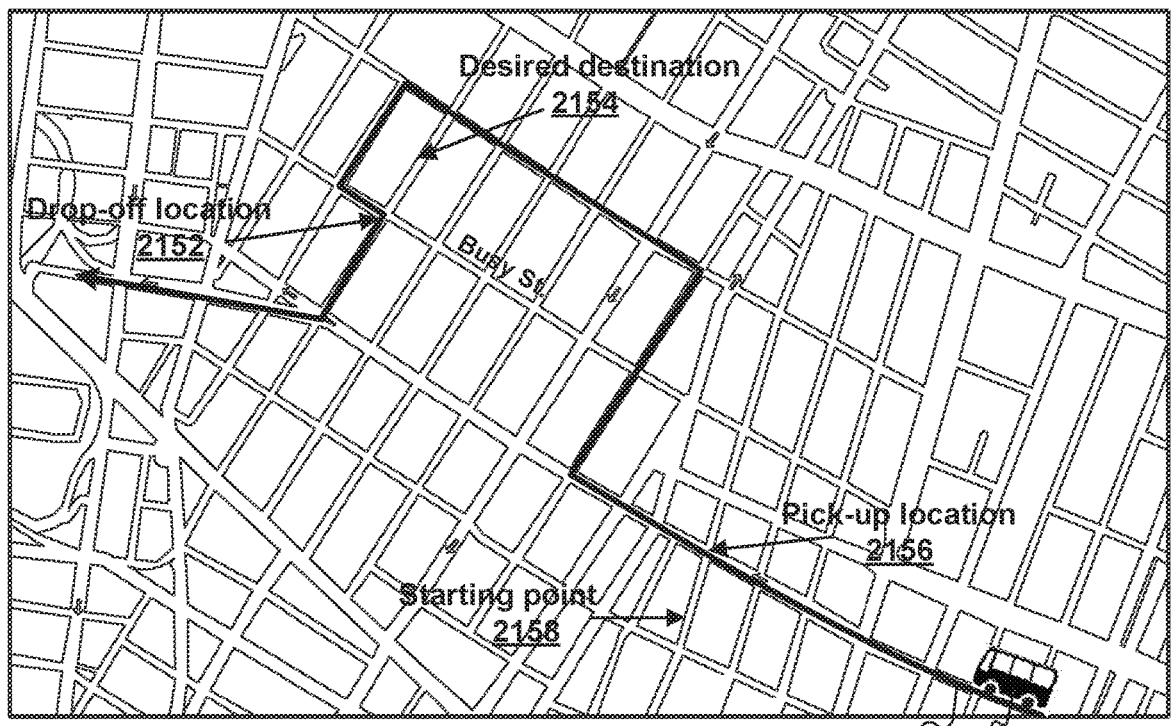
FIGS. 21B and 21C are schematic illustrations of an example map including different driving route alternatives for a ridesharing vehicle according to disclosed embodiments.
Figure 21C:
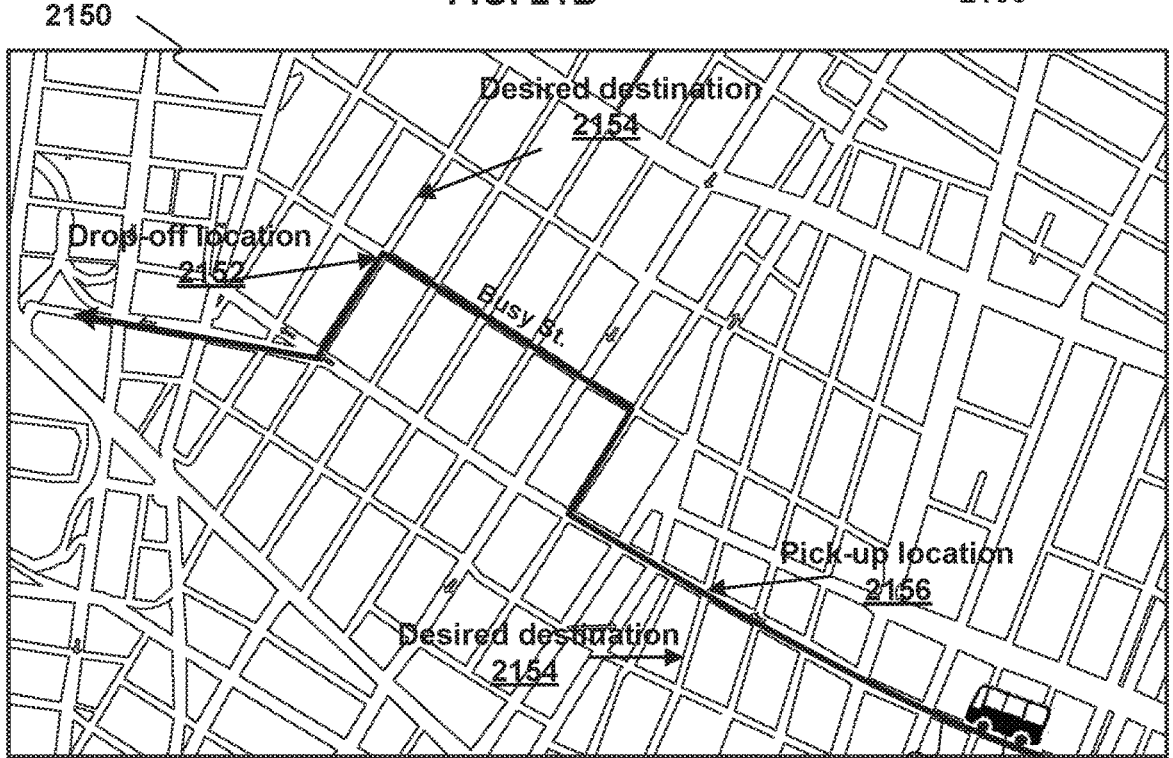

When determining the path between two virtual bus stops, route determination module 2108 may determine a route for the ridesharing vehicle other than the fastest route. Specifically, route determination module 2108 may determine a reduced-backtracking route. The term "reduced-backtracking route" means a route in which nonessential deviations from a trajectory of an average direction of the passengers' desired destinations are minimized. Although an absolute non-backtracking route may yield the most user satisfaction, in some cases (e.g., at an exit from a highway, at a specific road formation, due to certain traffic rules and/or conditions, etc.), selecting an absolute non-backtracking route may not be a feasible option. The reduced-backtracking route is a route in which unnecessary navigation maneuvers (e.g., U-turns, three consecutive left turns, three consecutive right turns, and more) are avoided compared to alternative driving routes. An example of a non-reduced-backtracking route is depicted in FIG. 21B and an example of a reduced-backtracking route is depicted in FIG. 21C. In some embodiments, although route determination module 2108 may give more weight to the rule for reducing backtracking than the rule for fastest route, in some cases, driving route determination module 2108 may override the backtracking rule.

In some embodiments, transmission module 2110 may communicate, based on instructions from vehicle selection module 2106, with ridesharing management server 150 to send to the selected ridesharing vehicle, via a communications interface (e.g., communications interface 360), driving directions according to the determined route. As discussed above, communications interface 360 may include a modem, Ethernet card, or any other interface configured to exchange data with a network, such as network 140 in FIG. 1. For example, ridesharing management server 150 may include software that, when executed by a processor, provides communications with network 140 through communications interface 360 to one or more mobile communications devices 120A-F. In some embodiments, transmission module 2110 may further send to the user, via the communications interface, information that causes a display of walking directions from a starting point to a pick-up location and from a drop-off location to a desired destination. Transmission module 2110 may further send (e.g., via a communications interface) messages to the passengers of a ridesharing vehicle when a route other than the reduced-backtracking route has been selected. The messages may appear in different formats, for example, a text message, an audio message, or a graphical image, which may include text. The messages may specify how much time each passenger is estimated to save by selecting the driving route other than the reduced-backtracking route.

In some embodiments, database access module 2112 may cooperate with database 2114 to retrieve a plurality of rules for determining the driving route, map information, traffic data, environmental condition data, and/or any associated stored data or metadata. For example, database access module 2112 may send a database query to database 2114 which may be associated with database 170. Database 2114 may be configured to store any type of information of use to modules 2102-2112, depending on implementation-specific considerations. For example, route determination module 2108 may be configured to determine a route for the ridesharing vehicle using a plurality of rules stored in database 2114. Route determination module 2108 may further be configured to determine the driving route for the ridesharing vehicle using data stored in database 2114. The stored data may be prior-collected information. Prior-collected information may include ride request information from users and indications of locations of plurality of ridesharing vehicles received from data capture module 2102. Prior-collected information may also include received real time traffic data and information providing a description of the nature, time, and/or date of any traffic conditions and/or environmental conditions received from traffic module 2104

In some embodiments, database 2114 may include separate databases, including, for example, a vector database, raster database, tile database, viewport database, and/or a user input database, configured to store data. The data stored in database 2114 may be received from modules 2102-2112, ridesharing management server 150, from user devices 120A-F and/or may be provided as input using data entry, data transfer, or data uploading. The data stored in the database 2114 may represent multiple data forms including, for example, general mapping and geographic information, latitude and longitude (Lat/Lon) values, world coordinates, tile coordinates, pixel coordinates, Mercator and/or other map projection data, user identifier data, driver identifier data, vehicle identifier data, device type data, viewport data, device orientation data, user input data, geographical scale data, and a variety of other electronic data. Database 2114 may also include, for example, street, city, state, and country data including landmark identifiers and other related information. Database 2114 may also include search logs, cookies, web pages, and/or social network content, etc.

Modules 2102-2112 may be implemented in software, hardware, firmware, a mix of any of those, or the like. For example, if the modules are implemented in software, the modules may be stored in a server (e.g., ridesharing management server 150) or distributed over a plurality of servers. In some embodiments, any one or more of modules 2102-2112 and data associated with database 2114, may, for example, be stored in processor 310 and/or located on ridesharing management server 150, which may include one or more processing devices. Processing devices of ridesharing management server 150 may be configured to execute the instructions of modules 2102-2112. In some embodiments, aspects of modules 2102-2112 may include software, hardware, or firmware instructions (or a combination thereof) executable by one or more processors, alone or in various combinations with each other. For example, modules 2102-2112 may be configured to interact with each other and/or other modules of server 150 and/or a ridesharing management system 100 to perform functions consistent with disclosed embodiments.

FIG. 21B and FIG. 21C are schematic illustrations of an example map including different driving route alternatives for a ridesharing vehicle 2150, according to disclosed embodiments. The map includes a pick-up location 2156 for a passenger with a starting point 2158 and a drop-off location 2152 for a passenger with a desired destination 2154. Drop-off location 2152 is not necessarily for the same passenger that was picked up at pick-up location 2156. The map in FIG. 21B includes a route 2160 that, based on traffic conditions, is the fastest route, while the map in FIG. 21C includes a route 2162 that, based on traffic conditions, would take more time than route 2160 but consistent with the present disclosure is considered as a reduced-backtracking route.

In some embodiments, ridesharing management system 100 is configured to identify multiple alternative route segments from pick-up location 2156 to drop-off location 2152. Thereafter, ridesharing management system 100 is configured to use real-time traffic data to calculate a time estimation for each of the alternative route segments. In the example illustrated in FIGS. 21B and 21C, route 2160 is longer (distance wise) from route 2162, but ridesharing management system 100 estimates that it would take 5 minutes to drive the route segment from drop-off location 2152 to pick-up location 2156 using route 2160, and 8 minutes to drive the route segment from drop-off location 2152 to pick-up location 2156 using route 2162. The reason route 2160 estimated to be is faster than route 2162 is due to traffic congestion determined from, for example, traffic data received by ridesharing management system 100. However, consistent with the present disclosure, route 2162 is considered as a reduced-backtracking route compared to route 2160 because it does not have three consecutive left turns. In one embodiment, ridesharing management system 100 may be configured to select the appropriate route for ridesharing vehicle 2150 based on a plurality of parameters. In one example, when ridesharing vehicle 2150 is carrying five passengers, ridesharing management system 100 is configured to direct ridesharing vehicle 2150 via route 2162 because route 2160 has three consecutive left turns and it may negatively impact the user experience. In another example, when ridesharing vehicle 2150 is carrying only the passenger picked up at pick-up location 2156, ridesharing management system 100 is configured to direct ridesharing vehicle 2150 via route 2160, which is faster.

Figure 22:
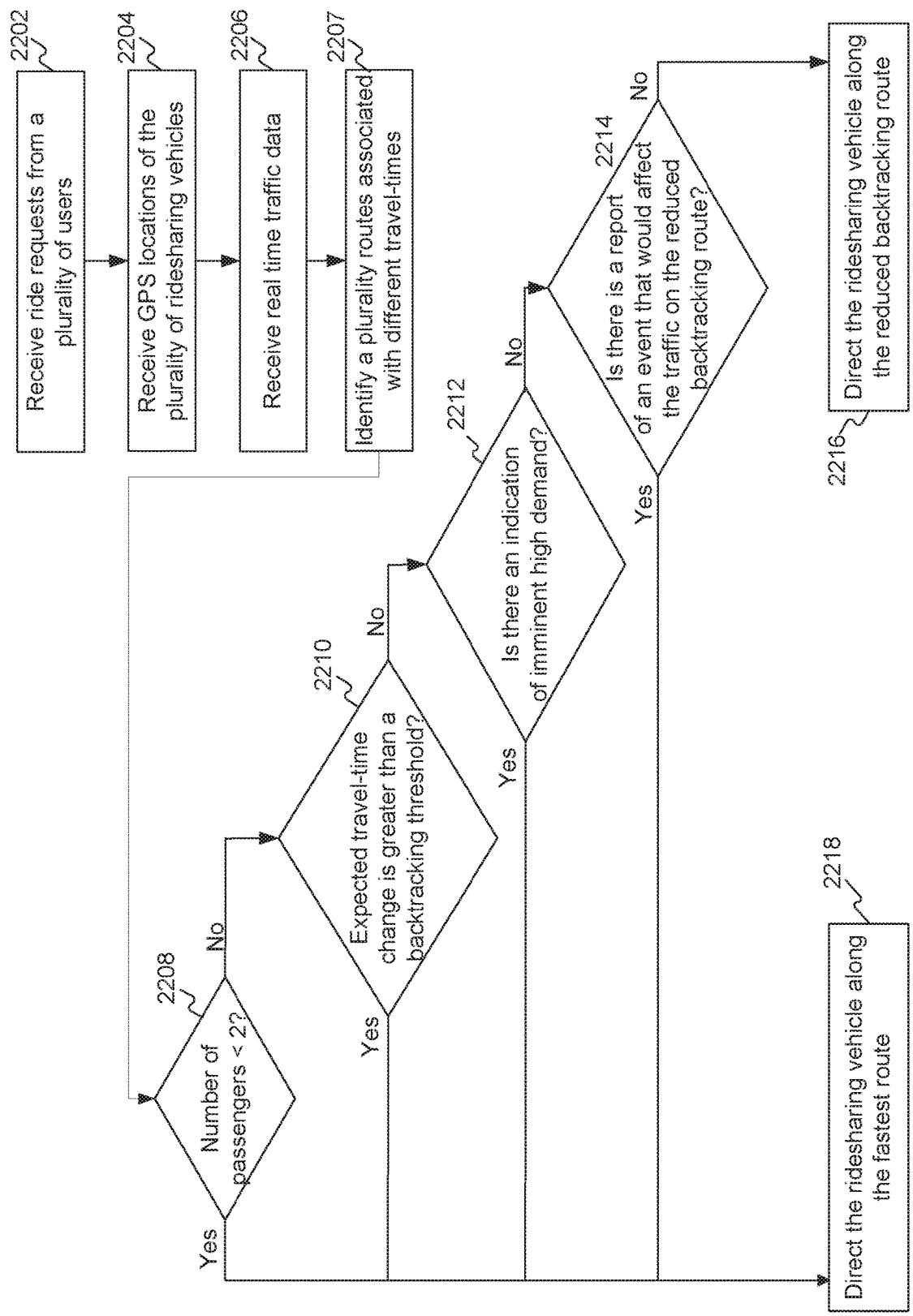
FIG. 22 is a flowchart of an example process used by ridesharing management system to select between the different route alternatives for a ridesharing vehicle.

With reference to the example described above. FIG. 22 depicts a flowchart of an example process 2200 used by ridesharing management system 100 to select between the different route alternatives. Process 2200 begins when ridesharing management system 100 receives ride requests from a plurality of users (block 2202), receives GPS locations of the plurality of ridesharing vehicles (block 2204), and receives real time traffic data (block 2206). Thereafter, and based on the received data, ridesharing management system 100 may identify a plurality routes associated with different travel-times (block 2207), and assign the plurality of users to ridesharing vehicle 2150. In this example, ridesharing management system 100 has identified only two relevant routes: the fastest route (e.g., route 2160) and the reduced-backtracking route (e.g., route 2162). However, a person skilled in the art would recognize that ridesharing management system 100 may identify more than two route alternatives, and that process 2200 specified below may be modified to enable selection between numerous of routes.

As mentioned above, the selection of the appropriate route for ridesharing vehicle 2150 is based on different parameters. Process 2200 continues when ridesharing management system 100 determines whether the number of passengers currently riding ridesharing vehicle 2150 is less than a certain threshold, e.g., two (decision block 2208). In some embodiments—in the context of process 2200, a group of passengers riding to the same drop-off location are considered as a single passenger. When less than, e.g., two passengers riding ridesharing vehicle 2150, ridesharing management system 100 may direct ridesharing vehicle 2150 along the fastest route (block 2218). On the other hand, when two or more passengers are riding ridesharing vehicle 2150, ridesharing management system 100 may determine whether an expected travel-time change is greater than a backtracking threshold. In other words, ridesharing management system 100 may be configured to estimate how much faster the fastest route is. The backtracking threshold may be predetermined (e.g., 10 minutes) or dynamic (e.g., 5 minutes in rush hour and 10 minutes in regular hours). For example, at 3:00 am when traffic is typically light, passengers may mind that the ridesharing vehicle backtracks, and the backtracking threshold may be lower (e.g., two minutes). When the expected travel-time change is greater than a backtracking threshold, ridesharing management system 100 may direct ridesharing vehicle 2150 along the fastest route (block 2218). In the example above, when ridesharing vehicle 2150 carried five passengers route 2160 was estimated to be 3 minutes faster than route 2162, and ridesharing management system 100 determined to use the reduced-backtracking route. But if, for example, due to road construction on street route 2160 was estimated to be 24 minutes faster than route 2162, ridesharing management system 100 may determine to use the faster route.

Process 2200 continues when ridesharing management system 100 determines whether there is an indication of imminent high demand (decision block 2212). In one embodiment, the imminent high demand for ridesharing vehicles may be the result of an inclement weather condition. When there is an indication of imminent high demand, ridesharing management system 100 may direct ridesharing vehicle 2150 along the fastest route (block 2218). On the other hand, when there is no an indication of imminent high demand, ridesharing management system 100 may determine if there is a report or other indication of an event that would affect the traffic on the reduced-backtracking route. In one embodiment, the event may be a scheduled event, for example, when the reduced-backtracking route passes next to a school, ridesharing management system 100 may direct ridesharing vehicle 2150 along the fastest route near the end of the school day. In another embodiment, the event may be an unscheduled event, for example, when the reduced-backtracking route passes next to a building that is on fire, and ridesharing management system 100 may direct ridesharing vehicle 2150 along the fastest route. Accordingly, when ridesharing management system 100 determines that the number of passengers currently riding ridesharing vehicle 2150 is greater than two, the expected travel-time change may be less than a backtracking threshold, and when there is no an indication of imminent high demand and there is no report or other indication of an event that would affect the traffic on the reduced-backtracking route, the system may direct ridesharing vehicle 2150 along the reduce-backtracking route.

Figure 23:
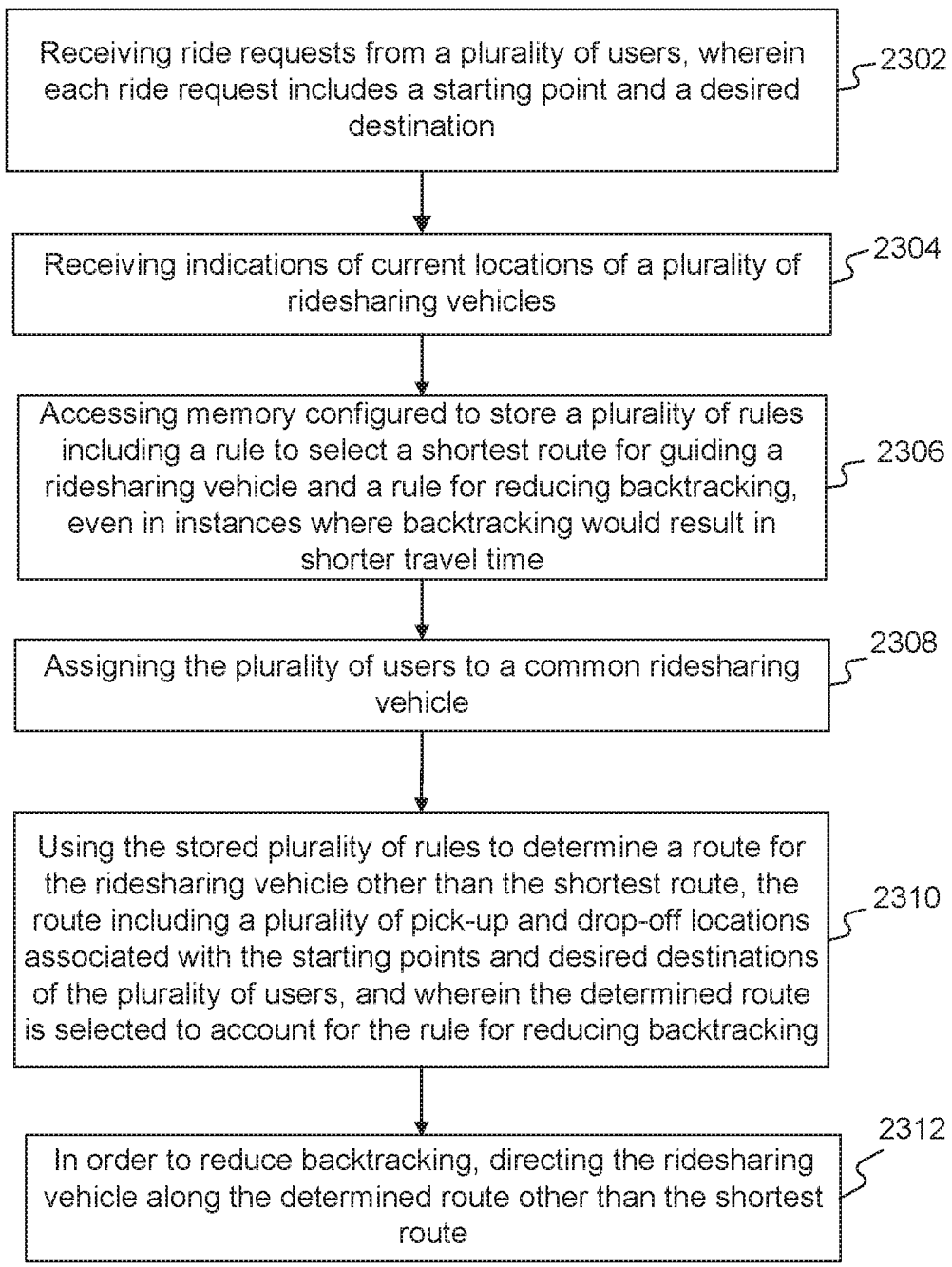
FIG. 23 is a flowchart of an example of a method for managing a fleet of ridesharing vehicles.

Reference is now made to FIG. 23, which depicts an exemplary method 2300 for managing a fleet of ridesharing vehicles consistent with the present disclosure. In one embodiment, the steps of method 2300 may be performed by automated ridesharing dispatch system 300. In the following description, reference is made to certain components of ridesharing management server 150 for purposes of illustration. It will be appreciated, however, that other implementations are possible and that other components may be utilized to implement the exemplary method. It will be readily appreciated that the illustrated method can be altered to modify the order of steps, delete steps, or further include additional steps.

At step 2302, a communications interface (e.g., communications interface 360) may receive ride requests from a plurality of users. Consistent with the present disclosure, each ride request may include a starting point and a desired destination. As mentioned above, the starting point may refer to a current location of the user, as input by the user through an associated user device, or as determined by a location service application installed on the associated user device. In some embodiments, the starting point may be a location different from the current location of the user, for example, a location where the user will subsequently arrive at (e.g., entrance of a building). A desired destination may refer to a location where the user requests to be taken to. In another embodiment, each ride request may include additional information, for example, information identifying the user, a selection of a type ridesharing service, an indication of a maximum walking distance, etc.

At step 2304, the communications interface may receive from a plurality of communication devices associated with a plurality of ridesharing vehicles, indications of current locations of the plurality of ridesharing vehicles. Consistent with the present disclosure, the indications of the current locations of the plurality of ridesharing vehicles may include global positioning system (GPS) data generated by at least one GPS component associated with each ridesharing vehicle. In one example, the plurality of communication devices may include mobile devices such as tablets or smartphones that belong to the drivers of the ridesharing vehicles. In another example, the plurality of ridesharing vehicles includes multiple smart vehicles and each communication device may be a component of a smart vehicle. The term "smart vehicles" refers to vehicles (autonomously and/or manually-driven) with computing resources, location determination components, and communication devices. A smart vehicle may communicate with ridesharing management system 100 independently to the driver.

At step 2306, a processing device (e.g., processor 310) may access memory (e.g., database 170) configured to store a plurality of rules including a rule to select a fastest route for guiding a ridesharing vehicle and a rule for reducing backtracking, even in instances where backtracking would result in a shorter travel time. In addition to the fastest route rule and the reduced-backtracking rule, the memory is further configured to store additional rules for determining the driving route for the ridesharing vehicle. For example, a rule to avoid specific roads, a rule to minimize a time duration in which each assigned user spends in the ridesharing vehicle, a rule to minimize a time duration in which each assigned user spends waiting, a rule to minimize a distance each assigned user needs to walk from the starting point to the pick-up location, a rule to minimize a distance each assigned user needs to walk from the drop-off location to the desired destination, and a rule to minimize the number of empty seats in the ridesharing vehicle.

At step 2308, the processing device may assign the plurality of users to a common ridesharing vehicle (e.g., ridesharing vehicle 2150). Consistent with the present disclosure, the processing device is further configured to assign a user to the ridesharing vehicle based on at least some of the following parameters: a location of the ridesharing vehicle, a driving direction of the ridesharing vehicle, a driving route of the ridesharing vehicle, a number of passengers riding the ridesharing vehicle, a number of users assigned to the ridesharing vehicle and scheduled to be picked up, the virtual bus stops that the ridesharing vehicle is scheduled to stop, the desired destinations of all the users assigned to the ridesharing vehicle, real time traffic data, the user's starting point, the user's desired destination, the user's personal preferences, and the type of service the user selected.

At step 2310, the processing device may use the stored plurality of rules to determine a route for the ridesharing vehicle other than the fastest route. The determined route including a plurality of pick-up and drop-off locations associated with the starting points and desired destinations of the plurality of users. Consistent with the present disclosure, the processing device may select the determined route to account for the rule for reducing backtracking. In one embodiment, applying the rule for reducing backtracking means routing the ridesharing vehicle in a manner avoiding a trajectory opposite to an average direction of the plurality of users' desired destinations. For example, in some instances, the system may avoid a trajectory of 120-180 degrees away from the user's desired destination. In another embodiment, applying the rule for reducing backtracking means routing the ridesharing vehicle in a manner avoiding three consecutive left turns. In another embodiment, applying the rule for reducing backtracking means routing the ridesharing vehicle in a manner avoiding three consecutive right turns. In another embodiment, applying the rule for reducing backtracking means routing the ridesharing vehicle in a manner reducing U-turns. In another embodiment, applying the rule for reducing backtracking means routing the ridesharing vehicle in a manner reducing unnecessary navigation maneuvers. In another embodiment, applying the rule for reducing backtracking may include routing the ridesharing vehicle in a manner that takes into consideration a combination of duration and distance.

In some embodiments, the processing device may receive real time traffic data and may calculate an expected travel-time change associated with users currently riding in the ridesharing vehicle when the ridesharing vehicle is directed along a route with backtracking as compared to a route with reduced backtracking. In other words, the processing device may estimate how much time the passengers will save if the ridesharing vehicle would take the driving route with backtracking. In one embodiment, the expected travel-time change may be calculated separately for each of the users currently riding the ridesharing vehicle. Alternatively, the expected travel-time change may be calculated collectively for the users currently riding the ridesharing vehicle. Consistent with the present disclosure, the processing device may be further configured to override the backtracking rule when the received traffic data is indicative of at least one of street blockages and atypical congestion. For example, the traffic data may be indicative of a road closure, a parade, an accident, a public safety incident, and an infrastructure repair. Additionally, the processing device may be further configured to override the backtracking rule in response to a received indication of imminent high demand for rides. Additionally, the processing device may be further configured to override the backtracking rule when an expected travel-time change is higher than a backtracking threshold. As described above, the value of the backtracking threshold may be dynamic and may be determined based on at least one of a time of day and a type of users currently riding the ridesharing vehicle (e.g., regular users. VIP users, students, and more).

At step 2312, the processing device may direct the ridesharing vehicle along the determined route other than the fastest route in order to reduce backtracking. In the example above, ridesharing vehicle 2150 may be directed via route 2162 and not 2160. However, as discussed above, consistent with disclosed embodiments the processing device may be further configured to override the backtracking rule. In one scenario, the processing device may determine an updated route along which to direct the ridesharing vehicle, and to change at least one drop-off location of the plurality of users after determining the updated route. In a similar scenario, the processing device may be further configured to override the backtracking rule, determine an updated route along which to direct the ridesharing vehicle, and to reassign a user scheduled to be picked up by the ridesharing vehicle to another ridesharing vehicle. Typically, these scenarios happen when one of the parameter described above has changed. For example, with reference to FIGS. 21B and 21C, the following scenario may happen, processing device may receive traffic information that an accident occurred on a particular street and that it would take 18 minutes to drive from drop-off location 2152 to pick-up location 2156 using route 2162 (instead on 8 minutes). Accordingly, the processing device may override the backtracking rule and either change at least one drop-off location of the plurality of users after determining the updated route or reassign a user scheduled to be picked up by the ridesharing vehicle to another ridesharing vehicle. In some embodiments, the processing device may receive at least one additional ride request from at least one additional user and change the determined route to pick-up at the least one additional user.

Route Planning Based on Environmental Conditions

In some embodiments, ridesharing management server 150 may receive a ride request from, for example, user 130A sent through user device 120A. The ride request may include a starting point and a desired destination of the user. When processing such rides requests in order to timely navigate the user from the starting point to the desired destination, the system may need to take into account traffic or other environmental conditions. For example, existing systems may not be equipped to determine an optimum route that avoids traffic or environmental conditions. Moreover, although existing systems may provide a choice to a user of different route options. given the increasing frequency of environmental disturbances, may nevertheless fail to provide real-time route planning based on traffic or environmental conditions. Presently disclosed embodiments, on the other hand, address this technical problem by providing route planning based on received user ride requests and detected or anticipated environmental conditions.

For example, in one embodiment, ridesharing management server 150 may receive real time traffic data, including information about at least one of street blockages and atypical congestion from a plurality of driver devices (e.g., driver devices 120D and 120E) associated with drivers (e.g., drivers 130D and 130E) operating vehicles. Ridesharing management server 150 may be configured to send, based on the real time traffic data, ride service assignments (e.g., including pick-up and drop-off location information) to the plurality of driver devices associated with the drivers, and/or a driving-control device (e.g., driving-control device 120F) associated with an autonomous vehicle (e.g., autonomous vehicle 130F), to substantially avoid the street blockages and atypical congestion.

In some embodiments, ridesharing management server 150 may identify a change in the area of traffic obstruction, based on detected traffic data and related environmental conditions, and may send updated driving directions to a user, driver device and/or a driving-control device associated with an autonomous vehicle to substantially avoid the area of traffic obstruction. Ridesharing management server 150 may determine an alternative pick-up location to accommodate the change in the area of traffic obstruction. Ridesharing management server 150 may send to the user information about the alternative pick-up location and update the driving directions to accommodate the change in the area of traffic obstruction.

In some examples, ridesharing management server 150 may also predict an area that may have traffic obstruction in the near future, based on traffic data and environmental conditions stored, for example, in database 170, and may determine pick-up and drop-off locations and send corresponding walking instructions to one or more users sending ride requests to ridesharing management server 150. A user may then follow the walking instructions to move to a pick-up location that avoids the anticipated traffic obstruction.

As discussed above, user devices 120A-120C, driver devices 120D and 120E, and driving-control device 120F may respectively be installed with a user side ridesharing application, and a corresponding driver side ridesharing application. Mobile communications device 200 may be installed with the user side ridesharing application, and the corresponding driver side ridesharing application, and/or other software to perform one or disclosed embodiments, such as on mobile communications devices 120A-120F. Mobile communications device 200 may retrieve GPS/navigation instructions 268 from memory 250 and may facilitate GPS and navigation-related processes or routes associated with drivers 130D and 130E in communication with ridesharing management server 150. Ridesharing management server 150 may receive real time traffic data including any traffic obstruction in a vicinity of a user's starting point, select a vehicle-for-hire to pick up the user, identify a pick-up location, send to user 130A-C information about the pick-up location, and send to driver devices 120D and 120E associated with drivers 130D and 130E, and driving-control device 120F driving directions to the pick-up location, as described in greater detail below.

In some embodiments, ridesharing management server 150 may transmit information to user device 120A-C, which may be, for example, a smartphone or tablet having a dedicated application installed therein. A graphical user interface (GUI) including a plurality of user-adjustable feature user side or driver-side ridesharing application settings may be included on a display of mobile communications devices 120A-120C to visibly output information to one or more users 130A-C and drivers 130D and 130E.

Figure 24:
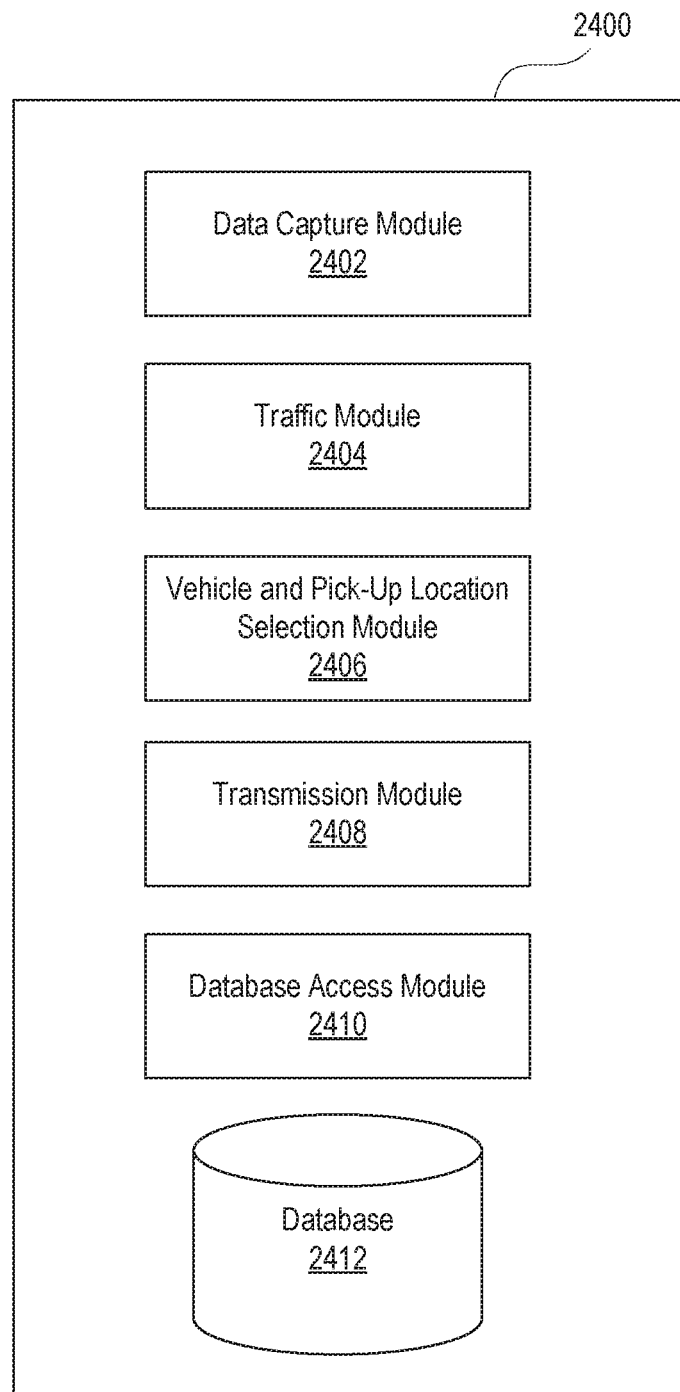
FIG. 24 illustrates an exemplary embodiment of a memory containing software modules consistent with the present disclosure.

FIG. 24 illustrates an exemplary embodiment of a memory 2400 containing software modules consistent with the present disclosure. In particular, as shown, memory 2400 may include a data capture module 2402, a traffic module 2404, a vehicle and pick-up location selection module 2406, a transmission module 2408, a database access module 2410, and a database 2412. Modules 2402, 2404, 2406, 2408, and 2410 may contain software instructions for execution by at least one processing device. e.g., processor 310, included with automated ridesharing dispatch system 300. Data capture module 2402, traffic module 2404, vehicle and pick-up location selection module 2406, transmission module 2408, database access module 2410, and database 2412 may cooperate to perform multiple operations. For example, data capture module 2402 may receive a ride request from a user and receive indications of current locations of the plurality of vehicles-for-hire. Traffic module 2404 may receive real time traffic data and identify an existence of an area of traffic obstruction. Vehicle and pick-up location selection module 2406 may select a vehicle-for-hire to pick up the user and identify a pick-up location. Transmission module 2408 may send to the user, via a communications interface, information about the pick-up location, and may send to the selected vehicle-for-hire, via a communications interface, driving directions to the pick-up location. Database access module 2410 may interact with database 2412 which may store any information associated with the functions of modules 2402-2408.

In some embodiments, memory 2400 may be included in, for example, memory 320 storing programs 330 including, for example, server app(s) 332, operating system 334, and data 340, and a communications interface 360 discussed above. Alternatively or additionally, memory 2400 may be stored in an external database 170 (which may also be internal to ridesharing management server 150) or external storage communicatively coupled with ridesharing management server 150, such as one or more database or memory accessible over network 140. Further, in other embodiments, the components of memory 2400 may be distributed in more than one server.

In some embodiments, data capture module 2402 may receive a ride request from a user, and the ride request may include a starting point and a desired destination. A starting point may refer to a current location of the user, as input by the user through an input device of an associated user device, or as determined by a location service application installed on the user device. In some embodiments, the starting point may be a location different from the current location of the user, for example, a location where the user will subsequently arrive at (e.g., an entrance of a building after walking a predetermined distance). A desired destination may refer to a location where the user requests to be taken to, including for example, a drop off-point located at or near a particular destination point (e.g., an entrance of a different building). In some embodiments, data capture module 2402 may also receive from a plurality of communication devices associated with a plurality of vehicles-for-hire indications of current locations of the plurality of vehicles-for-hire. The current location of the plurality of vehicles-for-hire may be determined by a location service application installed on a driver device, a driving-control device, or by a location determination component in the ridesharing management system 100, which may be a part of or separate from ridesharing management server 150.

In some embodiments, data capture module 2402 may also include software instructions for categorizing data obtained by ridesharing management server 150 (and obtained from other servers and/or user devices 120A-C over network 140) into a plurality of categories including, for example, ride request route information and vehicle-for-hire locations. Data received may include audio and image data, captured, by, for example, an image sensor or a microphone associated with vehicle-for-hires and a plurality of user devices. Data received from ridesharing management server 150 may also include GPS data and/or other user 130A-C or driver 130D-E device identifiers related to mobile communication devices 120A-F. In some embodiments, image data, audio data. GPS data, and user 130A-C or driver 130D-E data may be preprocessed by data capture module 2402. Preprocessing may include, for example, sorting, filtering, and or automatically storing or categorizing data relating to ride requests, route information, and/or vehicle-for-hire locations in database 170.

In some embodiments, traffic module 2404 may include instructions configured to receive historical and/or real time traffic data, including information about at least one of street blockages and atypical congestion. Traffic data may include real-time traffic data regarding a certain geographical region, and may be used to, for example, calculate estimate pick-up and drop-off times, and determine an optimal route for a particular ride. Real-time traffic data may be received from a real-time traffic monitoring system, which may be integrated in or independent from ridesharing management system 100. Traffic module 2404 may determine real time traffic data information received from the plurality of communication devices associated with the plurality of vehicles-for-hire. In some embodiments, traffic module 2404 may also identify an existence of an area of traffic obstruction in a vicinity of the user's starting point. Traffic obstructions may include a road closure, a parade, an accident, a public safety incident, an infrastructure repair, a car accident, construction work, or any related environmental condition, such as a fallen tree or powerline. The area of traffic obstruction may be a region where traffic flow is slower than in an adjacent region. Other types of obstructions contemplated by one of ordinary skill in the art are consistent with the disclosed embodiments.

In some embodiments, vehicle and pick-up location selection module 2406 may select a vehicle-for-hire to pick up the user. For example, ride service parameters may be transmitted to ridesharing management server 150 for processing the request and selecting an available vehicle-for-hire based on the ride service parameters. Ride service parameters may include user preference parameters regarding a vehicle ridesharing service, for example, a maximum walking distance from a starting point to a pick-up location, a maximum walking distance from a drop-off location to a desired destination, a total maximum walking distance involved in a ride, a maximum number of subsequent pick-ups, maximum delay of arrival/detour incurred by subsequent pick-ups during a ride, and a selection whether to permit toll road usage during the ride, etc. Ridesharing management server 150 may further be configured to receive user input from user devices (e.g., user devices 120A-120C) as to various ride service parameters and may select a vehicle-for-hire to pick up the user, accordingly.

In some embodiments, vehicle and pick-up location selection module 2406 may also identify a pick-up location, which may be remote from the user's starting point, and peripheral to the area of traffic obstruction. Vehicle and pick-up location selection module 2406 may select the pick-up location such that a path from a current location of the selected vehicle-for-hire to the pick-up location avoids the area of traffic obstruction. For example, a ride request may be associated with a maximum walking distance (e.g., 300 meters) from a starting point to a pick-up location that is remote from the user's starting point, as discussed above. When selecting an available vehicle to pick up the user, vehicle and pick-up location selection module 2406 may also include in the assignment an assigned pick-up location within the maximum walking distance (e.g., 300 meters or less from the starting point). Similarly, a ride request may be associated with a maximum walking distance (e.g., 500 meters) from a drop-off location to a desired destination. When selecting an available vehicle to pick up the user, vehicle and pick-up location selection module 2406 may also include in the assignment an assigned drop-off location within the maximum walking distance (e.g., 500 meters or less from the desired destination). For requests associated with a maximum total walking distance relative to both the pick-up location and the drop-off location (e.g., a user is willing to walk up to a combined distance of one kilometer to both reach the pick-up location and to reach a desired destination from the drop-off location), when assigning an available vehicle to pick up the user, vehicle and pick-up location selection module 2406 may select an assigned pick-up location and an assigned drop-off location accordingly (e.g., the combined distance from the user's starting point to the pick-up location and from the drop-off location to the desired destination is equal to or less than one kilometer).

In some embodiments, transmission module 2408 may communicate, based on instructions from vehicle and pick-up location selection module 2406, with ridesharing management server 150 to send to the user, via a communications interface (e.g., communications interface 360), information about the pick-up location. As discussed above, communications interface 360 may include a modem, Ethernet card, or any other interface configured to exchange data with a network, such as network 140 in FIG. 1. For example, ridesharing management server 150 may include software that, when executed by a processor, provides communications with network 140 through communications interface 360 to one or more mobile communications devices 120A-F. In some embodiments, transmission module 2408 may also send to the selected vehicle-for-hire, via the communications interface, driving directions to the pick-up location. The transmitted driving directions may substantially avoid an area of traffic or other obstruction or environmental condition. In some embodiments, transmission module 2408 may further send to the user, via the communications interface, walking directions from the drop-off location to the desired destination.

In some embodiments, transmission module 2408 may also communicate with ridesharing management server 150 to send via a communications interface a first message to user device 120A to cause an indication of a calculated estimated pick-up time to appear on a display of user device 120A. Transmission module 2408 may also send a second message to user device 120A walking directions from the drop-off location to the desired destination. Transmission module 2408 may further send via a communications interface in a message to the selected vehicle-for-hire driving directions and an estimated time of travel to the pick-up location. The messages may appear in different formats, for example, a text message including an estimated pick-up time, an audio message, or a graphical image, which may include text. Transmission module 2408 may also communicate confirmation messages and notification and/or alerts based on detected changes in real-time traffic data. Transmission module 2408 may also transmit selected maps for mobile devices 120A-F in accordance with instructions determined by vehicle and pick-up location selection module 2406.

In some embodiments, database access module 2410 may cooperate with database 2412 to retrieve map information, traffic data, environmental condition data, and/or any associated stored data or metadata. For example, database access module 2410 may send a database query to database 2412 which may be associated with database 170. Database 2412 may include a map vector-based database or a map raster-based database, and database access module 2410 may be configured to extract a map image from a larger pre-assembled map image, which may be delivered to, for example, user device 120A-C or driver device 120D-F for display. In some embodiments, instead of a vector-based or raster-based system, a tile-based system may be implemented from database 2412. For example, database access module 2410 may instruct processor 310 to send a request for map data to an external map tile server, and mobile devices 120A-F may receive a set of map tiles corresponding to a ride request. In other embodiments, database access module 2410 may instruct a tile maker program module to divide raster images into a plurality of discrete map tiles from a painter library or rich map engine library that is commercially available. Database access module 2410 may instruct processor 310 to compile a received set of cut map tiles in a grid, position the tile grid with respect to a clipping shape, and may output the grid as a single map as part of a user or driver side ridesharing application displayed within a GUI or web browser of mobile devices 120A-F. Database access module 2410 may select map information in accordance with GPS data and determined pick-up and drop-off locations specified by user 120A-C, vehicle-for-hire driver 130D-E locations, and identified locations of traffic obstructions.

Database 2412 may be configured to store any type of information of use to modules 2402-2410, depending on implementation-specific considerations. For example, in embodiments in which traffic module 2404 is configured to provide information about traffic conditions to the driver of a vehicle-for-hire, database 2412 may also retrieve stored prior-collected information. Prior-collected information may include ride request information from users and indications of locations of plurality of vehicles-for-hire received from data capture module 2402. Prior-collected information may also include received real time traffic data and information providing a description of the nature, time, and/or date of any traffic conditions and/or environmental conditions received from traffic module 2404. The description may include words and/or images (e.g., photographs, icons, symbols, etc.) representing the conditions. In some embodiments, database 2412 may store one or more images received from traffic module 2402 that include traffic data including congestion and/or any environmental conditions. Prior-collected information may also include pick-up locations received from vehicle and pick-up location selection module 2406 or any transmitted information received from transmission module 2410.

In some embodiments, database 2412 may include separate databases, including, for example, a vector database, raster database, tile database, viewport database, and/or a user input database, configured to store data. The data stored in database 2412 may be received from modules 2402-2410, ridesharing management server 150, from user devices 120A-F and/or may be provided as input using data entry, data transfer, or data uploading. The data stored in the database 2412 may represent multiple data forms including, for example, general mapping and geographic information, latitude and longitude (Lat/Lon) values, world coordinates, tile coordinates, pixel coordinates, Mercator and/or other map projection data, user identifier data, driver identifier data, vehicle identifier data, device type data, viewport data, device orientation data, user input data, geographical scale data, and a variety of other electronic data. Database 2412 may also include, for example, street, city, state, and country data including landmark identifiers and other related information. Database 2412 may also include search logs, cookies, web pages, and/or social network content, etc.

Modules 2402-2410 may be implemented in software, hardware, firmware, a mix of any of those, or the like. For example, if the modules are implemented in software, the modules may be stored in a server (e.g., ridesharing management server 150) or distributed over a plurality of servers. In some embodiments, any one or more of modules 2402-2410 and data associated with database 2412, may, for example, be stored in processor 310 and/or located on ridesharing management server 150, which may include one or more processing devices. Processing devices of ridesharing management server 150 may be configured to execute the instructions of modules 2402-2410. In some embodiments, aspects of modules 2402-2410 may include software, hardware, or firmware instructions (or a combination thereof) executable by one or more processors, alone or in various combinations with each other. For example, modules 2402-2410 may be configured to interact with each other and/or other modules of server 150 and/or a system 100 to perform functions consistent with disclosed embodiments.

Figure 25:
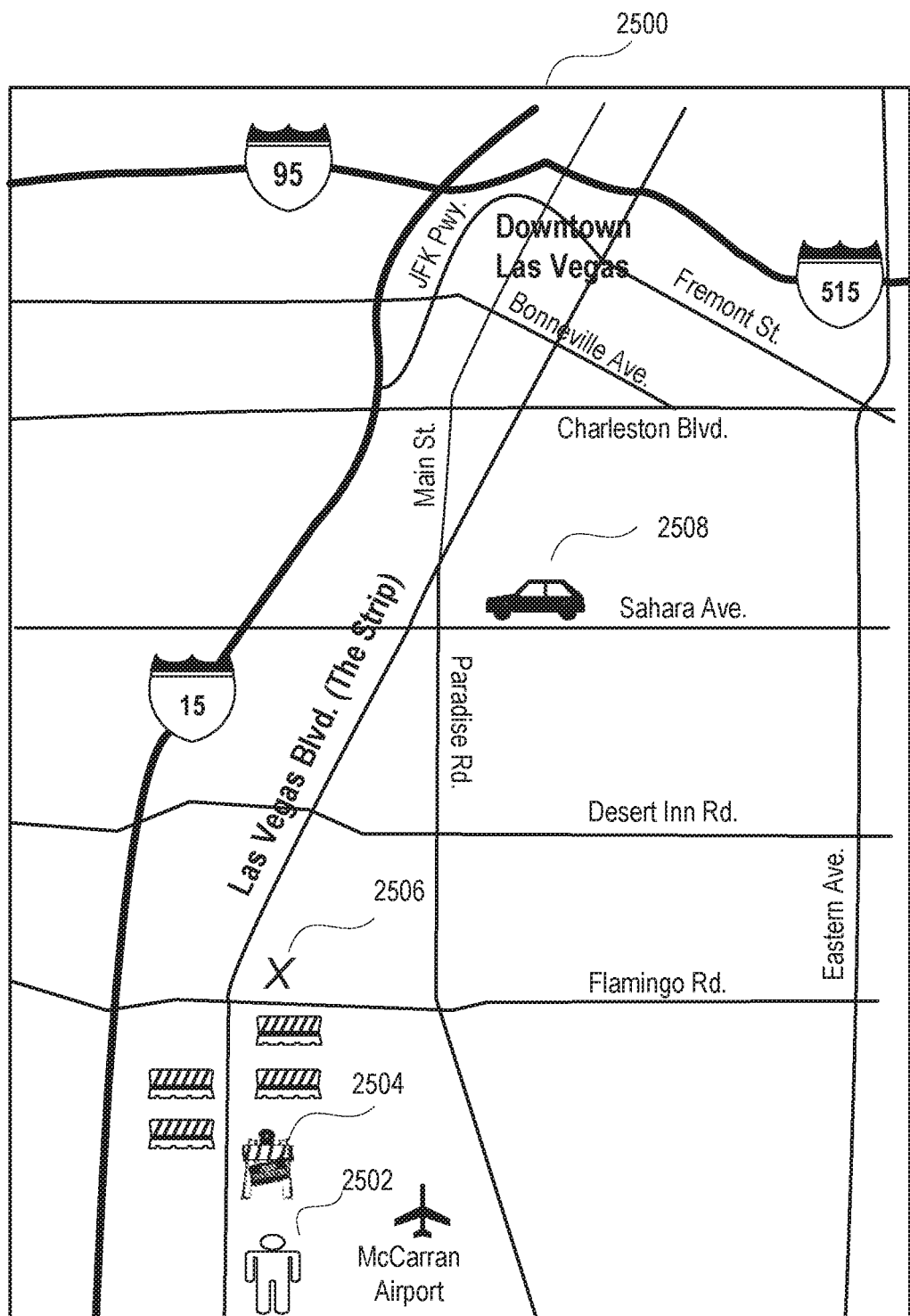
FIG. 25 is a schematic illustration of an example of a map including map information used for ridesharing purposes according to a disclosed embodiment.

FIG. 25 is a schematic illustration of an example of a map 2500 including map information used for ridesharing purposes according to a disclosed embodiment. Map 2500 may include a map implemented on user-side and/or drive-side ridesharing applications. In the example shown in FIG. 25, map 2500 includes a map of the city of Las Vegas including McCarran Airport, Las Vegas Blvd., and Downtown Las Vegas. Map 2500 may include a user 2502 located, for example, on Las Vegas Blvd. near McCarran Airport and a traffic obstruction 2504 located nearby on Las Vegas Blvd. prior to the intersection of Flamingo Rd. Traffic obstruction 2504 may be representative of traffic-based environmental conditions including, for example, construction work, traffic, and/or both. In some embodiments, other environmental conditions (not shown) such as at least one of a road closure, a parade, an accident, a public safety incident, and an infrastructure repair may be included as icons or graphics displayed on map 2500 as alternatives to or in addition to traffic obstruction 2504. Further, although the indication of the traffic obstruction shown in FIG. 25 is an icon, in some embodiments, in addition to the icon or as an alternative to the icon, the indication of the traffic obstruction may include words describing the traffic obstruction and/or images of the traffic obstruction.

Map 2500 may be displayed as part of a GUI visible on, for example, mobile devices 120A-F. In the example shown in FIG. 25, user 2502 may send a request for pick up at a present location along Las Vegas Blvd. near McCarran Airport and may request to be dropped off at a requested destination, such as on Las Vegas Blvd. at the intersection of Desert Inn Rd. Alternatively, as another example, user 2502 may request to be dropped off at another destination, such as Downtown Las Vegas. Consistent with the disclosure, different user pick-up points and different destination points may be inputted by user 2052 operating user device 120A-C and sent to ridesharing management server 150. In some embodiments, a plurality of vehicles for hire located in the vicinity of user 2502 may be displayed and/or updated in real-time on map 2500. For example, map 2500 shows a vehicle 2508 located on Sahara Ave. at the time user 2502 submits a ride request. In some embodiments, data related to distances of one or more vehicles-for-hire to user 2502 and/or estimated times to reach user 2502 may be displayed and/or updated in real-time on map 2500 according to preferences of user 2502. In addition, map 2500 may be zoomed-in or zoomed-out based on preferences of user 2502.

In some embodiments, map 2500 may identify a user location, allow a user to subsequently identify a desired pick-up or drop-off point for ridesharing, and/or identify a traffic or environmental condition in relation to the pick-up and drop off points so as to avoid the obstruction during ridesharing. Additionally, map 2500 may include buttons (not shown) for user input to facilitate a pick-up request based on a user's location. For example, based on user 2502 selection of a button, a prompt to a user may ask for permission to access the current GPS location of smartphone 120A. In response to user approval enabling access to a current GPS location, processor 310 may then zoom the displayed map 2500 image to fit the map data to the boundaries of smartphone 120A viewport, and/or may surround the map data around an origin aligned with current geographic location of smartphone 120A. In some embodiments, selection of buttons may provide a dialogue box to a user to allow for entry of text indicating a desired zip code (e.g., 88901) or a geographic area (e.g., Las Vegas), or a current location or landmark (e.g., McCarron Airport) and an intended destination address (e.g., Downtown Las Vegas). Further, the user may then identify a desired pick-up and/or drop off point within the confines of the displayed map 2500 image by making selections (e.g., selections made on a touch screen) and/or through user input (e.g., spoken commands, text, etc.).

In some embodiments, at least one processor (e.g., processor 310) may be configured to receive information from an external source, predict an area that will have traffic obstruction in the near future, and use the predicted area in determining the pick-up location. For example, in some embodiments, the viewport of smartphone 120A may be configured to implement maps from other sources available over the network or from another digital mapping software application. GUIs may include display of a web browser including a search tool bar (not shown) configured to receive and process search queries related to displayed map data received from an external source or other sources available over the network. The search tool bar may allow for user 2502 to search for a displayed map area for one or more landmarks (e.g., Caesar's Palace), including but not limited to hotels, gas stations, etc. In some embodiments, a scale may be displayed on map 2500 and may indicate distance between streets and landmarks. In some embodiments, a request for map data may include a request based on a selection of button to use the current location of smartphone 120A, as discussed above. The request for map data may further include a request for at least one of a road map, satellite map, hybrid map, and terrain type map formats.

As discussed above, selection module 2404 may determine one or more routes based on a ride request, including preferred pick-up and drop-off locations, and detected traffic and/or environmental conditions in the vicinity. For example, selection module 2404 may determine a direct route for navigating vehicle 2508 to user 2502 by traveling on Sahara Ave, to Las Vegas Blvd. and proceeding to McCarran Airport. However, when taking into account traffic obstruction 2504, consistent with disclosed embodiments, ridesharing management sever 150 may instead determine a different pick-up point in order to avoid traffic obstruction 2504.

For example, ridesharing management server 150 may determine a different pick-up point completely remote from the user's starting point, which in this example, may be peripheral to the area of traffic obstruction 2504. In some embodiments, transmission module 2406 may instruct ridesharing management server 150 to send to user 2502, via the GUI communications interface of map 2500, information about the pick-up location, which may be represented by icon 2506 (e.g., an "X" marking the pick-up location) on map 2500. Icon 2506 designates a location that is within walking distance to the current location of user 2502. As shown, the pick-up location at icon 2506 is past traffic obstruction 2504. Walking instructions to the pick-up point may be provided. Ridesharing management server 150 may also send driver instructions along route 2514 to avoid traffic so as to pick up user 2502 in a more expedited fashion. Further, as discussed earlier, ridesharing management server 150 may determine the pick-up point taking into account a maximum walking distance according to a preference of user 2502.

In some embodiments, vehicle and pick-up location selection module 2406 may select a vehicle-for-hire in accordance with real time traffic data received at traffic module 2404. For example, if a vehicle has a closest route to a desired destination, but has to back track to avoid a traffic or environmental condition, vehicle and pick-up location selection module 2406 may instead select another vehicle, and have it take a longer route. Alternatively, vehicle and pick-up location selection module 2406 may select a vehicle based on other service parameters, including for example, a maximum walking distance from the starting point to a pick-up location, a maximum walking distance from a drop-off location to a desired destination, a total maximum walking distance involved in a ride, a maximum number of subsequent pick-ups, maximum delay of arrival/detour incurred by subsequent pick-ups during a ride, and a selection whether to permit toll road usage during the ride, as discussed above.

Figure 26:
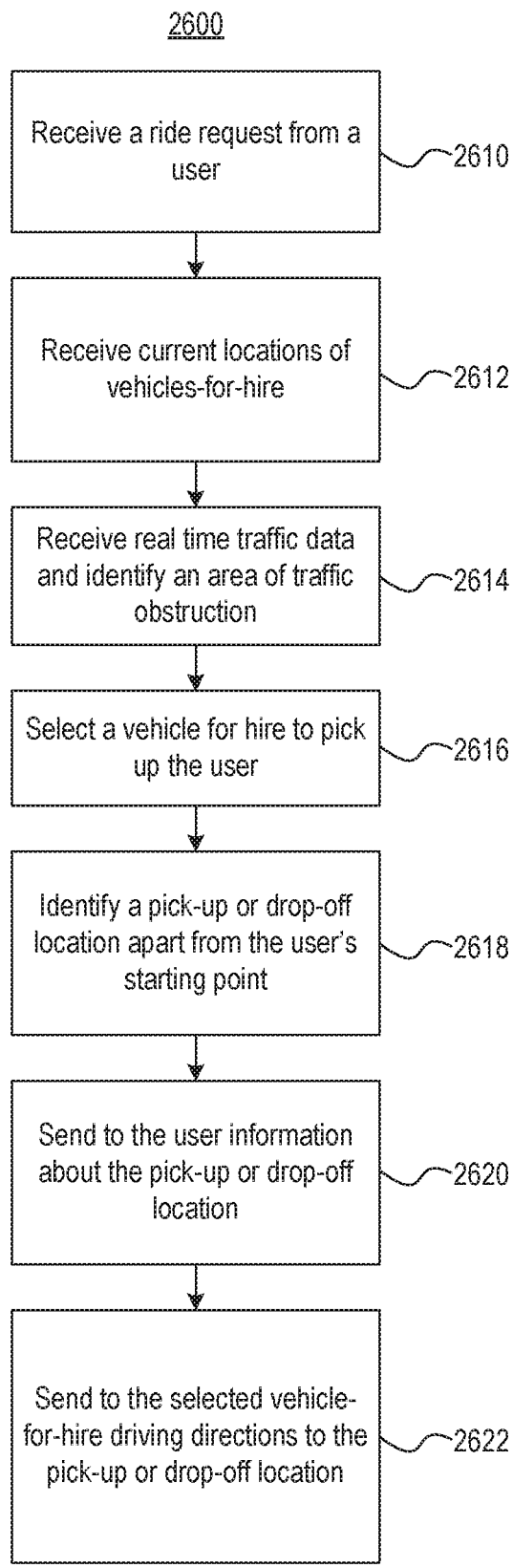
FIG. 26 is a flowchart of an example of a method for directing a vehicle-for-hire and a prospective passenger to a pick-up or drop-off location to avoid traffic congestion.

FIG. 26 is a flowchart of an example of a method 2600 for directing a vehicle-for-hire and a prospective passenger to a remote pick-up location to avoid traffic congestion. Steps of method 2600 may be performed by one or more processors of ridesharing management server 150 and/or memory 320 and memory modules 2400. Further, as discussed earlier, although the following example is in the context of traffic congestion, the disclosed embodiments may determine a pick-up location to avoid any traffic and/or environmental condition.

At step 2610, data capture module 2402 may receive a ride request from a user 130A-C. The ride request may include a starting point and a desired destination. For example, data capture module 2402 may receive a ride request from user 130A-C including a starting point (e.g., Las Vegas Blvd. at McCarran Airport) and a desired destination (e.g., Downtown Las Vegas) and current GPS locations of a plurality of vehicles-for-hire. Data received from ridesharing management server 150 may include GPS data and/or other user 130A-C or driver 130D-E device identifiers related to mobile communication devices 120A-F. In some embodiments, pick-up locations, drop-off locations, associated GPS data, and user 130A-C or driver 130D-E data may be processed by data capture module 2402.

At step 2612, data capture module 2402 may receive current locations of vehicles of a plurality of vehicles-for-hire. The current locations of the plurality of vehicles-for-hire may be determined by a location service application installed on a driver device, a driving-control device, or by a location determination component in the ridesharing management system 100, which may be a part of or separate from ridesharing management server 150.

At step 2614, traffic module 2404 may receive real-time traffic data and may identify an area of traffic obstruction 2504. Traffic data may include real-time traffic data regarding a certain geographical region, and may be used to, for example, calculate estimate pick-up and drop-off times, and determine an optimal route for a particular ride. For example, real-time traffic data may be received from a real-time traffic monitoring system, which may be integrated in or independent from ridesharing management system 100. Based on detection of atypical congestion, traffic module 2404 may include software instructions for receiving data indicative of an area of a traffic obstruction from ridesharing management server 150.

In some embodiments, image data, audio data. GPS data, and/or user data may be processed and/or analyzed by traffic module 2404 in order to identify the traffic obstruction.

At step 2616, vehicle and pick-up location selection module 2406 may select a vehicle-for-hire to pick up the user. For example, ride service parameters may be transmitted to ridesharing management server 150 for processing the request and selection of an available vehicle-for-hire based on the ride service parameters, as discussed above. Ridesharing management server 150 may further be configured to receive user input from user devices 120A-120C as to various ride service parameters and may select a vehicle-for-hire to pick up the user according to the specified parameters. Ridesharing management server 150 may communicate with devices associated with one or more of drivers 130D-E and a plurality of vehicle-for-hires across network 140, and may select a vehicle closest to the pick-up point of the user and/or located on a route that avoids the traffic obstruction. Other parameters of vehicle selection may be considered, including, for example, the location and availability of other vehicles-for-hire in the vicinity of the user, and including, for example, that other users may be simultaneously sending pick-up requests in a location proximate to user. Additionally, in some embodiments, ridesharing management server 150 may assign a plurality of users to concurrently share a vehicle-for-hire, and/or may determine differing pick-up locations and differing drop-off locations for the plurality of users.

At step 2618, vehicle and pick-up location selection module 2406 may identify a pick-up or drop-off location apart from the user's starting point. For example, vehicle and pick-up location selection module 2406 may identify a pick-up location that is remote from the user's starting point and peripheral to the area of the traffic obstruction. In some embodiments, a ride request may be associated with a maximum walking distance (e.g., 300 meters, 500 meters, etc.) from a starting point to a pick-up location that is remote from the user's starting point, as discussed above. In some embodiments, a ride request may be associated with a walking distance which is higher than maximum thresholds in case a close point cannot be found due to one or more conditions of the congested area. The pick-up location may or may not be inputted by the user or may be determined based on avoiding the traffic obstruction. In some embodiments, the pick-up location may be selected in an area currently walkable from a determined GPS position of the user's current location when sending a request for pick-up. For example, vehicle and pick-up location selection module 2406 may identify a pick-up location along a route that avoids the traffic obstruction.

At step 2620, transmission module 2408 may send to the user information about the pick-up location. For example, server 150 may transmit to user device 120A-C information relating to the pick-up location which may be displayed as an icon on a map, as discussed above. As part of the displayed information, walking directions to the pick-up location may be provided in visual, textual, and/or audio form so that the user can easily find the pick-up point. Consistent with this disclosure, transmission module 2408 may communicate with ridesharing management server 150 to send a first message to a user device 120A-C to provide information about pick-up location to display of user device 120A-C. The message may appear in different formats, for example, a text message including the estimated pick-up time, an audio message, or an image. Transmission module 2408 may communicate confirmation messages and notification and/or alerts based on detected changes in real-time traffic data, which may then change the pick-up and/or drop-off locations for the user to alternative locations. For example, ridesharing management server 150 may send information about the pick-up location to the user including walking directions to a location that is, for example, at least one block away from the user's starting point. Further, ridesharing management server 150 may select the pick-up location and the driving directions so that the user arrives at the pick-up location before arrival of the vehicle-for-hire.

At step 2622, transmission module 2408 may send to the selected vehicle-for-hire driving directions to the pick-up-location. For example, ridesharing management server 150 may transmit to a vehicle for hire using any number of electronic devices 120 information relating to the pick-up location. The information relating to the pick-up location may be displayed as an icon on a map, as discussed above. As part of the displayed information, driving directions to the pick-up location may also be provided in visual, textual, and/or audio form so that the driver may easily drive to the pick-up point. Consistent with this disclosure, transmission module 2408 may be configured to send, based on real time traffic data, ride service assignments (for example, including pick-up and drop-off location information) to the plurality of driver devices 120D and 120E associated with drivers 130D and 130E and/or driving-control device 120F, to substantially avoid the traffic obstruction.

Detecting the Number of Vehicle Passengers

In some embodiments, ridesharing management server 150 may receive ride request for a plurality of users and schedule more than one user to share the same vehicle-for-hire. In some situations, existing systems may encounter the technical problem of how to process the ride requests while taking into vehicle occupancy levels in order to transport passengers without exceeding a capacity of a ridesharing vehicle. For example, existing systems may have difficulty accurately detecting a changing occupancy of a vehicle-for-hire as it travels from one location to another, at which passengers may enter and/or exit. Some systems may provide different vehicle types to account for different occupancies, given that the number of vehicle passengers may unpredictably change, but fail to provide real-time detection of ridesharing vehicle passengers. Presently disclosed embodiments, on the other hand, address this problem by providing capacity information to a server based on detected sensor information.

For example, in some embodiments, ridesharing management server 150 may receive from at least one sensor associated with ridesharing vehicles operated by drivers 130D and 130E, and/or driving-control device 120F, information indicative of a current number of passengers or users 130A-130C in the ridesharing vehicles. Ridesharing management server 150 may then determine whether to assign additional users to the ridesharing vehicles based on the received information from the sensor and capacity thresholds associated with the ridesharing vehicles.

In some embodiments, ridesharing management server 150 may compare the sensor data associated with a ridesharing vehicle with a capacity threshold of the ridesharing vehicle, and may determine whether a number of actual passengers within the ridesharing vehicle exceeds a capacity threshold of the ridesharing vehicle. If, based on at least the sensor data, the number of detected passengers exceeds the capacity threshold of the ridesharing vehicle, ridesharing management server 150 may reassign one or more subsequent passengers. In some embodiments, a threshold block that prevents assignment of the additional users to the ridesharing vehicle when the ridesharing vehicle's current utilized capacity is above a threshold being less than the ridesharing vehicle's capacity threshold may also be implemented.

In some embodiments, ridesharing management server 150 may determine a discrepancy between an actual number of passengers entering a ridesharing vehicle at a specific pick-up location and the number of passengers expected to enter the ridesharing vehicle at a specific pick-up location, and may inform ridesharing management server 150 of the discrepancy, thereby causing a change in the route of the ridesharing vehicle.

As discussed above, user devices 120A-120C, driver devices 120D and 120E, and/or driving-control device 120F may respectively be installed with a user side ridesharing application, and a corresponding driver side ridesharing application. Mobile communications device 200 may be installed with a user side ridesharing application, and a corresponding driver side ridesharing application, and/or other software to perform one or disclosed embodiments described in the present disclosure, such as on mobile communications devices 120A-120F. Mobile communications device 200 may retrieve GPS/navigation instructions 268 from memory 250 and may facilitate GPS and navigation-related processes or routes associated with drivers 130D and 130E in communication with ridesharing management server 150. Ridesharing management server 150 may receive a ride request from one or more users 130A-130C, may receive data from sensors including a number of passengers currently located in or expected to occupy a ridesharing vehicle, and may take an action, such reassigning passengers or changing a vehicle route, based on a comparison between the actual number of passengers detected and the vehicle occupancy, as described in greater detail below.

In some embodiments, ridesharing management server 150 may transmit information to user device 120A-C, which may be, for example, a smartphone or tablet having a dedicated application installed therein. A graphical user interface (GUI) including a plurality of user-adjustable feature user side or driver side ridesharing application settings may be included on a display of mobile communications devices 120A-120C to visibly output information to one or more users 130A-C and/or drivers 130D and 130E in relation to anticipated or detected vehicle occupancy.

Figure 27:
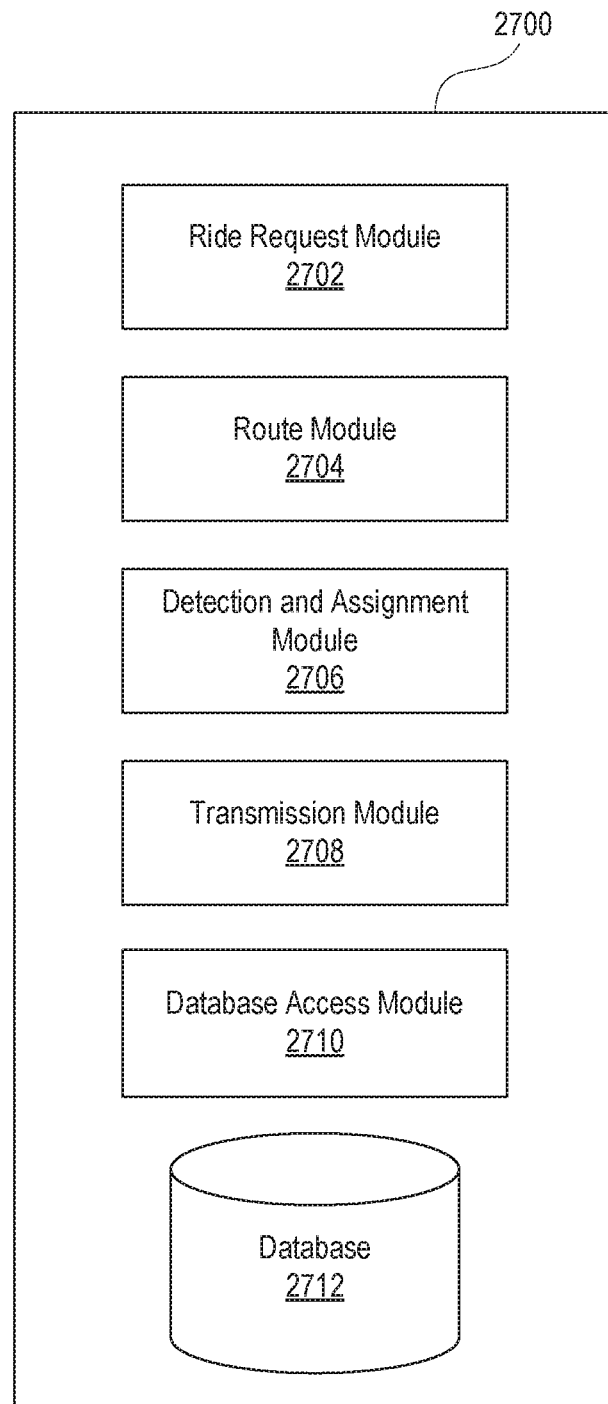
FIG. 27 illustrates an exemplary embodiment of a memory containing software modules consistent with the present disclosure.

FIG. 27 illustrates an exemplary embodiment of a memory 2700 containing software modules consistent with the present disclosure. In particular, as shown, memory 2700 may include a ride request module 2702, a route module 2704, a detection and assignment module 2706, a transmission module 2708, a database access module 2710, and a database 2712. Modules 2702, 2704, 2706, 2708, and 2710 may contain software instructions for execution by at least one processing device (e.g., processor 310), included with automated ridesharing dispatch system 300. Ride request module 2702, route module 2704, detection and assignment module 2706, transmission module 2708, database access module 2710, and database 2712 may cooperate to perform multiple operations. For example, ride request module 2702 may include a communications interface configured to electronically receive ride requests from a plurality of users, may access memory, and may process the received ride requests. Route module 2704 may determine a route for the ridesharing vehicle. Detection and assignment module 2706 may receive information indicative of a current number of passengers in the ridesharing vehicle, and may determine whether to assign additional users to the ridesharing vehicle. Transmission module 2708 may send instructions to pick up and drop off users based on an assignment from detection and assignment module 2706. Database access module 2710 may interact with database 2712 which may store any information associated with the functions of modules 2702-2708.

In some embodiments, memory 2700 may be included in, for example, memory 320 storing programs 330 including, for example, server app(s) 332, operating system 334, and data 340, and a communications interface 360, discussed above. Alternatively or additionally, memory 2700 may be stored in an external database 170 (which can also be internal to ridesharing management server 150) or external storage communicatively coupled with ridesharing management server 150 (not shown), such as one or more database or memory accessible over network 140. Further, in other embodiments, the components of memory 2700 may be distributed in more than one server.

In some embodiments, ride request module 2702 may receive, via a communications interface, ride requests from a plurality of users. As discussed above, the communications interface (e.g., communications interface 360) may include a modem, Ethernet card, or any other interface configured to exchange data with a network, such as network 140. Communications interface 360 may receive ride requests from a plurality of users 130A-C, and ride requests may include multiple pick-up and drop-off locations, and may be initiated from a user side ridesharing application on one or more user devices 120A-C.

In some embodiments, ride request module 2702 may also access memory 320 to store a capacity threshold for each of a plurality of ridesharing vehicles. The capacity threshold may include a total available number of seats present in a ridesharing vehicle. Alternatively, the capacity threshold may include a total amount of volumetric space available to accommodate a plurality of passengers in a ridesharing vehicle. In some embodiments, ride request module 2702 may process the ride requests received from the communications interface and assign to a ridesharing vehicle the plurality of users for pick up at a plurality of differing pick-up locations and for delivery to a plurality of differing drop-off locations. Ride request module 2702 may also receive software instructions for clustering a plurality of users to a single ridesharing vehicle based on a common pick-up point or a common drop-off point. Data received from ridesharing management server 150 may include GPS data indicating a location of a plurality of users, user devices 120A-C including user identifier data, and vehicle-for hire data indicating a plurality of vehicle-for-hire available for ridesharing. Data received from ridesharing management server 150 may also include a stored threshold capacity of each of a plurality of vehicles-for-hire.

In some embodiments, route module 2704 may determine, based on processed ride requests from ride request module 2702, a route for the ridesharing vehicle. For example, route module 2704 may determine an optimal route for a particular ride based on the number of differing pick-up locations and differing drop-off locations, and based on map information and environmental conditions, including for example, traffic or congestion. Route module 2704 may also calculate potential routes and guide users to a pick-off or drop-off location based on the received and processed ride requests. Route module 2704 may also utilize GPS/navigation instructions 268 to facilitate GPS and navigation-related processes and instructions and plan an optimum route for a plurality of passengers occupying a single ridesharing vehicle.

In some embodiments, detection and assignment module 2706 may receive from at least one sensor within the ridesharing vehicle, information indicative of a current number of passengers in the ridesharing vehicle. For example, detection and assignment module 2706 may detect, based on received sensor information, a current number of passengers positioned in each of the ridesharing vehicles, and may determine whether a number of identified passengers exceeds a stored threshold or capacity for a particular vehicle. Detection and assignment module 2706 may also determine whether to assign additional users to a particular ridesharing vehicle based on the received information from sensors and the capacity threshold associated with the ridesharing vehicle. Detection and assignment module 2706 may also determine whether to assign existing passengers to another ridesharing vehicle.

In some embodiments, detection and assignment module 270, may detect a discrepancy between an actual and an expected number of passengers entering a particular ridesharing vehicle. Detection and assignment module 2706 may also calculate a difference and, based on the difference, change a route based on route module 2704 instructions of a particular vehicle so to allow for or prevent pick-up of additional passengers. For example, a route of a particular vehicle may be extended to allow for pick-up of additional passengers when an actual number of passengers entering a vehicle detected by detection and assignment module 2706 is less than an expected number. Conversely, a route of a particular vehicle may be shortened to prevent pick-up of additional passengers when an actual number of passengers entering a vehicle detected by detection and assignment module 2706 exceeds an expected number. Other route variations and changes to allow for passenger drop-off may also be contemplated.

In some embodiments, detection and assignment module 2706 may receive information from a plurality of sensors to detect vehicle occupancy and entry of passengers into a ridesharing vehicle. For example, detection and assignment module 2706 may receive from ridesharing management server 150 audio and image data, captured by, for example, an image sensor or a microphone associated with a ridesharing vehicle. Image and audio data may be used to determine an actual number of vehicle occupants and may be configured to detect the current number of passengers in the ridesharing vehicle. In some embodiments, the ridesharing vehicle may include one or more a plurality of sensors that may also include LIDAR, proximity sensors, seat pressure sensors, thermal sensors, and/or other sensors to collect information related to vehicle occupancy. Detection and assignment module 2706 may receive detected information from each sensor placed internally or externally to a ridesharing vehicle and may determine vehicle occupancy based on any combination of sensor information. Detection and assignment module 2706 may then make a vehicle assignment corresponding to the detected vehicle occupancy.

In some embodiments, transmission module 2708 may communicate, based on assignment instructions from detection and assignment module 2706, to ridesharing management server 150 a message to pick up and drop off users. For example, transmission module 2708 may communicate pick-up and drop-off locations. In some examples, transmission module 2708 may communicate with ridesharing management server 150 to send a first message to a user device 120A to cause an indication of a calculated estimated pick-up time to appear on a display of user device 120A. The message may appear in different formats, for example, a text message including the estimated pick-up time, an audio message, or an image. Transmission module 2708 may communicate confirmation messages and notification and/or alerts based on detected changes vehicle assignment so that users can be notified that they are assigned to a different ridesharing vehicle. Transmission module 2708 may also transmit selected vehicle assignment and reassignment instructions for mobile devices 120A-C in accordance with detection and assignment module 2706 instructions.

In some embodiments, database access module 2710 may cooperate with database 2712 to retrieve information. Database 2712 may be configured to store any type of information of use to modules 2702-2710, depending on implementation-specific considerations. For example, in embodiments in which database access module 2710 is configured to provide a recommendation to add users, remove users (based on detection and assignment module 2706), and/or reroute a vehicle (based on route module 2704 and) based on a detected discrepancy amongst a number of vehicle passengers, database access module 2710 may retrieve prior-collected vehicle or map information from database 2712 in order to reassign passengers or change the route of a ridesharing vehicle (or request re-assignment of at least one of the plurality of users scheduled to be picked up by the ridesharing vehicle to a different ridesharing vehicle). The change in route may also include a change in pick-up or drop-off location. Further, database 2712 may store metadata associated with pick-up or drop-offs (based on ride request module 2702). In some embodiments, database 2712 may store one or more images of the plurality of captured images and/or receive sensor data from a plurality of sensors.

Modules 2702-2710 may be implemented in software, hardware, firmware, a mix of any of those, or the like. For example, if the modules are implemented in software, they may be stored in a server or one or more servers. However, in some embodiments, any one or more of modules 2702-2710 and data associated with database 2712, may, for example, be stored in processor 310 and/or located on ridesharing management server 150, which may include one or more processing devices. Processing devices of ridesharing management server 150 may be configured to execute the instructions of modules 2702-2710. In some embodiments, aspects of modules 2702-2710 may include software, hardware, or firmware instructions (or a combination thereof) executable by one or more processors, alone or in various combinations with each other. For example, modules 2702-2710 may be configured to interact with each other and/or other modules of ridesharing management server 150 and/or a system 100 to perform functions consistent with disclosed embodiments.

Figure 28A:
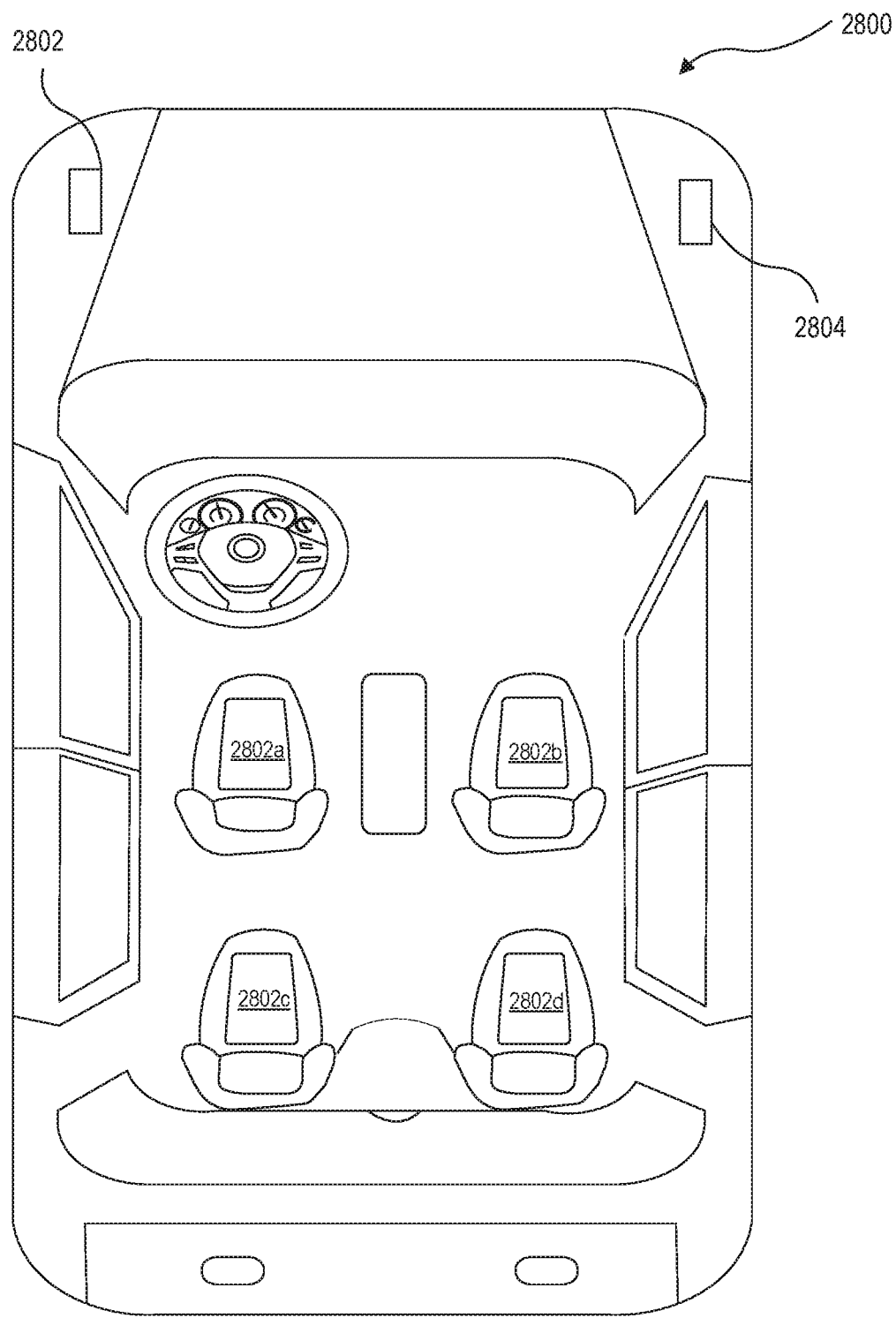
FIG. 28A is a schematic illustration of an example of an interior of a vehicle used for ridesharing purposes according to a disclosed embodiment.

FIG. 28A is a schematic illustration of an example of an interior of a vehicle 2800 used for ridesharing purposes according to a disclosed embodiment. Vehicle 2800 may include a plurality of seats to accommodate multiple vehicle passengers. One vehicle passenger may be the driver. In some embodiments, vehicle 2800 may include an autonomous driving vehicle (e.g., autonomous vehicle 130F) without a driver and/or seat designated for a driver. The interior of a vehicle 2800 may include a plurality of sensors 2082 and 2084 to detect a current vehicle occupancy level. For example, sensors 2802 and 2084 may include one or more imaging and/or proximity sensors. Interior of vehicle 2800 may also include specific sensors 2802a-d corresponding to each of the plurality of seats. For example, sensors 2802a-d may include pressure sensors or thermal sensors that are activated when a passenger sits down and occupies a seat. Other types of sensors are contemplated. As shown in FIG. 28A, vehicle 2800 is empty and does not include any passengers. Accordingly, sensors 2082, 2084, and 2802a-d may communicate to server 150 a state that no vehicle passengers are detected.

In some embodiments, the plurality of sensors 2802a-d equipped with each seat may include weight sensors, thermometers to measure body temperatures, or may include seat belt sensors. The seat belt sensors (not shown) may include sensors located on seat belt buckles provided for each seat in the vehicle. The seat belt sensors may determine whether a seat belt is fastened or unfastened to detect if a passenger seat is occupied. In some examples, cameras may be mounted on each seat or each headrest, and heart pulse sensors, electric field sensors, or other biometric sensors may be positioned on each seat to determine individual seat occupancy. Detection and assignment module 2706 may aggregate information for each seat including signals of detection and non-detection to calculate a number of ridesharing occupants.

Figure 28B:
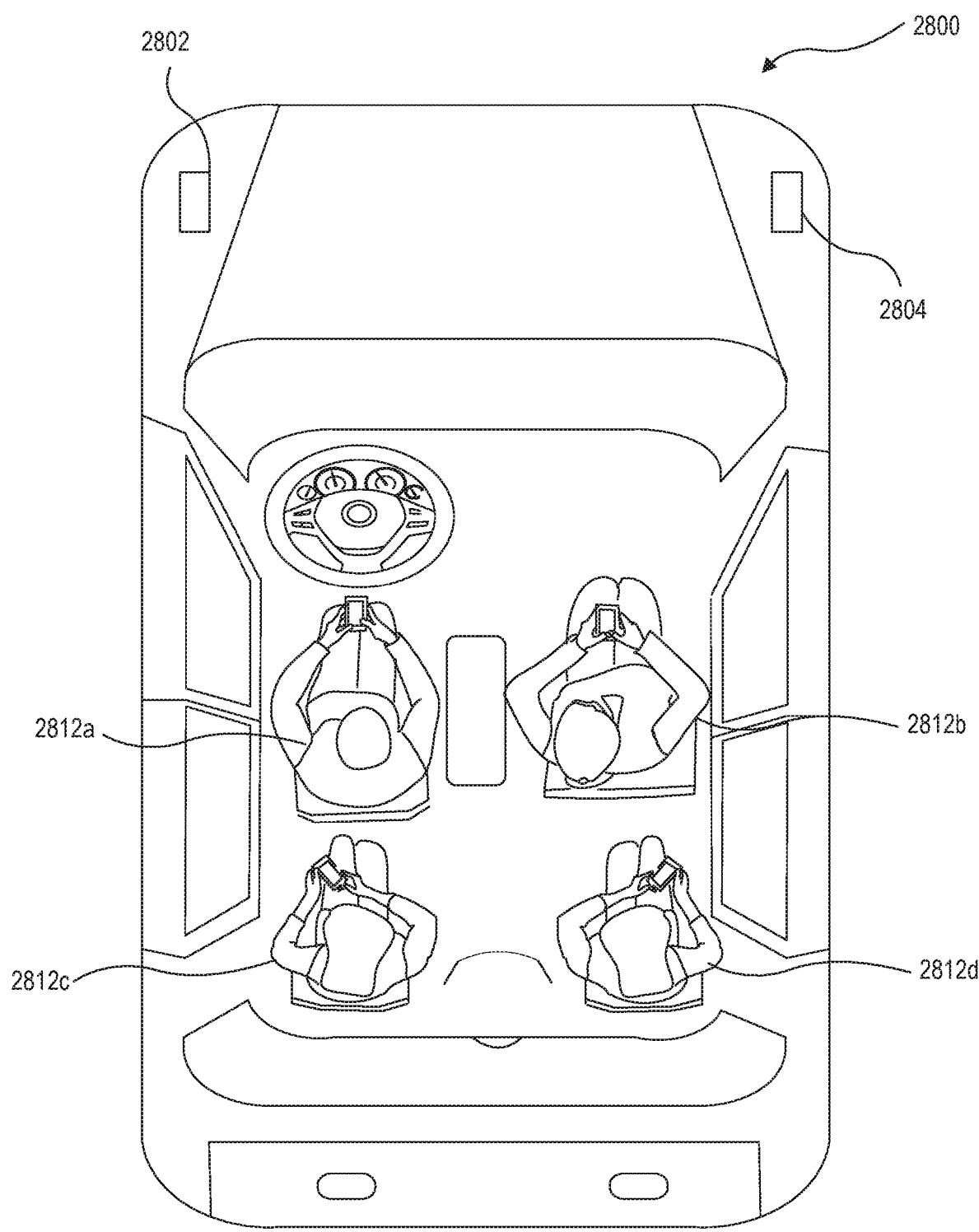
FIG. 28B is a schematic illustration of an example of an interior of a vehicle used for ridesharing purposes according to a disclosed embodiment.

FIG. 28B is a schematic illustration of an example of an interior of a vehicle used for ridesharing purposes according to a disclosed embodiment. As shown in FIG. 28B, vehicle 2800 includes four passengers 2812a-d positioned in the interior of the vehicle and each occupying an individual seat. Sensors 2802, 2084, and/or 2082a-d may communicate detection of each the four passengers 2812a-d to ridesharing management server 150. Although the example shown includes four passenger seats in an autonomous vehicle, as discussed earlier, in some embodiments, a driver may instead occupy one of the seats. Further, any appropriate number of passenger seats (e.g., 1, 2, 3, 4, 5, etc.) and/or seat configurations (e.g., additional or fewer seats and/or additional fewer rows of seats) are consistent with the disclosed embodiments.

In some embodiments, sensors 2802 and 2084 may be configured to be positioned at the exterior of the vehicle in order to detect vehicle passengers in the proximity of and entering vehicle 2800. Such a detection may inform ridesharing management server 150 of an anticipated number of vehicle passengers 2812a-d that may enter vehicle 2800. Detection and assignment module 2706 may also determine an actual number of users entering the ridesharing vehicle by communicating with mobile devices of the users. A short-range transceiver configured to determine an actual number of users entering the ridesharing vehicle by communicating with mobile devices of the users may also be contemplated. Detection and assignment module 2706 may also compare the detection of vehicle passengers 2812a-d external and internal to the vehicle to identify any discrepancies and change a route or vehicle 2800 trajectory. Consistent with this disclosure, detection and assignment module 2706 may aggregate information for each seat 2802a-d including signals of detection and non-detection to calculate a number of ridesharing passengers 2812a-d. As shown in FIG. 28B, each of passengers 2812a-d may also have mobile devices. Detection of the mobile devices corresponding to each of vehicle passengers 2812a-d may be contemplated as a means to detect vehicle 2800 occupancy. For example, the radio-frequency (RF) signals emitted by electrically powered mobile radio-emitting devices such as smartphones phones or similar personal wearable communication devices may be detected by a sensor included in vehicle 2800. In some embodiments, a sensor, such as an image sensor associated with a mobile communications device within the ridesharing vehicle, may be configured (e.g., via software instructions including in a ride sharing application) to detect the current number of passengers in the ridesharing vehicle and to transmit the detected number to, for example, ridesharing management server 150.

In some embodiments, each passenger may not be directly positioned in each seat. For example, in some cases, vehicle passengers may be standing, sharing a seat, sitting on another's lap, or otherwise not confined to a seat. In such examples, other means of detection are contemplated. For example, a LIDAR system implemented either internal or external to vehicle 2800 may calculate distance and/or location data of passengers 2812a-d to determine occupancy. LIDAR systems may include a transmitter and a receiver emitting light pulses internal to or through windows of vehicle 2800 to gather distance data for passengers 2812a-d located internal to vehicle 2800. LIDAR wavelengths may include infrared, near-infrared, or ultraviolet wavelengths, and may include periodic or continuous pulses. In some embodiments, the LIDAR system may emit light pulses that reflect on seats, headrests, a dashboard, steering wheel, and passengers. Captured distance information based on reflected light may indicate an existence of absence of passengers inside vehicle 2800 or external to vehicle 2800, and detection and assignment module 2706 may incorporate this detected information to identify occupancy and make a passenger assignment.

In some embodiments, an occupant can be identified based a point cloud image. For example, a LIDAR system may obtain a point cloud image, and detection and assignment module 2706 may compare the point cloud image to a default template including a silhouette of at least one passenger positioned internal to a vehicle to determine whether the point cloud image identifies a vehicle passenger. If there is a match or a substantially close match between the template and the point cloud image, then a passenger is determined to be inside vehicle 2800. Alternatively, if there is no match between a point cloud image and a template, then no passenger is determined to be within vehicle 2800.

In some embodiments, a three-dimensional image volume in conjunction with a volumetric threshold may be determined and computed to determine the occupancy of vehicle 2800. For example, an average volume for each of seats 2802a-d and a corresponding volume for a typical vehicle passenger 2812a-d may be determined. When one or more volumes exceed a predetermined threshold, a plurality of vehicle passengers 2812a-d may be detected in vehicle 2800. When one or more volumes fall below a predetermined threshold or threshold blocks, one or more passengers 2812a-d may not be in vehicle 2800. Alternately, a series of volumetric ranges may be contemplated and correspond to a particular number of passengers 2812a-d. For example, a low volume range may only indicate a single vehicle passenger 2812a-d, whereas a high volume range may include three or four vehicle passengers 2812a-d.

In some embodiments, detection may be temporal in nature. For example occupancy detection may begin when a driver begins or stops driving. If a detected vehicle speed is almost zero (e.g., vehicle 2800 is stationary), then a vehicle occupancy may not be detected. However, when a vehicle speed is detected at a value greater than zero (e.g., vehicle 2800 is in motion), then a vehicle occupancy may be detected. Such temporal detection constraints may enable detection and assignment module 2706 to eliminate false detection results when passengers are moving in and out of vehicle before a ride starts.

Figure 29A:
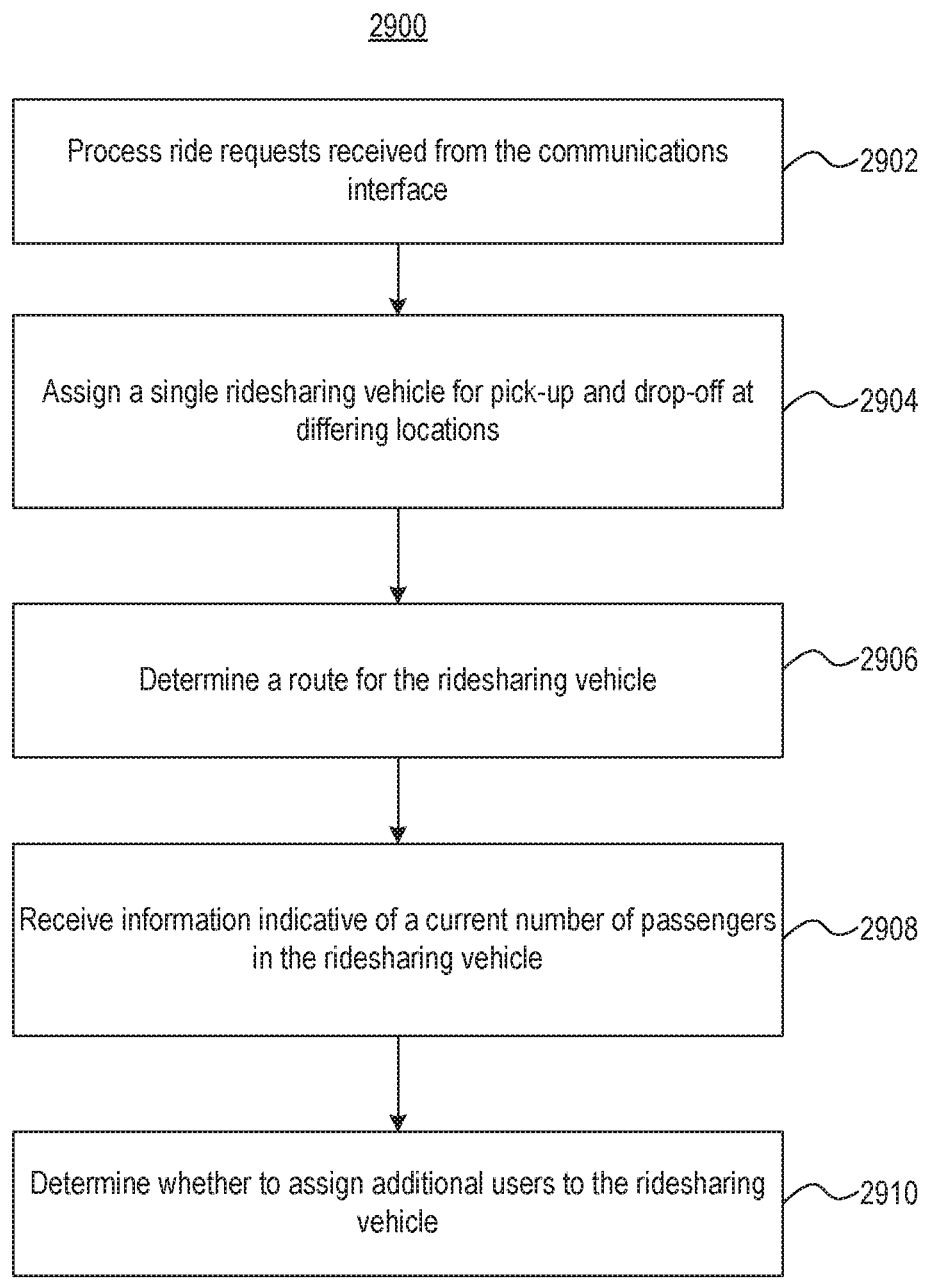
FIG. 29A is a flowchart of an example of a method for automatically dispatching ridesharing vehicles.

FIG. 29A is a flowchart of an example of a method 2900 for automatically dispatching ridesharing vehicles. Steps of method 2900 may be performed by one or more processors of server 150 and/or memory 320 and memory modules 2700, which may receive data from one or more user devices and one or more sensors.

At step 2902, ride request module 2702 may electronically receive ride requests from a communications interface (e.g., communications interface 360) from a plurality of users. Ride requests may indicate a plurality of differing pick-up and drop-off locations from the plurality of users. The plurality of users may send ride requests from multiple user devices 120A-C. Ride request module 2702 may include software instructions for receiving data from ridesharing management server 150, and may include software instructions for receiving ride requests from a user side ridesharing application installed on each of the multiple user devices 120A-C. In some embodiments, ride request module 2702 may also access memory 320 to retrieve a stored capacity threshold for each of a plurality of ridesharing vehicles in response to electronically receiving ride requests from the plurality of users.

At step 2904, ride request module 2702 may process the ride requests received from the communications interface and assign to a single ridesharing vehicle the plurality of users for pick up at a plurality of differing pick-up locations and for delivery to a plurality of differing drop-off locations. Ride request module 2702 may also receive software instructions for clustering a plurality of users to a single ridesharing vehicle based on a common pick-up point or a common drop-off point. Data received from ridesharing management server 150 may include GPS data indicating a location of a plurality of users, user devices 120A-C including user identifier data, and vehicle-for hire data indicating a plurality of vehicle-for-hire available for ridesharing. Data received from ridesharing management server 150 may also include a stored capacity threshold for each of a plurality of ridesharing vehicles.

At step 2906, route module 2704 may determine, based on the processed ride requests, an optimum route for the ridesharing vehicle. As discussed above, route module 2704 may also calculate potential routes and guide users to a pick-off or drop-off location based on the received and processed ride requests. Route module 2704 may also use GPS/navigation instructions 268 to facilitate GPS and navigation-related processes and instructions and plan an optimum route for picking up and dropping off a plurality of passengers occupying a single ridesharing vehicle.

At step 2908, detection and assignment module 2706 may receive from at least one sensor within the ridesharing vehicle, information indicative of a current number of passengers in the ridesharing vehicle. For example, detection and assignment module 2706 may detect a current number of passengers positioned in each of the ridesharing vehicles, and may determine whether a number of identified users exceeds a stored threshold or capacity for a particular vehicle. This information may be stored in database 2712. In some embodiments, this information may be based on one or more sensors (e.g., sensors 2802a-d, 2802, and 2804). As discussed earlier, the sensors may be proximity sensors, pressure sensors, thermal sensors, image sensors, audio sensors, LIDAR-based sensors, or any other detection mechanism. Sensor data may be transmitted to server 150 and may be compared to occupancy data in database 2712.

At step 2910, detection and assignment module 2706 may determine whether to assign additional users to the ridesharing vehicle. In some embodiments, detection and assignment module 2706 may compare the sensor data from the particular vehicle with the capacity threshold of the particular vehicle and may determine whether to assign existing passengers to another ridesharing vehicle based on this comparison. For example, if the detected number of passengers is the same as the capacity threshold, as shown in FIG. 28B, then no additional users will be assigned to the ridesharing vehicle. Conversely, if the detected number of passengers is less than the capacity threshold, then additional users may be assigned to the ridesharing vehicle. Transmission module 2708 may communicate that additional users may be assigned to a ridesharing vehicle.

Figure 29B:
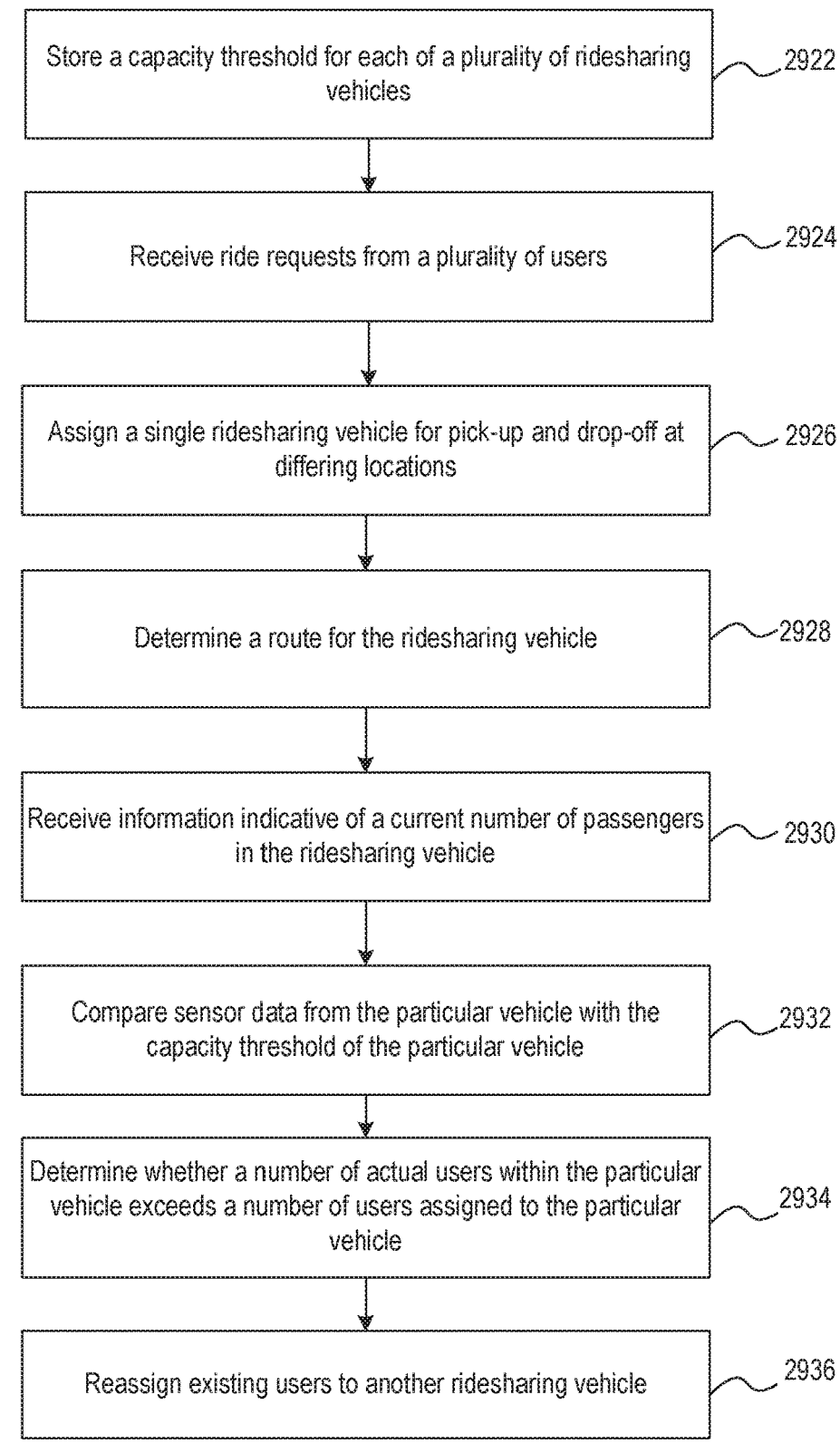
FIG. 29B is a flowchart of an example of a method for automatically dispatching ridesharing vehicles.

FIG. 29B is a flowchart of an example of another method 2920 for automatically dispatching ridesharing vehicles. Steps of method 2920 may be performed by one or more processors of server 150 and/or memory 320 and memory modules 2700, which may receive data from one or more user devices and one or more sensors.

At step 2922, ride request module 2702 may store a capacity threshold for each of a plurality of ridesharing vehicles. As discussed earlier, the capacity threshold may include a total available number of seats present in a ridesharing vehicle, as shown in FIG. 28A. Alternatively, the capacity threshold may include a total amount of volumetric space available to accommodate a plurality of passengers in a ridesharing vehicle. For example, a capacity threshold may include 4 seats, such as seats 2802a-d shown in FIG. 28A.

At step 2924, ride request module 2702 may receive ride requests from a plurality of users. As discussed earlier at step 2902, ride request module 2702 may electronically receive ride requests from a communications interface 360 from a plurality of users. Ride requests may indicate a plurality of differing pick-up and drop-off locations from the plurality of users. Ride request module 2702 may include software instructions for receiving data from ridesharing management server 150, and may include software instructions for receiving ride requests from a user side ridesharing application installed on each of the multiple user devices 120A-C. As shown in FIG. 28B, passengers 2812a-d may supply ride requests to ride request module 2702, and are occupying vehicle 2800.

At step 2926, ride request module 2702 may process the ride requests received from the communications interface and assign to a single ridesharing vehicle the plurality of users for pick up at a plurality of differing pick-up locations and for delivery to a plurality of differing drop-off locations, as discussed earlier in step 2904. As shown in FIG. 28B, passengers 2812a-d were assigned to share a single ridesharing vehicle 2800. Processed data received from ridesharing management server 150 may include GPS data indicating a location of a plurality of users, user devices 120A-C including user identifier data, and vehicle-for hire data indicating a plurality of vehicle-for-hire available for ridesharing to enable ride request module 2702 to assign a ridesharing vehicle.

At step 2928, route module 2704 may determine, based on processed ride requests from ride request module 2702, an optimum route for the ridesharing vehicle. As discussed earlier in step 2906, route module 2704 may also use GPS/navigation instructions 268 to facilitate GPS and navigation-related processes and instructions and plan an optimum route for a plurality of passengers occupying a single ridesharing vehicle.

At step 2930, detection and assignment module 2706 may receive information indicative of a current number of passengers in the ridesharing vehicle. As discussed earlier in step 2908, detection and assignment module 2706 receive from at least one sensor within the ridesharing vehicle, information indicative of a current number of passengers in the ridesharing vehicle. In some embodiments, the at least one sensor may include LIDAR, proximity sensors, pressure sensors, thermal sensors, and/or other sensors to collect information related to vehicle occupancy.

At step 2932, detection and assignment module 2706 may compare sensor data from a particular vehicle with the capacity threshold data from the particular vehicle. Detection and assignment module 2706 and ridesharing management server 150 may compare the sensor data associated with ridesharing vehicles operated by drivers 130D and 130E, and driving-control device 120F with the capacity threshold of the ridesharing vehicles. Sensor data may be transmitted to server 150 and may be compared to occupancy data in database 2710.

At step 2934, detection and assignment module 2706 may determine whether an actual number of users within the particular vehicle exceeds a number of users assigned to the particular vehicle. Detection and assignment module 2704 may detect a current number of passengers positioned in each of the ridesharing vehicles, and may determine whether a number of identified users exceeds a stored threshold or capacity for a particular vehicle. This information may be stored in database 2710, and may be retrieved to formulate the comparison.

At step 2936, if the number of users within the particular vehicle exceeds the number of users assigned to the particular vehicle, detection assignment module 2706 may reassign one or more users to another ridesharing vehicle. Detection assignment module 2706 may communicate with database access module 2710 to retrieve prior-collected vehicle or map information from database 2712 in order to reassign passengers or change the route of a ridesharing vehicle. Transmission module 2708 may communicate the reassignment. For example, if the detected number of passengers is exceeds the capacity threshold, which is met as shown in FIG. 28B, then additional users will be assigned to another ridesharing vehicle. Conversely, if the detected number of passengers does not exceed the capacity threshold, then additional users may not be assigned to another ridesharing vehicle.

Figure 29C:
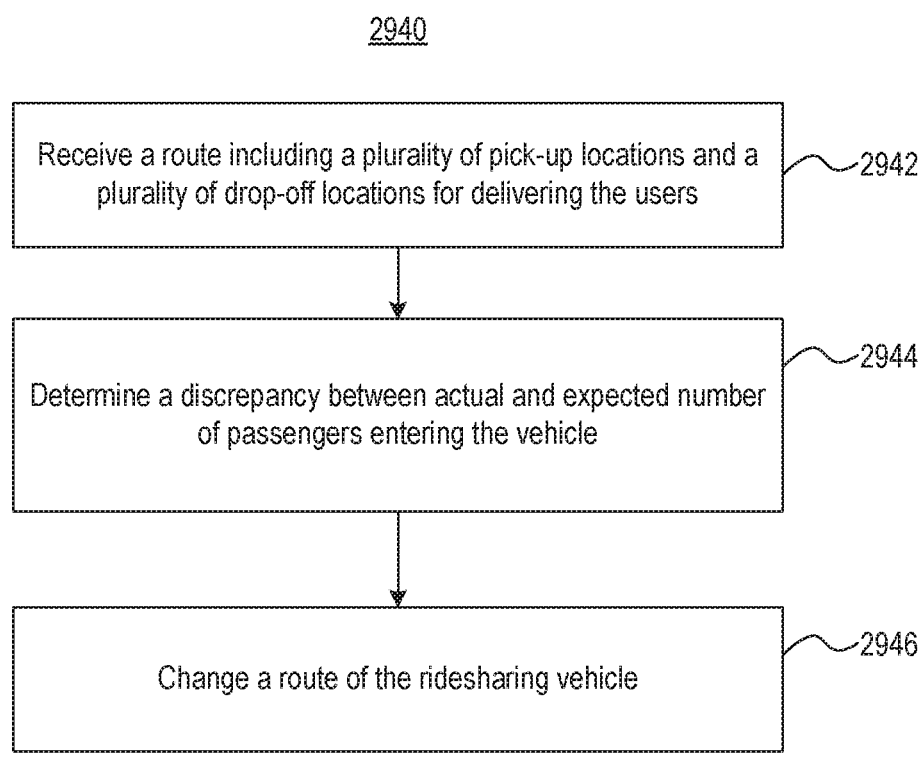
FIG. 29C is a flowchart of an example of a method for changing a route for an autonomous ridesharing vehicle.

FIG. 29C is a flowchart of an example of a method 2940 for changing a route for an autonomous ridesharing vehicle. Steps of method 2940 may be performed by one or more processors of server 150 and/or memory 320 and memory modules 2700, which may receive data from one or more user devices and one or more sensors.

At step 2942, ride request module 2702 may receive a desired route according to instructions from route module 2704 and based on a plurality of pick-up locations and a plurality of drop-off locations for delivering the users. The route may include a plurality of pick-up locations for picking up users, a number of the users expected to enter the ridesharing vehicle at each pick-up location, and a plurality of drop-off locations for delivering the users. As discussed earlier, route module 2704 may also determine, based on the received route from ride request module 2702, an optimum route for the ridesharing vehicle.

At step 2944, detection and assignment module 2706 may determine a discrepancy between an actual and expected number of passengers entering a ridesharing vehicle. For example, detection and assignment module 2706 may determine a discrepancy between an actual number of passengers entering the ridesharing vehicle at a specific pick-up location and the number of users expected to enter the ridesharing vehicle at the specific pick-up location. Detection and assignment module 2704 may then calculate a difference based on received sensor information from a plurality of sensors, discussed above. Different sensors may be utilized to make the detection of an actual number of passengers entering a ridesharing vehicle at different pick-up locations.

At step 2946, route module 2704 may change a route, based on the determined discrepancy, for the ridesharing vehicle. For example, route module 2704 may change a route so as to allow for or prevent pick-up of additional passengers. For example, a route of a particular vehicle may be extended to allow for pick-up of additional passengers when an actual number of passengers entering a vehicle is less than an expected number. Conversely, a route of a particular vehicle may be shortened to prevent pick-up of additional passengers when an actual number of passengers entering a vehicle exceeds an expected number. Other route variations and changes to allow for passenger pick-up and drop-off may also be contemplated, and may be implemented in real-time based on dynamic usage of user side ridesharing applications implemented on user devices 120A-C. Transmission module 2708 may communicate the change in route to vehicle passengers.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, e.g., hard disks or CD ROM, or other forms of RAM or ROM, USB media, DVD, Blu-ray, Ultra HD Blu-ray, or other optical drive media.

Computer programs based on the written description and disclosed methods are within the skills of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.). Java, C++, Objective-C, HTML, HTML/AJAX combinations. XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The examples are to be construed as non-exclusive. Furthermore, the steps of the disclosed methods may be modified in any manner, including by reordering steps and/or inserting or deleting steps. It is intended, therefore, that the specification and examples be considered as illustrative only.

What is claimed is:

1. An automated ridesharing dispatch system, comprising:
a communications interface configured to electronically receive ride requests from a plurality of users;
memory configured to store a capacity threshold for each of a plurality of ridesharing vehicles;
at least one processing device configured to:
process the ride requests received from the communications interface and to assign to a single ridesharing vehicle the plurality of users for pick up at a plurality of differing pick-up locations and for delivery to a plurality of differing drop-off locations;
determine a first route for the ridesharing vehicle;
receive from at least one sensor within the ridesharing vehicle, information indicative of a current number of passengers in the ridesharing vehicle;
determine whether to assign additional users to the ridesharing vehicle and reassign one of the passengers to another ridesharing vehicle based on the received information from the sensor and the capacity threshold associated with the ridesharing vehicle;
calculate, based on the assignment determination, a difference between the current number and an expected number of passengers for the ridesharing vehicle; and
based on the calculated difference, change the first route for the ridesharing vehicle to a shorter second route to prevent pick-up of additional passengers.

2. The system of claim 1, wherein the at least one sensor includes an image sensor configured to detect the current number of passengers in the ridesharing vehicle.

3. The system of claim 1, wherein the at least one sensor includes a plurality of image sensors configured to detect the current number of passengers in the ridesharing vehicle.

4. The system of claim 1, wherein the at least one sensor includes an image sensor associated with a mobile communications device within the ridesharing vehicle and configured to detect the current number of passengers in the ridesharing vehicle.

5. The system of claim 1, wherein the at least one sensor includes a plurality of pressure sensors associated with seats in the ridesharing vehicle and configured to detect the current number of seats occupied in the ridesharing vehicle.

6. The system of claim 1, wherein the at least one sensor includes a thermal sensor configured to detect the current number of passengers in the ridesharing vehicle.

7. The system of claim 1, wherein the at least one sensor includes a proximity sensor configured to detect the current number of passengers in the ridesharing vehicle.

8. The system of claim 1, wherein the at least one sensor includes a short-range transceiver configured to determine an actual number of users entering the ridesharing vehicle by communicating with mobile devices of the users.

9. The system of claim 1, wherein the at least one processing device is configured to receive from the communications interface an actual number of individuals entering the ridesharing vehicle.

10. The system of claim 1, wherein the at least one processing device is configured to receive from the communications interface an actual number of occupants in the ridesharing vehicle.

11. The system of claim 1, wherein the at least one processing device is further configured to implement a threshold block that prevents assignment of the additional users to the ridesharing vehicle when the ridesharing vehicle's current utilized capacity is above a threshold being less than the ridesharing vehicle's capacity threshold.

12. The system of claim 1, wherein the ridesharing vehicle is part of an autonomous vehicle and the at least one processor is further configured to determine a discrepancy between a number of users expected to enter the ridesharing vehicle and the actual number of passengers entering the ridesharing vehicle.

13. The system of claim 12, wherein the at least one processing device is further configured to change the determined route of the ridesharing vehicle in response to a detected discrepancy.

14. The system of claim 13, wherein the at least one processing device is further configured to reassign at least one of the plurality of users scheduled to be picked up by the ridesharing vehicle to a different ridesharing vehicle.

15. The system of claim 1, wherein the at least one processing device is further configured to change an assigned drop-off location of at least one of the passengers in the ridesharing vehicle.

16. The system of claim 15, wherein the at least one processing device is further configured to communicate with at least one mobile communications device associated with the at least one passenger to inform the at least one passenger about the change in the assigned drop-off location.

17. A non-transitory computer-readable storage medium storing instructions that, when executed by at least one processing device, cause the at least one processing device to perform a method for automatically dispatching ridesharing vehicles, the method comprising:
    storing a capacity threshold for each of a plurality of ridesharing vehicles;
    receiving ride requests from a plurality of users;
    assigning to a particular ridesharing vehicle the plurality of users for pick up at a plurality of differing pick-up locations and for delivery to a plurality of differing drop-off locations;
    determining a first route for the ridesharing vehicle;
    receiving at a location remote from the particular vehicle, and based on sensor data transmitted from the particular vehicle, information indicative of a current number of passengers in the particular vehicle;
    comparing the sensor data from the particular vehicle with the capacity threshold of the particular vehicle;
    determining, based on comparing, whether a number of actual users within the particular vehicle exceeds a number of users assigned to the particular vehicle;
    reassigning to another vehicle a subsequent user already assigned to the particular vehicle if, from the sensor data, actual users detected exceeds the number of assigned users;
    calculating, based on the assignment determination, a difference between the current number and an expected number of passengers for the ridesharing vehicle; and
    based on the calculated difference, changing the first route for the ridesharing vehicle to a shorter second route to prevent pick-up of additional passengers.

18. The non-transitory computer-readable storage medium according to claim 17, wherein the sensor data includes data from at least one of an image sensor, a pressure sensor, a thermal sensor, a proximity sensor, and a short-range transceiver.

* * * * *